US012584648B2

(12) United States Patent
Risbeck et al.

(10) Patent No.: US 12,584,648 B2
(45) Date of Patent: Mar. 24, 2026

(54) BUILDING MANAGEMENT SYSTEM WITH CLEAN AIR AND INFECTION REDUCTION FEATURES

(71) Applicant: Tyco Fire & Security GmbH, Neuhausen am Rheinfall (CH)

(72) Inventors: Michael J. Risbeck, Madison, WI (US); Young M. Lee, Old Westbury, NY (US); Jonathan D. Douglas, Mequon, WI (US); Martin Z. Bazant, Wellesley, MA (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 406 days.

(21) Appl. No.: 18/106,934

(22) Filed: Feb. 7, 2023

(65) Prior Publication Data

US 2023/0280064 A1 Sep. 7, 2023

Related U.S. Application Data

(60) Provisional application No. 63/307,981, filed on Feb. 8, 2022.

(51) Int. Cl.
| | |
|---|---|
| *F24F 11/63* | (2018.01) |
| *G05B 19/042* | (2006.01) |
| *F24F 110/64* | (2018.01) |

(52) U.S. Cl.
CPC ............ *F24F 11/63* (2018.01); *G05B 19/042* (2013.01); *F24F 2110/64* (2018.01); *G05B 2219/2614* (2013.01)

(58) Field of Classification Search
CPC .......... F24F 11/63; F24F 2110/64; F24F 8/22; F24F 2120/10; F24F 11/64;
(Continued)

(56) References Cited

U.S. PATENT DOCUMENTS

| | | | |
|---|---|---|---|
| 10,359,748 B2 | 7/2019 | Elbsat et al. | |
| 11,037,681 B1 * | 6/2021 | Wala ...................... | G16H 20/60 |

(Continued)

FOREIGN PATENT DOCUMENTS

| | | |
|---|---|---|
| EP | 1 156 286 A2 | 11/2001 |
| WO | WO-2012/161804 A1 | 11/2012 |

(Continued)

OTHER PUBLICATIONS

Cao, Q., Kuehn, T.H., Kim, S.C., Ou, Q., Pei, C. and Pui, D.Y., 2021. An experimentally validated analytical model for aerosol No. concentration reduction in classrooms. Aerosol and Air Quality Research, 21(9), p. 210038. (Year: 2021).*
(Continued)

*Primary Examiner* — Alicia M. Choi
(74) *Attorney, Agent, or Firm* — Foley & Lardner LLP

(57) ABSTRACT

Systems and methods for executing an IAQ analysis of a building. One system includes a controller including memory and one or more processors configured to obtain IAQ data from one or more sensors within the building, wherein the IAQ data is associated with at least one of a plurality of environment species, obtain BAS data, identify one or more unknown parameters from the IAQ data and BAS data of two or more of the plurality of environment species, estimate the one or more unknown parameters based on inputting the IAQ data and the BAS data into an optimization model, and wherein the optimization model analyzes predicted concentrations of the plurality of environment species subject to the two or more of the plurality of environment species evolving according to a single-species concentration model, and provide the estimated one or more unknown parameters to one or more predictive models.

20 Claims, 41 Drawing Sheets

(58) Field of Classification Search

CPC .............. F24F 2110/10; F24F 2110/20; F24F 2110/70; F24F 11/30; F24F 11/46; F24F 11/0001; F24F 11/006; G05B 19/042; G05B 2219/2614; G05B 15/02; Y02B 30/70

See application file for complete search history.

(56) References Cited

U.S. PATENT DOCUMENTS

| | | | | |
|---|---|---|---|---|
| 11,513,486 | B2 | 11/2022 | Kupa et al. | |
| 11,620,594 | B2* | 4/2023 | Endel | G05B 15/02 |
| | | | | 700/277 |
| 2003/0055798 | A1 | 3/2003 | Hittle et al. | |
| 2004/0005856 | A1 | 1/2004 | Sharp et al. | |
| 2008/0188173 | A1* | 8/2008 | Chen | F24F 11/77 |
| | | | | 454/239 |
| 2015/0316907 | A1 | 11/2015 | Elbsat et al. | |
| 2017/0081707 | A1 | 3/2017 | Dillon et al. | |
| 2018/0285800 | A1 | 10/2018 | Wenzel et al. | |
| 2018/0357365 | A1 | 12/2018 | Meadow et al. | |
| 2018/0357577 | A1 | 12/2018 | Elbsat et al. | |
| 2018/0375444 | A1 | 12/2018 | Gamroth | |
| 2019/0187635 | A1* | 6/2019 | Fan | F24F 11/63 |
| 2019/0340709 | A1 | 11/2019 | Elbsat et al. | |
| 2019/0347622 | A1 | 11/2019 | Elbsat et al. | |
| 2020/0348038 | A1 | 11/2020 | Risbeck et al. | |
| 2021/0010701 | A1 | 1/2021 | Nesler et al. | |
| 2021/0011444 | A1* | 1/2021 | Risbeck | F24F 11/52 |
| 2021/0018206 | A1* | 1/2021 | Barooah | F24F 11/52 |
| 2021/0222231 | A1 | 7/2021 | Dillon et al. | |
| 2021/0293439 | A1* | 9/2021 | Melink | F24F 11/46 |
| 2021/0356153 | A1 | 11/2021 | Nesler et al. | |
| 2021/0381711 | A1* | 12/2021 | Harvey | G06N 3/084 |
| 2022/0057099 | A1 | 2/2022 | Clement et al. | |
| 2022/0058545 | A1 | 2/2022 | Warake et al. | |
| 2022/0058556 | A1 | 2/2022 | Warake et al. | |
| 2022/0065479 | A1 | 3/2022 | Douglas et al. | |
| 2022/0082280 | A1 | 3/2022 | Douglas et al. | |
| 2022/0100918 | A1 | 3/2022 | Ploegert et al. | |
| 2022/0154956 | A1* | 5/2022 | Maruyama | F24F 11/52 |
| 2022/0203287 | A1 | 6/2022 | Wenger et al. | |
| 2022/0203288 | A1 | 6/2022 | Wenger et al. | |
| 2022/0205962 | A1 | 6/2022 | Vanderkoy | |
| 2022/0207215 | A1 | 6/2022 | Liu et al. | |
| 2022/0221184 | A1 | 7/2022 | Gupta et al. | |
| 2022/0228756 | A1* | 7/2022 | Gupta | F24D 19/1048 |
| 2022/0254483 | A1 | 8/2022 | Boisvert et al. | |
| 2022/0277851 | A1 | 9/2022 | Wellig | |
| 2022/0282886 | A1 | 9/2022 | Hriljac et al. | |
| 2022/0293261 | A1 | 9/2022 | Mcbrady et al. | |
| 2022/0305438 | A1 | 9/2022 | Wenger et al. | |
| 2022/0305881 | A1 | 9/2022 | Neu et al. | |
| 2022/0325913 | A1* | 10/2022 | Dong | F24F 11/65 |
| 2023/0042065 | A1 | 2/2023 | Douglas et al. | |
| 2023/0070313 | A1 | 3/2023 | Douglas et al. | |
| 2023/0103453 | A1 | 4/2023 | Douglas et al. | |
| 2023/0139152 | A1 | 5/2023 | Smith et al. | |
| 2024/0068694 | A1* | 2/2024 | Gupta | F24F 11/65 |
| 2024/0401831 | A1* | 12/2024 | Lloyd | F24F 11/77 |

FOREIGN PATENT DOCUMENTS

| | | | |
|---|---|---|---|
| WO | WO-2013/130956 | A1 | 9/2013 |
| WO | WO-2022/120158 | A1 | 6/2022 |

OTHER PUBLICATIONS

Hou, F., Ma, J., Kwok, H. H. and Cheng, J.C., 2022. Prediction and optimization of thermal comfort, IAQ and energy consumption of typical air-conditioned rooms based on a hybrid prediction model. Building and Environment, 225, p. 109576. (Year: 2022).*

Afram et al., "Theory and Application of HVAC Control Systems—A review of Model Predictive Control (MPC)," Building and Environment, Feb. 2014, vol. 72 (pp. 343-355).

Ahn et al., "Optimal Control Development for Chilled Water Plants Using a Quadratic Representation," Energy and Buildings, Apr. 2001, vol. 33, No. 4 (pp. 371-378).

Alvarado et al., "A Methodology to Monitor Airborne PM10 Dust Particles Using a Small Unmanned Aerial Vehicle," Sensors, 2017, vol. 17 (25 pages).

Burer et al., "Non-convex Mixed-Integer Nonlinear Programming: A Survey," Surveys in Operations Research and Management Science, Jul. 2012, vol. 17, No. 2 (pp. 97-106).

Cantoni, A., "Optimal Curve Fitting with Piecewise Linear Functions," IEEE Transactions on Computers, Jan. 1971, vol. 20, No. (pp. 59-67).

Corbin et al., "A Model Predictive Control Optimization Environment for Real-Time Commercial Building Application," Journal of Building Performance Simulation, 2013, (Published online: Jan. 11, 2012) vol. 6, No. 3 (pp. 159-174).

Drgona et al., "All you Need to Know about Model Predictive Control for Buildings," Annual Reviews in Control, 2020, vol. 50 (pp. 190-232).

EPO Notice of Opposition to a European Patent issued in Appl. Ser. No. EP 16165681.4 dated May 2, 2023 (48 pages).

EPO Notice of Opposition to a European Patent issued in Appl. Ser. No. EP 16165681.4 dated May 2, 2023 (51 pages).

EPO Notice of Opposition to a European Patent with Consolidated List issued in EP Appl. Ser. No. 16165681.4 dated May 2, 2023 (4 pages).

EPO Office Action on EP Appl. Ser. No. 16165681.4 dated Apr. 6, 2021 (7 pages).

Extended European Search Report on EP Appl. Ser. No. 16165681.4 dated Oct. 20, 2016 (5 pages).

Extended European Search Report on EP Appl. Ser. No. 22177772.5 dated Sep. 26, 2022 (11 pages).

Hackner, J.R., "HVAC system dynamics and energy use in existing buildings," Doctoral Dissertation, University of Madison, Wisconsin, 1984 (174 pages).

Haves et al., "Model Predictive Control of HVAC Systems: Implementation and Testing at the University of California, Merced," Technical Report, U.S. Department of Energy Office of Scientific and Technical Information, Jun. 29, 2010 (140 pages).

Huang et al., "A New Model Predictive Control Scheme for Energy and Cost Savings in Commercial Buildings: An Airport Terminal Building Case Study," Building and Environment, Jul. 2015, vol. 89 (pp. 203-216).

Kelman et al., "Analysis of Local Optima in Predictive Control for Energy Efficient Buildings," Journal of Building Performance Simulation, Apr. 16, 2012, vol. 6, No. 3 (pp. 236-255).

Koehler et al., "Building Temperature Distributed Control via Explicit MPC and 'Trim and Respond' Methods," European Control Conference (ECC), Jul. 17-19, 2013, Zurich, Switzerland (pp. 4334-4339).

Kwadzogah et al., "Model Predictive Control for HVAC Systems—A Review," 2013 IEEE International Conference on Automation Science and Engineering, Model Predictive Control for HVAC Systems—A Review, 2013 IEEE International Conference on Automation Science and Engineering (CASE), Madison, WI, United States, Aug. 17- 20, 2013 (pp. 442-447).

Mckenna et al., "A TRNSYS model of a building HVAC system with GSHP and PCM thermal energy storage—component modelling and validation," Proceedings of BS2013: 13th Conference of International Building Performance Simulation Association, Chambéry, France, Aug. 26-28, 2013 (pp. 3336-3343).

Mossolly et al., "Optimal Control Strategy for a Multizone Air Conditioning System Using a Genetic Algorithm," Energy, Jan. 2009, vol. 34, No. 1 (pp. 58-66).

Nassif et al., "Optimization of HVAC Control System Strategy Using Two-Objective genetic Algorithm," International Journal of HVA C&R Research, vol. 11, No. 3 (pp. 459-486).

Sourbon et al., "Dynamic Thermal Behaviour of Buildings with Concrete Core Activation," Dissertation, Arenberg Doctoral School of Science, Engineering & Technology, Katholieke Universiteit

(56) References Cited

OTHER PUBLICATIONS

Leuven—Faculty of Engineering Celestijnenlaan: 300A box 2421, B-3001 Heverlee (Belgium) Sep. 2012 (416 pages).

Stluka et al., "Energy Management for Buildings and Microgrids," 2011 50th IEEE Conference on Decision and Control and European Control Conference (CDCECC) Orlando, FL, USA, Dec. 12- 15, 2011 (pp. 5150-5157).

Strurznegger, D., "Model Predictive Building Climate Control, Steps Towards Practice," Doctoral Thesis, Automatic Control Laboratory, Zurich, Switzerland, 2014 (176 pages).

Sun et al., Optimal Control of Building HVAC&R Systems Using Complete Simulation-Based Sequential Quadratic Programming (CSB-SQP), Building and Environment, May 2005, vol. 40, No. 5 (pp. 657-669).

Third Party Observation Report on EP Appl. Ser. No. 16165681.4 dated Jan. 15, 2020 (8 pages).

Third Party Observation Report on EP Appl. Ser. No. 16165681.4 dated Oct. 5, 2018 (6 pages).

Verhelst et al., "Study of the Optimal Control Problem Formulation for Modulating Air-to-Water Heat Pumps Connected to a Residential Floor Heating System," Energy and Buildings, Feb. 2012, vol. 45 (pp. 43-53).

Verhelst, C., "Model Predictive Control of Ground Coupled Heat Pump Systems in Office Buildings," Dissertation, Arenberg Doctoral School of Science, Engineering & Technology, Katholieke Universiteit Leuven—Faculty of Engineering Celestijnenlaan : 300A box 2421, B-3001 Heverlee (Belgium) Apr. 20, 2012 (316 pages).

Wang et al., "Model-Based Optimal Control of VAV Air-Conditioning System Using Genetic Algorithm," Building and Environment, Aug. 2000, vol. 35, No. 6 (pp. 471-487).

Wang et al., "Supervisory and Optimal Control of Building HVAC Systems: A Review," HVAC&R Research, Jan. 2008, vol. 14, No. 1 (pp. 3-32).

Xi et al., "Support Vector Regression Model Predictive Control on a HVAC Plant," Control Engineering Practice, Aug. 2007, vol. 15, No. 8 (pp. 897-908).

Yao et al., "Global Optimization of a Central Air-Conditioning System Using Decomposition-Coordination Method," Energy and Buildings, May 2010, vol. 42, No. 5 (pp. 570-583).

U.S. Appl. No. 17/541,119, filed Dec. 2, 2021, Douglas et al.

U.S. Appl. No. 18/106,932, filed Feb. 7, 2023, Risbeck et al.

U.S. Appl. No. 18/106,934, filed Feb. 7, 2023, Risbeck et al.

U.S. Appl. No. 18/114,127, filed Feb. 24, 2023, Smith et al.

U.S. Appl. No. 18/114,129, filed Feb. 24, 2023, Douglas et al.

Risbeck, M., et al., "Airborne Disease Transmission Risk and Energy Impact of HVAC Mitigation Strategies," ASHRAE Journal, May 2022 (11 pages).

Risbeck, M., et al., "Modeling and multiobjective optimization of indoor airborne disease transmission risk and associated energy consumption for building HVAC systems," Energy & Buildings, 2021, 253 (24 pages).

Risbeck, M., et al., "Quantifying the tradeoff between energy consumption and the risk of airborne disease transmission for building HVAC systems," Science and Technology for the Built Environment, 2021, 0 (15 pages).

* cited by examiner

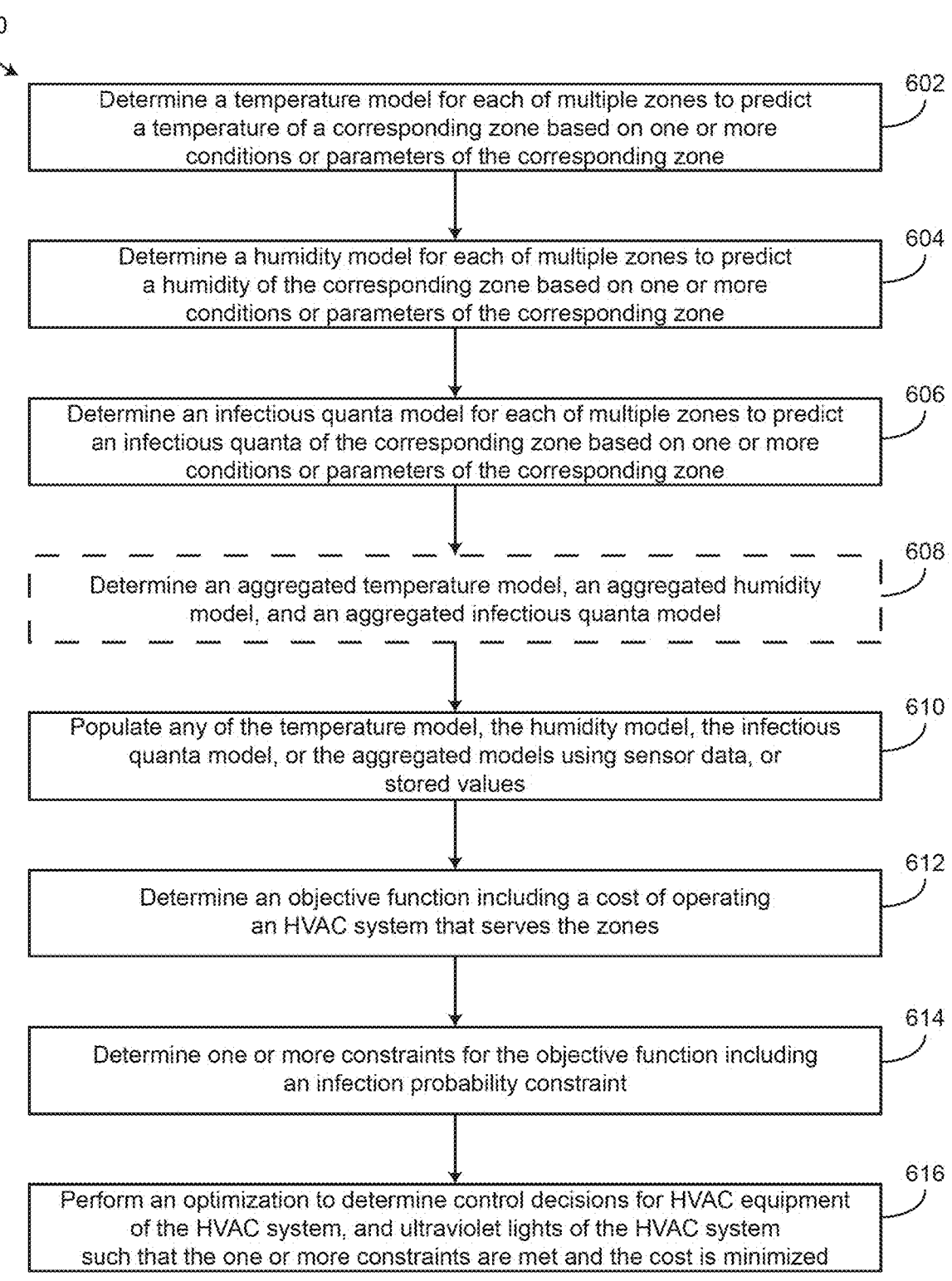

600

602
Determine a temperature model for each of multiple zones to predict a temperature of a corresponding zone based on one or more conditions or parameters of the corresponding zone 604
Determine a humidity model for each of multiple zones to predict a humidity of the corresponding zone based on one or more conditions or parameters of the corresponding zone 606
Determine an infectious quanta model for each of multiple zones to predict an infectious quanta of the corresponding zone based on one or more conditions or parameters of the corresponding zone 608
Determine an aggregated temperature model, an aggregated humidity model, and an aggregated infectious quanta model 610
Populate any of the temperature model, the humidity model, the infectious quanta model, or the aggregated models using sensor data, or stored values 612
Determine an objective function including a cost of operating an HVAC system that serves the zones 614
Determine one or more constraints for the objective function including an infection probability constraint 616
Perform an optimization to determine control decisions for HVAC equipment of the HVAC system, and ultraviolet lights of the HVAC system such that the one or more constraints are met and the cost is minimized

FIG. 6

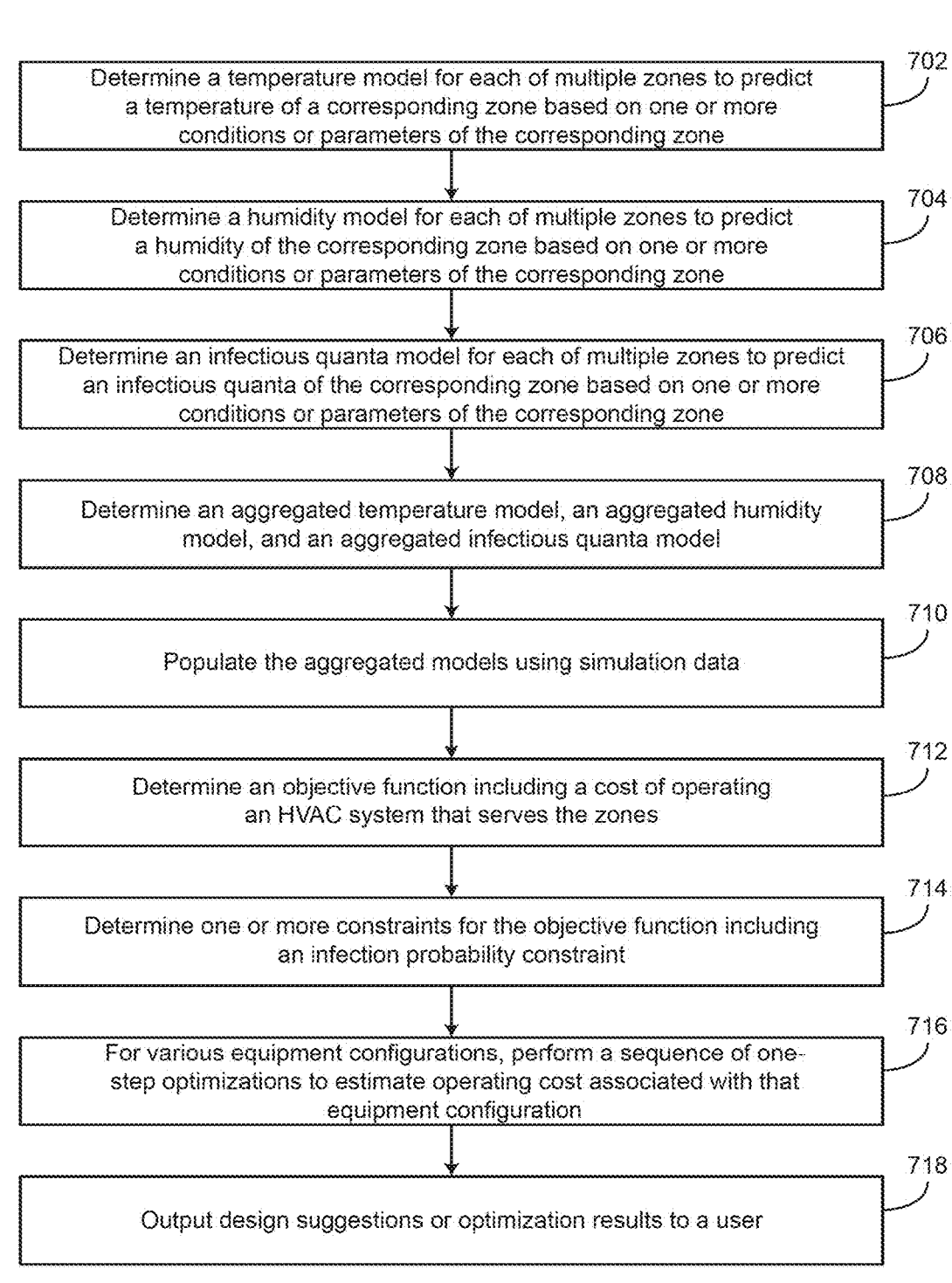

700

702
Determine a temperature model for each of multiple zones to predict a temperature of a corresponding zone based on one or more conditions or parameters of the corresponding zone 704
Determine a humidity model for each of multiple zones to predict a humidity of the corresponding zone based on one or more conditions or parameters of the corresponding zone 706
Determine an infectious quanta model for each of multiple zones to predict an infectious quanta of the corresponding zone based on one or more conditions or parameters of the corresponding zone 708
Determine an aggregated temperature model, an aggregated humidity model, and an aggregated infectious quanta model 710
Populate the aggregated models using simulation data 712
Determine an objective function including a cost of operating an HVAC system that serves the zones 714
Determine one or more constraints for the objective function including an infection probability constraint 716
For various equipment configurations, perform a sequence of one-step optimizations to estimate operating cost associated with that equipment configuration 718
Output design suggestions or optimization results to a user

FIG. 7

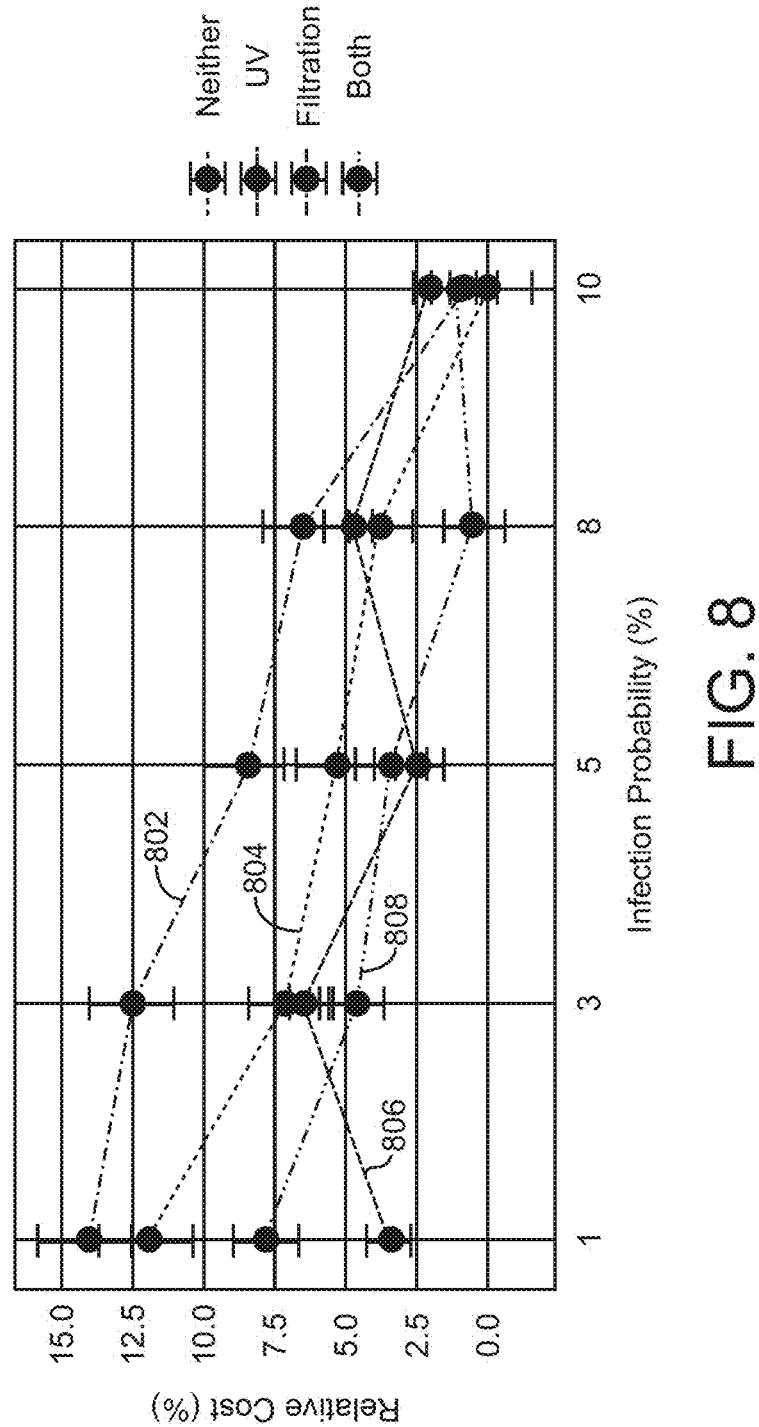
FIG. 8

900

Building Disinfection Design Tool

Building Options

Size (ft²) [10,000]          ☑ Allow UV

City [Milwaukee ▼]          ☑ Allow Filtration

Simulation

[Run]  ████████ Complete ████████

Disinfection Options

| Month | Low | High |
|-------|-----|------|
| Jan | | |
| Feb | | |
| Mar | | |
| Apr | | |
| May | | |
| Jun | | |
| Jul | | |
| Aug | | |
| Sep | | |
| Oct | | |
| Nov | | |
| Dec | | |

Results (1) UV + Filtration
  Energy Cost: 100.6 ± 10.08
  Daily Infection Probability:
    Mean: 1.042%
    Min: 0%
    Max: 2.192%

(2) UV Only
  Energy Cost: 105.6 ± 8.852
  Daily Infection Probability:
    Mean: 1.079%
    Min: 0%
    Max: 2.264%

(3) Filtration Only
  Energy Cost: 114 ± 10.37
  Daily Infection Probability:
    Mean: 1.065%
    Min: 0%
    Max: 3.054%

(4) Neither
  Energy Cost: 123.9 ± 10.64
  Daily Infection Probability:
    Mean: 0.983%
    Min: 0%
    Max: 2.338%

FIG. 9

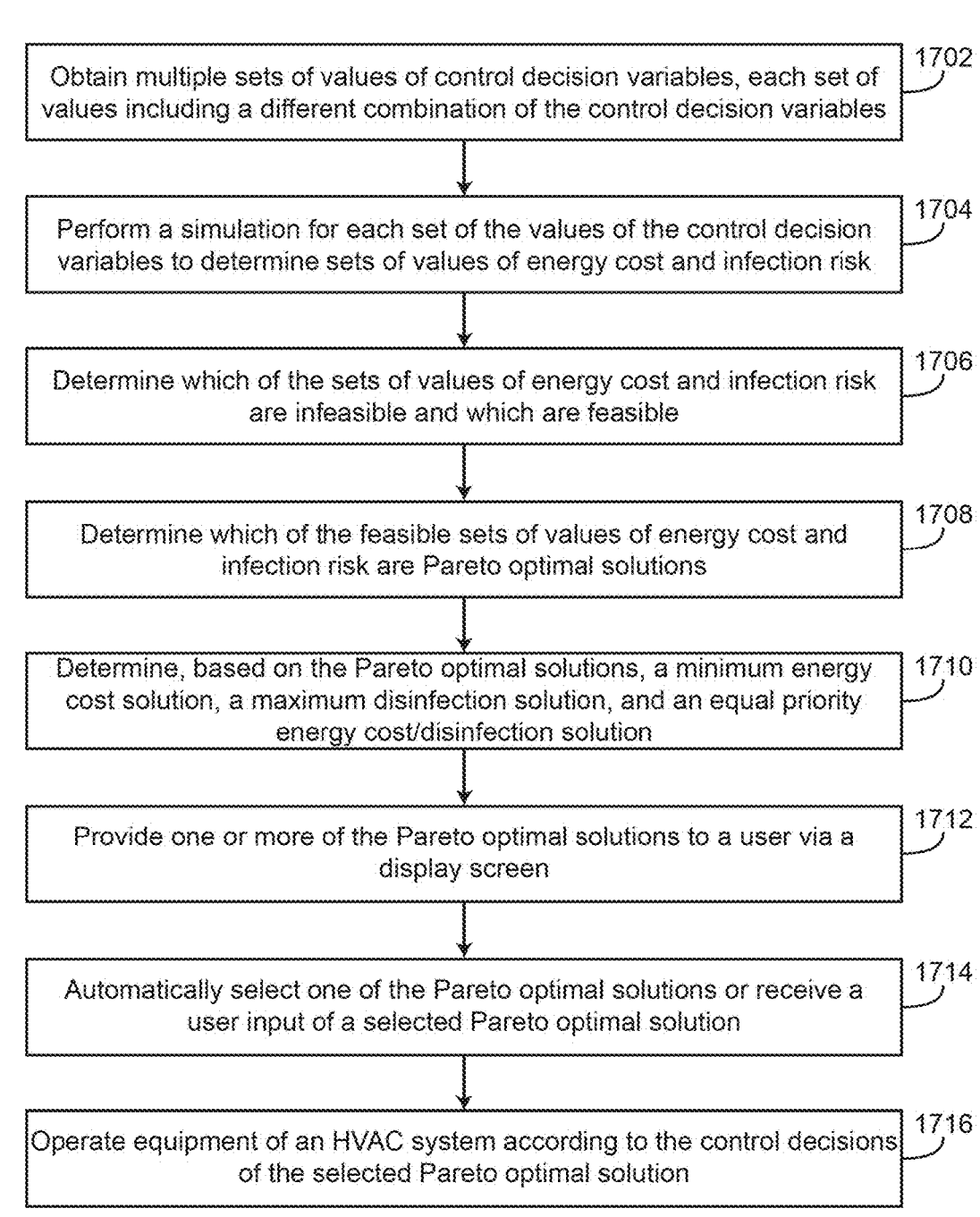

1700

1702 Obtain multiple sets of values of control decision variables, each set of values including a different combination of the control decision variables 1704 Perform a simulation for each set of the values of the control decision variables to determine sets of values of energy cost and infection risk 1706 Determine which of the sets of values of energy cost and infection risk are infeasible and which are feasible 1708 Determine which of the feasible sets of values of energy cost and infection risk are Pareto optimal solutions 1710 Determine, based on the Pareto optimal solutions, a minimum energy cost solution, a maximum disinfection solution, and an equal priority energy cost/disinfection solution 1712 Provide one or more of the Pareto optimal solutions to a user via a display screen 1714 Automatically select one of the Pareto optimal solutions or receive a user input of a selected Pareto optimal solution 1716 Operate equipment of an HVAC system according to the control decisions of the selected Pareto optimal solution

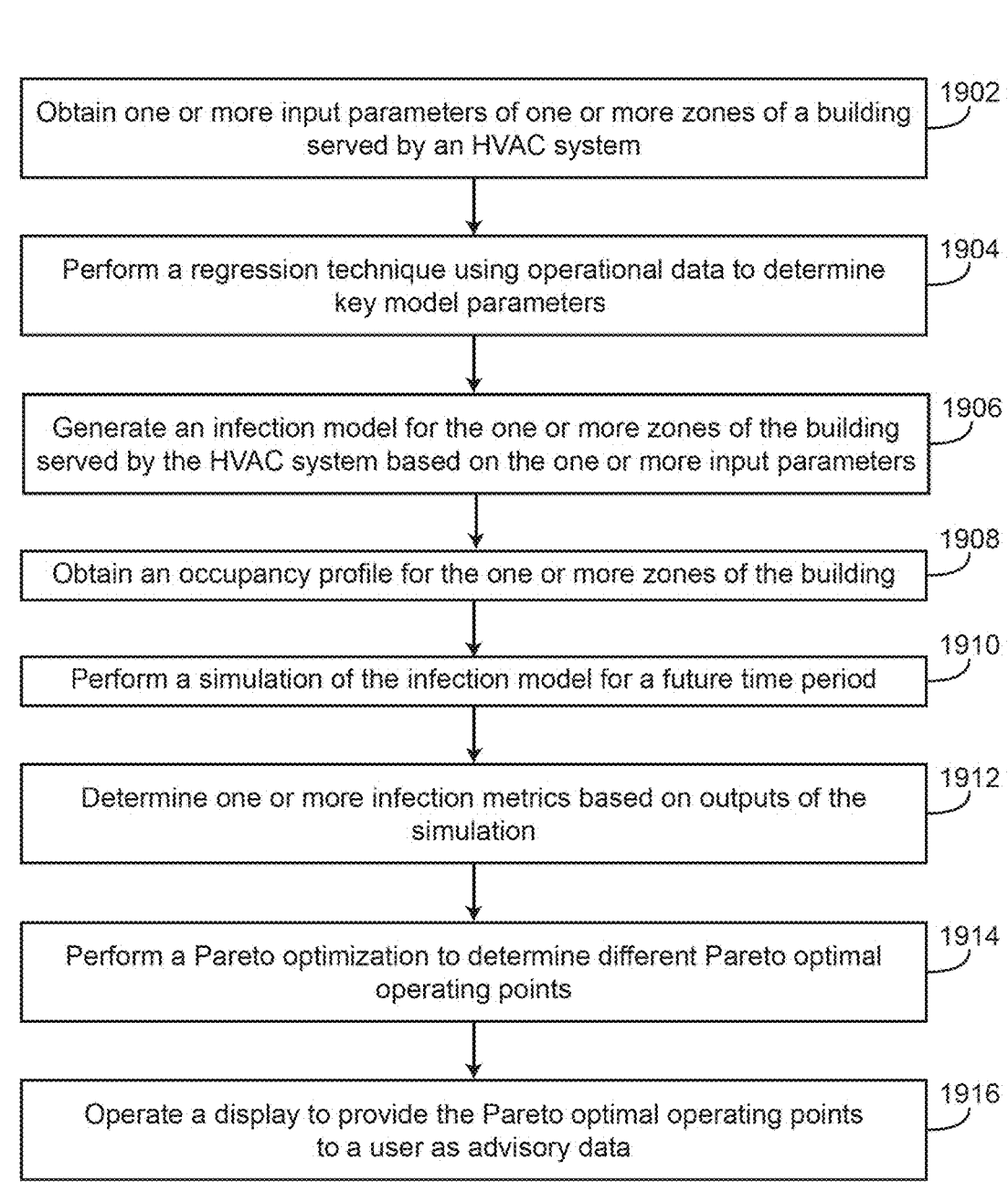

Obtain one or more input parameters of one or more zones of a building served by an HVAC system ⟶ 1902

Perform a regression technique using operational data to determine key model parameters ⟶ 1904

Generate an infection model for the one or more zones of the building served by the HVAC system based on the one or more input parameters ⟶ 1906

Obtain an occupancy profile for the one or more zones of the building ⟶ 1908

Perform a simulation of the infection model for a future time period ⟶ 1910

Determine one or more infection metrics based on outputs of the simulation ⟶ 1912

Perform a Pareto optimization to determine different Pareto optimal operating points ⟶ 1914

Operate a display to provide the Pareto optimal operating points to a user as advisory data ⟶ 1916

FIG. 19

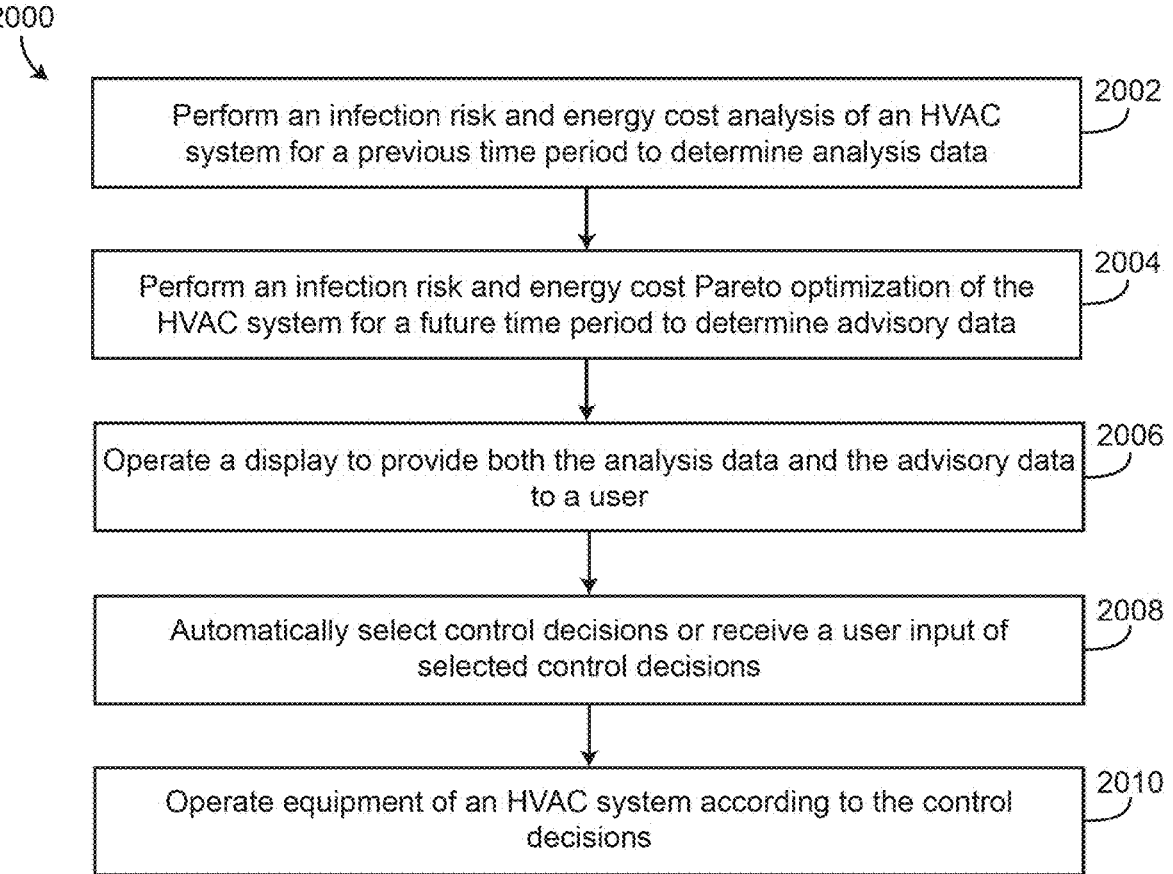

2000

Perform an infection risk and energy cost analysis of an HVAC system for a previous time period to determine analysis data — 2002

Perform an infection risk and energy cost Pareto optimization of the HVAC system for a future time period to determine advisory data — 2004

Operate a display to provide both the analysis data and the advisory data to a user — 2006

Automatically select control decisions or receive a user input of selected control decisions — 2008

Operate equipment of an HVAC system according to the control decisions — 2010

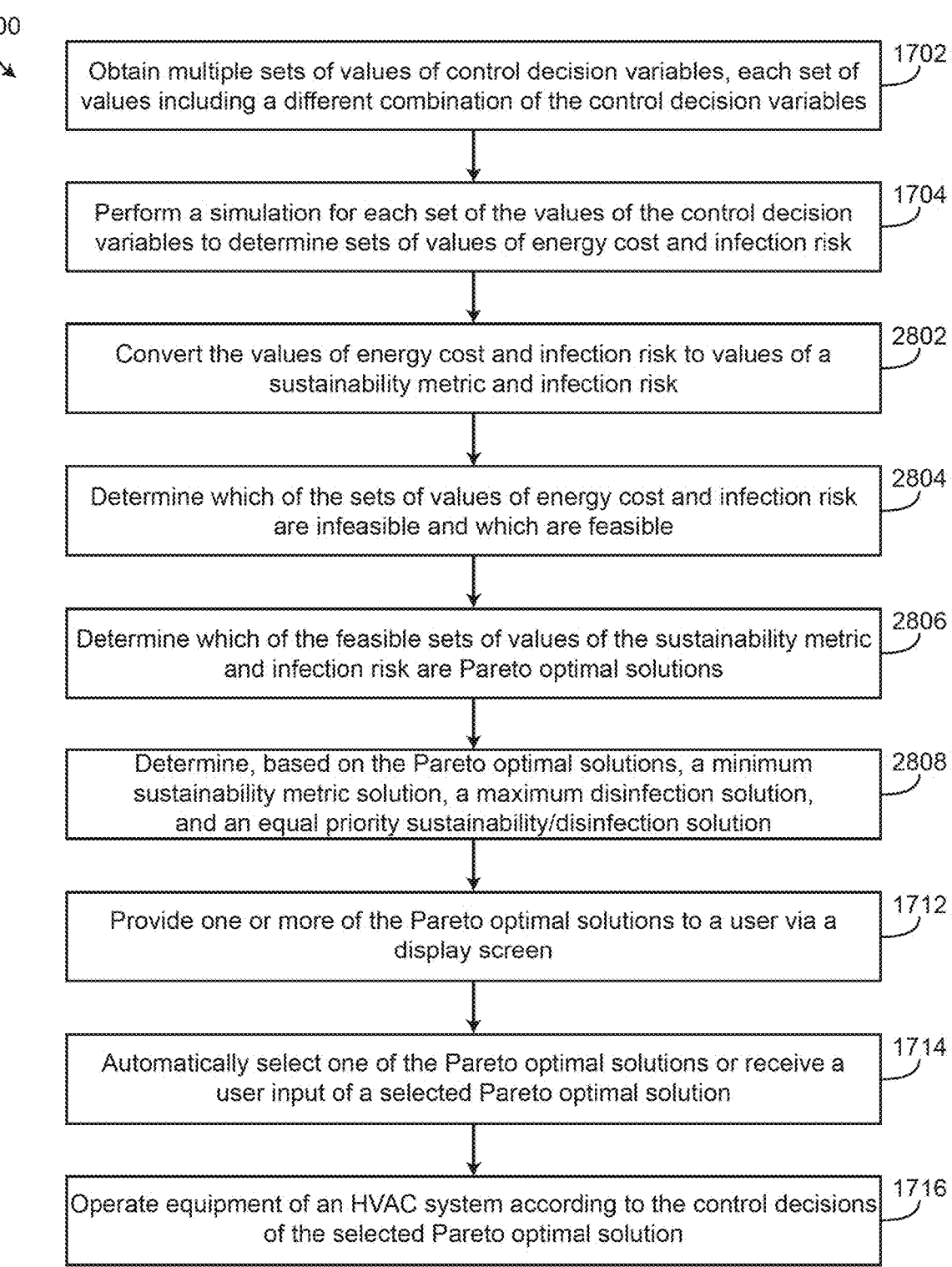

1702
Obtain multiple sets of values of control decision variables, each set of values including a different combination of the control decision variables 1704
Perform a simulation for each set of the values of the control decision variables to determine sets of values of energy cost and infection risk 2802
Convert the values of energy cost and infection risk to values of a sustainability metric and infection risk 2804
Determine which of the sets of values of energy cost and infection risk are infeasible and which are feasible 2806
Determine which of the feasible sets of values of the sustainability metric and infection risk are Pareto optimal solutions 2808
Determine, based on the Pareto optimal solutions, a minimum sustainability metric solution, a maximum disinfection solution, and an equal priority sustainability/disinfection solution 1712
Provide one or more of the Pareto optimal solutions to a user via a display screen 1714
Automatically select one of the Pareto optimal solutions or receive a user input of a selected Pareto optimal solution 1716
Operate equipment of an HVAC system according to the control decisions of the selected Pareto optimal solution

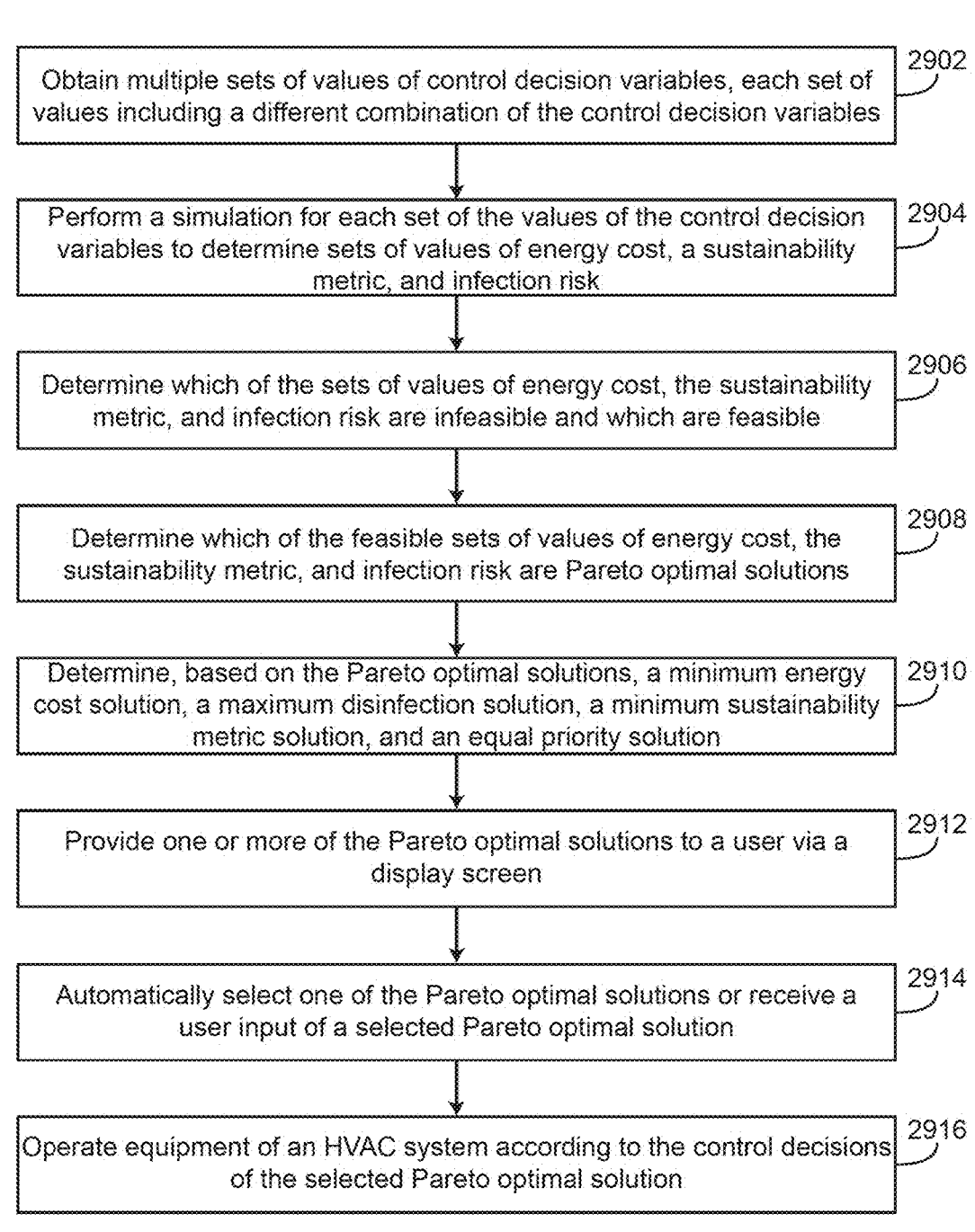

| | |
|---|---|
| Obtain multiple sets of values of control decision variables, each set of values including a different combination of the control decision variables | 2902 |

| | |
|---|---|
| Perform a simulation for each set of the values of the control decision variables to determine sets of values of energy cost, a sustainability metric, and infection risk | 2904 |

| | |
|---|---|
| Determine which of the sets of values of energy cost, the sustainability metric, and infection risk are infeasible and which are feasible | 2906 |

| | |
|---|---|
| Determine which of the feasible sets of values of energy cost, the sustainability metric, and infection risk are Pareto optimal solutions | 2908 |

| | |
|---|---|
| Determine, based on the Pareto optimal solutions, a minimum energy cost solution, a maximum disinfection solution, a minimum sustainability metric solution, and an equal priority solution | 2910 |

| | |
|---|---|
| Provide one or more of the Pareto optimal solutions to a user via a display screen | 2912 |

| | |
|---|---|
| Automatically select one of the Pareto optimal solutions or receive a user input of a selected Pareto optimal solution | 2914 |

| | |
|---|---|
| Operate equipment of an HVAC system according to the control decisions of the selected Pareto optimal solution | 2916 |

FIG. 29

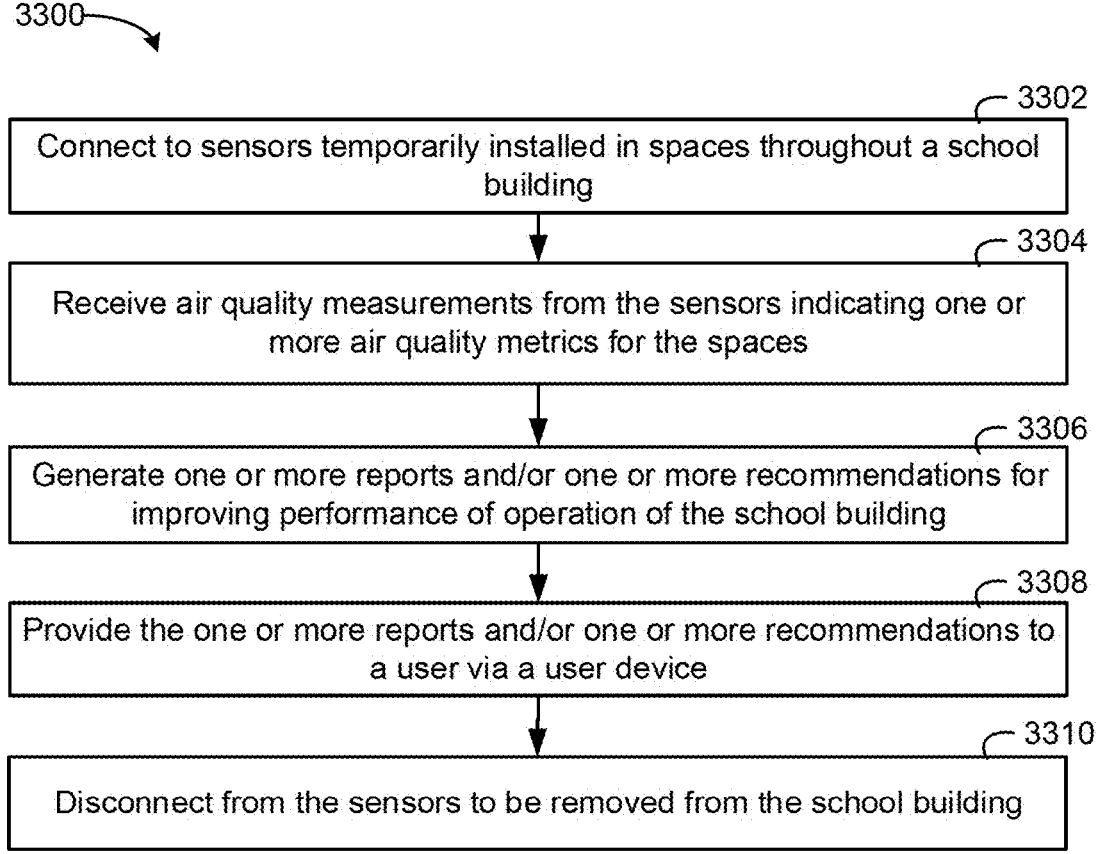

3300

3302
Connect to sensors temporarily installed in spaces throughout a school building 3304
Receive air quality measurements from the sensors indicating one or more air quality metrics for the spaces 3306
Generate one or more reports and/or one or more recommendations for improving performance of operation of the school building 3308
Provide the one or more reports and/or one or more recommendations to a user via a user device 3310
Disconnect from the sensors to be removed from the school building

| Species | $CO_2$ | VOCs | PM | Humidity |
|---|---|---|---|---|
| Concentration Units | ppm (parts per million) | ppb (parts per billion) | $\mu g/m^3$ | g water/g dry air (humidity ratio) |
| $g_{occ}$ | Known from Biology | Known from Biology or Estimated | Known from Biology or Estimated | Known from Biology |
| $g_{bkgd}$ | Generally Zero | Estimated | Generally Zero | Generally Zero |
| $K_{decay}$ | Zero | Estimated | Known from Physics | Zero |
| $C_{zone}$ | Measured | Measured | Measured | Measured |
| $C_{recirc}$ | Measured or Assumed Equal to $C_{zone}$ | Measured or Assumed Equal to $C_{zone}$ | Measured or Assumed Equal to $C_{zone}$ | Measured or Estimated from Supply Temperature |
| $C_{out}$ | Measured or Assumed Constant | Measured | Measured or Estimated from Outdoor Air Quality Data | Measured or Estimated from Weather Data |

4110
Obtain IAQ data

4120
Obtain BAS data

4130
Identify one or more
unknown parameters

4140
Estimate the one or
more unknown parameters

4150
Provide the estimated one or
more unknown parameters

4160
Operate HVAC equipment

4170
Modify a control strategy

BUILDING MANAGEMENT SYSTEM WITH CLEAN AIR AND INFECTION REDUCTION FEATURES

CROSS-REFERENCE TO RELATED PATENT APPLICATIONS

This application claims the benefit of and priority to U.S. Provisional Application No. 63/307,981, filed Feb. 8, 2022, which is incorporated by reference herein in its entirety for all purposes.

The following applications are incorporated herein by reference in their entireties: U.S. application Ser. No. 17/403,669 filed Aug. 16, 2021; U.S. application Ser. No. 16/927,759 filed Jul. 13, 2020; U.S. Provisional Patent Application No. 62/873,631 filed Jul. 12, 2019; U.S. Provisional Patent Application No. 63/044,906 filed Jun. 26, 2020; U.S. patent application Ser. No. 17/393,138 filed Aug. 3, 2021; U.S. patent application Ser. No. 16/927,766 filed Jul. 13, 2020; U.S. Provisional Application No. 63/194,771 filed May 28, 2021; and U.S. Provisional Application No. 63/220,878 filed Jul. 12, 2021.

BACKGROUND

The present disclosure relates generally to building management systems for buildings. The present disclosure relates more particularly to maintaining occupant health and safety by assessing and controlling aspects of air cleanliness and/or infection risk reduction in buildings.

Building equipment (e.g., HVAC equipment) can be operated to control various environment conditions of spaces of a building. Building equipment can move air through various spaces of a building and can be operated to control the quality or cleanliness of air in the spaces, such as by moving clean air into the space and/or moving air with potential contaminants out of the space. Additionally, building equipment operation can have an effect on the likelihood of an infectious disease spreading amongst occupants of the building.

SUMMARY

Some embodiments relate to a building management system (BMS) for executing an indoor air quality (IAQ) analysis of a building, the BMS including a controller including memory and one or more processors configured to obtain IAQ data from one or more sensors within the building, wherein the IAQ data is associated with at least one of a plurality of environment species, obtain building automation system (BAS) data, identify one or more unknown parameters from the IAQ data and BAS data of two or more of the plurality of environment species, estimate the one or more unknown parameters based on inputting the IAQ data and the BAS data into an optimization model, and wherein the optimization model analyzes predicted concentrations of the plurality of environment species subject to the two or more of the plurality of environment species evolving according to a single-species concentration model, and provide the estimated one or more unknown parameters to one or more predictive models configured to predict values of a control objective for one or more building zones as a function of control decision variables for HVAC equipment.

In some embodiments, the single-species concentration model is an ordinary differential equation model, and wherein the plurality of environment species are subject to the two or more of the plurality of environment species evolving according to the single-species concentration model using one or more basis function expansions of the one or more unknown parameters.

In some embodiments, a predicted error of the optimization model of the two or more environment species of the plurality of environment species is scaled according to one or more scaling coefficients of the optimization model, wherein the two or more of the plurality of environment species is collected from a sensor of the one or more sensors.

In some embodiments, the one or more scaling coefficients are determined based comparing a first accuracy of a first sensor configured to collect the IAQ data for a first environment species with a second accuracy of a second sensor configured to collect the IAQ data for a second environment species and in response to comparing the first accuracy and the second accuracy, biasing either the first environment species or the second environment species in the optimization model.

In some embodiments, the plurality of environment species includes at least two of a carbon dioxide species, a particulate matter species, a volatile organic compounds species, and a humidity species.

In some embodiments, the optimization model includes an objective function, and wherein the objective function is minimized by adjusting the one or more unknown parameters according to the predicted concentrations approximately matching one or more measured time series concentrations.

In some embodiments, the one or more unknown parameters includes at least one of a time series occupancy, a time series ventilation rate, or a time series recirculation rate, and wherein the two or more of the environment species is associated with one or more of the predicted concentrations.

In some embodiments, a time series occupancy trajectory and a ventilation trajectory are the same for each of a plurality of single-species concentration models, and wherein the predicted concentrations are different for each of the plurality of single-species concentration models.

In some embodiments, the one or more processors further configured to operate HVAC equipment to affect an environmental condition of the building in accordance with a selected set of optimization results from the one or more predictive models.

In some embodiments, the one or more processors further configured to in response to estimating the one or more unknown parameters, modify a control strategy for the one or more building zones based on improving a value of the predicted values.

In some embodiments, the one or more processors further configured to execute the one or more predictive models to scale at least one of a first control objective or a second control objective based on the estimated one or more unknown parameters and at least one hospitalization metric, execute an optimization process using the one or more predictive models to produce multiple sets of optimization results of the control decision variables and corresponding sets of optimal values of the first control objective and the second control objective for a time period, select one or more of the sets of optimization results, and operate the HVAC equipment to affect an environmental condition of the building in accordance with the values of the control decision variables corresponding to a selected set of the optimization results.

Some embodiments relate to a building management system (BMS) for executing an indoor air quality (IAQ) analysis of a building, the BMS including a controller including memory and one or more processors configured to obtain IAQ data from one or more sensors within the building, wherein the IAQ data is associated with an environment species, obtain building automation system (BAS) data, identify occupancy and ventilation rate as a plurality of unknown parameters from the IAQ data and BAS data the environment species, estimate the occupancy and the ventilation rate based on inputting the IAQ data and the BAS data into an optimization model, and wherein the optimization model analyzes predicted concentrations of the environment species subject to the environment species evolving according to a single-species concentration model, and provide the estimated occupancy and estimated ventilation rate to one or more predictive models configured to predict values of a control objective for one or more building zones as a function of control decision variables for HVAC equipment.

In some embodiments, the single-species concentration model is an ordinary differential equation model, and wherein the environment species is subject to the environment species evolving according to the single-species concentration model using one or more basis function expansions of the plurality of unknown parameters.

In some embodiments, the optimization model includes an objective function, and wherein the objective function is minimized by adjusting the plurality of unknown parameters according to the predicted concentrations approximately matching one or more measured time series concentrations.

In some embodiments, the one or more processors further configured to operate HVAC equipment to affect an environmental condition of the building in accordance with a selected set of the optimization results from the one or more predictive models.

In some embodiments, the one or more processors further configured to in response to estimating the occupancy and the ventilation rate, modify a control strategy for the one or more building zones based on improving a value of the predicted values.

Some embodiments relate to a computer-implemented method for executing an indoor air quality (IAQ) analysis of a building, the computer-implemented method including obtaining, by a processing circuit, IAQ data from one or more sensors within the building, wherein the IAQ data is associated with at least one of a plurality of environment species, obtaining, by the processing circuit, building automation system (BAS) data, identifying, by the processing circuit, one or more unknown parameters from the IAQ data and BAS data of two or more of the plurality of environment species, estimating, by the processing circuit, the one or more unknown parameters based on inputting the IAQ data and the BAS data into an optimization model, and wherein the optimization model analyzes predicted concentrations of the plurality of environment species subject to the two or more of the plurality of environment species evolving according to a single-species concentration model, and providing, by the processing circuit, the estimated one or more unknown parameters to one or more predictive models configured to predict values of a control objective for one or more building zones as a function of control decision variables for HVAC equipment.

In some embodiments, the optimization model includes an objective function, and wherein the objective function is minimized by adjusting the one or more unknown parameters according to the predicted concentrations approximately matching one or more measured time series concentrations.

In some embodiments, the one or more unknown parameters includes at least one of a time series occupancy, a time series ventilation rate, or a time series recirculation rate, and wherein two or more of the environment species is associated with one or more of the predicted concentrations.

In some embodiments, a time series occupancy trajectory and a ventilation trajectory are the same for each of a plurality of single-species concentration models, and wherein the predicted concentrations are different for each of the plurality of single-species concentration models.

Some embodiments relate to a building management system (BMS) for executing an indoor air quality (IAQ) analysis of a building, the BMS including a controller including memory and one or more processors configured to obtain IAQ data from one or more sensors within the building, wherein the IAQ data is associated with at least one of a plurality of environment species, obtain building automation system (BAS) data, estimate at least one airflow parameter for a plurality of single-species concentration models based on enriching two or more of the plurality of environment species, wherein enriching includes estimating the least one airflow parameter based on inputting the IAQ data and the BAS data into an optimization model and scaling the optimization model according to an occupancy parameter over a given time period, provide the estimated at least one airflow parameter to one or more predictive models configured to predict values of a control objective for one or more building zones as a function of control decision variables for HVAC equipment, and operate the HVAC equipment to affect an environmental condition of the building in accordance with a selected set of the optimization results from the one or more predictive models.

In some embodiments, the one or more processors further configured to in response to estimating the at least one airflow parameter, modify a control strategy or ventilation schedule for the one or more building zones based on the estimated at least one airflow parameter.

In some embodiments, the estimated at least one airflow parameter is an estimated ventilation rate, and wherein the one or more processors are further configured to compare an expected ventilation rate of the HVAC system with the estimated ventilation rate, and in response to the expected ventilation rate and the estimated ventilation rate diverging from each other, modify a control strategy for the one or more building zones based on the estimated ventilation rate and a ventilation schedule for the one or more building zones.

In some embodiments, an occupancy estimate and a particle generation rate are back calculated based on calculating a time series particle disturbance based on the estimated ventilation rate and the IAQ data, wherein an increase in a portion of the time series particle disturbance indicates an increase in occupancy of the one or more building zones of the building, and calculating a particle generation rate based on an occupancy dataset including occupant ages and occupant metabolic rates.

In some embodiments, the occupancy parameter is a peak occupancy over a given time period, and wherein the occupancy parameter is scaled according to a scaling factor.

In some embodiments, the two or more of the plurality single-species concentration models are an ordinary differential equation model, and wherein the plurality of environment species are subject to the two or more of the plurality of environment species evolving according to a single-species concentration model using one or more basis function expansions of the at least one airflow parameter.

In some embodiments, a predicted error of the optimization model of the two or more of the environment species of the plurality of environment species is scaled according to one or more scaling coefficients of the optimization model, wherein the two or more of the plurality of environment species is collected from a sensor of the one or more sensors.

In some embodiments, the plurality of environment species includes at least two of a carbon dioxide species, a particulate matter species, a volatile organic compounds species, and a humidity species.

In some embodiments, the optimization model includes an objective function, and wherein the objective function is minimized by adjusting the at least one airflow parameter according to predicted concentrations approximately matching one or more measured time series concentrations.

In some embodiments, the at least one airflow parameter includes at least one of a time series ventilation rate, or a time series recirculation rate, and wherein the two or more of the plurality of environment species are associated with one or more of the predicted concentrations.

In some embodiments, a time series recirculation trajectory and a ventilation trajectory are the same for each of the plurality of single-species concentration models, and wherein the predicted concentrations are different for each of the plurality of single-species concentration models.

In some embodiments, the one or more processors further configured to execute the one or more predictive models to scale at least one of a first control objective or a second control objective based on the estimated at least one airflow parameter and at least one hospitalization metric, execute an optimization process using the one or more predictive models to produce multiple sets of optimization results of the control decision variables and corresponding sets of optimal values of the first control objective and the second control objective for a time period, select one or more of the sets of optimization results, and operate the HVAC equipment to affect the environmental condition of the building in accordance with the values of the control decision variables corresponding to a selected set of the optimization results.

Some embodiments relate to a building management system (BMS) for executing an indoor air quality (IAQ) analysis of a building, the BMS including a controller including memory and one or more processors configured to obtain IAQ data from one or more sensors within the building, wherein the IAQ data is associated with an environment species, obtain building automation system (BAS) data, identify a ventilation rate and a recirculate rate as a plurality of unknown parameters from the IAQ data and BAS data the environment species, estimate the ventilation rate and the recirculate rate based on inputting the IAQ data and the BAS data into an optimization model, and wherein the optimization model analyzes predicted concentrations of the environment species subject to the environment species evolving according to a single-species concentration model, provide the estimated ventilation rate and estimated recirculate rate to one or more predictive models configured to predict values of a control objective for one or more building zones as a function of control decision variables for HVAC equipment, and operate the HVAC equipment to affect an environmental condition of the building in accordance with a selected set of the optimization results from the one or more predictive models.

In some embodiments, the single-species concentration model is an ordinary differential equation model, and wherein the environment species is subject to the environment species evolving according to the single-species concentration model using one or more basis function expansions of the plurality of unknown parameters.

In some embodiments, the optimization model includes an objective function, and wherein the objective function is minimized by adjusting the plurality of unknown parameters according to the predicted concentrations approximately matching one or more measured time series concentrations.

In some embodiments, the one or more processors further configured to in response to estimating the ventilation rate and the recirculate rate, modify a control strategy for the one or more building zones based on improving a value of the predicted values.

Some embodiments relate to a computer-implemented method for executing an indoor air quality (IAQ) analysis of a building, the computer-implemented method including obtaining, by a processing circuit, IAQ data from one or more sensors within the building, wherein the IAQ data is associated with at least one of a plurality of environment species, obtaining, by the processing circuit, building automation system (BAS) data, estimating, by the processing circuit, at least one airflow parameter for a plurality of single-species concentration models based on enriching the two or more of the plurality of environment species, wherein enriching includes estimating the least one airflow parameter based on inputting the IAQ data and the BAS data into an optimization model and scaling the optimization model according to an occupancy parameter over a given time period, and providing, by the processing circuit, the estimated at least one airflow parameter to one or more predictive models configured to predict values of a control objective for one or more building zones as a function of control decision variables for HVAC equipment.

In some embodiments, the estimated at least one airflow parameter is an estimated ventilation rate, and wherein the computer-implemented method further includes comparing, by the processing circuit, an expected ventilation rate of the HVAC system with the estimated ventilation rate, and in response to the expected ventilation rate and the estimated ventilation rate diverging from each other, modifying, by the processing circuit, a control strategy for the one or more building zones based on the estimated ventilation rate and a ventilation schedule for the one or more building zones.

In some embodiments, an occupancy estimate and particle generation rate are back calculated based on calculating, by the processing circuit, a time series particle disturbance based on the estimated ventilation rate and the IAQ data, wherein an increase in a portion of the time series particle disturbance indicates an increase in occupancy of the one or more building zones, and calculating, by the processing circuit, a particle generation rate based on an occupancy dataset including occupant ages and occupant metabolic rates.

In some embodiments, two or more of the plurality single-species concentration models are an ordinary differential equation model, and wherein the plurality of environment species are subject to the two or more of the plurality of environment species evolving according to a single-species concentration model using one or more basis function expansions of the at least one airflow parameter.

BRIEF DESCRIPTION OF THE DRAWINGS

FIG. 6 is a flow diagram of a process which can be performed by the controller of FIG. 3 for determining control decisions for an HVAC system to minimize energy consumption and provide sufficient disinfection, according to some embodiments.

FIG. 7 is a flow diagram of a process which can be performed by the controller of FIG. 3 for determining design suggestions for an HVAC system to minimize energy consumption and provide sufficient disinfection, according to some embodiments.

FIG. 8 is a graph of various design suggestions or information that can be provided by the controller of FIG. 3, according to some embodiments.

FIG. 9 is a drawing of a user interface that can be used to specify building options and disinfection options and provide simulation results, according to some embodiments.

FIG. 17 is a flow diagram of a process for performing a Pareto optimization to determine different Pareto optimal solutions in terms of energy cost and infection risk for an HVAC system, according to some embodiments.

FIG. 19 is a flow diagram of a process for performing a Pareto optimization in terms of energy cost and infection risk over a future time period, according to some embodiments.

FIG. 20 is a flow diagram of a process for performing an infection metrics analysis of an HVAC system over a previous time period and a Pareto optimization for the HVAC system over a future time period, according to some embodiments.

FIG. 28 is a flow diagram of a process for performing a Pareto optimization to determine different Pareto optimal solutions in terms of energy cost converted to a sustainability metric and infection risk for an HVAC system, according to some embodiments.

FIG. 29 is a flow diagram of a process for performing a Pareto optimization to determine different Pareto optimal solutions in terms of a sustainability metric and infection risk for an HVAC system, according to some embodiments.

FIG. 33 is a flow diagram of a process where temporary air quality sensors are installed in spaces of a school building to collect air quality measurements of the spaces and generate one or more reports and/or recommendations, according to an exemplary embodiment.

FIG. 35 is a table of units of measure and sources of each model parameter, according to some embodiments.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Overview

Referring generally to the FIGURES, systems and methods for mitigating infection risk and/or improving indoor air quality of a building are provided according to various example embodiments. According to various embodiments, the systems and methods described herein can balance various factors such as minimizing the risk of infectious diseases and serious illnesses/hospitalizations while also considering energy cost, carbon usage, and other important factors. These systems and methods can control and optimize building equipment/HVAC control in order to mitigate the risk of infection and improve indoor air quality. In particular, systems and methods perform multi-objective building equipment/HVAC control, balancing the risk of serious illness/hospitalization from infectious disease and energy cost.

In some embodiments, building management systems gather data from various sources such as Building Automation Systems (BAS) and Indoor Air Quality (IAQ) sensors to monitor CO2, humidity, particulate matter, volatile organic compounds (VOCs) and other relevant parameters. This data can then use to optimize and modify building equipment/HVAC control, reducing the risk of infection and improving indoor air quality. For example, building occupancy can be estimated using IAQ and BAS/building equipment/HVAC operational data, such as ventilation, filtration, disinfection, etc. and data regarding occupant activity, such as breathing rate. The systems and method use this information to control building equipment/HVAC systems, mitigating the risk of infection and improving indoor air quality. Additionally, the systems and method can estimate time-varying ventilation and recirculation rate using IAQ data and BAS data. In particular, these systems and methods described herein employ a multi-objective optimization and control of building equipment parameters, such as HVAC setpoints, to balance multiple factors, including energy usage, infection risk, indoor air quality, carbon production, and occupant comfort. By balancing all these factors, building management systems aim to provide a safer and more comfortable indoor environment.

Building Management System and HVAC System

Figure 1:
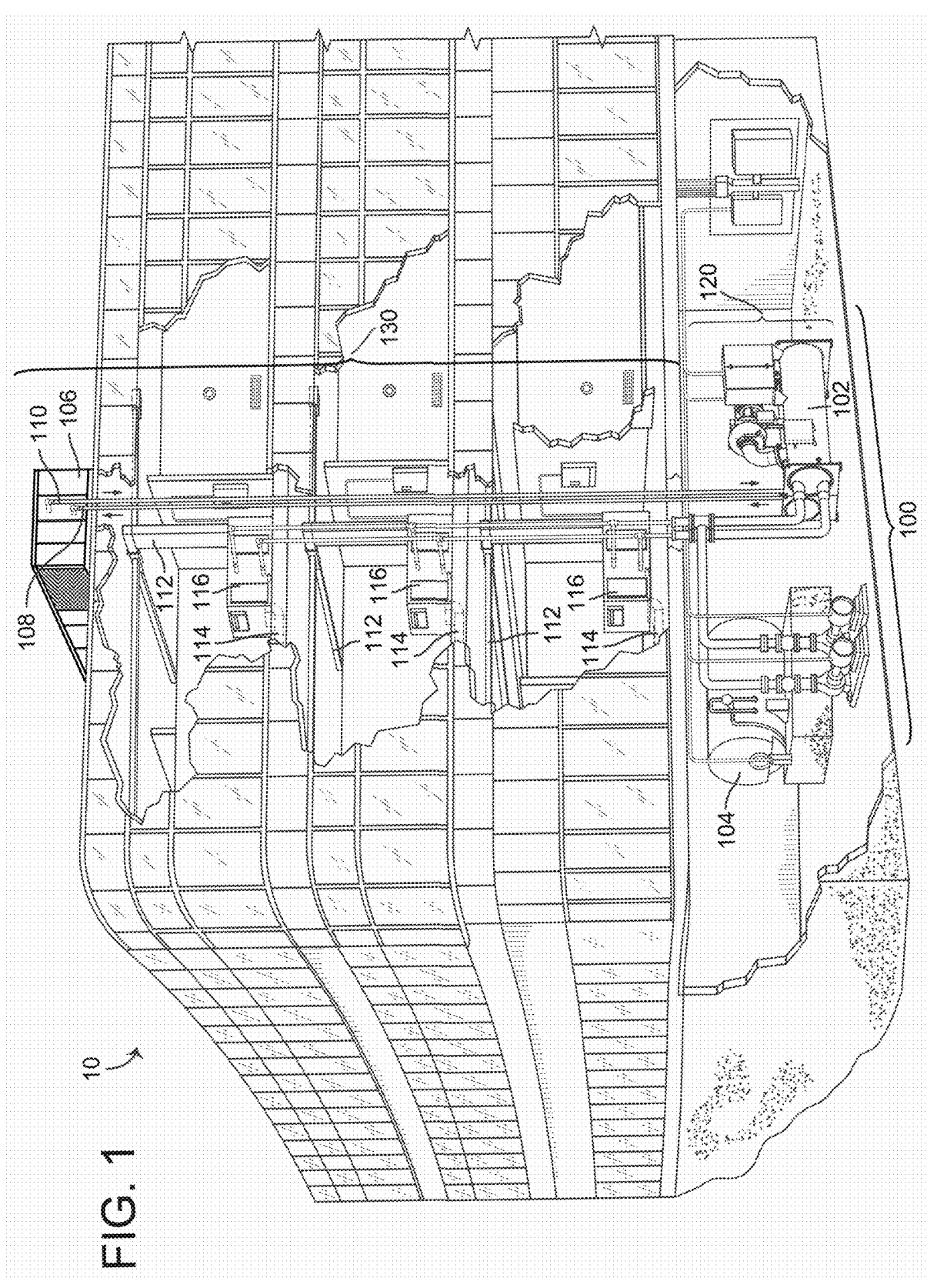
FIG. 1 is a drawing of a building equipped with a HVAC system, according to some embodiments.

Referring now to FIG. 1, a perspective view of a building 10 is shown. Building 10 can be served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. An example of a BMS which can be used to monitor and control building 10 is described in U.S. patent application Ser. No. 14/717,593 filed May 20, 2015, the entire disclosure of which is incorporated by reference herein.

The BMS that serves building 10 may include a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 can be replaced with or supplemented by a central plant or central energy facility (described in greater detail with reference to FIG. 2). An example of an airside system which can be used in HVAC system 100 is described in greater detail with reference to FIG. 2.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Airside System

Figure 2:
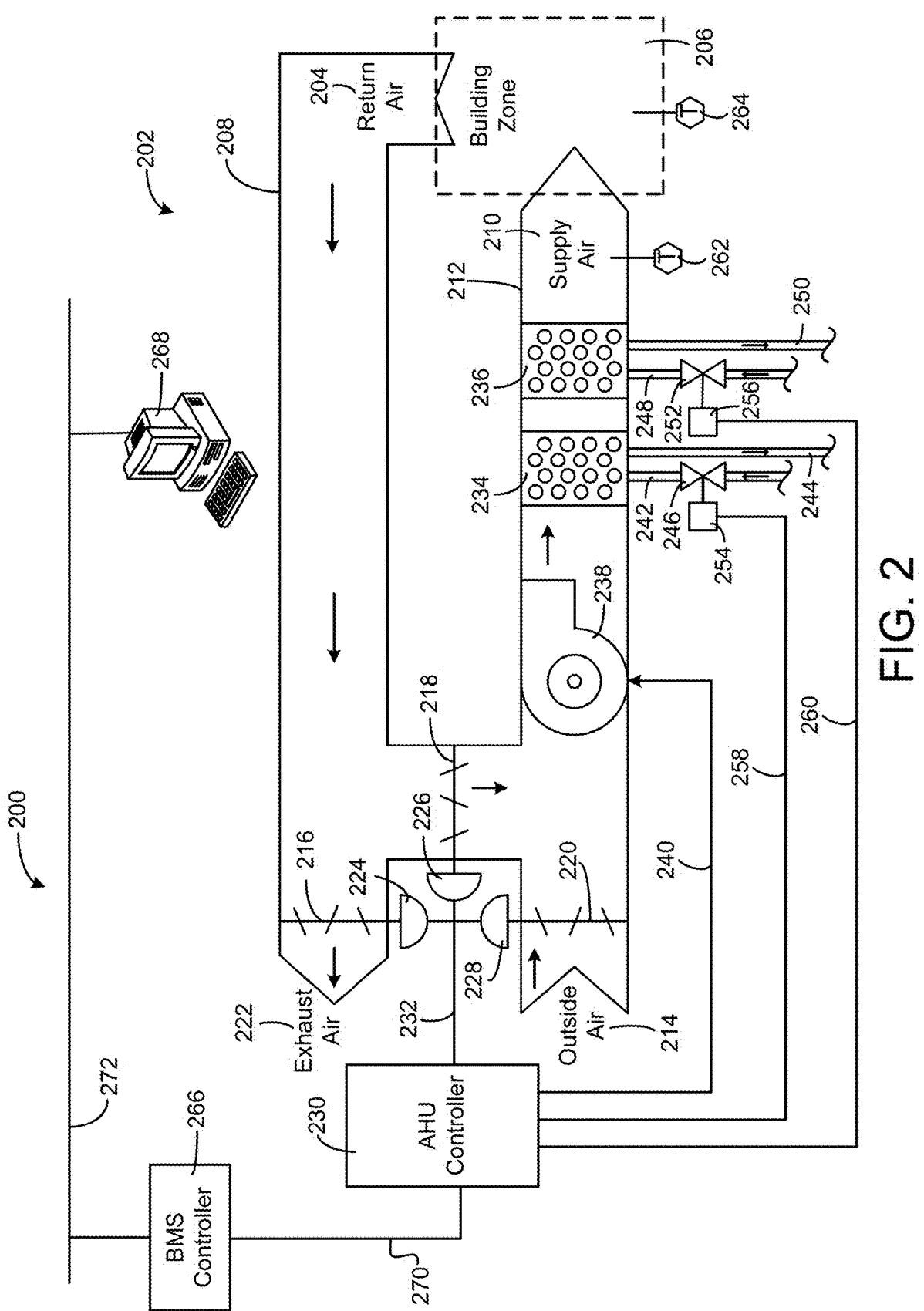
FIG. 2 is a block diagram of an airside system which can be implemented in the building of FIG. 1, according to some embodiments.

Referring now to FIG. 2, a block diagram of an airside system 200 is shown, according to some embodiments. In various embodiments, airside system 200 may supplement or replace airside system 130 in HVAC system 100 or can be implemented separate from HVAC system 100. When implemented in HVAC system 100, airside system 200 can include a subset of the HVAC devices in HVAC system 100 (e.g., AHU 106, VAV units 116, ducts 112-114, fans, dampers, etc.) and can be located in or around building 10. Airside system 200 may operate to heat, cool, humidify, dehumidify, filter, and/or disinfect an airflow provided to building 10 in some embodiments.

Airside system 200 is shown to include an economizer-type air handling unit (AHU) 202. Economizer-type AHUs vary the amount of outside air and return air used by the air handling unit for heating or cooling. For example, AHU 202 may receive return air 204 from building zone 206 via return air duct 208 and may deliver supply air 210 to building zone 206 via supply air duct 212. In some embodiments, AHU 202 is a rooftop unit located on the roof of building 10 (e.g., AHU 106 as shown in FIG. 1) or otherwise positioned to receive both return air 204 and outside air 214. AHU 202 can be configured to operate exhaust air damper 216, mixing damper 218, and outside air damper 220 to control an amount of outside air 214 and return air 204 that combine to form supply air 210. Any return air 204 that does not pass through mixing damper 218 can be exhausted from AHU 202 through exhaust damper 216 as exhaust air 222.

Each of dampers 216-220 can be operated by an actuator. For example, exhaust air damper 216 can be operated by actuator 224, mixing damper 218 can be operated by actuator 226, and outside air damper 220 can be operated by actuator 228. Actuators 224-228 may communicate with an AHU controller 230 via a communications link 232. Actuators 224-228 may receive control signals from AHU controller 230 and may provide feedback signals to AHU controller 230. Feedback signals can include, for example, an indication of a current actuator or damper position, an amount of torque or force exerted by the actuator, diagnostic information (e.g., results of diagnostic tests performed by actuators 224-228), status information, commissioning information, configuration settings, calibration data, and/or other types of information or data that can be collected, stored, or used by actuators 224-228. AHU controller 230 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 224-228.

Still referring to FIG. 2, AHU 202 is shown to include a cooling coil 234, a heating coil 236, and a fan 238 positioned within supply air duct 212. Fan 238 can be configured to force supply air 210 through cooling coil 234 and/or heating coil 236 and provide supply air 210 to building zone 206. AHU controller 230 may communicate with fan 238 via communications link 240 to control a flow rate of supply air 210. In some embodiments, AHU controller 230 controls an amount of heating or cooling applied to supply air 210 by modulating a speed of fan 238. In some embodiments, AHU 202 includes one or more air filters (e.g., filter 308) and/or one or more ultraviolet (UV) lights (e.g., UV lights 306) as described in greater detail with reference to FIG. 3. AHU controller 230 can be configured to control the UV lights and route the airflow through the air filters to disinfect the airflow as described in greater detail below.

Cooling coil 234 may receive a chilled fluid from central plant 200 (e.g., from cold water loop 216) via piping 242 and may return the chilled fluid to central plant 200 via piping 244. Valve 246 can be positioned along piping 242 or piping 244 to control a flow rate of the chilled fluid through cooling coil 234. In some embodiments, cooling coil 234 includes multiple stages of cooling coils that can be independently activated and deactivated (e.g., by AHU controller 230, by BMS controller 266, etc.) to modulate an amount of cooling applied to supply air 210.

Heating coil 236 may receive a heated fluid from central plant 200 (e.g., from hot water loop 214) via piping 248 and may return the heated fluid to central plant 200 via piping 250. Valve 252 can be positioned along piping 248 or piping 250 to control a flow rate of the heated fluid through heating coil 236. In some embodiments, heating coil 236 includes multiple stages of heating coils that can be independently activated and deactivated (e.g., by AHU controller 230, by BMS controller 266, etc.) to modulate an amount of heating applied to supply air 210.

Each of valves 246 and 252 can be controlled by an actuator. For example, valve 246 can be controlled by actuator 254 and valve 252 can be controlled by actuator 256. Actuators 254-256 may communicate with AHU controller 230 via communications links 258-260. Actuators 254-256 may receive control signals from AHU controller 230 and may provide feedback signals to controller 230. In some embodiments, AHU controller 230 receives a measurement of the supply air temperature from a temperature sensor 262 positioned in supply air duct 212 (e.g., downstream of cooling coil 334 and/or heating coil 236). AHU controller 230 may also receive a measurement of the temperature of building zone 206 from a temperature sensor 264 located in building zone 206.

In some embodiments, AHU controller 230 operates valves 246 and 252 via actuators 254-256 to modulate an amount of heating or cooling provided to supply air 210 (e.g., to achieve a setpoint temperature for supply air 210 or to maintain the temperature of supply air 210 within a setpoint temperature range). The positions of valves 246 and 252 affect the amount of heating or cooling provided to supply air 210 by cooling coil 234 or heating coil 236 and may correlate with the amount of energy consumed to achieve a desired supply air temperature. AHU 230 may control the temperature of supply air 210 and/or building zone 206 by activating or deactivating coils 234-236, adjusting a speed of fan 238, or a combination of both.

Still referring to FIG. 2, airside system 200 is shown to include a building management system (BMS) controller 266 and a client device 268. BMS controller 266 can include one or more computer systems (e.g., servers, supervisory controllers, subsystem controllers, etc.) that serve as system level controllers, application or data servers, head nodes, or master controllers for airside system 200, central plant 200, HVAC system 100, and/or other controllable systems that serve building 10. BMS controller 266 may communicate with multiple downstream building systems or subsystems (e.g., HVAC system 100, a security system, a lighting system, central plant 200, etc.) via a communications link 270 according to like or disparate protocols (e.g., LON, BACnet, etc.). In various embodiments, AHU controller 230 and BMS controller 266 can be separate (as shown in FIG. 2) or integrated. In an integrated implementation, AHU controller 230 can be a software module configured for execution by a processor of BMS controller 266.

In some embodiments, AHU controller 230 receives information from BMS controller 266 (e.g., commands, setpoints, operating boundaries, etc.) and provides information to BMS controller 266 (e.g., temperature measurements, valve or actuator positions, operating statuses, diagnostics, etc.). For example, AHU controller 230 may provide BMS controller 266 with temperature measurements from temperature sensors 262-264, equipment on/off states, equipment operating capacities, and/or any other information that can be used by BMS controller 266 to monitor or control a variable state or condition within building zone 206.

Client device 268 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 268 can be a computer workstation, a client terminal, a remote or local interface, or any other type of user interface device. Client device 268 can be a stationary terminal or a mobile device. For example, client device 268 can be a desktop computer, a computer server with a user interface, a laptop computer, a tablet, a smartphone, a PDA, or any other type of mobile or non-mobile device. Client device 268 may communicate with BMS controller 266 and/or AHU controller 230 via communications link 272.

HVAC System with Building Infection Control

Overview

Figure 3:
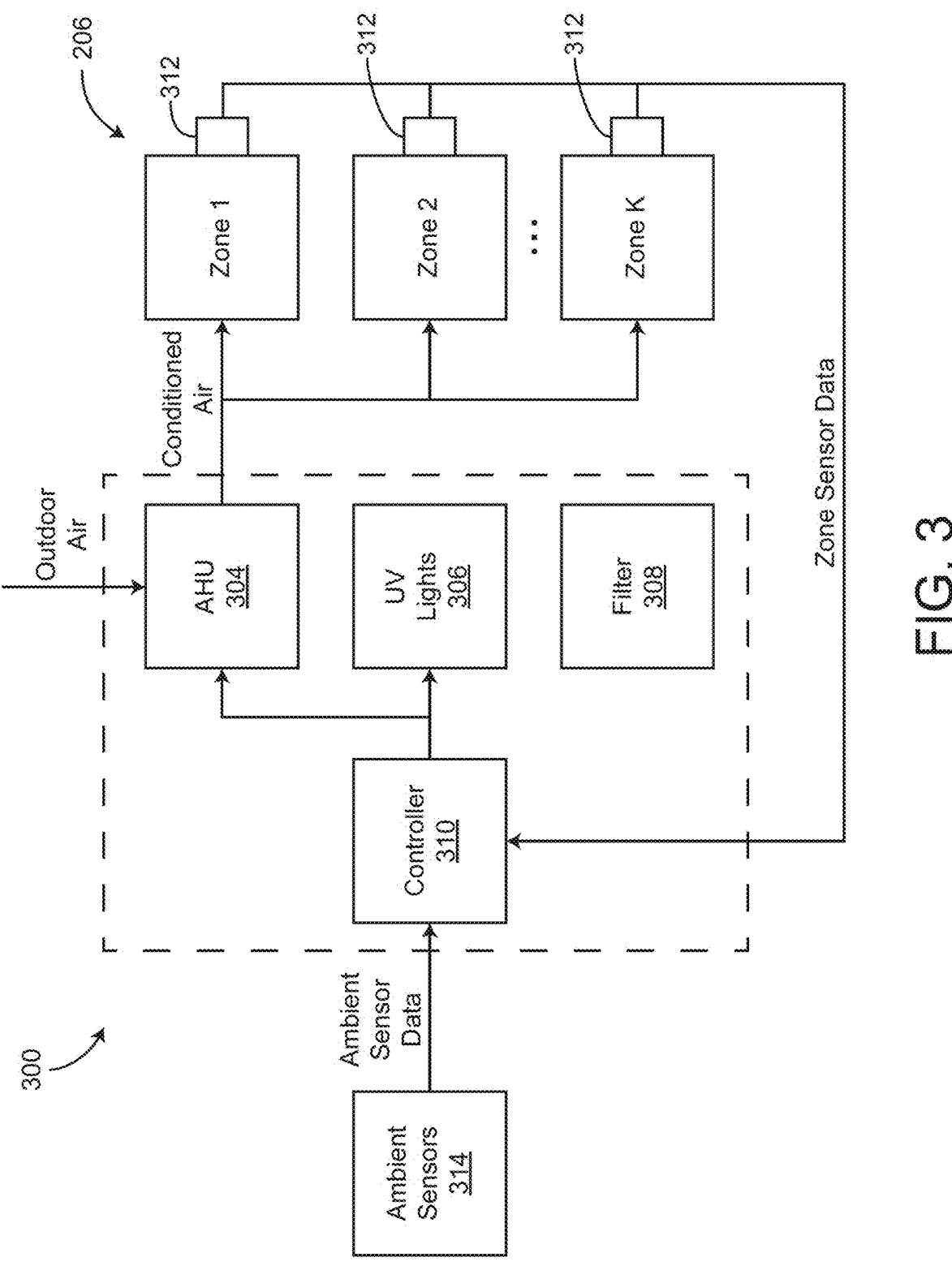
FIG. 3 is a block diagram of an HVAC system including a controller configured to operate an air-handling unit (AHU) of the HVAC system of FIG. 1, according to some embodiments.

Referring particularly to FIG. 3, a HVAC system 300 that is configured to provide disinfection for various zones of a building (e.g., building 10) is shown, according to some embodiments. HVAC system 300 can include an air handling unit (AHU) 304 (e.g., AHU 230, AHU 202, etc.) that can provide conditioned air (e.g., cooled air, supply air 210, etc.) to various building zones 206. The AHU 304 may draw air from the zones 206 in combination with drawing air from outside (e.g., outside air 214) to provide conditioned or clean air to zones 206. The HVAC system 300 includes a controller 310 (e.g., AHU controller 230) that is configured to determine a fraction x of outdoor air to recirculated air that the AHU 304 should use to provide a desired amount of disinfection to building zones 206. In some embodiments, controller 310 can generate control signals for various dampers of AHU 304 so that AHU 304 operates to provide the conditioned air to building zones 206 using the fraction x.

The HVAC system 300 can also include ultraviolet (UV) lights 306 that are configured to provide UV light to the conditioned air before it is provided to building zones 206. The UV lights 306 can provide disinfection as determined by controller 310 and/or based on user operating preferences. For example, the controller 310 can determine control signals for UV lights 306 in combination with the fraction x of outdoor air to provide a desired amount of disinfection and satisfy an infection probability constraint. Although UV lights 306 are referred to throughout the present disclosure, the systems and methods described herein can use any type of disinfection lighting using any frequency, wavelength, or luminosity of light effective for disinfection. It should be understood that UV lights 306 (and any references to UV lights 306 throughout the present disclosure) can be replaced with disinfection lighting of any type without departing from the teachings of the present disclosure.

The HVAC system 300 can also include one or more filters 308 or filtration devices (e.g., air purifiers). In some embodiments, the filters 308 are configured to filter the conditioned air or recirculated air before it is provided to building zones 206 to provide a certain amount of disinfection. In this way, controller 310 can perform an optimization in real-time or as a planning tool to determine control signals for AHU 304 (e.g., the fraction x) and control signals for UV lights 306 (e.g., on/off commands) to provide disinfection for building zones 206 and reduce a probability of infection of individuals that are occupying building zones 206. Controller 310 can also function as a design tool that is configured to determine suggestions for building managers regarding benefits of installing or using filters 308, and/or specific benefits that may arise from using or installing a particular type or size of filter. Controller 310 can thereby facilitate informed design decisions to maintain sterilization of air that is provided to building zones 206 and reduce a likelihood of infection or spreading of infectious matter.

Wells-Riley Airborne Transmission

In some embodiments, systems and methods described herein may use an infection probability constraint in various optimizations (e.g., in on-line or real-time optimizations or in off-line optimizations) to facilitate reducing infection probability among residents or occupants of spaces that the HVAC system serves. The infection probability constraint can be based on a steady-state Wells-Riley equation for a probability of airborne transmission of an infectious agent given by:

$$P := \frac{D}{S} = 1 - \exp\left(-\frac{Ipqt}{Q}\right)$$

where P is a probability that an individual becomes infected (e.g., in a zone, space, room, environment, etc.), D is a number of infected individuals (e.g., in the zone, space, room, environment, etc.), S is a total number of susceptible individuals (e.g., in the zone, space, room, environment, etc.), I is a number of infectious individuals (e.g., in the zone, space, room, environment, etc.), q is a disease quanta generation rate (e.g., with units of 1/sec), p is a volumetric breath rate of one individual (e.g., in m³/sec), t is a total exposure time (e.g., in seconds), and Q is an outdoor ventilation rate (e.g., in m³/sec). For example, Q may be a volumetric flow rate of fresh outdoor air that is provided to the building zones 206 by AHU 304.

When the Wells-Riley equation is implemented by controller 310 as described herein, controller 310 may use the Wells-Riley equation (or a dynamic version of the Wells-Riley equation) to determine an actual or current probability of infection P and operate the HVAC system 200 to maintain the actual probability of infection P below (or drive the actual probability of infection below) a constraint or maximum allowable value. The constraint value (e.g., $P^{max}$) may be a constant value, or may be adjustable by a user (e.g., a user-set value). For example, the user may set the constraint value of the probability of infection to a maximum desired probability of infection (e.g., either for on-line implementation of controller 310 to maintain the probability of infection below the maximum desired probability, or for an off-line implementation/simulation performed by controller 310 to determine various design parameters for HVAC system 200 such as filter size), or may select from various predetermined values (e.g., 3-5 different choices of the maximum desired probability of infection).

In some embodiments, the number of infectious individuals I can be determined by controller 310 based on data from the Centers for Disease and Control Prevention or a similar data source. The value of/may be typically set equal to 1 but may vary as a function of occupancy of building zones 206.

The disease quanta generation rate q may be a function of the infectious agent. For example, more infectious diseases may have a higher value of q, while less infectious diseases may have a lower value of q. For example, the value of q for COVID-19 may be 30-300 (e.g., 100).

The value of the volumetric breath rate p may be based on a type of building space 206. For example, the volumetric breath rate p may be higher if the building zone 206 is a gym as opposed to an office setting. In general, an expected level of occupant activity may determine the value of the volumetric breath rate p.

A difference between D (the number of infected individuals) and/(the number of infectious individuals) is that D is a number of individuals who are infected (e.g., infected with a disease), while/is a number of people that are infected and are actively contagious (e.g., individuals that may spread the disease to other individuals or spread infectious particles when they exhale). The disease quanta generation rate indicates a number of infectious droplets that give a 63.2% chance of infecting an individual (e.g., 1-exp(−1)). For example, if an individual inhales k infectious particles, the probability that the individual becomes infected (P) is given by $$1 - \exp\left(-\frac{k}{k_0}\right)$$

where k is the number of infectious particles that the individual has inhaled, and ko is a quantum of particles for a particular disease (e.g., a predefined value for different diseases). The quanta generation rate q is the rate at which quanta are generated (e.g., K/ko) where K is the rate of infectious particles exhaled by an infectious individual. It should be noted that values of the disease quanta generation rate q may be back-calculated from epidemiological data or may be tabulated for well-known diseases.

The Wells-Riley equation (shown above) is derived by assuming steady-state concentrations for infectious particles in the air. Assuming a well-mixed space:

$$V\frac{dN}{dt} = Iq - NQ$$

16 where V is a total air volume (e.g., in m³), N is a quantum concentration in the air, I is the number of infectious individuals, q is the disease quanta generation rate, and Q is the outdoor ventilation rate. The term Iq is quanta production by infectious individuals (e.g., as the individuals breathe out or exhale), and the term NQ is the quanta removal rate due to ventilation (e.g., due to operation of AHU 304).

Assuming steady-state conditions, the steady state quantum concentration in the air is expressed as:

$$N_{ss} = \frac{Iq}{Q}$$

according to some embodiments.

Therefore, if an individual inhales at an average rate of p (e.g., in m³/sec), over a period of length t the individual inhales a total volume pt or $N_{ss}ptk_0$ infectious particles. Therefore, based on a probability model used to define the quanta, the infectious probability is given by:

$$P = 1 - \exp\left(-\frac{k}{k_0}\right) = 1 - \exp(-N_{ss}pt) = 1 - \exp\left(-\frac{Iqpt}{Q}\right)$$

where P is the probability that an individual becomes infected, k is the number of infectious particles that the individual has inhaled, and ko is the quantum of particles for the particular disease.

Carbon Dioxide for Infectious Particles Proxy

While the above equations may rely on in-air infectious quanta concentration, measuring in-air infectious quanta concentration may be difficult. However, carbon dioxide (CO2) is a readily-measurable parameter that can be a proxy species, measured by zone sensors 312. In some embodiments, a concentration of CO2 in the zones 206 may be directly related to a concentration of the infectious quanta.

A quantity @ that defines a ratio of an infected particle concentration in the building air to the infected particle concentration in the exhaled breath of an infectious individual is defined:

$$\phi := \frac{pN}{q}$$

where p is the volumetric breath rate for an individual, N is the quantum concentration in the air, and q is the disease quanta generation rate. Deriving the above equation with respect to time yields:

$$\frac{d\phi}{dt} = \frac{p}{q}\left(\frac{dN}{dt}\right) = \frac{Ip}{V} - \phi\left(\frac{Q}{V}\right)$$

where p is the volumetric breath rate for the individual, q is disease quanta generation rate, N is the quantum concentration in the air, t is time, I is the number of infectious individuals, V is the total air volume, $\phi$ is the ratio, and Q is the outdoor ventilation rate. Since it can be difficult to measure the ratio $\phi$ of the air, CO2 can be used as a proxy species.

Humans release CO2 when exhaling, which is ultimately transferred to the ambient via ventilation of an HVAC system. Therefore, the difference between CO2 particles and infectious particles is that all individuals (and not only the infectious population) release CO2 and that the outdoor air CO2 concentration is non-zero. However, it may be assumed that the ambient CO2 concentration is constant with respect to time, which implies that a new quantity C can be defined as the net indoor CO2 concentration (e.g., the indoor concentration minus the outdoor concentration). With this assumption, the following differential equation can be derived:

$$V \frac{dC}{dt} = Spc - QC$$

where V is the total air volume (e.g., in m$^3$), C is the net indoor CO2 concentration, t is time, S is the total number of susceptible individuals (e.g., in building zone 206, or a modeled space, or all of building zones 206, or building 10), p is the volumetric breath rate for one individual, c is the net concentration of exhaled CO2, and Q is the outdoor ventilation rate. This equation assumes that the only way to remove infectious particles is with fresh air ventilation (e.g., by operating AHU 304 to draw outdoor air and use the outdoor air with recirculated air). A new quantity $\psi$ can be defined that gives the ratio of net CO2 concentration in the building air to net CO2 concentration in the exhaled air:

$$\psi = \frac{C}{c}$$

where $\psi$ is the ratio, C is the net indoor CO2 concentration, and c is the net concentration of exhaled CO2.

Deriving the ratio w/with respect to time yields:

$$\frac{d\psi}{dt} = \frac{1}{c}\left(\frac{dC}{dt}\right) = \frac{Sp}{V} - \psi\left(\frac{Q}{V}\right)$$

according to some embodiments.

Combining the above equation with the quantity $\phi$, it can be derived that:

$$\frac{d}{dt}\log\left(\frac{\phi}{\psi}\right) = \frac{1}{\phi}\left(\frac{d\phi}{dt}\right) - \frac{1}{\psi}\left(\frac{d\psi}{dt}\right) = \frac{p}{V}\left(\frac{I}{\phi} - \frac{S}{\psi}\right)$$

according to some embodiments. Assuming that the initial condition satisfies:

$$\phi(0) = \frac{1}{S}\psi(0)$$

it can be determined that the right-hand side of the $$\frac{d}{dt}\log\left(\frac{\phi}{\psi}\right)$$

equation becomes zero. This implies that the term log $$\left(\frac{\phi}{\psi}\right)$$

and therefore $$\frac{\phi}{\psi}$$

is a constant. Therefore, $\phi/\psi$ is constant for all times t and not merely initial conditions when t=0.

The $$\frac{d}{dt}\log\left(\frac{\phi}{\psi}\right)$$

relationship only holds true when fresh outdoor air is used as the only disinfection mechanism. However, in many cases HVAC system 200 may include one or more filters 308, and UV lights 306 that can be operated to provide disinfection for building zones 206. If additional infection mitigation strategies are used, the ventilation rate may instead by an effective ventilation rate for infectious quanta that is different than that of the CO2. Additionally, the only way for the initial conditions $\phi(0)$ and $\psi(0)$ to be in proportion is for both to be zero. This assumption can be reasonable if HVAC system 200 operates over a prolonged time period (such as overnight, when the concentrations have sufficient time to reach equilibrium zero values). However, ventilation is often partially or completely disabled overnight and therefore the two quantities $\phi$ and $\psi$ are not related. However, CO2 concentration can be measured to determine common model parameters (e.g., for the overall system volume V) without being used to estimate current infectious particle concentrations. If fresh outdoor air ventilation is the only mechanism for disinfection of zones 206, and the HVAC system 200 is run so that the concentrations reach equilibrium, CO2 concentration can be measured and used to estimate current infectious particle concentrations.

Dynamic Extension and Infection Probability Constraints

Referring still to FIG. 3, it may be desirable to model the infectious quanta concentration N of building zones 206 as a dynamic parameter rather than assuming N is equal to the steady state $N_{SS}$ value. For example, if infectious individuals enter building zones 206, leave building zones 206, etc., the infectious quanta concentration N may change over time. This can also be due to the fact that the effective fresh air ventilation rate (which includes outdoor air intake as well as filtration or UV disinfection that affects the infectious agent concentration in the supply air that is provided by AHU 304 to zones 206) can vary as HVAC system 200 operates.

Therefore, assuming that the infectious quanta concentration N(t) is a time-varying quantity, for a given time period $t \in [0, T]$, an individual breathes in:

$$k_{[0,T]} = \int_0^T pk_0 N(t)dt$$

where $k_{[0,T]}$ is the number of infectious particles that an individual inhales over the given time period [0, T], p is the volumetric breath rate of one individual, ko is the quantum of particles for a particular disease, and N (t) is the time-varying quantum concentration of the infectious particle in the air.

Since $$P = 1 - \exp\left(-\frac{k}{k_0}\right),$$

the above equation can be rearranged and substitution yields:

$$-\log(1 - P_{[0,T]}) = \int_0^T pN(t)dt \approx \Delta \sum_t pN_t$$

according to some embodiments.

Assuming an upper boundary $$P_{[0,T]}^{max}$$

on acceptable or desirable infection probability, a constraint is defined as:

$$\frac{\Delta}{T} \sum_t N_t \leq -\frac{1}{pT} \log(1 - P_{[0,T]})$$

according to some embodiments. The constraint can define a fixed upper boundary on an average value of $N_t$ over the given time interval.

Control Formulation

Figure 4:
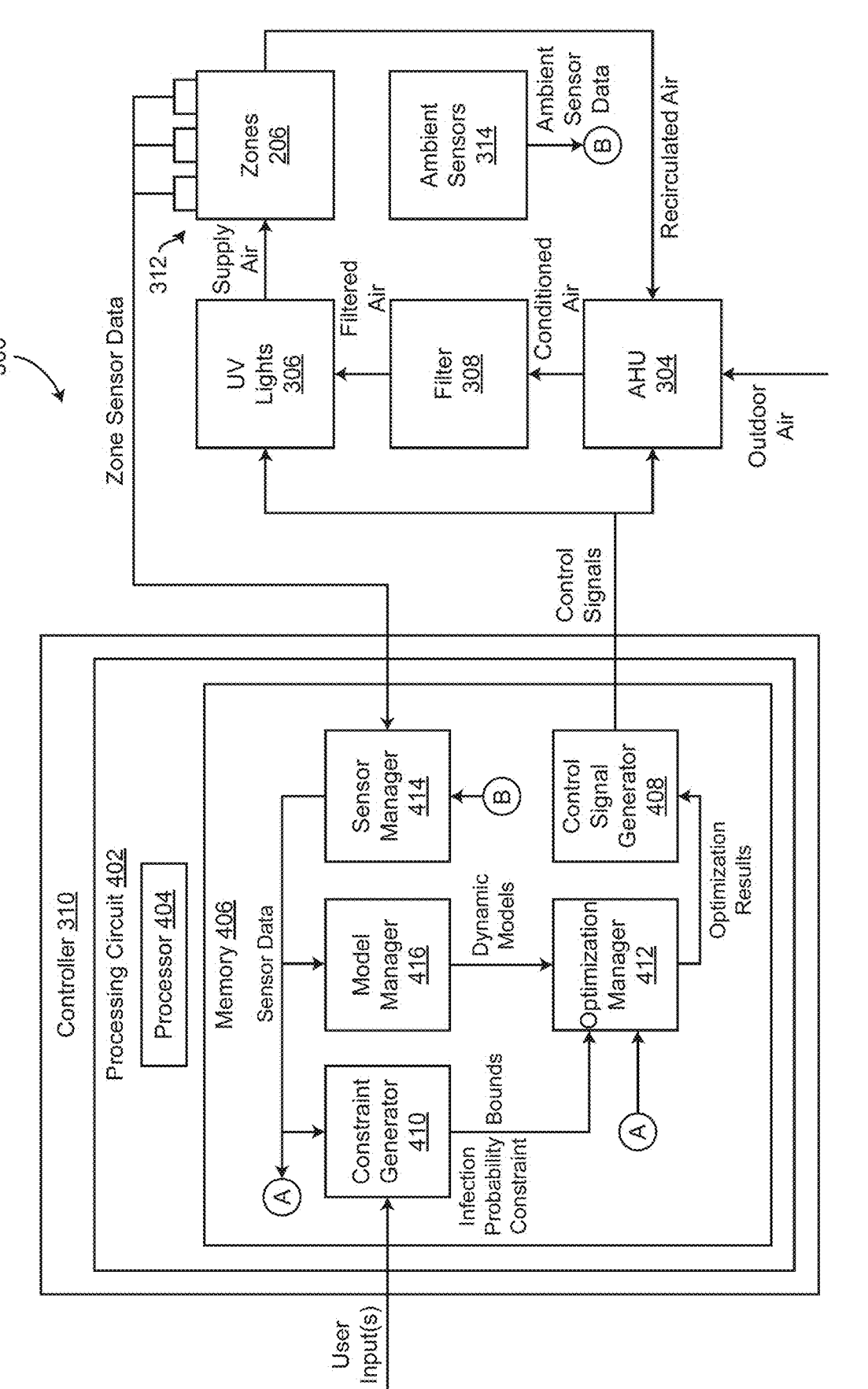
FIG. 4 is a block diagram illustrating the controller of FIG. 3 in greater detail, showing operations performed when the controller is used in an on-line mode or real-time implementation for making control decisions to minimize energy consumption of the HVAC system and provide sufficient disinfection, according to some embodiments.

Referring particularly to FIG. 4, controller 310 is shown in greater detail, according to some embodiments. Controller 310 is configured to generate control signals for any of UV lights 306, filter 308, and/or AHU 304. AHU 304 operates to draw outdoor air and/or recirculated air (e.g., from zones 206) to output conditioned (e.g., cooled) air. The conditioned air may be filtered by passing through filter 308 (e.g., which may include fans to draw the air through the filter 308) to output filtered air. The filtered air and/or the conditioned air can be disinfected through operation of UV lights 306. The AHU 304, filter 308, and UV lights 306 can operate in unison to provide supply air to zones 206.

Controller 310 includes a processing circuit 402 including a processor 404 and memory 406. Processing circuit 402 can be communicably connected with a communications interface of controller 310 such that processing circuit 402 and the various components thereof can send and receive data via the communications interface. Processor 404 can be implemented as a general purpose processor, an application specific integrated circuit (ASIC), one or more field programmable gate arrays (FPGAs), a group of processing components, or other suitable electronic processing components.

Memory 406 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 406 can be or include volatile memory or non-volatile memory. Memory 406 can include database components, object code components, script components, or any other type of information structure for supporting the various activities and information structures described in the present application. According to some embodiments, memory 406 is communicably connected to processor 404 via processing circuit 402 and includes computer code for executing (e.g., by processing circuit 402 and/or processor 404) one or more processes described herein.

In some embodiments, controller 310 is implemented within a single computer (e.g., one server, one housing, etc.). In various other embodiments controller 310 can be distributed across multiple servers or computers (e.g., that can exist in distributed locations).

Memory 406 can include a constraint generator 410, a model manager 416, a sensor manager 414, an optimization manager 412, and a control signal generator 408. Sensor manager 414 can be configured to obtain zone sensor data from zone sensors 312 and/or ambient sensor data from ambient sensors 314 (e.g., environmental conditions, outdoor temperature, outdoor humidity, etc.) and distribute required sensor data to the various components of memory 406 thereof. Constraint generator 410 is configured to generate one or more constraints for an optimization problem (e.g., an infection probability constraint) and provide the constraints to optimization manager 412. Model manager 416 can be configured to generate dynamic models (e.g., individual or zone-by-zone dynamic models, aggregate models, etc.) and provide the dynamic models to optimization manager 412. Optimization manager 412 can be configured to use the constraints provided by constraint generator 410 and the dynamic models provided by model manager 416 to formulate an optimization problem. Optimization manager 412 can also define an objective function for the optimization problem, and minimize or optimize the objective function subject to the one or more constraints and the dynamic models. The objective function may be a function that indicates an amount of energy consumption, energy consumption costs, carbon footprint, or any other optimization goals over a time interval or time horizon (e.g., a future time horizon) as a function of various control decisions. Optimization manager 412 can output optimization results to control signal generator 408. Control signal generator 408 can generate control signals based on the optimization results and provide the control signals to any of AHU 304, filter 308, and/or UV lights 306.

Referring particularly to FIGS. 3 and 4, AHU 304 can be configured to serve multiple building zones 206. For example, AHU 304 can be configured to serve a collection of zones 206 that are numbered $k=1, \ldots, K$. Each zone 206 can have a temperature, referred to as temperature $T_k$ (the temperature of the kth zone 206), a humidity $\omega_k$ (the humidity of the kth zone 206), and an infectious quanta concentration $N_k$ (the infectious quanta concentration of the kth zone 206). Using this notation, the following dynamic models of individual zones 206 can be derived:

$$\rho c V_k \left(\frac{dT_k}{dt}\right) = \rho c f_k (T_0 - T_k) + Q_k(T_k)$$

$$\rho V_k \left(\frac{d\omega_k}{dt}\right) = \rho f(\omega_0 - T_0) + w_k$$

$$V_k \left(\frac{dN_k}{dt}\right) = f_k (N_0 - N_k) + I_k q$$

where $f_k$ is a volumetric flow of air into the kth zone, p is a mass density of air (e.g., in kg per cubic meters), c is the heat capacity of air (e.g., in KJ/kg·K), $Q_k(\cdot)$ is heat load on the kth zone 206 (which may depend on the temperature $T_k$), $w_k$ is the moisture gain of the kth zone 206, and $I_k$ is the number of infectious individuals in the kth zone 206. $T_0$ is the temperature of the air provided to the kth zone (e.g., as discharged by a VAV box of AHU 304), $\omega_0$ is the humidity of the air provided to the kth zone 206, and No is the infectious quanta concentration of the air provided to the kth zone 206.

The temperature $T_0$ of air output by the AHU 304, the humidity $\omega_0$ of air output by the AHU 304, and the infectious quanta concentration $N_0$ of air output by the AHU 304 is calculated using the equations:

$$T_0 = xT_a + (1-x)\frac{\sum_k f_k T_k}{\sum_k f_k} - \Delta T_c$$

$$\omega_0 = x\omega_a + (1-x)\frac{\sum_k f_k \omega_k}{\sum_k f_k} - \Delta\omega_c$$

$$N_0 = (1-\lambda)(1-x)\frac{\sum_k f_k N_k}{\sum_k f_k}$$

where x is the fresh-air intake fraction of AHU 304, $T_a$ is current ambient temperature, $\omega_a$ is current ambient humidity, $\Delta T_c$ is temperature reductions from the cooling coil of AHU 304, $\Delta\omega_c$ is humidity reduction from the cooling coil of AHU 304, and $\lambda$ is a fractional reduction of infectious quanta due to filtration (e.g., operation of filter 308) and/or UV treatment (e.g., operation of UV lights 306) at AHU 304 (but not due to ventilation which is accounted for in the factor 1−x, according to some embodiments.

In some embodiments, the dynamic models of the individual zones are stored by and used by model manager 416. Model manager 416 can store the individual dynamic models shown above and/or aggregated models (described in greater detail below) and populate the models. The populated models can then be provided by model manager 416 to optimization manager 412 for use in performing an optimization.

In some embodiments, model manager 416 is configured to receive sensor data from sensor manager 414. Sensor manager 414 may receive sensor data from zone sensors 312 and/or ambient sensors 313 and provide appropriate or required sensor data to the various managers, modules, generators, components, etc., of memory 406. For example, sensor manager 414 can obtain values of the current ambient temperature $T_a$, the current ambient humidity $\omega_a$, the temperature reduction $\Delta T_c$ resulting from the cooling coil of AHU 304, and/or the humidity reduction $\Delta\omega_c$ resulting from the cooling coil of AHU 304, and provide these values to model manager 416 for use in determining $T_0$, $\omega_0$, and $N_0$ or for populating the dynamic models of the individual zones 206.

In some embodiments, various parameters or values of the variables of the dynamic models of the individual zones 206 are predefined, predetermined, or stored values, or may be determined (e.g., using a function, an equation, a table, a look-up table, a graph, a chart, etc.) based on sensor data (e.g., current environmental conditions of the ambient or outdoor area, environmental conditions of the zones 206, etc.). For example, the mass density of air p may be a predetermined value or may be determined based on sensor data. In some embodiments, model manager 416 can use stored values, sensor data, etc., to fully populate the dynamic models of the individual zones 206 (except for control or adjustable variables of the dynamic models of the individual zones 206 that are determined by performing the optimization). Once the models are populated so that only the control variables remain undefined or undetermined, model manager 416 can provide the populated models to optimization manager 412.

The number of infectious individuals $I_k$ can be populated based on sensor data (e.g., based on biometric data of occupants or individuals of the building zones 206), or can be estimated based on sensor data. In some embodiments, model manager 416 can use an expected number of occupants and various database regarding a number of infected individuals in an area. For example, model manager 416 can query an online database regarding potential infection spread in the area (e.g., number of positive tests of a particular virus or contagious illness) and estimate if it is likely that an infectious individual is in the building zone 206.

In some embodiments, it can be difficult to obtain zone-by-zone values of the number of infectious individuals $I_k$ in the modeled space (e.g., the zones 206). In some embodiments, model manager 416 is configured to use an overall approximation of the model for $N_k$. Model manager 416 can store and use volume-averaged variables:

$$\overline{N} = \frac{\sum_k V_k N_k}{V}$$

$$\overline{f} = \sum_k f_k$$

$$V = \sum_k V_k$$

$$\overline{I} = \sum_k I_k$$

according to some embodiments. Specifically, the equations shown above aggregate the variables $\overline{N}$, $\overline{f}$, $V$, and $\overline{I}$ across multiple zones 206 by calculating a weighted average based on the volume of zones 206.

The K separate ordinary differential equation models (i.e., the dynamic models of the individual zones 206) can be added for $N_k$ to determine an aggregate quantum concentration model:

$$V\frac{d\overline{N}}{dt} = \sum_k V_k \frac{dN_k}{dt}$$

$$= \sum_k (f_k(N_0 - N_k) + I_k q)$$

$$= \overline{I}q + \sum_k f_k\left((1-\lambda)(1-x)\frac{\sum_{k'} f_{k'} N_{k'}}{\sum_{k'} f_{k'}} - N_k\right)$$

$$= \overline{I}q + (1-\lambda)(1-x)\sum_{k'} f_{k'} N_{k'} - \sum_k f_k N_k$$

$$= \overline{I}q - (\lambda + x - \lambda x)\sum_k f_k N_k$$

$$\approx \overline{I}q - (\lambda + x - \lambda x)\overline{f}\,\overline{N}$$

according to some embodiments, assuming that $N_k \approx \overline{N}$ for each zone 206. The aggregate quantum concentration model is shown below:

$$\bar{V}\frac{d\bar{N}}{dt} = \bar{I}q - (\lambda + x - \lambda x)\sum_k f_k N_k \approx \bar{I}q - (\lambda + x - \lambda x)\bar{f}\bar{N}$$

according to some embodiments.

Defining aggregate temperature, humidity, heat load, and moisture gain parameters:

$$\bar{T} = \frac{\sum_k V_k T_k}{\bar{V}}$$

$$\bar{\omega} = \frac{\sum_k V_k \omega_k}{\bar{V}}$$

$$\bar{Q}(\cdot) = \sum_k Q_k(\cdot)$$

$$\bar{w} = \sum_k w_k$$

allows the k thermal models $$\rho c V_k\left(\frac{dT_k}{dt}\right)$$

to be added:

$$\rho c\bar{V}\frac{d\bar{T}}{dt} = \sum_k \rho c V_k \frac{dT_k}{dt}$$

$$= \sum_k (\rho c f_k(T_0 - T_k) + Q_k(T_k))$$

$$= \sum_k Q_k(T_k) + \sum_k \rho c f_k\left(xT_a + (1-x)\frac{\sum_{k'} f_{k'} T_{k'}}{\sum_{k'} f_{k'}} - T_k - \Delta T_c\right)$$

$$= \sum_k Q_k(T_k) + (1-x)\sum_{k'} \rho c f_{k'} T_{k'} + \sum_k \rho f_k(xT_a - T_k - \Delta T_c)$$

$$= \sum_k Q_k(T_k) + \rho c\sum_k f_k(x(T_a - T_k) - \Delta T_c)$$

$$\approx \bar{Q}(\bar{T}) + \rho c\bar{f}(x(T_a - \bar{T}) - \Delta T_c)$$

according to some embodiments (assuming that $T_k \approx \bar{T}$ for each zone 206). This yields the aggregate thermal model:

$$\rho c\bar{V}\frac{d\bar{T}}{dt} =$$

$$\sum_k Q_k(T_k) + \rho c\sum_k f_k(x(T_a - T_k) - \Delta T_c) \approx \bar{Q}(\bar{T}) + \rho c\bar{f}(x(T_a - \bar{T}) - \Delta T_c)$$

according to some embodiments.

The moisture model $$\rho V_k\left(\frac{d\omega_k}{dt}\right)$$

can similarly be aggregated to yield an aggregate moisture model:

$$\rho\bar{V}\frac{d\bar{\omega}}{dt} = \bar{w} + \rho\sum_k f_k(x(\omega_a - \omega_k) - \Delta\omega_c) \approx \bar{w} + \rho\bar{f}(x(\omega_a - \bar{\omega}) - \Delta\omega_c)$$

to predict an evolution of volume-averaged humidity, according to some embodiments.

In some embodiments, model manager 416 stores and uses the aggregate quantum concentration model, the aggregate thermal model, and/or the aggregate moisture model described hereinabove. Model manager 416 can populate the various parameters of the aggregate models and provide the aggregate models to optimization manager 412 for use in the optimization.

Referring still to FIG. 4, memory 406 includes optimization manager 412. Optimization manager 412 can be configured to use the models provided by model manager 416 and various constraints provided by constraint generator 410 to construct an optimization problem for HVAC system 200 (e.g., to determine design outputs and/or to determine control parameters, setpoints, control decisions, etc., for UV lights 306 and/or AHU 304). Optimization manager 412 can construct an optimization problem that uses the individual or aggregated temperature, humidity, and/or quantum concentration models subject to constraints to minimize energy use. In some embodiments, decision variables of the optimization problem formulated and solved by optimization manager 412 are the flows $f_k$ (or the aggregate f if the optimization problem uses the aggregate models), the outdoor air fraction x and the infectious quanta removal fraction A.

The infectious quanta removal fraction 1 is defined as:

$$\lambda = \lambda_{filter} + \lambda_{UV}$$

where $\lambda_{filter}$ is an infectious quanta removal fraction that results from using filter 308 (e.g., an amount or fraction of infectious quanta that is removed by filter 308), and $\lambda_{UV}$ is an infectious quanta removal fraction that results from using UV lights 306 (e.g., an amount or fraction of infectious quanta that is removed by operation of UV lights 306). In some embodiments, $\lambda_{filter}$ is a design-time constant (e.g., determined based on the chosen filter 308), whereas $\lambda_{UV}$ is an adjustable or controllable variable that can be determined by optimization manager 412 by performing the optimization of the optimization problem. In some embodiments, $\lambda_{UV}$ is a discrete variable. In some embodiments, $\lambda_{UV}$ is a continuous variable.

Instantaneous electricity or energy consumption of HVAC system 200 is modeled using the equation (e.g., an objective function that is minimized):

$$E = \eta_{coil}\rho\bar{f}(c\Delta T_c + L\Delta\omega_c) + \eta_{fan}\bar{f}\Delta P + \eta_{UV}\lambda_{UV}$$

where L is a latent heat of water, $\Delta P$ is a duct pressure drop, $\eta_{coil}$ is an efficiency of the cooling coil of AHU 304, $\eta_{fan}$ is an efficiency of a fan of AHU 304, and $\eta_{UV}$ is an efficiency of the UV lights 306, according to some embodiments. In some embodiments, optimization manager 412 is configured to store and use the energy consumption model shown above for formulating and performing the optimization. In some embodiments, the term $\eta_{coil}\rho\bar{f}(c\Delta T_c + L\Delta\omega_c)$ is an amount of energy consumed by the cooling coil or heating coil of the AHU 304 (e.g., over an optimization time period or time horizon), the term $\eta_{fan}\bar{f}\Delta P$ is an amount of energy consumed by the fan of the AHU 304, and $\eta_{UV}\lambda_{UV}$ is the amount of energy consumed by the UV lights 306. In some embodiments, the duct pressure drop $\Delta P$ is affected by or related to a choice of a type of filter 308, where higher efficiency filters 308 (e.g., filters 308 that have a higher value of $\eta_{filter}$)

generally resulting in a higher value of the duct pressure drop $\Delta P$ and therefore greater energy consumption. In some embodiments, a more complex model of the energy consumption is used by optimization manager 412 to formulate the optimization problem (e.g., a non-linear fan model and a time-varying or temperature-dependent coil efficiency model).

In some embodiments, the variables $\Delta T_c$ and $\Delta \omega_c$ for the cooling coil of the AHU 304 are implicit dependent decision variables. In some embodiments, a value of a supply temperature $T_{AHU}$ is selected for the AHU 304 and is used to determine the variables $\Delta T_c$ and $\Delta \omega_c$ based on inlet conditions to the AHU 304 (e.g., based on sensor data obtained by sensor manager 414). In such an implementation, model manager 416 or optimization manager 412 may determine that $T_0 = T_{AHU}$ and an equation for $\omega_0$.

Optimization manager 412 can use the models (e.g., the individual models, or the aggregated models) provided by model manager 416, and constraints provided by constraint generator 410 to construct the optimization problem. Optimization manager 412 may formulate an optimization problem to minimize energy consumption subject to constraints on the modeled parameters, $\omega$, and N and additional constraints:

$$\min_{f_t, x_t, \lambda_t} \sum_t E_t$$

(Energy Cost) s.t . . . (Dynamic Models for $T_t$, $\omega_t$, and $N_t$) . . . (Infection Probability Constraint)

$$T_t^{min} \le T_t \le T_t^{max}$$

(Temperature Bounds)

$$\omega_t^{min} \le \omega_t \le \omega_t^{max}$$

(Humidity Bounds)

$$x_t f_t \ge F_t^{min}$$

(Fresh-Air Ventilation Bound)

$$f_t^{min} \le f_t \le f_t^{max}$$

(VAV Flow Bounds)

$$0 \le x_t \le 1$$

(Outdoor-Air Damper Bounds)
where $$\sum_t E_t$$

is the summation or instantaneous electricity or energy consumption of the HVAC system 200 over an optimization time period, subject to the dynamic models for $T_t$, $\omega_t$, and $N_t$ (either zone-by-zone individual models, or aggregated models as described above), an infection probability constraint (described in greater detail below), temperature boundary constraints $$\left(T_t^{min} \le T_t \le T_t^{max}\right.$$

maintaining $T_t$ between a minimum temperature boundary $$T_t^{min}$$

and a
maximum temperature boundary $$T_t^{max}\big),$$

humanly boundary constraints $$\left(\omega_t^{min} \le \omega_t \le \omega_t^{max}\right.$$

maintaining the humidity $\omega_t$ between a minimum humidity boundary $$\omega_t^{min}$$

and a maximum humidity boundary $$\omega_t^{max}\big),$$

a fresh air ventilation boundary $$\left(x_t f_t \ge F_t^{min}\right.$$

maintaining the fresh air ventilation $x_t f_t$ above or equal to a minimum required amount $F_t^{min}$), a VAV flow boundary $$\left(f_t^{min} \le f_t \le f_t^{max}\right.$$

maintaining the volumetric flow rate $f_t$ between a minimum boundary $$f_t^{min}$$

and a maximum boundary $$f_t^{max}\big),$$

and an outdoor air dumper pound/constraint ($0 \le x_t \le 1$ maintaining the outdoor air fraction $x_t$ between 0 and 1). In some embodiments, optimization manager 412 is configured to discretize the dynamic models (e.g., the individual dynamic models or the aggregate dynamic models) using matrix exponentials or approximately using collocation methods.

The boundaries on temperature $$\left(T_t^{min} \leq T_t \leq T_t^{max}\right)$$

and humidity $$\left(\omega_t^{min} \leq \omega_t \leq \omega_t^{max}\right)$$

can be determined by optimization manager 412 based on user inputs or derived from comfort requirements. The temperature and humidity bounds may be enforced by optimization manager 412 as soft constraints. The remaining bounds (e.g., the fresh-air ventilation bound, the VAV flow bounds, and the outdoor-air damper bounds) can be applied to input quantities (e.g., decision variables) by optimization manager 412 as hard constraints for the optimization. In some embodiments, the fresh-air ventilation bound is enforced by optimization manager 412 to meet the American Society of Heating, Refrigerating, and Air-Conditioning Engineers (ASHRAE) standards. In some embodiments, the fresh-air ventilation bound is replaced with a model and corresponding bounds for $CO_2$ concentration.

In some embodiments, the various constraints generated by constraint generator 410 or other constraints imposed on the optimization problem can be implemented as soft constraints, hard constraints, or a combination thereof. Hard constraints may impose rigid boundaries (e.g., maximum value, minimum value) on one or more variables in the optimization problem such that any feasible solution to the optimization problem must maintain the hard constrained variables within the limits defined by the hard constraints. Conversely, soft constraints may be implemented as penalties that contribute to the value of the objective function (e.g., adding to the objective function if the optimization problem seeks to minimize the objective function or subtracting from the objective function if the optimization problem seeks to maximize the objective function). Soft constraints may be violated when solving the optimization problem, but doing so will incur a penalty that affects the value of the objective function. Accordingly, soft constraints may encourage optimization manager 412 to maintain the values of the soft constrained variables within the limits defined by the soft constraints whenever possible to avoid the penalties, but may allow optimization manager 412 to violate the soft constraints when necessary or when doing so would result in a more optimal solution.

In some embodiments, constraint generator 410 may impose soft constraints on the optimization problem by defining large penalty coefficients (relative to the scale of the other terms in the objective function) so that optimization manager 412 only violates the soft constraints when absolutely necessary. However, it is contemplated that the values of the penalty coefficients can be adjusted or tuned (e.g., by a person or automatically by constraint generator 410) to provide an optimal tradeoff between maintaining the soft constrained variables within limits and the resulting cost (e.g., energy cost, monetary cost) defined by the objective function. One approach which can be used by constraint generator 410 is to use penalties proportional to amount by which the soft constraint is violated (i.e., static penalty coefficients). For example, a penalty coefficient of 0.1 $/° C.·hr for a soft constrained temperature variable would add a cost of $0.10 to the objective function for every 1° C. that the temperature variable is outside the soft constraint limit for every hour of the optimization period. Another approach which can be used by constraint generator 410 is to use variable or progressive penalty coefficients that depend on the amount by which the soft constraint is violated. For example, a variable or progressive penalty coefficient could define a penalty cost of 0.1 $/° C.·hr for the first 1° C. by which a soft constrained temperature variable is outside the defined limit, but a relatively higher penalty cost of 1.0 $/° C.·hr for any violations of the soft constrained temperature limit outside the first 1° C.

Another approach which can be used by constraint generator 410 is to provide a "constraint violation budget" for one or more of the constrained variables. The constraint violation budget may define a total (e.g., cumulative) amount by which a constrained variable is allowed to violate a defined constraint limit within a given time period. For example, a constraint violation budget for a constrained temperature variable may define 30° C.·hr (or any other value) as the cumulative amount by which the constrained temperature variable is allowed to violate the temperature limit within a given time period (e.g., a day, a week, a month, etc.). This would allow the temperature to violate the temperature constraint by 30° C. for a single hour, 1° C. for each of 30 separate hours, 0.1° C. for each of 300 separate hours, 10° C. for one hour and 1° C. for each of 20 separate hours, or any other distribution of the 30° chr amount across the hours of the given time period, provided that the cumulative temperature constraint violation sums to 30° chr or less. As long as the cumulative constraint violation amount is within (e.g., less than or equal to) the constraint violation budget, constraint generator 410 may not add a penalty to the objective function or subtract a penalty from the objective function. However, any further violations of the constraint that exceed the constraint violation budget may trigger a penalty. The penalty can be defined using static penalty coefficients or variable/progressive penalty coefficients as discussed above.

The infection probability constraint (described in greater detail below) is linear, according to some embodiments. In some embodiments, two sources of nonlinearity in the optimization problem are the dynamic models and a calculation of the coil humidity reduction $\Delta\omega_c$. In some embodiments, the optimization problem can be solved using nonlinear programming techniques provided sufficient bounds are applied to the input variables.

Infection Probability Constraint

Referring still to FIG. 4, memory 406 is shown to include a constraint generator 410. Constraint generator 410 can be configured to generate the infection probability constraint, and provide the infection probability constraint to optimization manager 412. In some embodiments, constraint generator 410 is configured to also generate the temperature bounds, the humidity bounds, the fresh-air ventilation bound, the VAV flow bounds, and the outdoor-air damper bounds and provide these bounds to optimization manager 412 for performing the optimization.

For the infection probability constraint, the dynamic extension of the Wells-Riley equation implies that there should be an average constraint over a time interval during which an individual is in the building. An individual i's probability of infection $P_{i,[0,T]}$ over a time interval [0,T] is given by:

$$P_{i,[0,T]} = 1 - \exp\left(-p\Delta\sum_t \delta_{it} N_t\right), \quad \delta_{it} = \begin{cases} 1 & \text{if } i \text{ present at time } t \\ 0 & \text{else} \end{cases}$$

according to some embodiments. Assuming that the individual's probability of infection $P_{i,[0,T]}$ is a known value, an upper bound $p^{max}$ can be chosen for $P_{i,[0,T]}$ and can be implemented as a linear constraint:

$$\sum_t \delta_{it} N_t \le -\frac{1}{p\Delta}\log(1 - P^{max})$$

according to some embodiments. In some embodiments, the variable $\delta_{it}$ may be different for each individual in the building 10 but can be approximated as described herein.

The above linear constraint is an average constraint that gives optimization manager 412 (e.g., an optimizer) a maximum amount of flexibility since the average constraint may allow a higher concentration of infectious quanta during certain times of the day (e.g., when extra fresh-air ventilation is expensive due to outdoor ambient conditions) as long as the higher concentrations are balanced by lower concentrations of the infectious quanta during other times of the day. However, the Sit sequence may be different for each individual in the building 10. For purposes of the example described herein it is assumed that generally each individual is present a total of 8 hours (e.g., if the building 10 is an office building). However, the estimated amount of time the individual is within the building can be adjusted or set to other values for other types of buildings. For example, when the systems and methods described herein are implemented in a restaurant or store, the amount of time the individual is assumed to be present in the building can be set to an average or estimated amount of time required to complete the corresponding activities (e.g., eating a meal, shopping, etc.). While an occupancy time of the building by each individual may be reasonably known, the times that the individual is present in the building may vary (e.g., the individual may be present from 7 AM to 3 PM, 9 AM to 5 PM, etc.). Therefore, to ensure that the constraint is satisfied for all possible $\delta_{it}$ sequences, the constraint may be required to be satisfied when summing over 8 hours of the day that have a highest concentration.

This constraint is represented using linear constraints as:

$$M\eta + \sum_t \mu_t \le -\frac{1}{p\Delta}\log(1 - P^{max})$$

$$\mu_t + \eta \ge N_t \; \forall \, t$$

where $\eta$ and $\mu_t$ are new auxiliary variables in the optimization problem, and M is a number of discrete timesteps corresponding to 8 hours (or any other amount of time that an individual is expected to occupy building 10 or one of building zones 206). This formulation may work since $\eta$ is set to an Mth highest value of $N_t$ and each of the $u_t$ satisfy $u_t = \max(N_t - \eta, 0)$. Advantageously, this implementation of the infection probability constraint can be generated by constraint generator 410 and provided to optimization manager 412 for use in the optimization problem when controller 310 is implemented to perform control decisions for HVAC system 200 (e.g., when controller 310 operates in an on-line mode).

An alternative implementation of the infection probability constraint is shown below that uses a pointwise constraint:

$$N_t \le N_t^{max} = -\frac{1}{Mp\Delta}\log(1 - P^{max})$$

where $N_t$ is constrained to be less than or equal to $$N_t^{max}$$

for a maximum infection probability value $p^{max}$. In some embodiments, the pointwise constraint shown above is generated by constraint generator 410 for when optimization manager 412 is used in an off-line or design implementation. In some embodiments, the pointwise constraint shown above, if satisfied in all zones 206, ensures that any individual will meet the infection probability constraint. Such a constraint may sacrifice flexibility compared to the other implementation of the infection probability constraint described herein, but translates to a simple box constraint similar to the other bounds in the optimization problem, thereby facilitating a simpler optimization process.

In some embodiments, the maximum allowable or desirable infection probability $p^{max}$ is a predetermined value that is used by constraint generator 410 to generate the infection probability constraints described herein. In some embodiments, constraint generator 410 is configured to receive the maximum allowable or desirable infection probability $p^{max}$ from a user as a user input. In some embodiments, the maximum allowable or desirable infection probability $p^{max}$ is an adjustable parameter that can be set by a user or automatically generated based on the type of infection, time of year, type or use of the building, or any of a variety of other factors. For example, some buildings (e.g., hospitals) may be more sensitive to preventing disease spread than other types of buildings and may use lower values of $p^{max}$ Similarly, some types of diseases may be more serious or life-threatening than others and therefore the value of $p^{max}$ can be set to relatively lower values as the severity of the disease increases. In some embodiments, the value of $p^{max}$ can be adjusted by a user and the systems and methods described herein can run a plurality of simulations or optimizations for a variety of different values of $p^{max}$ to determine the impact on cost and disease spread. A user can select the desired value of $p^{max}$ in view of the estimated cost and impact on disease spread using the results of the simulations or optimizations.

Model Enhancements

Referring still to FIG. 4, optimization manager 412, constraint generator 410, and/or model manager 416 can implement various model enhancements in the optimization. In some embodiments, optimization manager 412 is configured to add a decision variable for auxiliary (e.g., controlled) heating (e.g., via baseboard heat or VAV reheat coils). In some embodiments, an effect of the auxiliary heating is included in the dynamic model of temperature similar to the disturbance heat load Qk(•). Similar to the other decision variables, the auxiliary heating decision variable may be subject to bounds (e.g., with both set to zero during cooling season to disable auxiliary heating) that are generated by constraint generator 410 and used by optimization manager 412 in the optimization problem formulation and solving. In some embodiments, the auxiliary heating also results in optimization manager 412 including another term for associated energy consumption in the energy consumption equation (shown above) that is minimized.

In some embodiments, certain regions or areas may have variable electricity prices and/or peak demand charges. In some embodiments, the objective function (e.g., the energy consumption equation) can be augmented by optimization manager 412 to account for such cost structures. For example, the existing energy consumption Et that is minimized by optimization manager 412 may be multiplied by a corresponding electricity price Pt. A peak demand charge may require the use of an additional parameter et that represents a base electric load of building 10 (e.g., for non-HVAC purposes). Optimization manager 412 can include such cost structures and may minimize overall cost associated with electricity consumption rather than merely minimizing electrical consumption. In some embodiments, optimization manager 412 accounts for revenue which can be generated by participating in incentive based demand response (IBDR) programs, frequency regulation (FR) programs, economic load demand response (ELDR) programs, or other sources of revenue when generating the objective function. In some embodiments, optimization manager 412 accounts for the time value of money by discounting future costs or future gains to their net present value. These and other factors which can be considered by optimization manager 412 are described in detail in U.S. Pat. No. 10,359, 748 granted Jul. 23, 2019, U.S. Patent Application Publication No. 2019/0347622 published Nov. 14, 2019, and U.S. Patent Application Publication No. 2018/0357577 published Dec. 13, 2018, each of which is incorporated by reference herein in its entirety.

In some embodiments, certain locations have time-varying electricity pricing, and therefore there exists a potential to significantly reduce cooling costs by using a solid mass of building 10 for thermal energy storage. In some embodiments, controller 310 can operate to pre-cool the solid mass of building 10 when electricity is cheap so that the solid mass can later provide passive cooling later in the day when electricity is less expensive. In some embodiments, optimization manager 412 and/or model manager 416 are configured to model this effect using a model augmentation by adding a new variable $$T_k^m$$

to represent the solid mass of the zone 206 evolving as:

$$\rho c_m V_k^m \frac{dT_k^m}{dt} = h_k^m(T_k - T_k^m)$$

with a corresponding term:

$$\rho c V_k \frac{dT_k}{dt} = \ldots + h_k^m(T_k^m - T_k)$$

added to the air temperature model (shown above). This quantity can also be aggregated by model manager 416 to an average value Tm similar to T.

For some diseases, infectious particles may naturally become deactivated or otherwise removed from the air over time. To consider these effects, controller 310 can add a proportional decay term to the infectious quanta model (in addition to the other terms of the infectious quanta model discussed above). An example is shown in the following equation:

$$V \frac{dN}{dt} = \ldots - V\beta N$$

where β represents the natural decay rate (in $s^{-1}$) of the infectious species and the ellipsis represents the other terms of the infectious quanta model as discussed above. Because the natural decay subtracts from the total amount of infectious particles, the natural decay term is subtracted from the other terms in the infectious quanta model. For example, if a given infectious agent has a half-life $t_{1/2}$ of one hour (i.e., $t_{1/2}$=1 hr=3600 s), then the corresponding decay rate is given by:

$$\beta = \frac{\ln(2)}{t_{1/2}} \approx 1.925 \times 10^{-4} s^{-1}$$

This extra term can ensure that infectious particle concentrations do not accumulate indefinitely over extremely long periods of time.

Off-Line Optimization

Figure 5:
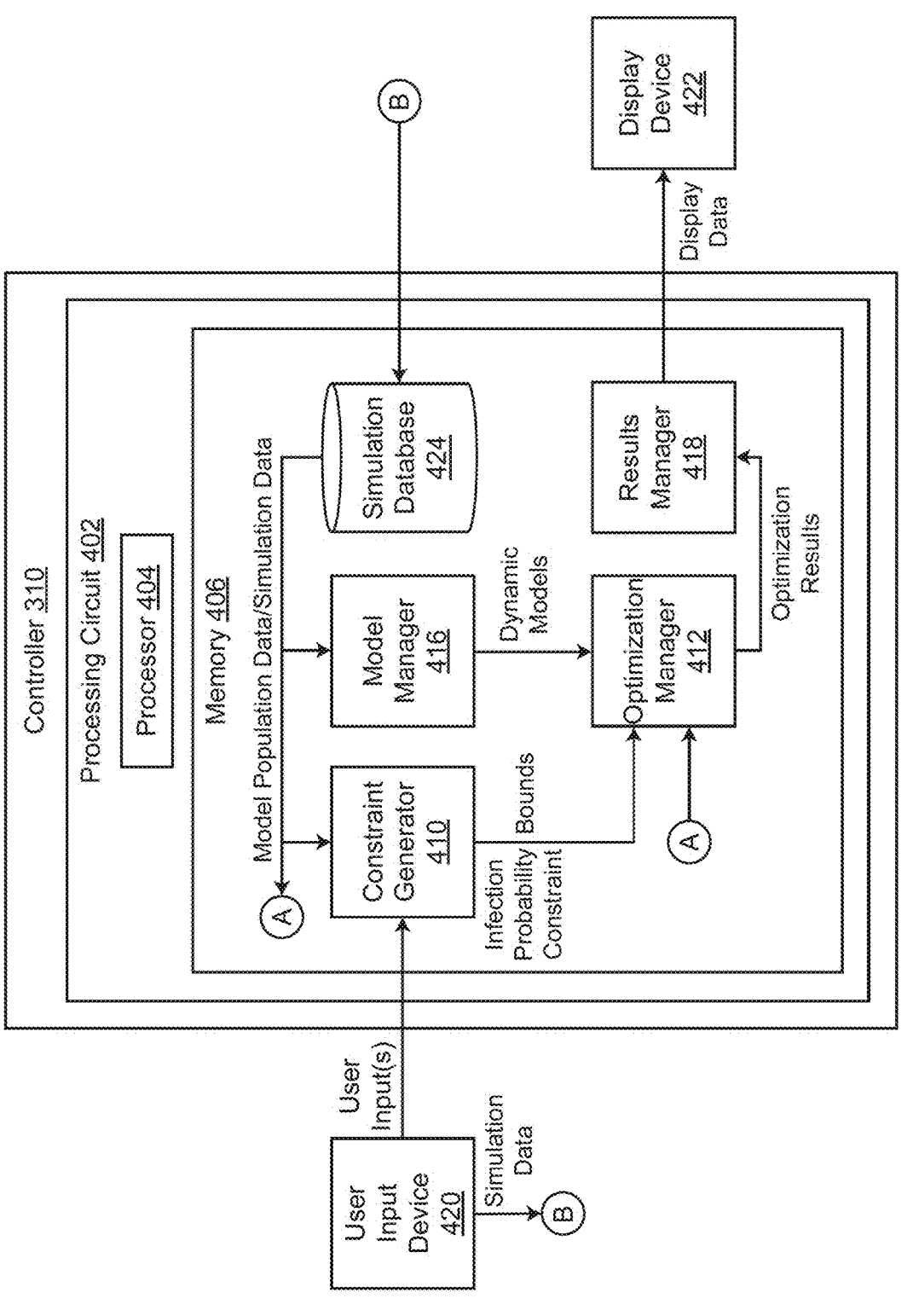
FIG. 5 is a block diagram illustrating the controller of FIG. 3 in greater detail, showing operations performed when the controller is used in an off-line or planning mode for making design suggestions to minimize energy consumption of the HVAC system and provide sufficient disinfection, according to some embodiments.

Referring particularly to FIG. 5, controller 310 can be configured for use as a design or planning tool for determining various design parameters of HVAC system 300 (e.g., for determining a size of filter 308, UV lights 306, etc.). In some embodiments, controller 310 implemented as a design tool, a planning tool, a recommendation tool, etc., (e.g., in an off-line mode) functions similarly to controller 310 implemented as a real-time control device (e.g., in an on-line mode). However, model manager 416, constraint generator 410, and optimization manager 412 may receive required sensor input data (i.e., model population data) from a simulation database 424. Simulation database 424 can store values of the various parameters of the constraints or boundaries, the dynamic models, or typical energy consumption costs or operational parameters for energy-consuming devices of the HVAC system 200. In some embodiments, simulation database 424 also stores predicted or historical values as obtained from sensors of HVAC system 200. For example, simulation database 424 can store typical ambient temperature, humidity, etc., conditions for use in performing the off-line simulation.

When controller 310 is configured for use as the design tool (shown in FIG. 5), controller 310 may receive user inputs from user input device 420. The user inputs may be initial inputs for various constraints (e.g., a maximum value of the probability of infection for the simulation) or various required input parameters. The user can also provide simulation data for simulation database 424 used to populate the models or constraints, etc. Controller 310 can output suggestions of whether to use a particular piece of equipment (e.g., whether or not to use or install UV lights 306), whether to use AHU 304 to draw outside air, etc., or other factors to minimize cost (e.g., to optimize the objective function, minimize energy consumption, minimize energy consumption monetary cost, etc.) and to meet disinfection goals (e.g., to provide a desired level of infection probability). In some embodiments, controller 310 may provide different recommendations or suggestions based on a location of building 10. In some embodiments, the recommendations notify the user regarding what equipment is needed to keep the infection probability of zones 206 within the threshold while not increasing energy cost or carbon footprint.

Compared to the on-line optimization (described in greater detail below), the optimization problem formulated by optimization manager 412 for the off-line implementation includes an additional constraint on the infectious quanta concentration (as described in greater detail above). In some embodiments, the infectious quanta concentration can be controlled or adjusted by (a) changing the airflow into each zone 206 (e.g., adjusting $f_i$), (b) changing the fresh-air intake fraction (e.g., adjusting x), or (c) destroying infectious particles in the AHU 304 via filtration or UV light (e.g., adjusting $\lambda$).

It should be noted that the first and second control or adjustments (e.g., (a) and (b)) may also affect temperature and humidity of the zones 206 of building 10. However, the third control option (c) (e.g., adjusting the infectious quanta concentration through filtration and/or operation of UV lights) is independent of the temperature and humidity of the zones 206 of building 10 (e.g., does not affect the temperature or humidity of zones 206 of building 10). In some embodiments, optimization manager 412 may determine results that rely heavily or completely on maintaining the infectious quanta concentration below its corresponding threshold or bound through operation of filter 308 and/or UV lights 306. However, there may be sufficient flexibility in the temperature and humidity of building zone 206 so that optimization manager 412 can determine adjustments to (a), (b), and (c) simultaneously to achieve lowest or minimal operating costs (e.g., energy consumption). Additionally, since purchasing filters 308 and/or UV lights 306 may incur significant capital costs (e.g., to purchase such devices), controller 310 may perform the optimization as a simulation to determine if purchasing filters 308 and/or UV lights 306 is cost effective.

When controller 310 is configured as the design tool shown in FIG. 5, controller 310 may provide an estimate of a total cost (both capital costs and operating costs) to achieve a desired level of infection control (e.g., to maintain the infection probability below or at a desired amount). The purpose is to run a series of independent simulations, assuming different equipment configurations (e.g., as stored and provided by simulation database 424) and for different infection probability constraints given typical climate and occupancy data (e.g., as stored and provided by simulation database 424). In some embodiments, the different equipment configurations include scenarios when filters 308 and/or UV lights 306 are installed in the HVAC system 200, or when filters 308 and/or UV lights 306 are not installed in the HVAC system 200.

After performing the simulation for different equipment configuration scenarios and/or different infection probability constraints, controller 310 can perform a cost benefit analysis based on global design decisions (e.g., whether or not to install UV lights 306 and/or filters 308). The cost benefit analysis may be performed by results manager 418 and the cost benefit analysis results can be output as display data to a building manager via display device 422. These results may aid the building manager or a building designer in assessing potential options for infection control of building 10 (as shown in FIG. 8).

Referring particularly to FIGS. 5 and 8, graph 800 illustrates a potential output of results manager 418 that can be displayed by display device 422. Graph 800 illustrates relative cost (the Y-axis) with respect to infection probability (the X-axis) for a case when both filtration and UV lights are used for infection control (represented by series 808), a case when filtration is used for infection control without using UV lights (represented by series 802), a case when UV lights are used for infection control without using filtration (represented by series 806), and a case when neither UV lights and filtration are used for infection control (represented by series 804). In some embodiments, each of the cases illustrated by series 802-808 assume that fresh-air intake is used to control infection probability. Data associated with graph 800 can be output by results manager 418 so that graph 800 can be generated and displayed on display device 422.

In some embodiments, the off-line optimization performed by optimization manager 412 is faster or more computationally efficient than the on-line optimization performed by optimization manager 412. In some embodiments, the simulation is performed using conventional rule-based control rather than a model-predictive control scheme used for the on-line optimization. Additionally, the simulation may be performed over shorter time horizons than when the optimization is performed in the on-line mode to facilitate simulation of a wide variety of design conditions.

In some embodiments, optimization manager 412 is configured to use the aggregate dynamic models as generated, populated, and provided by model manager 416 for the off-line optimization (e.g., the design optimization). When optimization manager 412 uses the aggregate dynamic models, this implies that there are three decision variables of the optimization: $\bar{T}$, x, and $\lambda$. The variable $\lambda$ can include two positions at each timestep (e.g., corresponding to the UV lights 306 being on or the UV lights 306 being off). A reasonable grid size of $\bar{T}$ and x may be 100. Accordingly, this leads to 100×100×2=20,000 possible combinations of control decisions at each step, which is computationally manageable. Therefore, optimization manager 412 can select values of the variables $\bar{T}$, x, and $\lambda$ via a one-step restriction of the optimization problem by simply evaluating all possible sets of control inputs and selecting the set of control inputs that achieves a lowest cost.

If additional variables are used, such as an auxiliary heating variable, this may increase the dimensionality of the optimization problem. However, optimization manager 412 can select a coarser grid (e.g., 5 to 10 choices) for the additional variable.

In some embodiments, optimization manager 412 is configured to solve a number of one-step optimization problems (e.g., formulate different optimization problems for different sets of the control variables and solve the optimization problem over a single timestep) in a training period, and then train a function approximator (e.g., a neural network) to recreate a mapping. This can improve an efficiency of the optimization. In some embodiments, optimization manager 412 is configured to apply a direct policy optimization to the dynamic models in order to directly learn a control law using multiple parallel optimization problems.

In some embodiments, when controller 310 functions as the design tool shown in FIG. 5, there are two design variables. The first design variable is whether it is cost effective or desirable to purchase and install UV lights 306, and the second design variable is whether it is cost effective or desirable to purchase and install filters 308 (e.g., advanced filtration devices).

In some embodiments, optimization manager 412 is configured to perform a variety of simulations subject to different simulation variables for each simulation month. These simulation variables can be separated into a design decision category and a random parameter category. The design decision category includes variables whose values are chosen by system designers, according to some embodiments. The random parameters category includes variables whose values are generated by external (e.g., random) processes.

The design decision category can include a first variable of whether to activate UV lights 306. The first variable may have two values (e.g., a first value for when UV lights 306 are activated and a second value for when UV lights 306 are deactivated). The design decision category can include a second decision variable of which of a variety of high-efficiency filters to use, if any. The second variable may have any number of values that the building manager wishes to simulate (e.g., 5) and can be provided via user input device 420. The design decisions category can also include a third variable of what value should be used for the infection probability constraint (as provided by constraint generator 410 and used in the optimization problem by optimization manager 412). In some embodiments, various values of the third variable are also provided by the user input device 420. In some embodiments, various values of the third variable are predetermined or stored in simulation database 424 and provided to optimization manager 412 for use in the simulation. The third variable may have any number of values as desired by the user (e.g., 3 values).

The random parameters category can include an ambient weather and zone occupancy variable and a number of infected individuals that are present in building 10 variable. In some embodiments, the ambient weather and zone occupancy variable can have approximately 10 different values. In some embodiments, the number of infected individuals present can have approximately 5 different values.

In order to determine a lowest cost for a given month, optimization manager 412 can aggregate the variables in the random parameters category (e.g., average) and then perform an optimization to minimize the energy consumption or cost over feasible values of the variables of the design decisions category. In some embodiments, some of the design-decision scenarios are restricted by a choice of global design decisions. For example, for optimization manager 412 to calculate monthly operating costs assuming UV lights 306 are chosen to be installed but not filtration, optimization manager 412 may determine that a lowest cost scenario across all scenarios is with no filtration but with the UV lights 306 enabled or disabled. While this may be unusual (e.g., for the UV lights 306 to be disabled) even though the UV lights 306 are installed, various conditions (e.g., such as weather) may make this the most cost effective solution.

In some embodiments, simulation logic performed by optimization manager 412 may be performed in a Tensorflow (e.g., as operated by a laptop computer, or any other sufficiently computationally powerful processing device). In order to perform 1,500 simulation scenarios for each month, or 18,000 for an entire year, with a timestep of 15 minutes, this implies a total of approximately 52 million timesteps of scenarios for a given simulation year.

In some embodiments, optimization manager 412 requires various simulation data in order to perform the off-line simulation (e.g., to determine the design parameters). In some embodiments, the simulation data is stored in simulation database 424 and provided to any of constraint generator 410, model manager 416, and/or optimization manager 412 as required to perform their respective functions. The simulation data stored in simulation database 424 can include heat-transfer parameters for each zone 206, thermal and moisture loads for each zone 206, coil model parameters of the AHU 304, fan model parameters of the AHU 304, external temperature, humidity, and solar data, filtration efficiency, pressure drop, and cost versus types of the filter 308, disinfection fraction and energy consumption of the UV lights 306, installation costs for the UV lights 306 and the filter 308, typical breathing rate p, a number of infected individuals Ī in building zones 206, and disease quanta generation q values for various diseases. In some embodiments, the heat-transfer parameters for each zone 206 may be obtained by simulation database 424 from previous simulations or from user input device 420. In some embodiments, the thermal and moisture loads for each zone 206 are estimated based on an occupancy of the zones 206 and ASHRAE guidelines. After this simulation data is obtained in simulation database 424, controller 310 may perform the simulation (e.g., the off-line optimization) as described herein.

It should be understood that as used throughout this disclosure, the term "optimization" may signify a temporal optimization (e.g., across a time horizon) or a static optimization (e.g., at a particular moment in time, an instantaneous optimization). In some embodiments, optimization manager 412 is configured to either run multiple optimizations for different equipment selections, or is configured to treat equipment configurations as decision variables and perform a single optimization to determine optimal equipment configurations.

It should also be understood that the term "design" as used throughout this disclosure (e.g., "design data" and/or "design tool") may include equipment recommendations (e.g., recommendations to purchase particular equipment or a particular type of equipment such as a particular filter) and/or operational recommendations for HVAC system 200. In other words, "design data" as used herein may refer to any information, metrics, operational data, guidance, suggestion, etc., for selecting equipment, an operating strategy, or any other options to improve financial metrics or other control objectives (e.g., comfort and/or infection probability).

For example, controller 310 as described in detail herein with reference to FIG. 5 may be configured to provide recommendations of specific models to purchase. In some embodiments, controller 310 is configured to communicate with an equipment performance database to provide product-specific selections. For example, controller 310 can search the database for equipment that has particular specifications as determined or selected by the optimization. In some embodiments, controller 310 may also provide recommended or suggested control algorithms (e.g., model predictive control) as the design data. In some embodiments, controller 310 may provide a recommendation or suggestion of a general type of equipment or a general equipment configuration without specifying a particular model. In some embodiments, controller 310 may also recommend a specific filter or a specific filter rating. For example, optimization manager 412 can perform multiple optimizations with different filter ratings and select the filter ratings associated with an optimal result.

On-Line Optimization

Referring again to FIG. 4, controller 310 can be implemented as an on-line controller that is configured to determine optimal control for the equipment of building 10. Specifically, controller 310 may determine optimal operation for UV lights 306 and AHU 304 to minimize energy consumption after UV lights 306 and/or filter 308 are installed and HVAC system 200 is operational. When controller 310 is configured as an on-line controller, controller 310 may function similarly to controller 310 as configured for off-line optimization and described in greater detail above with reference to FIG. 5. However, controller 310 can determine optimal control decisions for the particular equipment configuration of building 10.

In some embodiments, optimization manager 412 is configured to perform model predictive control similar to the techniques described in U.S. patent application Ser. No. 15/473,496, filed Mar. 29, 2017, the entire disclosure of which is incorporated by reference herein.

While optimization manager 412 can construct and optimize the optimization problem described in greater detail above, and shown below, using MPC techniques, a major difference is that optimization manager 412 performs the optimization with an infectious quanta concentration model as described in greater detail above.

$$\min_{f_t, x_t, \lambda_t} \sum_t E_t$$

(Energy Cost)
s.t . . . (Dynamic Models for $T_t$, $\omega_t$, and $N_t$)
. . . (Infection Probability Constraint)

$$T_t^{min} \le T_t \le T_t^{max}$$

(Temperature Bounds)

$$\omega_t^{min} \le \omega_t \le \omega_t^{max}$$

(Humidity Bounds)

$$x_t f_t \ge F_t^{min}$$

Fresh-Air Ventilation Bound)

$$f_t^{min} \le f_t \le f_t^{max}$$

(VAV Flow Bounds)

$$0 \le x_t \le 1$$

(Outdoor-Air Damper Bounds)

Therefore, the resulting optimization problem has additional constraints on this new variable (the infectious quanta concentration) but also new flexibility by determined decisions for activating UV lights 306. In some embodiments, the optimization performed by optimization manager 412 can balance, in real time, a tradeoff between takin gin additional outdoor air (which generally incurs a cooling energy penalty) and activating the UV lights 306 (which requires electricity consumption). Additionally, the addition of infectious agent control can also provide additional room optimization of HVAC system 200 during a heating season (e.g., during winter). Without considering infectious quanta concentrations, solutions generally lead to a minimum outdoor airflow below a certain break-even temperature, below which heating is required throughout building 10. However, since the optimization problem formulated by optimization manager 412 can determine to increase outdoor air intake, this can provide an additional benefit of disinfection.

For purposes of real-time or on-line optimization, the HVAC system 200 can be modeled on a zone-by-zone basis due to zones 206 each having separate temperature controllers and VAV boxes. In some embodiments, zone-by-zone temperature measurements are obtained by controller 310 from zone sensors 312 (e.g., a collection of temperature, humidity, CO2, air quality, etc., sensors that are positioned at each of the multiple zones 206). In some embodiments, optimization manager 412 is configured to use zone-level temperature models but aggregate humidity and infectious quanta models for on-line optimization. Advantageously, this can reduce a necessary modeling effort and a number of decision variables in the optimization problem. In some embodiments, if the AHU 304 serves an excessive number of zones 206, the zone-level thermal modeling may be too computationally challenging so optimization manager 412 can use aggregate temperature models.

After optimization manager 412 has selected whether to use individual or aggregate models (or some combination thereof), optimization manager 412 can implement a constraint in the form:

$$\frac{dx}{dt} = f(x(t), u(t), p(t)) \text{ for all } t \in [0, T]$$

given a horizon t, where u(t) is a decision, control, or adjustable variable, and p(t) are time-varying parameters (the values of which are forecasted ahead of time). In some embodiments, optimization manager 412 is configured to implement such a constraint by discretizing the u(t) and p(t) signals into piecewise-constant values $u_n$ and $p_n$ where the discrete index n represents the time interval $t \in [n\Delta, (n+1)\Delta]$ for a fixed sample time $\Delta$. Optimization manager 412 may then transform the constraint to:

$$\frac{dx}{dt} = f(x(t), u_j, p_j) \text{ for all } t \in [n\Delta, (n+1)\Delta] \text{ and } n \in \{0, \ldots, N-1\}$$

where N=T/Δ the total number of timesteps. In some embodiments, optimization manager 412 is configured to evaluate this constraint using advanced quadrature techniques. For example, optimization manager 412 may transform the constraint to:

$$x_{n+1} = F(x_n, u_n, p_n)$$

where x(t) is discretized to $x_n$ and F($\bullet$) represents a numerical quadrature routine. In some embodiments, if the models provided by model manager 416 are sufficiently simple, optimization manager 412 can derive an analytical expression for F($\bullet$) to perform this calculation directly.

In some embodiments, optimization manager 412 uses an approximate midpoint method to derive the analytical expression:

$$x_{n+1} = x_k + f\left(\frac{x_{n+1} + x_n}{2}, u_n, p_n\right)\Delta$$

where the ordinary differential equation f($\bullet$) is evaluated at a midpoint of the time interval.

In some embodiments, optimization manager 412 is configured to repeatedly solve the optimization problem at regular intervals (e.g., every hour) to revise an optimized sequence of inputs for control signal generator 408. However, since the optimization is nonlinear and nonconvex, it may be advantageous to decrease a frequency at which the optimization problem is solved to provide additional time to retry failed solutions.

In some embodiments, optimization manager 412 uses a daily advisory capacity. For example, optimization manager 412 may construct and solve the optimization problem once per day (e.g., in the morning) to determine optimal damper positions (e.g., of AHU 304), UV utilizations (e.g., operation of UV lights 306), and zone-level airflows. Using the results of this optimization, optimization manager 412 may be configured to pre-schedule time-varying upper and lower bounds on the various variables of the optimized solution, but with a range above and below so that optimization manager 412 can have sufficient flexibility to reject local disturbances. In some embodiments, regulatory control systems of HVAC system 200 are maintained but may saturate at new tighter bounds obtained from the optimization problem. However, optimization manager 412 may be configured to re-optimize during a middle of the day if ambient sensor data from ambient sensors 314 (e.g., ambient temperature, outdoor temperature, outdoor humidity, etc.) and/or weather forecasts and/or occupancy forecasts indicate that the optimization should be re-performed (e.g., if the weather forecasts are incorrect or change).

In some embodiments, optimization manager 412 is configured to reduce an amount of optimization by training a neural network based on results of multiple offline optimal solutions (e.g., determined by controller 310 when performing off-line optimizations). In some embodiments, the neural network is trained to learn a mapping between initial states and disturbance forecasts to optimal control decisions. The neural network can be used in the online implementation of controller 310 as a substitute for solving the optimization problem. One advantage of using a neural network is that the neural network evaluation is faster than performing an optimization problem, and the neural network is unlikely to suggest poor-quality local optima (provided such solutions are excluded from the training data). The neural network may, however, return nonsensical values for disturbance sequences. However, this downside may be mitigated by configuring controller 310 to use a hybrid trust-region strategy in which optimization manager 412 solves the optimization problem via direct optimization at a beginning of the day, and then for the remainder of the day, controller 310 uses neural-network suggestions if they are within a predefined trust region of the optimal solution. If a neural-network suggestion is outside of the predefined trust region, optimization manager 412 may use a previous optimal solution that is within the predefined trust region.

In some embodiments, the optimization problem is formulated by optimization manager 412 assuming the zone-level VAV flows $f_k$ are the decision variables. In some systems, however, a main interface between controller 310 and equipment of HVAC system 200 is temperature setpoints that are sent to zone-level thermostats. In some embodiments, optimization manager 412 and control signal generator 408 are configured to shift a predicted optimal temperature sequence backward by one time interval and then pass these values (e.g., results of the optimization) as the temperature setpoint. For example, if the forecasts over-estimate head loads in a particular zone 206, then a VAV damper for that zone will deliver less airflow to the zone 206, since less cooling is required to maintain a desired temperature.

When optimization manager 412 uses the constraint on infectious quanta concentration, controller 310 can now use the zone-level airflow to control two variables, while the local controllers are only aware of one. Therefore, in a hypothetical scenario, the reduced airflow may result in a violation of the constraint on infection probability. In some embodiments, optimization manager 412 and/or control signal generator 408 are configured to maintain a higher flow rate at the VAV even though the resulting temperature may be lower than predicted. To address this situation, optimization manager 412 may use the minimum and maximum bounds on the zone-level VAV dampers, specifically setting them to a narrower range so that the VAV dampers are forced to deliver (at least approximately) an optimized level of air circulation. In some embodiments, to meet the infectious quanta concentration, the relevant bound is the lower flow limit (as any higher flow will still satisfy the constraint, albeit at higher energy cost). In some embodiments, a suitable strategy is to set the VAV minimum position at the level that delivers 75% to 90% of the optimized flow. In some embodiments, a VAV controller is free to dip slightly below the optimized level when optimization manager 412 over-estimates heat loads, while also having the full flexibility to increase flow as necessary when optimization manager 412 under-estimates heat loads. In the former case, optimization manager 412 may slightly violate the infectious quanta constraint (which could potentially be mitigated via rule-based logic to activate UV lights 306 if flow drops below planned levels), while in the latter case, the optimal solution still satisfies the constraint on infectious quanta. Thus, optimization manager 412 can achieve both control goals without significant disruption to the low-level regulatory controls already in place.

On-Line Optimization Process

Referring particularly to FIG. 6, a process 600 for performing an on-line optimization to minimize energy consumption and satisfy an infection probability constraint in a building is shown, according to some embodiments. Process 600 can be performed by controller 310 when controller 310 is configured to perform an on-line optimization. In some embodiments, process 600 is performed in real time for HVAC system 200 to determine optimal control of AHU 304 and/or UV lights 306. Process 600 can be performed for an HVAC system that includes UV lights 306 configured to provide disinfection for supply air that is provided to one or more zones 206 of a building 10, filter 308 that filters an air output of an AHU, and/or an AHU (e.g., AHU 304). Process 600 can also be performed for HVAC systems that do not include filter 308 and/or UV lights 306.

Process 600 includes determining a temperature model for each of multiple zones to predict a temperature of a corresponding zone based on one or more conditions or parameters of the corresponding zone (step 602), according to some embodiments. The temperature model can be generated or determined by model manager 416 for use in an optimization problem. In some embodiments, the temperature model is:

$$\rho c V_k \left( \frac{dT_k}{dt} \right) = \rho c f_k (T_0 - T_k) + Q_k(T_k)$$

where $\rho$ is a mass density of air, c is a heat capacity of air, $V_k$ is a volume of the kth zone, $f_k$ is a volumetric flow of air into the kth zone, To is the temperature of air output by the AHU, $T_k$ is the temperature of the kth zone, and Qk is the heat load on the kth zone. Step 602 can be performed by model manager 416 as described in greater detail above with reference to FIGS. 4-5.

Process 600 includes determining a humidity model for each of the multiple zones to predict a humidity of the corresponding zone based on one or more conditions or parameters of the corresponding zone (step 604), according to some embodiments. Step 604 can be similar to step 602 but for the humidity model instead of the temperature model. In some embodiments, the humidity model is:

$$\rho V_k\left(\frac{d\omega_k}{dt}\right) = \rho f(\omega_0 - T_0) + w_k$$

for a kth zone 206. In some embodiments, step 604 is performed by model manager 416 as described in greater detail above with reference to FIGS. 4-5.

Process 600 incudes determining an infectious quanta concentration model for each of the multiple zones to predict an infectious quanta of the corresponding zone based on one or more conditions or parameters of the corresponding zone (step 606), according to some embodiments. In some embodiments, the infectious quanta concentration model is similar to the humidity model of step 604 or the temperature model of step 602. The infectious quanta concentration model can be:

$$V_k\left(\frac{dN_k}{dt}\right) = f_k(N_0 - N_k) + I_k q$$

according to some embodiments. In some embodiments, step 606 is performed by model manager 416.

Process 600 includes determining an aggregated temperature model, an aggregated humidity model, an aggregated infectious quanta model, an aggregated thermal model, and an aggregated moisture model (step 608), according to some embodiments. In some embodiments, step 608 is optional. Step 608 can include generating or determining each of the aggregated models by determining a volume-average across zones 206. The aggregate infectious quanta model is:

$$\bar{V}\frac{d\bar{N}}{dt} = \bar{I}q - (\lambda + x - \lambda x)\sum_k f_k N_k \approx \bar{I}q - (\lambda + x - \lambda x)\overline{fN}$$

according to some embodiments. The aggregated thermal model is:

$$\rho c\bar{V}\frac{d\bar{T}}{dt} =$$
$$\sum_k Q_k(T_k) + \rho c\sum_k f_k(x(T_a - T_k) - \Delta T_c) \approx \bar{Q}(\bar{T}) + \rho c\bar{f}(x(T_a - \bar{T}) - \Delta T_c)$$

according to some embodiments. The aggregated moisture model is:

$$\rho\bar{V}\frac{d\bar{\omega}}{dt} = \bar{w} + \rho\sum_k f_k(x(\omega_a - \omega_k) - \Delta\omega_c)$$
$$\approx \bar{w} + \rho\bar{f}(x(\omega_a - \bar{\omega} - \Delta\omega_c)$$

according to some embodiments. In some embodiments, the aggregated thermal and moisture models are aggregate thermal models. Step 608 can be optional. Step 608 can be performed by model manager 416.

Process 600 includes populating any of the temperature model, the humidity model, the infectious quanta model, or the aggregated models using sensor data or stored values (step 610), according to some embodiments. In some embodiments, step 610 is performed by model manager 416. In some embodiments, step 610 is optional. Step 610 can be performed based on sensor data obtained from zone sensors 312.

Process 600 includes determining an objective function including a cost of operating an HVAC system that serves the zones (step 612), according to some embodiments. In some embodiments, step 612 is performed by optimization manager 412 using the dynamic models and/or the aggregated models provided by model manager 416. The objective function may be a summation of the energy consumption, energy cost, or other variable of interest over a given time period. The instantaneous energy consumption at a discrete time step is given by:

$$E = \eta_{coil}\rho\bar{f}(c\Delta T_c + L\Delta\omega_c) + \eta_{fan}\bar{f}\Delta P + \eta_{UV}\lambda_{UV}$$

which can be summed or integrated over all time steps of the given time period as follows:

$$\int_0^T E(t)dt \approx \Delta\sum_t E_t$$

where $\Delta$ is the duration of a discrete time step, according to some embodiments.

Process 600 includes determining one or more constraints for the objective function including an infection probability constraint (step 614), according to some embodiments. In some embodiments, step 614 is performed by constraint generator 410. The one or more constraints can include the infection probability constraint, temperature bounds or constraints, humidity bounds or constraints, fresh-air ventilation bounds or constraints, VAV flow bounds or constraints, and/or outdoor-air damper bounds or constraints. The infection probability constraint is:

$$M\eta + \sum_t \mu_t \le -\frac{1}{p\Delta}\log(1 - P^{max})$$
$$\mu_t + \eta \ge N_t \ \forall \ t$$

or:

$$N_t \le N_t^{max} = -\frac{1}{Mp\Delta}\log(1 - P^{max})$$

according to some embodiments.

Process 600 includes performing an optimization to determine control decisions for HVAC equipment of the HVAC system, and ultraviolet lights of the HVAC system such that the one or more constraints are met and the cost is minimized (step 616), according to some embodiments. Step 616 can be performed by optimization manager 412 by minimizing the objective function subject to the one or more constraints (e.g., the temperature, humidity, etc., bounds and the infection probability constraint). Step 616 can also include constructing the optimization problem and constructing the optimization problem based on the objective function, the dynamic models (or the aggregated dynamic models), and the one or more constraints. The control decisions can include a fresh-air fraction x for an AHU of the HVAC system (e.g., AHU 304), whether to turn on or off the UV lights, etc.

Off-Line Optimization Process

Referring particularly to FIG. 7, a process for performing an off-line optimization to determine equipment configurations that minimize energy consumption or cost and satisfy an infection probability constraint is shown, according to some embodiments. Process 700 may share similarities with process 600 but can be performed in an off-line mode (e.g., without determining control decisions or based on real-time sensor data) to determine or assess various design decisions and provide design information to a building manager. Process 700 can be performed by controller 310 when configured for the off-line mode (as shown in FIG. 5).

Process 700 includes steps 702-708 that can be the same as steps 602-608 of process 600. However, while step 608 may be optional in process 600 so that the optimization can be performed using a combination of individual dynamic models and aggregate dynamic models, step 708 may be non-optional in process 700. In some embodiments, using the aggregate dynamic models reduces a computational complexity of the optimization for process 700. Process 700 can be performed for a wide variety of design parameters (e.g., different equipment configurations) whereas process 600 can be performed for a single equipment configuration (e.g., the equipment configuration that process 600 is used to optimize). Therefore, it can be advantageous to use aggregate models in process 700 to reduce a complexity of the optimization problem.

Process 700 includes populating the aggregated models using simulation data (step 710). In some embodiments, step 710 is performed by model manager 416 using outputs from simulation database 424 (e.g., using values of various parameters of the aggregate models that are stored in simulation database 424). In some embodiments, step 710 is performed using known, assumed, or predetermined values to populate the aggregated models.

Process 700 includes determining an objective function including a cost of operating an HVAC system that serves the zones (step 712), and determining one or more constraints for the objective function including an infection probability constraint (step 714), according to some embodiments. In some embodiments, step 712 and step 714 are similar to or the same as steps 612 and 614 of process 600.

Process 700 includes performing a sequence of one-step optimizations for various equipment configurations to estimate an operating cost associated with that equipment configuration (step 716), according to some embodiments. In some embodiments, step 716 is performed by optimization manager 412. Optimization manager 412 can construct different optimization problems for different equipment configurations using the aggregate temperature model, the aggregated humidity model, the aggregated infectious quanta model, the one or more constraints, and the objective function. In some embodiments, optimization manager 412 is configured to solve the optimization problems for the different equipment configurations over a single time step. The results of the optimizations problems can be output to results manager 418 for displaying to a user.

Process 700 includes outputting design suggestions or optimizations results to a user (step 718), according to some embodiments. In some embodiments, step 718 includes outputting costs associated with different equipment configurations (e.g., equipment configurations that include UV lights for disinfection and/or filters for disinfection) to a user (e.g., via a display device) so that the user (e.g., a building manager) can determine if they wish to purchase additional disinfection equipment (e.g., UV lights and/or filters). For example, step 718 can include operating a display to provide graph 800 (or a similar graph) to a user.

Although process 700 is described primarily as an "off-line" process, it should be understood that process 700 is not limited to off-line implementations only. In some embodiments, process 700 can be used when controller 310 operates in an on-line mode (as described with reference to FIGS. 4 and 6). In some embodiments, the results generated by performing process 700 and/or the results generated when operating controller 310 in the off-line mode (e.g., recommended equipment configurations, recommended operating parameters, etc.) can be used to perform on-line control of HVAC equipment or perform other automated actions. For example, controller 310 can use the recommended equipment configurations to automatically enable, disable, or alter the operation of HVAC equipment in accordance with the recommended equipment configurations (e.g., enabling the set of HVAC equipment associated with the lowest cost equipment configuration identified by the simulations/optimizations). Similarly, controller 310 can use the recommended operating parameters to generate and provide control signals to the HVAC equipment (e.g., operating the HVAC equipment in accordance with the recommended operating parameters).

In general, the controller 310 can use the optimization/simulation results generated when operating controller 310 in the off-line mode to generate design data including one or more recommended design parameters (e.g., whether to include or use UV lights 306 for disinfection, whether to include or use filter 308 for disinfection, whether to use fresh/outdoor air for disinfection, a recommended type or rating of UV lights 306 or filter 308, etc.) as well as operational data including one or more recommended operational parameters (e.g., the fraction of fresh/outdoor air that should exist in the supply air provided to the building zone, operating decisions for UV lights 306, an amount of airflow to send to each building zone, etc.). The design data may include a recommended equipment configuration that specifies which HVAC equipment to use in the HVAC system to optimize the energy consumption, energy cost, carbon footprint, or other variable of interest while ensuring that a desired level of disinfection is provided.

Controller 310 can perform or initiate one or more automated actions using the design data and/or the operational data. In some embodiments, the automated actions include automated control actions such as generating and providing control signals to UV lights 306, AHU 304, one or more VAV units, or other types of airside HVAC equipment that operate to provide airflow to one or more building zones. In some embodiments, the automated action include initiating a process to purchase or install the recommended set of HVAC equipment defined by the design data (e.g., providing information about the recommended set of HVAC equipment to a user, automatically scheduling equipment upgrades, etc.). In some embodiments, the automated actions include providing the design data and/or the operational data to a user interface device (e.g., display device 422) and/or obtaining user input provided via the user interface device. The user input may indicate a desired level of disinfection and/or a request to automatically update the results of the optimizations/simulations based on user-selected values that define the desired infection probability or level of disinfection. Controller 310 can be configured to provide any of a variety of user interfaces (examples of which are discussed below) to allow a user to interact with the results of the optimizations/simulations and adjust the operation or design of the HVAC system based on the results.

User Interfaces

Referring now to FIGS. 5 and 9, in some embodiments, user input device 420 is configured to provide a user interface 900 to a user. An example of a user interface 900 that can be generated and presented via user input device 420 is shown in FIG. 9. User interface 900 may allow a user to provide one or more user inputs that define which equipment are available in the building or should be considered for design purposes (e.g., filtration, UV, etc.) as well as the desired infection probability (e.g., low, medium, high, percentages, etc.). The inputs provided via user interface 900 can be used by controller 310 to set up the optimization problem or problems to be solved by optimization manager 412. For example, constraint generator 410 can use the inputs received via user interface 900 to generate the various bounds, boundaries, constraints, infection probability constraint, etc., that are used by optimization manager 412 to perform the optimization. After completing all of the simulation scenarios, the results can be presented to the user via the "Results" portion of user interface 900 that allows the user to explore various tradeoffs.

As an example, the "Building Options" portion of user interface 900 allows the user to specify desired building and climate parameters such as the square footage of the building, the city in which the building is located, etc. The user may also specify whether UV disinfection and/or advanced filtration should be considered in the simulation scenarios (e.g., by selecting or deselecting the UV and filtration options). The "Disinfection Options" portion of user interface 900 allows the user to specify the desired level of disinfection or infection probability. For example, the user can move the sliders within the Disinfection Options portion of user interface 900 to define the desired level of disinfection for each month (e.g., low, high, an intermediate level, etc.). Alternatively, user interface 900 may allow the user to define the desired level of disinfection by inputting infection probability percentages, via a drop-down menu, by selecting or deselecting checkboxes, or any other user interface element.

After specifying the desired parameters and clicking the "Run" button, optimization manager 412 may perform one or more simulations (e.g., by solving one or more optimization problems) using the specified parameters. Once the simulations have completed, results may be displayed in the "Results" portion of user interface 900. The results may indicate the energy cost, energy consumption, carbon footprint, or any other metric which optimization manager 412 seeks to optimize for each of the design scenarios selected by the user (e.g., UV+Filtration, UV Only, Filtration Only, Neither). The results may also indicate the daily infection probability for each of the design scenarios (e.g., mean infection probability, minimum infection probability, maximum infection probability). In some embodiments, an initial simulation or simulations are run using default settings for the disinfection options. In some embodiments, the results include equipment recommendations (e.g., use UV+Filtration, use UV Only, use Filtration Only, use Neither). The results of each simulation can be sorted to present the most optimal results first and the least optimal results last. For example, user interface 900 is shown presenting the simulation result with the least energy consumption first and the most energy consumption last. In other embodiments, the results can be sorted by other criteria such as infection probability or any other factor.

The user can adjust desired disinfection options on a monthly basis (e.g., by adjusting the sliders within the Disinfection Options portion of user interface 900), at which point the results may be re-calculated by averaging over the appropriate subset of simulation instances, which can be performed in real time because the simulations need not repeated. Advantageously, this allows the user to adjust the disinfection options and easily see the impact on energy cost, energy consumption, carbon footprint, etc., as well as the impact on infection probability for each of the design scenarios. Additional display options beyond what is shown in FIG. 9 may be present in various embodiments, for example to selectively disable UV and/or filtration in certain months or to consider worst-case instances for each month rather than mean values. In addition, various other graphical displays could be added to provide more detailed results. User interface 900 may initially present optimization results and/or equipment recommendations based on default settings, but then the user is free to refine those settings and immediately see updates to cost estimates and suggested equipment.

Although a specific embodiment of user interface 900 is shown in FIG. 9, it should be understood that this example is merely one possible user interface that can be used in combination with the systems and methods described herein. In general, controller 310 can operate user input device 420 to provide a user interface that includes various sliders, input fields, etc., to receive a variety of user inputs from the user via user input device 420. In some embodiments, user input device 420 is configured to receive a desired level of disinfection, a desired level of infection probability, etc., from the user and provide the desired level of disinfection, or desired level of infection probability to constraint generator 410 as the user input(s). In some embodiments, the user interface includes a knob or a slider that allows the user to adjust between a level of energy savings and a level of infection control. For example, the user may adjust the knob or slider on the user input device 420 to adjust the infection probability constraint (e.g., to adjust thresholds or boundaries associated with the infection probability constraint).

In some embodiments, an infection spread probability is treated by constraint generator 410 as a constraint, or as a value that is used by constraint generator 410 to determine the infection probability constraint. If a user desires to provide a higher level of disinfection (e.g., a lower level of infection spread probability) and therefore an increased energy consumption or energy consumption cost, the user may adjust the knob or slider on the user interface of user input device 420 to indicate a desired trade-off between energy consumption and infection probability. Likewise, if the user desired to provide a lower level of disinfection (e.g., a higher level of infection spread probability) and therefore a lower energy consumption or energy consumption cost, the user may adjust the knob or slider on the user interface of the user input device 420 to indicate such a desired tradeoff between energy consumption or energy consumption cost and disinfection control.

In some embodiments, user input device 420 is configured to provide analytics, data, display data, building data, operational data, diagnostics data, energy consumption data, simulation results, estimated energy consumption, or estimated energy consumption cost to the user via the user interface of user input device 420. For example, results manager 418 may operate the user input device 420 and/or the display device 422 to provide an estimated energy consumption or energy consumption cost to the user (e.g., results of the optimization of optimization manager 412 when operating in either the on-line or off-line mode/ configuration). In some embodiments, user input device 420 and display device 422 are a same device (e.g., a touch-screen display device, etc.) that are configured to provide the user interface, while in other embodiments, user input device 420 and display device 422 are separate devices that are configured to each provide their own respective user interfaces.

For example, controller 310 can perform the off-line or planning or design tool functionality as described in greater detail above in real-time (e.g., as the user adjusts the knob or slider) to determine an estimated energy consumption or energy consumption cost given a particular position of the knob or slider (e.g., given a particular desired level of infection or disinfection control as indicated by the position of the knob or slider). In some embodiments, controller 310 is configured to operate the user input device 420 and/or the display device 422 to provide or display the estimated energy consumption or estimated energy consumption cost as the user adjusts the knob or slider. In this way, the user can be informed regarding an estimation of costs or energy consumption associated with a specific level of disinfection control (e.g., with a particular infection probability constraint). Advantageously, providing the estimation of costs or energy consumption associated with the specific level of disinfection control to the user in real-time or near real-time facilitates the user selecting a level of disinfection control that provides sufficient or desired disinfection control in addition to desired energy consumption or energy consumption costs.

Pareto Optimization

Figure 10:
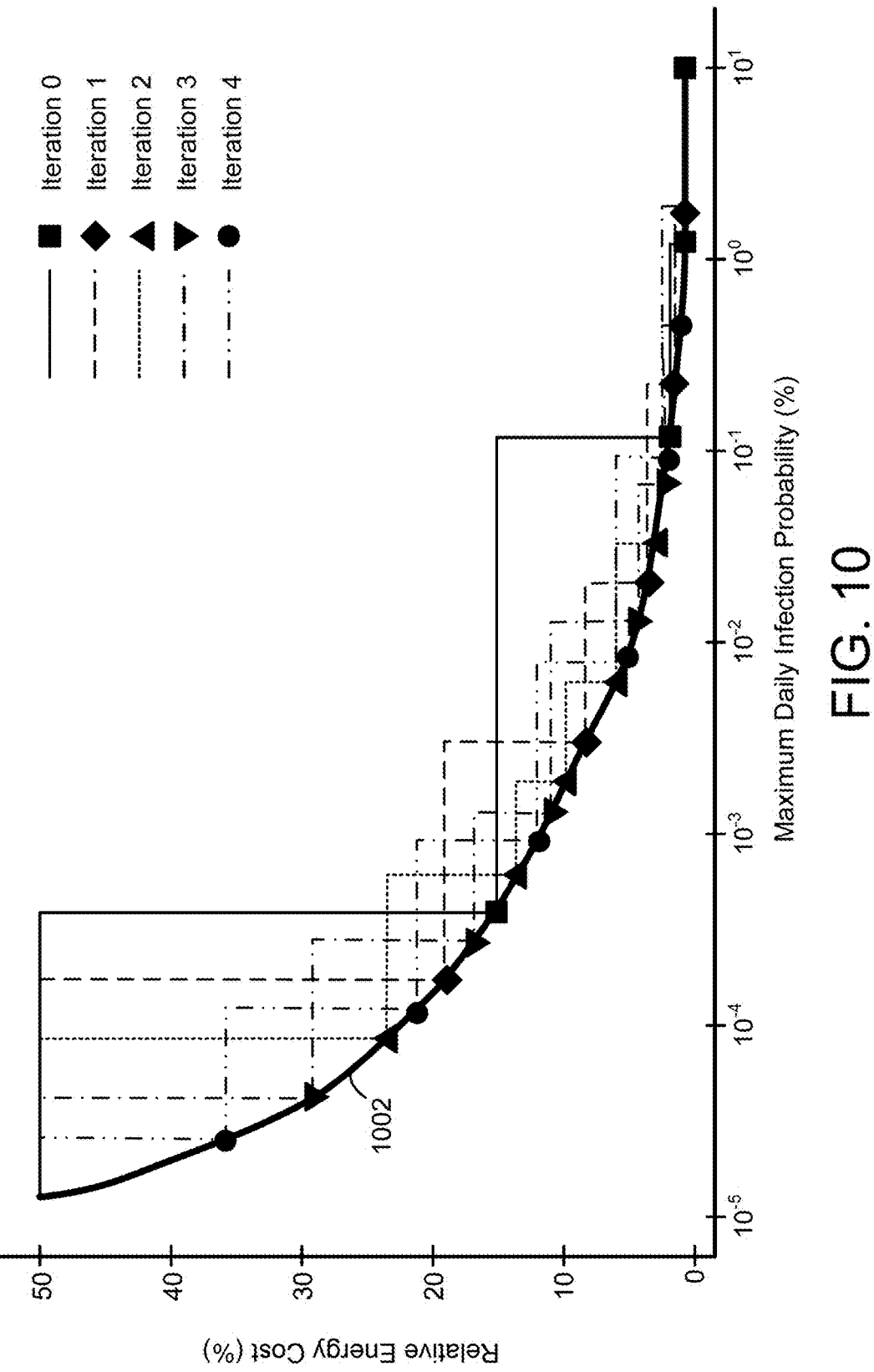
FIG. 10 is a graph illustrating a technique which can be used by the controller of FIG. 3 to estimate a Pareto front of a tradeoff curve for relative energy cost vs. infection probability, according to some embodiments.

Referring now to FIG. 10, a graph 1000 illustrating a Pareto search technique which can be used by controller 310 is shown, according to an exemplary embodiment. In some cases, users may want a more detailed tradeoff analysis than merely comparing a set of optimization results for a set of selected infection probabilities. For such cases, controller 310 may use a more detailed Pareto search that iteratively determines points on a Pareto front 1002 for an energy cost vs. infection probability tradeoff curve. By running additional simulations, this tradeoff curve can be plotted as accurately as possible so that users can fully evaluate the entire continuum of infection probabilities, (e.g., to look for natural breakpoints where additional disinfection probability begins to get more expensive).

To determine the points on the Pareto front 1002, controller 310 may start with a small number of infection probabilities already simulated for a given month and plot them against monthly energy cost. Then, additional candidate infection probabilities can be selected (e.g., as the points furthest from already completed simulations). After simulating instances with the new infection probabilities, these points are added to the plot, and the process repeats to the desired accuracy. Many criteria for selecting new points are possible, but one possible strategy is to choose the midpoint of successive points with the largest area (i.e., of the rectangle whose opposite corners are given by the two existing points) between them. This strategy prioritizes regions where the curve is changing rapidly and leads to efficient convergence.

As an example, consider the case in graph 1000. The goal is to obtain an approximation of the true Pareto front 1002, which is illustrated in FIG. 10 for ease of explanation, but may not be truly known. The instances of the optimization run for the small number of infection probabilities result in the points marked with squares in graph 1000 for Iteration 0. This gives a very coarse approximation of the true front.

Controller 310 may then select new points in each iteration, run those simulations, and add those points to graph 1000. For example, the points marked with diamond shapes in graph 1000 show the points selected for Iteration 1 the points marked with triangles in graph 1000 show the points selected for Iteration 2, the points marked with inverted triangles in graph 1000 show the points selected for Iteration 3, and the points marked with circles in graph 1000 show the points selected for Iteration 4. By the end of Iteration 4, the empirical Pareto front is a good approximation of the true front 1002, and of course additional iterations can be performed to further improve accuracy. The empirical Pareto front generated using this technique can be used by controller 300 to solve a Pareto optimization problem to determine an optimal tradeoff between the costs and benefits of selecting different infection probability values in the infection probability constraint.

In some embodiments, determining the infection probability constraint (e.g., to provide an optimal level of disinfection control, or an optimal level of infection probability spread) and the resulting energy consumption or energy consumption costs required for HVAC system 200 to operate to achieve the infection probability constraint is a Pareto optimization problem. For example, at a certain point, additional disinfection control may require undesirably high energy consumption or energy consumption costs. In some embodiments, controller 310 may solve a Pareto optimization problem given various inputs for the system to determine one or more inflection points along a curve between cost (e.g., energy consumption or energy consumption cost) and a benefit (e.g., disinfection control, infection probability, disinfection, etc.) or to determine an optimal tradeoff between the cost and the benefit.

In some embodiments, controller 310 is configured to operate display device 422 and/or user input device 420 to provide an infection probability constraint associated with the optimal tradeoff between the cost and the benefit. In some embodiments, controller 310 can operate according to various modes that can be selected by the user via the user interface of user input device 420. For example, the user may opt for a first mode where controller 310 solves the Pareto optimization problem to determine the infection probability constraint associated with the optimal tradeoff point between the cost (e.g., the energy consumption or energy consumption cost) and the benefit (e.g., the disinfection control, a provided level of disinfection, an infection probability, etc.). In the first mode, the controller 310 can automatically determine the infection probability constraint based on the results of the Pareto optimization problem. In some embodiments, controller 310 still operates display device 422 to provide estimated, actual, or current energy consumption or energy consumption costs and infection probability constraints.

In a second mode, controller 310 can provide the user the ability to manually adjust the tradeoff between the cost and the benefit (e.g., by adjusting the slider or knob as described in greater detail above). In some embodiments, the user may select the desired tradeoff between infection control and energy consumption or energy consumption costs based on the provided estimations of energy consumption or energy consumption costs.

In a third mode, controller 310 can provide the user additional manual abilities to adjust the infection probability constraint directly. In this way, the user may specifically select various boundaries (e.g., linear boundaries if the infection probability constraint is implemented as a linear constraint as described in greater detail above) for the infection probability constraint. In some embodiments, the user may select between the various modes (e.g., the first mode, the second mode, and/or the third mode).

It should be understood that while the Pareto optimization as described herein is described with reference to only two variables (e.g., energy consumption or energy consumption cost and disinfection control), the Pareto optimization may also account for various comfort parameters or variables (e.g., temperature and/or humidity of zones 206, either individually or aggregated). In some embodiments, controller 310 may also operate display device 422 to provide various comfort parameters that result from a particular position of the knob or slider that is provided on the user interface of user input device 420. In some embodiments, additional knobs, sliders, input fields, etc., are also provided on the user interface of user input device 420 to receive various inputs or adjustments for desired comfort parameters (e.g., temperature and/or humidity). In some embodiments, controller 310 (e.g., results manager 418) is configured to use the dynamic models for temperature or humidity as described above to determine estimations of the various comfort parameters as the user adjusts the knobs or sliders (e.g., the knobs or sliders associated with disinfection control and/or energy consumption or energy cost consumption). Similarly, controller 310 can solve the Pareto optimization problem as a multi-variable optimization problem to determine an inflection point or a Pareto efficiency on a surface (e.g., a 3d graph or a multi-variable optimization) which provides an optimal tradeoff between cost (e.g., the energy consumption, the energy consumption cost, etc.), comfort (e.g., temperature and/or humidity), and disinfection control (e.g., the infection probability constraint).

Pareto Optimization Controller

Figure 11:
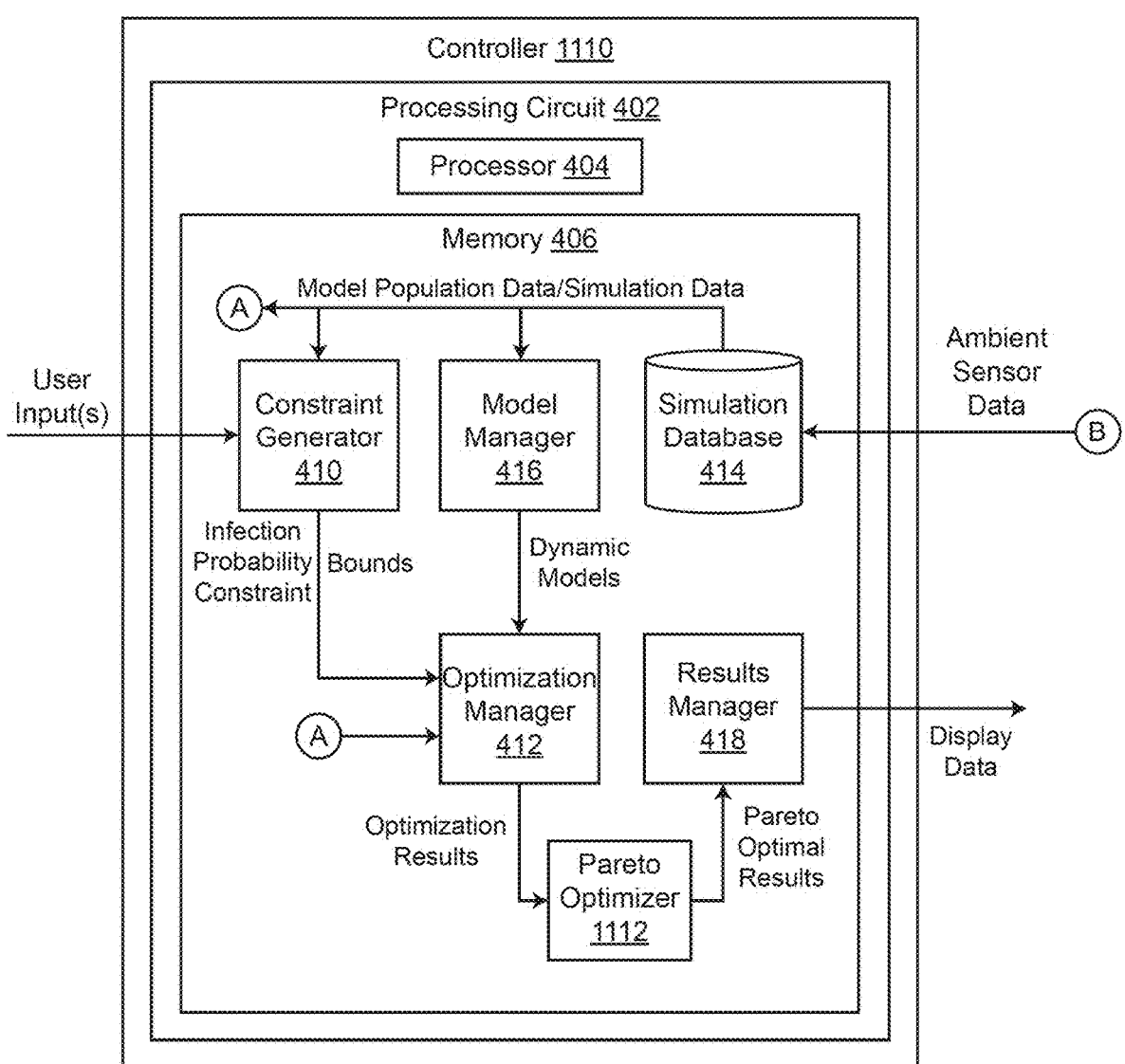
FIG. 11 is a block diagram illustrating the controller of FIG. 3 including a Pareto optimizer, according to some embodiments.

Referring particularly to FIG. 11, a controller 1110 is shown, according to some embodiments. The controller 1110 can be similar to the controller 310 and can be implemented in the HVAC system 300 as described in greater detail above. In some embodiments, the controller 1110 includes the constraint generator 410, the model manager 416, the simulation database 414, the optimization manager 412, and the results manager 418, similar to the controller 310. The controller 1110 additionally includes a Pareto optimizer 1112 that is configured to use optimization results from the optimization manager 412 and perform a Pareto optimization to determine feasible and infeasible operating points, and to determine, from the feasible operating point, which is the Pareto optimal point. In some embodiments, the optimization results provided to the Pareto optimizer 1112 are or include values of the objective function. For example, the values of the objective function can include values of two or more variables of interest. In some embodiments, the values of the objective function can include energy cost and infection risk for an associated pair of decision variables such as minimum ventilation setpoint and supply temperature setpoint. In some embodiments, both the values of the decision variables and values of the objective function are provided to the Pareto optimizer 1112 for use in determining what values of the decision variables should be used to achieve the Pareto optimal values of the values of the objective function.

In some embodiments, the controller 1110 is operable between an operational mode and a monitoring mode. For example, when the controller 1110 is in the operational mode, the controller 1110 may include the control signal generator 408 instead of the results manager 418 and may automatically determine control decisions and operate the AHU 304, the UV lights 306, etc., of the HVAC system 300 based on the determined control decisions. When the controller 1110 is in the monitoring mode, the controller 1110 may include the results manager 418 (as shown in FIG. 11) and can be configured to provide the display data to the display device 422. In some embodiments, the display device 422 may operate to display different control options for the HVAC system 300, and the user may select from the different control options. The selection can be provided to the controller 1110 or the control signal generator 408 and implemented by the controller 1110 to operate the HVAC system 300 according to the selected control option (e.g., over a future time horizon). In some embodiments, the controller 1110 is also operable In some embodiments, the controller 1110 is configured to use a combination of domain knowledge and artificial intelligence for either the operational mode or the advisory mode. For example, the controller 1110 can use domain knowledge including physics-based models for HVAC heat and mass transfer, phenomenological models that match system behavior for regulatory control, and/or different default values of the various parameters described herein. In some embodiments, the controller 1110 uses the artificial intelligence to train key model parameters (e.g., of the physics-based models described herein) in an online mode (e.g., when the controller 1110 communicates with a remote device, processing circuitry, network, gateway, etc.) using one or more regression techniques. In some embodiments, the controller 1110 uses the artificial intelligence to predict future disturbances using recent data obtained from the HVAC system 300 and also using timeseries models.

Figure 12:
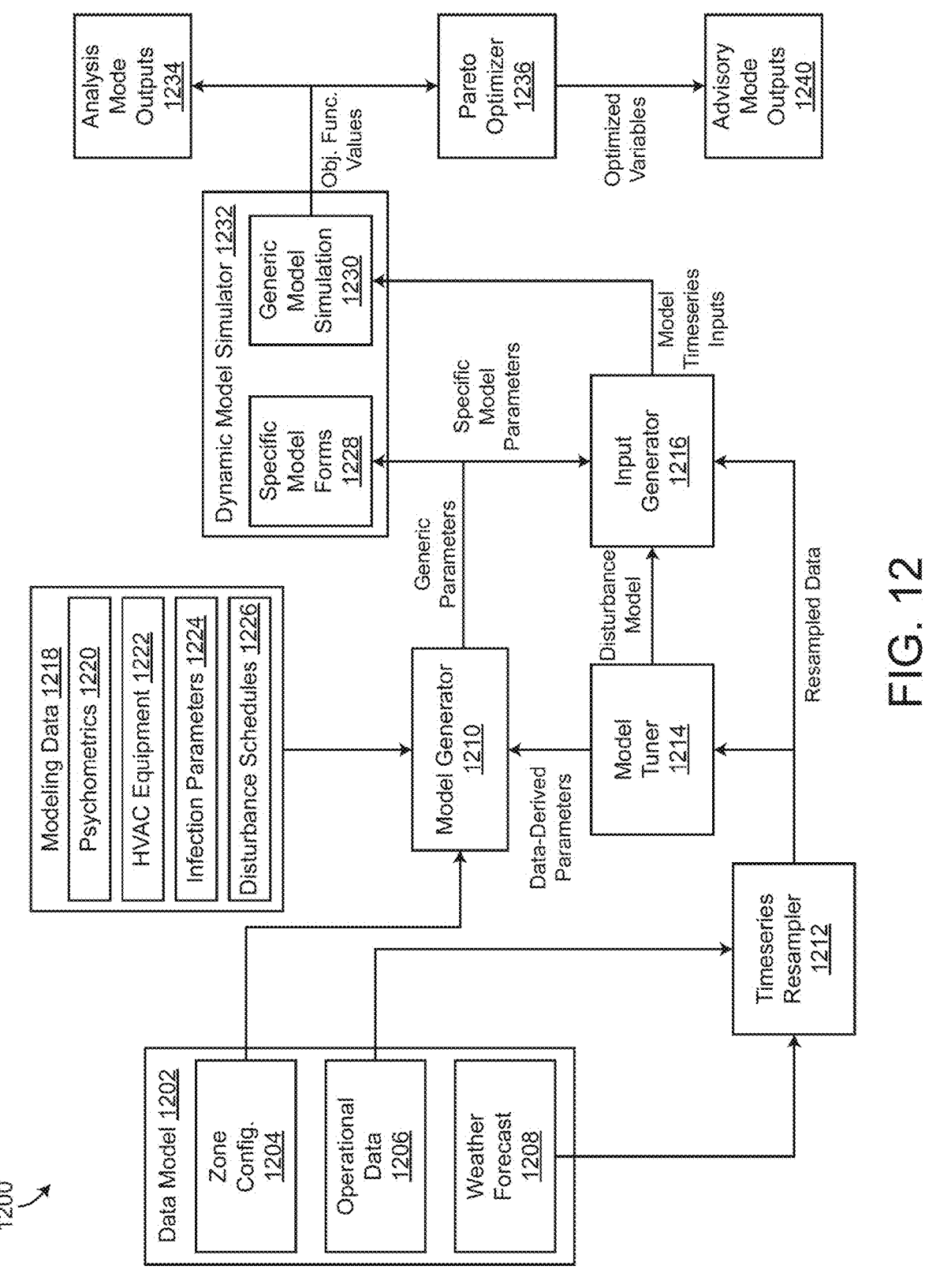
FIG. 12 is a block diagram illustrating the functionality of the controller of FIG. 11, according to some embodiments.

Referring particularly to FIG. 12, a diagram 1200 illustrating the functionality of the controller 1110 is shown, according to some embodiments. The diagram 1200 includes a data model 1202, a model generator 1210, a timeseries resampler 1212, a model tuner 1214, an input generator 1216, modeling data 1218, a dynamic model simulator 1232, analysis mode outputs 1234, a Pareto optimizer 1236, and advisory mode outputs 1240, according to some embodiments. In some embodiments, the data model 1202 includes one or more zone configurations 1204 (e.g., of zones 206), operational data 1206 (e.g., of the HVAC system 300, or historical operational data thereof), and weather forecast data 1208. In some embodiments, the data model 1202 is stored in the memory 406 of the controller 1110. In some embodiments, the data model 1202 is populated using data received from various sensors or control decisions of the HVAC system 300 over a previous time period (e.g., the operational data 1206). In some embodiments, the data model 1202 is populated using system configuration information such as the zone configurations 1204 (e.g., proximity of the zones 206, which of the zones 206 are served by which AHUs, etc.). In some embodiments, the data model 1202 is populated using information obtained from a third party service such as a weather service.

In some embodiments, the modeling data 1218 includes psychometric data 1220 of the HVAC system 300, HVAC equipment data 1222, infection parameters 1224, and/or disturbance schedules 1226. In some embodiments, the HVAC equipment data 1222 includes different performance curves, model identifiers, model numbers, models of HVAC equipment that predict one or more operational parameters (e.g., air delivery, temperature of air delivered to a zone, etc.) as a function of one or more input variables, etc. In some embodiments, the infection parameters 1224 are values of any of the variables of the Wells-Riley equations or derivations thereof, quantum concentration models, infection probability models, $CO_2$ concentration models, infection probability constraints, etc., as described in greater detail above with reference to FIGS. 3 and 4. For example, the infection parameters 1224 can include any of expected, actual, or hypothetical number of infected individuals D, total number of susceptivle individuals S, number of infectious individuals I, disease quanta generation rate q, total exposure time t, quantum concentration in the air N, net indoor CO2 concentration C, total air volume of one or more zones V, net concentration of exhaled CO2 c, number of infectious particles that an individual inhales over a given time $k_{[0,T]}$, the upper boundary on acceptable or desirable infection probability $$P_{[0,T]}^{max},$$

infectious quanta removal fraction of a filter $\lambda_{filter}$, infectious quanta removal of UV lights $\lambda_{UV}$, etc. In some embodiments, the disturbance schedules 1226 include expected heat disturbances, CO2 disturbances, expected occupancy schedules, etc., or any other schedules of disturbances for various infections parameters, environmental parameters, HVAC parameters, etc. In some embodiments, the data model 1202 and/or the modeling data 1218 are the domain knowledge that is used for performing the optimization described herein. In some embodiments, the data model 1202 and the modeling data 1218 are stored in the simulation database 414.

In some embodiments, the modeling data 1218 and the zone configuration data 1204 is provided to the model generator 1210 for generation of a model (e.g., any of the models or constraints described in greater detail above with reference to FIGS. 3-4). In some embodiments, the model generator 1210 is configured to perform any of the functionality of the model manager 416. In some embodiments, the weather forecast data 1208 is provided to the timeseries resampler 1212 that is configured to resample the weather forecast data 1208 and output resampled data to the model tuner 1214 and the input generator 1216. The resampled data has a frequency or time interval that is different than the frequency or time interval of the weather forecast data 1208 provided to the timeseries resampler 1212, according to some embodiments. In some embodiments, the timeseries resampler 1212 operates to provide the resampled data to the model tuner 1214 and the input generator 1216 at an appropriate frequency or time interval (e.g., between data points of the weather forecast data) so that the model tuner 1214 and the input generator 1216 can use the weather forecast data 1208, provided as the resampled data. In some embodiments, the timeseries resampler 1212 is configured to perform interpolation and/or extrapolation techniques to generate the resampled data based on the weather forecast data 1208.

The model tuner 1214 is configured to use the resampled data (e.g., the resampled weather forecast data 1208) to determine data-derived parameters and provide the data-derived parameters to the model generator 1210, according to some embodiments. In some embodiments, the model tuner 1214 is configured to generate a disturbance model using the resampled data to predict disturbances that may be introduced to HVAC system (e.g., temperature fluctuations, humidity fluctuations, etc., due to weather) and provide parameters of the disturbance model or outputs of the disturbance model to the model generator 1210 as the data-derived parameters. In some embodiments, the model tuner 1214 is configured to output the disturbance model to the input generator 1216. In some embodiments, the data-derived parameters are adjustments, calibration factors, additional correction terms, etc., for the model generator 1210 so that the model generator 1210 outputs models that accurately predict temperature, humidity, energy consumption, infection probability, etc., while accounting for different weather conditions, disturbances, occupancy, etc. In some embodiments, the data-derived parameters are generated by the model tuner 1214 using a neural network, a machine learning technique, artificial intelligence, etc. For example, the model tuner 1214 can obtain the operational data 1206 or the weather forecast 1208 for a historical or previous time period, as well as predictions of the various models for the historical or previous time period (e.g., predictions of zone temperatures, infection risks, infection probability, humidity, etc.), and actual values of the predictions of the various models for the historical or previous time period (e.g., actual zone temperatures, actual infection risks, actual infection probability, etc., or any other environmental or infection related parameter that can be sensed or determined based on sensor data), and determine adjustments for the models using the neural network, the machine learning technique, the artificial intelligence, etc., to improve accuracy of the models.

The model generator 1210 uses the data-derived parameters (e.g., disturbance parameters, adjustment parameters, correction factors, calibration factors, additional model terms, etc.), the zone configurations 1204, and the modeling data 1218 to generate one or more models and output model parameters (shown in FIG. 12 as "generic parameters") to the dynamic model simulator 1232, according to some embodiments. In some embodiments, the model generator 1210 uses the parameters of the disturbance model to tune or adjust the model generated based on the zone configuration data 1204 and the modeling data 1218. In some embodiments, the models (e.g., the generic parameters) are the dynamic models (e.g., the dynamic temperature model, the dynamic humidity model, the dynamic infectious quanta model, etc.) as described in greater detail above with reference to FIGS. 3-5.

The input generator 1216 uses the resampled data provided by the timeseries resampler 1212 and the disturbance model provided by the model tuner 1214 to determine model timeseries inputs, according to some embodiments. In some embodiments, the input generator 1216 is configured to generate timeseries inputs for various extrinsic parameters such as ambient or outdoor temperature, ambient or outdoor humidity, price per unit of energy as provided by a utility provider, etc. The input generator 1216 may provide the model timeseries inputs to the dynamic model simulator 1232 for use in performing a simulation (e.g., either to specific model forms 1228 or to generic model simulation 1230), according to some embodiments. In some embodiments, the model timeseries inputs are predicted or estimated timeseries data for a future time period, or are historical data from a previous time period (e.g., for the advisory mode outputs 1240 and the analysis mode outputs 1234, respectively). The input generator 1216 can provide specific model parameters to the specific model forms 1228 of the dynamic model simulator 1232 so that different generic models can be simulated for a specific HVAC system, a specific building, a specific space or zone, etc. The specific model parameters can be various thermal characteristics (e.g., heat transfer or heat storage parameters), HVAC equipment model numbers, HVAC equipment operating curves, etc.

The dynamic model simulator 1232 is configured to use the specific model parameters and the model timeseries inputs to perform a simulation for a future time period, and to perform a simulation or analysis for a previous time period, according to some embodiments. In some embodiments, the dynamic model simulator 1232 includes specific model forms 1228 and generic model simulation 1230. In some embodiments, the specific model forms 1228 are determined based on predefined or generic models (e.g., generic versions of the dynamic models as described in greater detail above) with specific model parameters that are generated or adjusted based on outputs of the model tuner 1214 and real-world or actual data as provided by the data model 1202 (e.g., the zone configuration data 1204, the operational data 1206, the weather forecast data 1208, etc.).

In some embodiments, the generic model simulation 1230 is performed using the specific model forms 1228 for both a future time period (e.g., for the advisory mode outputs 1240) and for a previous time period (e.g., for the analysis mode outputs 1234). In some embodiments, the generic model simulation 1230 is performed to determine energy consumption or energy cost and associated infection risks or disinfection (e.g., a reduction in infection risks resulting from performing any of the fresh air intake operations of an AHU, UV light disinfection, or filtration). In some embodiments, the generic model simulation 1230 uses the dynamic infectious quanta model to simulate or assess infection risks for previously performed HVAC operations, or for predicted future HVAC operations.

The outputs of the generic model simulation 1230 (e.g., objective function values such as including but not limited to infection risk and energy cost) are provided to the Pareto optimizer 1236 and the analysis mode outputs 1234, according to some embodiments. In some embodiments, the outputs of the dynamic model simulator 1232 that use historical BMS data (e.g., infection risk and energy cost values associated with previous operation of the HVAC system over the previous time period) are provided as the analysis mode outputs 1234. In some embodiments, the output of the dynamic model simulator 1232 that are for the future time period (e.g., for different possible control decisions of the HVAC system or decision variables over the future time period) are provided to the Pareto optimizer 1236 for determination of the advisory mode outputs 1240 (e.g., using the Pareto optimization techniques described in greater detail below with reference to FIGS. 13-16).

Pareto Optimization Techniques

Referring particularly to FIGS. 13-16, the Pareto optimizer 1236 or the Pareto optimizer 1112 are configured to perform various Pareto optimization techniques as described herein to determine Pareto optimization results, according to some embodiments. It should be understood that while the techniques described herein with reference to FIGS. 13-16 are described as being performed by the Pareto optimizer 1236, the techniques can also be performed by the Pareto optimizer 1112 or processing circuitry 402 thereof.

Figure 13:
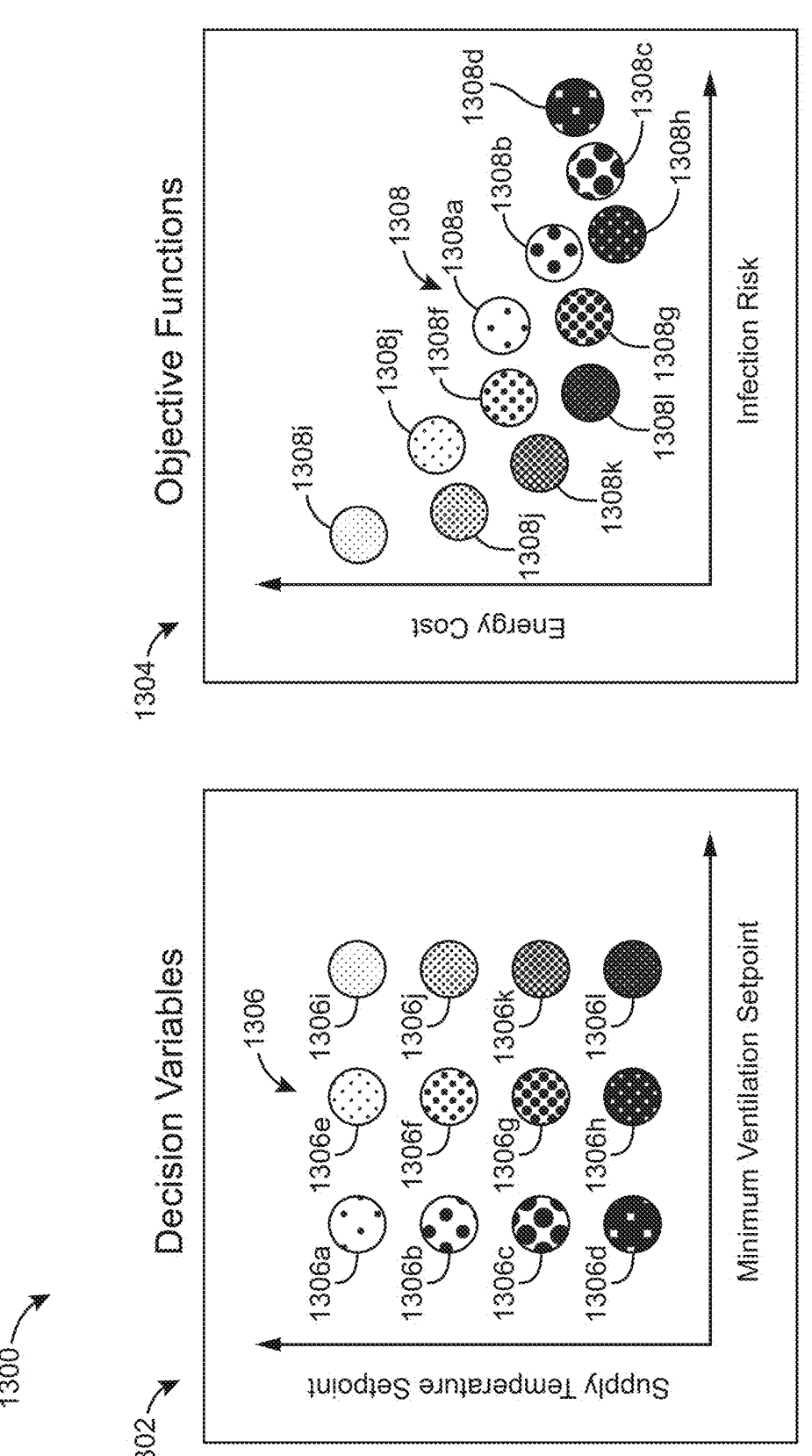
FIG. 13 is a diagram including a first graph that shows different combinations of decision variables, and a second graph that shows simulation results including energy cost and infection risk for each of the different combinations of decision variables, according to some embodiments.

Referring particularly to FIG. 13, a diagram 1300 shows a graph 1302 of different decision variables, and a graph 1304 of corresponding objective function values for each of the different decision variables. The graph 1302 shows different combinations for a supply temperature setpoint and a minimum ventilation setpoint (shown on the Y and X axes, respectively) for the HVAC system 300, according to some embodiments. It should be understood that only two decision variables are shown for ease of explanation, and that any number of decision variables may be used. Different values and combinations of both the decision variables are represented in FIG. 13 as points 1306. For example, points 1306a-1306d have a same value for the minimum ventilation setpoint decision variables but different values of the supply temperature setpoint decision variable. Similarly, points 1306e-1306h have the same value for the minimum ventilation setpoint decision (different than the value of the minimum ventilation setpoint decision variable for points 1306a-1306d) but different values of the supply temperature setpoint decision variable. Points 13061-13061 likewise have the same value of the minimum ventilation setpoint decision variable (different than the values of the minimum ventilation setpoint decision variable for points 1306a-1306d and 1306e-1306h) but different values of the supply temperature setpoint decision variable. In some embodiments, the values of the decision variables are a fixed set (e.g., generated as a grid using minimum and maximum allowed values for each of the multiple decision variables) or are generated iteratively based on simulation results (e.g., by adding additional points that are likely to be Pareto optimal based on simulation results of proximate points).

In some embodiments, a simulation is performed to determine corresponding energy cost and infection risk for each of the different points 1306. The corresponding energy cost and infection risk are shown as points 1308 in graph 1304. In some embodiments, points 1308a-13081 of graph 1304 correspond to points 1306a-13061 of graph 1302. For example, point 1308a illustrates the corresponding energy cost and infection risk for the values of the minimum ventilation setpoint and the supply temperature of the point 1306a. Likewise, points 1308b-13081 illustrate the various corresponding energy costs and infection risks for each of the minimum ventilation setpoint and supply temperature setpoint values as represented by points 1306b-13061. In some embodiments, each of the points 1306a-13061 and the corresponding points 1308a-13081 correspond to a simulation performed by the optimization manager 412, or the dynamic model simulator 1232. For example, the dynamic model simulator 1232 may perform a simulation for each of the sets of values of the supply temperature setpoint and the minimum ventilation setpoint (e.g., the decision variables) and output values of the energy cost and infection risk for each simulation (shown as points 1308). It should be understood that while FIG. 13 shows only two objectives of the Pareto optimization (e.g., energy cost and infection risk), the Pareto optimization may have any number of optimization objectives (e.g., more than two, etc.).

Figure 14:
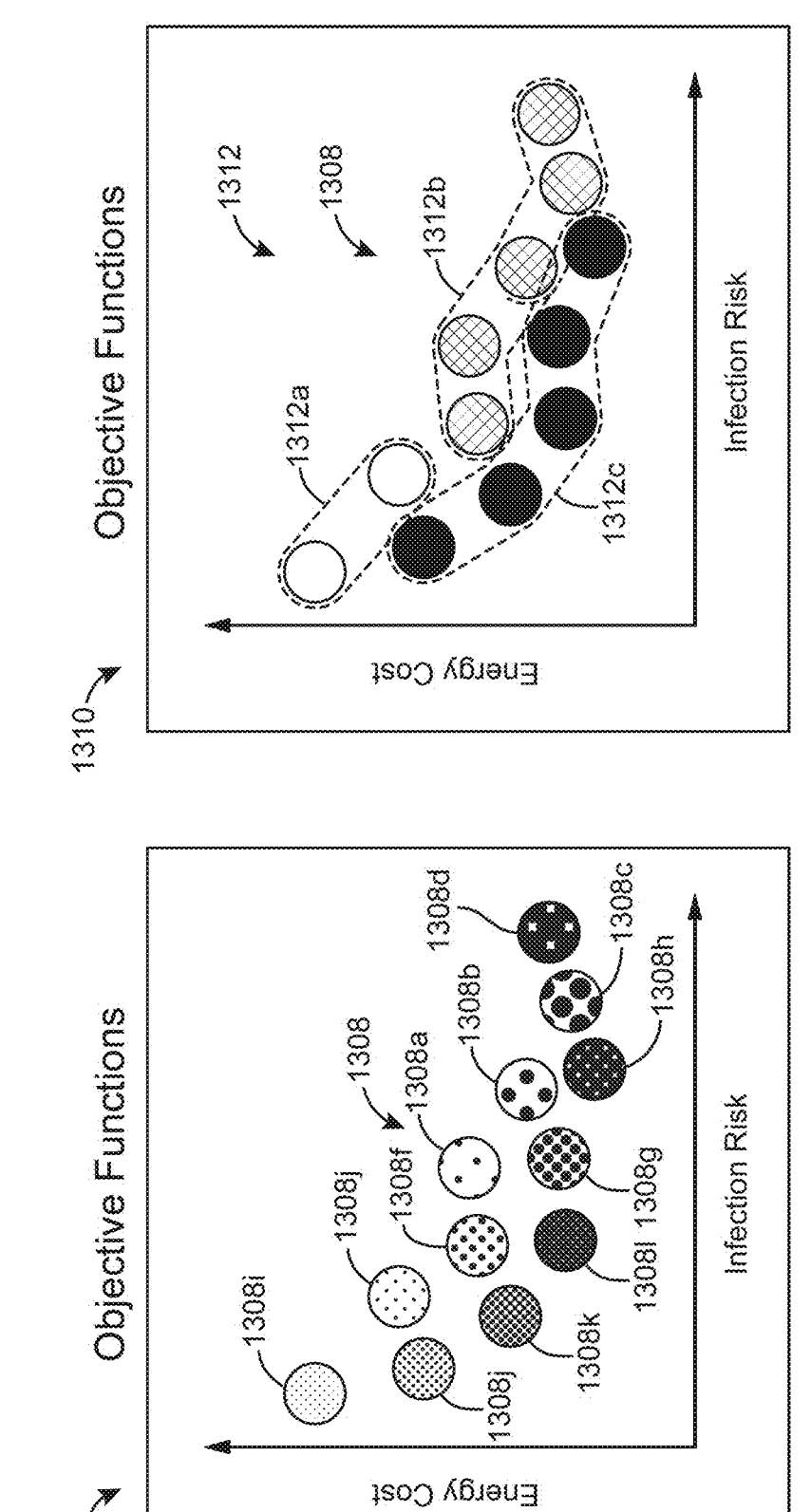
FIG. 14 is a diagram including the second graph of FIG. 13 and a third graph illustrating which of the simulation results are infeasible, feasible but not Pareto optimal, and feasible and Pareto optimal, according to some embodiments.

Referring particularly to FIG. 14, a diagram 1400 shows the graph 1304 and a graph 1310, according to some embodiments. The graph 1304 shows the points 1308 that illustrate the various combinations of energy cost and infection risk for the corresponding values of the decision variables (the supply temperature setpoint and the minimum ventilation setpoint shown in graph 1302 in FIG. 13). In some embodiments, the graph 1310 illustrates groups 1312 that are include the points 1308 grouped according to feasibility, and further group according to Pareto optimality. Specifically, groups 1312 includes a first group of points 1312a (e.g., points 1308i and 1308e), a second group of points 1312b (e.g., points 1308f, 1308a, 1308b, 1308c, and 1308d), and a third group of points 1312c (e.g., points 1308j, 1308k, 13081, 1308g, and 1308h).

The first group of points 1312a are points that are infeasible, unfeasible, or non-feasible. In some embodiments, the Pareto optimizer 1236 is configured to determine or identify which of the points 1308 are infeasible and group such combinations of energy cost and infection risk as infeasible solutions. In some embodiments, the Pareto optimizer 1236 is configured to use threshold energy costs or infection risks, and if some of the points 1308 are greater than a maximum allowable energy cost or infection risk, or less than a minimum allowable infection risk or energy cost, the Pareto optimizer 1236 can determine that such points are infeasible and group them accordingly as the first group of points 1312a. In some embodiments, the maximum or minimum allowable energy cost or infection risk values used by the Pareto optimizer 1236 are user inputs, values set by legal regulations, or values determined based on abilities of the HVAC system 300. In some embodiments, the second group of points 1312b and the third group of points 1312c are feasible solutions.

In some embodiments, the Pareto optimizer 1236 is configured to perform a Pareto optimization based on the points 1308 to determine which of the points 1308 are Pareto optimal. A Pareto optimal point is a point where neither the energy cost or the infection risk can be reduced without causing a corresponding increase in the infection risk or the energy cost. In the example shown in FIG. 14, the points 1308j, 1308k, 13081, 1308g, and 1308h are Pareto optimal points, and the Pareto optimizer 1236 is configured to classify these points as such, thereby defining the third group of points 1312c, according to some embodiments. In some embodiments, the Pareto optimizer 1236 is configured to determine that points which are feasible but are not Pareto optimal (e.g., points 1308f, 1308a, 1308b, 1308c, and 1308d) should define the second group of points 1312b. In this way, the Pareto optimizer 1236 can define several groups of the points 1308 (e.g., groups of various solutions to be considered): (i) infeasible points, (ii) feasible points that are Pareto optimal, and (iii) feasible points that are not Pareto optimal.

Figure 15:
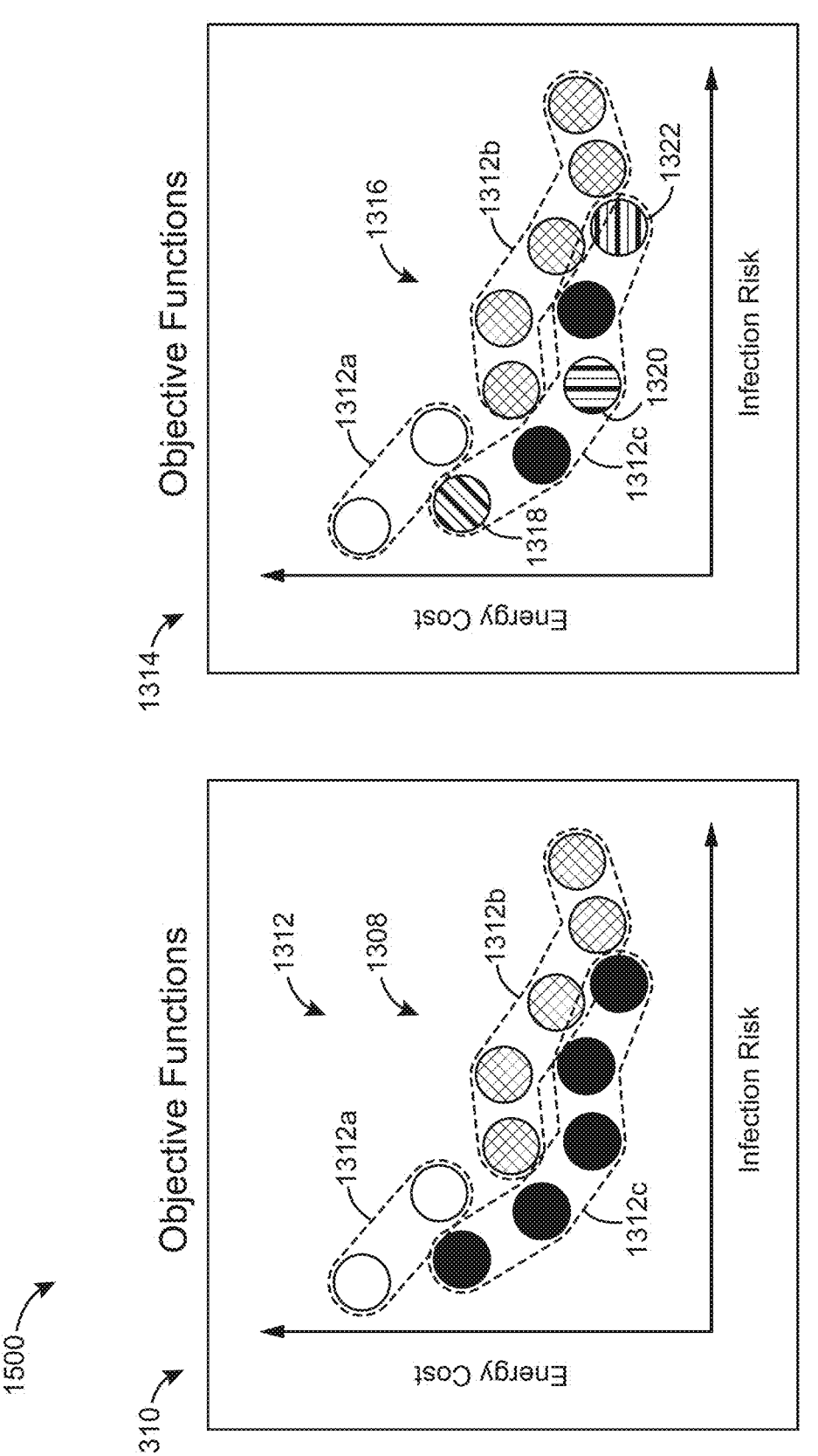
FIG. 15 is a diagram including the third graph of FIG. 14 and a fourth graph that illustrates a minimum infection risk solution, a minimum energy cost solution, and an equal priority infection risk/energy cost solution of the Pareto optimal simulation results, according to some embodiments.

Referring particularly to FIG. 15, the Pareto optimizer 1236 can further identify which of the Pareto optimal points, shown as the third group of points 1312c in graph 1310, result in maximum disinfection (e.g., minimal infection risk), minimum energy consumption, and an equal priority between disinfection and energy consumption, according to some embodiments. In some embodiments, the Pareto optimizer 1236 is configured to determine which of the Pareto optimal points (i.e., the points 1308 of the third group of points 1312c) have a minimum infection risk, a minimum energy consumption, and an equal priority between energy consumption and infection risk. Specifically, in the example shown in FIGS. 13-15, the point 1308j is a Pareto optimal point that has a lowest infection risk, and therefore the Pareto optimizer 1236 identifies point 1308j as a maximum disinfection point 1318. Similarly, in the example shown in FIGS. 13-15, the Pareto optimizer 1236 determines that the point 1308h is a Pareto optimal point associated with minimum energy consumption, and therefore the Pareto optimizer 1236 identifies the point 1308h as a minimum energy consumption point 1322. Finally, in the example shown in FIGS. 13-15, the Pareto optimizer 1236 determines that the point 13081 is a Pareto optimal point that results in an equal priority between the infection risk and the energy consumption, shown as equal priority point 1320.

In some embodiments, the maximum disinfection point 1318 (e.g., point 1308j), the minimum energy consumption (or energy costs) point 1322 (e.g., point 1308h), and the equal priority point 1320 (e.g., point 13081) are the Pareto optimization results. In some embodiments, the Pareto optimization results also include the energy cost, infection risk, as well as the minimum ventilation setpoint, and the supply temperature setpoint for each of the maximum disinfection point 1318, the minimum energy consumption point 1322, and the equal priority point 1320. In some embodiments, the Pareto optimization results are provided to the user via the display device 422 for selection. For example, the display device 422 can provide different recommended operating possibilities such as a maximum disinfection operating possibility, a minimum energy consumption operating possibility, and an equal energy and infection risk. In some embodiments, the user may select one of the different operating recommendations, and provide the selection to the controller 1110 for use in operating the HVAC system 300 according to the selected operating possibility.

Figure 16:
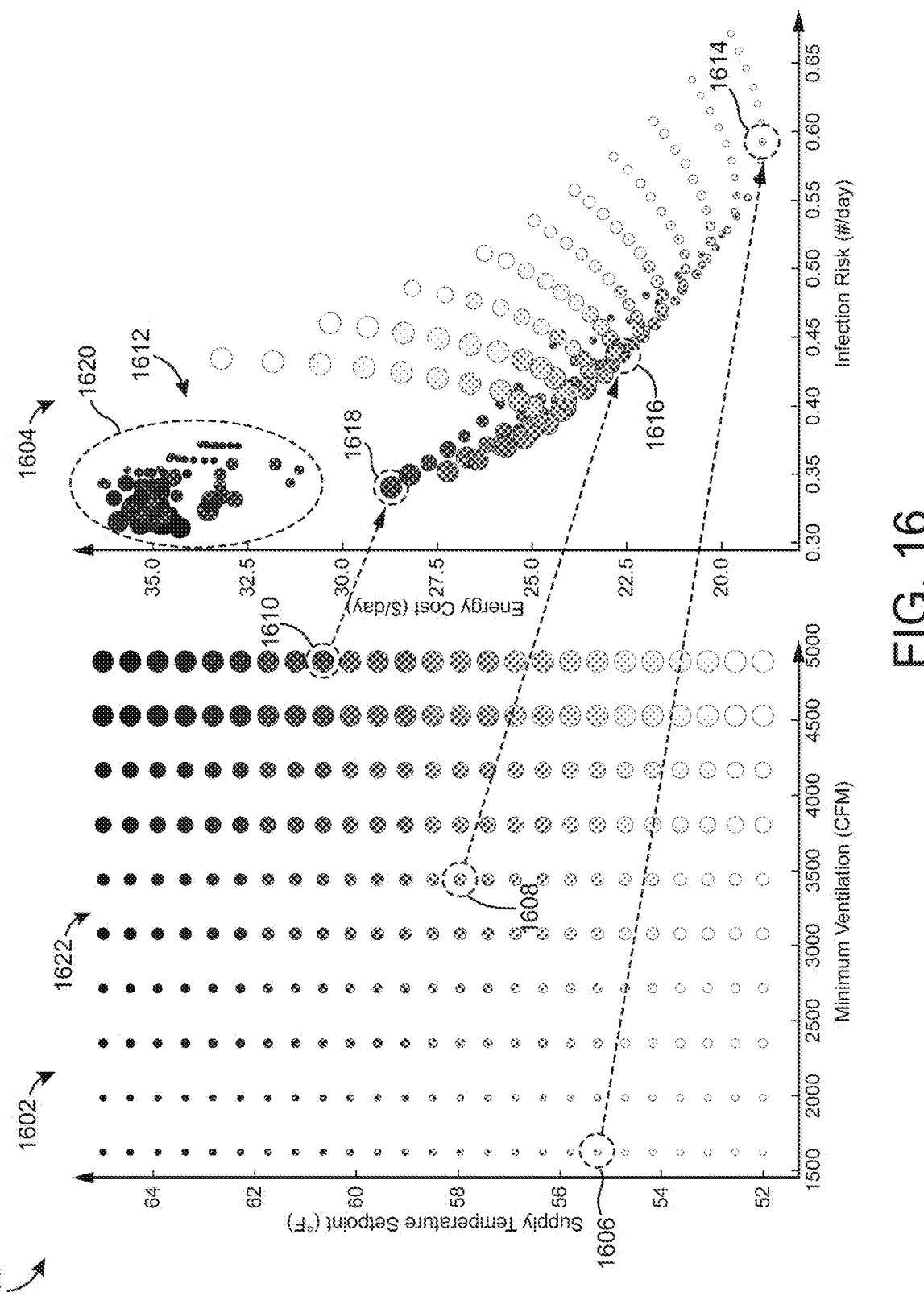
FIG. 16 is a diagram including a first graph that shows different combinations of decision variables, and a second graph that shows simulation results including energy cost and infection risk for each of the different combinations of decision variables, according to some embodiments.

Referring particularly to FIG. 16, a diagram 1600 shows another example of a graph 1602 and a graph 1604 illustrating the functionality of the Pareto optimizer 1236, according to some embodiments. Graph 1602 includes points 1622 that illustrate different combinations of minimum ventilation and supply temperature setpoint (e.g., the decision variables) usable by the dynamic model simulator 1232 or the optimization manager 412 for performing a simulation to determine corresponding infection risk and energy costs (shown as points 1612 in graph 1604), according to some embodiments. In some embodiments, the points 1612 illustrated in the graph 1604 are mapped to the points 1622. For example, the simulation can be performed for each of the points 1622 to determine the corresponding infection risk and energy cost, as represented by points 1612 in graph 1604.

In the example shown in FIG. 16, the Pareto optimizer 1236 identifies a group 1620 of infeasible points, according to some embodiments. The infeasible points may be points that cannot be achieved due to constraints and operational ability of the HVAC system 300. In some embodiments, the Pareto optimizer 1236 further identifies which of the points 1612 are Pareto optimal points, and determines which of the Pareto optimal points are associated with lowest infection risk (e.g., maximum disinfection), lowest energy costs or energy consumption, and a balanced priority point where energy costs and infection risk are equally prioritized. In the example shown in FIG. 16, the Pareto optimizer 1236 identifies that a point 1618 of graph 1604 is the Pareto optimal point that results in lowest infection risk, which corresponds to point 1610 of graph 1602. Similarly, the Pareto optimizer 1236 may determine that the point 1614 is the Pareto optimal point that results in lowest energy cost, which corresponds to the point 1606 in graph 1602, according to some embodiments. Finally, the Pareto optimizer 1236 can determine that a point 1616 of graph 1604 is a Pareto optimal point that results in a solution with equal priority between the infection risk and the energy cost, which corresponds to point 1608 of graph 1602, according to some embodiments.

In some embodiments, the Pareto optimizer 1236 is configured to provide all of the Pareto optimal points to the user via the display device 422. In some embodiments, the Pareto optimizer 1236 or the Pareto optimizer 1112 is configured to provide the Pareto optimal points as the Pareto optimal results to the results manager 418 for use in display to the user. In some embodiments, the Pareto optimizer 1112 or the Pareto optimizer 1236 automatically selects one of the Pareto optimal points for use and provides the Pareto optimal points and its associated control decisions (e.g., the minimum ventilation and supply temperature setpoints) to the control signal generator 408.

Pareto Optimization Process

Referring particularly to FIG. 17, a process 1700 for performing a Pareto optimization to determine operation of a building HVAC system is shown, according to some embodiments. Process 1700 includes steps 1702-1716 and can be performed by the controller 1110 or more specifically, by the Pareto optimizer 1112, according to some embodiments. In some embodiments, process 1700 is performed to determine various Pareto optimal values, or to determine a Pareto optimal solution and associated operating parameters that results in optimal tradeoff between infection risk and energy cost.

Process 1700 includes obtaining multiple sets of values of control decision variables, each set of values including a different combination of the control decision variables (step 1702), according to some embodiments. In some embodiments, the control decision variables include a minimum ventilation setpoint and a supply temperature setpoint. In some embodiments, the control decision variables include operating parameters or control decisions of the UV lights 306 or the AHU 304 (e.g., a fresh air intake fraction x). It should be understood that the control decision variables described herein are not limited to only two variables, and may include any number of variables. In some embodiments, each set of the values of the control decision variables is a unique combination of different values of the control decision variables. For example, graph 1302 of FIG. 13 shows different unique combinations of values of supply temperature setpoint and minimum ventilation setpoint. Similarly, regardless of a number of control decision variables, each set of the values of the control decision variables may be a unique combination, according to some embodiments.

Process 1700 includes performing a simulation for each set of the values of the control decision variables to determine sets of values of energy cost and infection risk (step 1704), according to some embodiments. In some embodiments, the simulation is performed using the dynamic models as generated by the model manager 416, or using the techniques of the dynamic model simulator 1232 (e.g., the specific model forms 1228, the generic model simulation 1230, etc.). In some embodiments, the simulations are performed by the controller 1110, or processing circuitry 402 thereof. In some embodiments, the simulations are performed for a future time horizon to generate predicted or simulated values for the energy cost and infection risk. In some embodiments, the simulations are performed for a previous or historical time period to determined values of the energy cost and infection risk for analysis (e.g., for comparison with actual historical data of the energy cost and infection risk). In some embodiments, each of the sets of values of control decisions (e.g., as obtained in step 1702) is used for a separate simulation to determine a corresponding set of performance variables (e.g., the values of energy cost and infection risk). In some embodiments, the simulations are performed subject to one or more constraints. In some embodiments, step 1704 includes performing steps 602-616 of process 600. In some embodiments, step 1704 includes performing steps 702-716 of process 700.

Process 1700 includes determining which of the sets of values of energy cost and infection risk are infeasible and which are feasible (step 1706), according to some embodiments. In some embodiments, step 1706 is performed by the Pareto optimizer 1112 or by the Pareto optimizer 1236. In some embodiments, step 1706 is performed using one or more constraints. The one or more constraints can be minimum or maximum allowable values of either of the energy cost and infection risk, according to some embodiments. For example, if one of the sets of values of energy cost and infection risk has an energy cost or energy consumption that exceeds a maximum allowable value of energy cost (e.g., exceeds a maximum threshold), then such a set of values of energy cost and infection risk, and consequently the corresponding sets of values of the control decision variables, may be considered infeasible, according to some embodiments. In some embodiments, the constraints are set based on capabilities of an HVAC system that the process 1700 is performed to optimize, user inputs, budgetary constraints, minimum infection risk reduction constraints, etc.

Process 1700 includes determining which of the feasible sets of values of energy cost and infection risk are Pareto optimal solutions (step 1708), according to some embodiments. In some embodiments, the step 1708 is performed by the Pareto optimizer 1112 or by the Pareto optimizer 1236. In some embodiments, the step 1708 is performed to determine which of the sets of values of energy cost and infection risk are Pareto optimal from the feasible sets of values of energy cost and infection risk. In some embodiments, process 1700 includes performing steps 1702-1708 iteratively to determine sets of decision variables. For example, the decision variables can be iteratively generated based on simulation results (e.g., by generating additional points that are likely to be Pareto optimal based on the results of step 1708).

Process 1700 includes determining, based on the Pareto optimal solutions, a minimum energy cost solution, a maximum disinfection solution, and an equal priority energy cost/disinfection solution, according to some embodiments. In some embodiments, step 1710 is performed the Pareto optimizer 1112 or by the Pareto optimizer 1236. In some embodiments, the minimum energy cost solution is the set of values of the energy cost and infection risk that are Pareto optimal, feasible, and also have the lowest value of the energy cost. In some embodiments, the maximum disinfection solution is selected from the set of values of the energy cost and infection risk that are feasible and Pareto optimal, and that has the lowest value of the infection risk. In some embodiments, the equal priority energy cost/disinfection solution is selected from the set of values of the energy cost and infection risk that are feasible and Pareto optimal, and that equally prioritizes energy cost and infection risk. For example, the energy cost/disinfection solution can be a point that is proximate an inflection of a curve that is fit to the sets of values of energy cost and infection risk (e.g., including the feasible and infeasible points, only the feasible points, only the Pareto optimal points, etc.).

Process 1700 includes providing one or more of the Pareto optimal solutions to a user via a display screen (step 1712), according to some embodiments. In some embodiments, step 1712 includes operating the display device 422 to display the Pareto optimal solutions to the user as different operational modes or available operating profiles. In some embodiments, step 1712 is performed by the display device 422 and the controller 1110. In some embodiments, step 1712 includes providing the Pareto optimal solutions and historical data (e.g., historical data of actually used control decisions and the resulting energy cost and infection risks). In some embodiments, step 1712 is optional. For example, if the user has already set a mode of operation (e.g., always use minimum infection risk settings, always use minimum energy cost solution, always use equal priority energy cost/disinfection solution, etc.), then step 1712 can be optional.

Process 1700 includes automatically selecting one of the Pareto optimal solutions or receiving a user input of a selected Pareto optimal solution (step 1714), according to some embodiments. In some embodiments, a user may select a setting for the controller 1110 to either automatically select one of the Pareto optimal solutions, or that the Pareto optimal solutions should be provided to the user for selection. In some embodiments, step 1714 is performed by the controller 1110 and the display device 422. For example, step 1714 can be performed by a user providing a selection of one of the Pareto optimal solutions (and therefore the corresponding control decisions) to be used by the HVAC system for operation, according to some embodiments. In some embodiments, step 1714 is performed automatically (e.g., if a user or administrator has selected a preferred mode of operation for the HVAC system) by the Pareto optimizer 1112 to select one of the Pareto optimal solutions and therefore the corresponding control decisions for operational use of the HVAC system.

Process 1700 includes operating equipment of an HVAC system according to the control decisions of the selected Pareto optimal solution (step 1716), according to some embodiments. In some embodiments, step 1716 includes operating the HVAC system 300. More specifically, step 1716 can include operating the UV lights 307, the AHU 304, etc., of the HVAC system 300 according to the control decisions of the selected Pareto optimal solution. Advantageously, using the control decisions of the selected Pareto optimal solution can facilitate optimal control of the HVAC system 300 in terms of risk reduction, energy consumption, or an equal priority between infection risk reduction and energy consumption or energy cost.

Pareto Optimal Analysis and Advisory

Referring again to FIGS. 11-16, the controller 1110 can be configured to perform any of the Pareto optimization techniques described herein to perform a historical analysis for the building 10 that the HVAC system 300 serves. For example, the controller 1110 can use modeling data 1218 and/or a data model 1202 that is based on historical data of the building 10, weather conditions, occupancy data, etc. In some embodiments, the controller 1110 is configured to perform the simulation and Pareto optimization techniques to determine different sets of values for the energy cost and infection risk, determine which of these sets are feasible, infeasible, Pareto optimal, etc., and compare the different Pareto optimal solutions to actual energy consumption (e.g., as read on a meter or other energy consumption sensor) and to estimated infection risks that are determined based on historical data of the building 10 or the HVAC system 300. In some embodiments, the analysis mode outputs 1234 are configured to determine potential advantages (e.g., missed energy cost or consumption opportunities) that could have been achieved if the HVAC system 300 had been operated according to a Pareto optimal solution over a previous time period. In some embodiments, the controller 1110 is configured to use newly obtained energy cost or energy consumption data and associated infection risk data (e.g., values of the objective functions) and compare them to energy cost or energy consumption data and associated infection risk data of a previous time period (e.g., a same month from a year ago) to provide the user with information regarding improved efficiency of the HVAC system 300 resulting from operating the HVAC system 300 according to a Pareto optimal solution.

Parallel Analysis and Advisory Outputs

Referring again to FIG. 12, the controller 1110 is configured to output both analysis mode outputs 1234 and advisory mode outputs 1240 concurrently or simultaneously, according to some embodiments. In some embodiments, the controller 1110 is configured to output both the analysis mode outputs 1234 and the advisory mode outputs 1240 to a building administrator or a user as display data via the display device 422.

The analysis mode outputs 1234 can be analysis data based on historical and/or current BMS data, according to some embodiments. In some embodiments, the analysis mode outputs 1234 include energy consumption, infection risks, ventilation setpoints, etc., over a previous time period. In some embodiments, the analysis mode outputs 1234 includes sensor or meter data (e.g., of the energy consumption, energy cost, etc.), and one or more calculated values (e.g., the calculated infection risk as described using the techniques herein) for the HVAC system 300 or the building 10.

In some embodiments, the advisory mode outputs 1240 are the results of the Pareto optimizer 1236 for future or predicted time periods. In some embodiments, the advisory mode outputs 1240 include various predicted infection risks and energy costs for different values of minimum ventilation setpoint and supply temperature setpoint (e.g., different Pareto optimal solutions as described in greater detail above with reference to FIGS. 13-16). In some embodiments, the Pareto optimal solutions or operating points are presented as suggested operating points for a future time period.

In some embodiments, the analysis mode outputs 1234 (e.g., analysis results over a previous or historical time period) and the advisory mode outputs 1240 (e.g., suggested operating points for the HVAC system 300 such as different Pareto optimal points), are determined (e.g., detected, sensed, read from a meter, determined based on operating parameters of equipment of the HVAC system 300, calculated, etc.) simultaneously and presented to the user simultaneously. In this way, the controller 1110 can both "look backwards" and "look forwards" to analyze or assess previous operation of the HVAC system 300 and present analysis data, and to simultaneously determine suggested or simulated setpoints for future operation that minimize energy consumption or energy cost (e.g., a Pareto optimal solution that has lowest energy consumption or energy cost), minimize infection risk (e.g., a Pareto optimal solution that has lowest infection risk or highest disinfection), or an equal priority operating point between minimizing infection risk and minimizing energy consumption or energy cost, according to some embodiments.

In some embodiments, the previous or historical time period over which data is analyzed to determine the analysis mode outputs 1234 is a different length or time duration than the future time period for the advisory mode outputs 1240. For example, the previous or historical time period and the future time period can have different periodicities or the same periodicities. In one example, the previous or historical time period may be a previous 24 hours, while the future time period is a 1 hour time horizon, a 12 hour time horizon, etc. In some embodiments, the periodicities of the historical or previous time period and the future time period is user-selectable and can be adjusted by the user providing inputs to the controller 1110 via the display device 422. In some embodiments, the analysis mode outputs 1234 are for an hourly previous time period and the advisory mode outputs 1240 are for a future 24 hour period. In some embodiments, the analysis mode outputs 1234 include calculations of clean-air delivery and infection risk (e.g., based on BMS data obtained over the previous time period) such as minimum ventilation setpoint, supply temperature setpoint, infection risk, and energy cost. In some embodiments, the analysis mode outputs 1234 are determined based on sensor data and/or setpoints or operating parameters of the HVAC system 300 or equipment thereof (e.g., the AHU 304). In some embodiments, both the analysis mode outputs 1234 and the advisory mode outputs 1240 are determined based on common models, configurations, and data streams (e.g., the same data model 1202, the same modeling data 1218, the same dynamic model simulator 1232, etc., except using historical or previous data, and predicted or future data).

Analysis Mode Process

Figure 18:
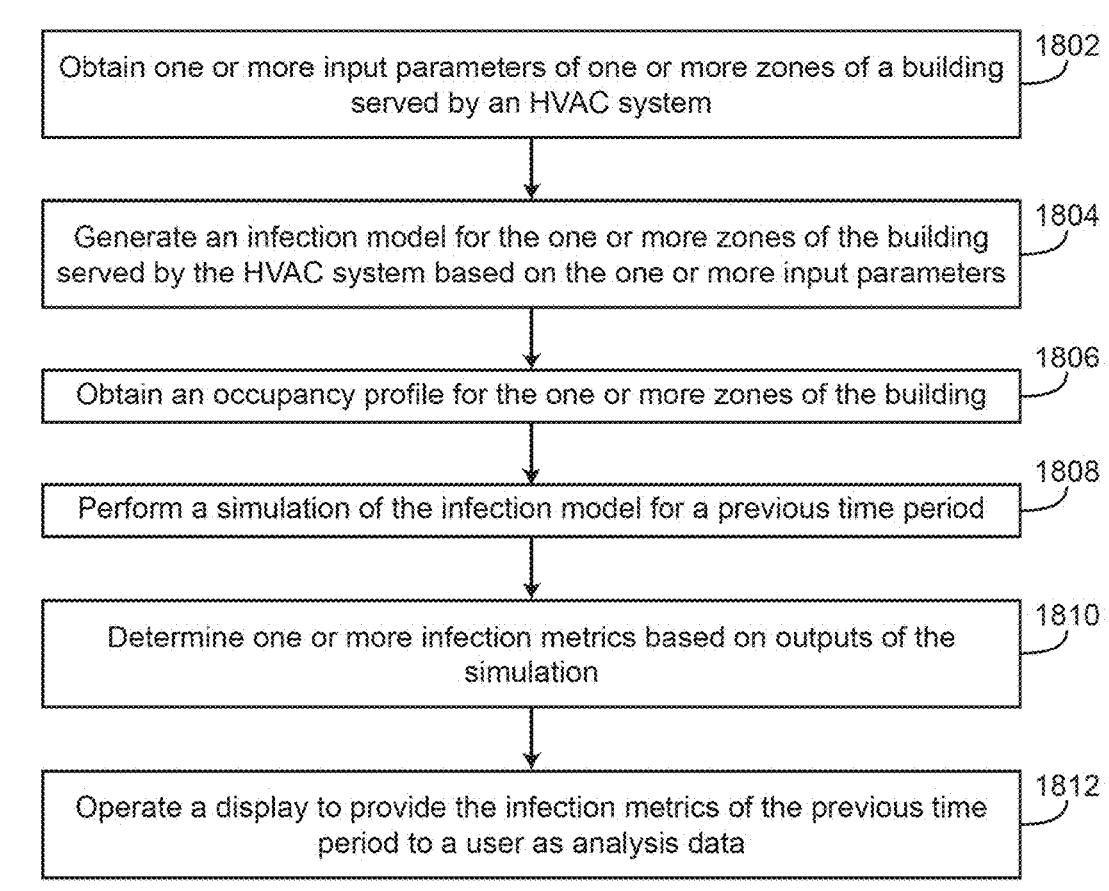
FIG. 18 is a flow diagram of a process for performing an infection metric analysis of an HVAC system over a previous time period, according to some embodiments.

Referring particularly to FIG. 18, a process 1800 for determining analysis mode outputs is shown, according to some embodiments. Process 1800 can be performed for a previous or historical time period of the building 10 using BMS data obtained over the previous or historical time period, according to some embodiments. In some embodiments, process 1800 is performed by the controller 1110. In some embodiments, process 1800 includes steps 1802-1812 and can be performed simultaneously with process 1900 as described in greater detail below with reference to FIG. 19.

Process 1800 includes obtaining one or more input parameters of one or more zones of a building served by an HVAC system (step 1802), according to some embodiments. In some embodiments, the one or more input parameters are timeseries values of the input parameters obtained (e.g., via obtaining BMS data) over a previous or historical time period. In some embodiments, step 1802 includes obtaining values of setpoints of the equipment of the HVAC system (e.g., the HVAC system 300) over the previous or historical time period. In some embodiments, the values of setpoints include values of the minimum ventilation setpoint and/or supply temperature setpoint (e.g., values of decision variables). In some embodiments, the one or more input parameters include setpoints for temperature, humidity, etc., of the building 10 or various zones thereof. In some embodiments, step 1802 is performed the model generator 1210 and/or the timeseries resampler 1212. In some embodiments, the one or more input parameters are or include values of different infection parameters such as a number of infected individuals, a number of susceptible individuals, a number of infectious individuals, a volumetric breath rate of one individual, a disease quanta generation rate, etc.

Process 1800 includes generating an infection model for the one or more zones of the building served by the HVAC system based on the one or more input parameters (step 1804), according to some embodiments. In some embodiments, the infection model predicts a probability of infection as a function of at least one of the one or more input parameters. In some embodiments, the infection model is a Wells-Riley based model. In some embodiments, step 1804 is performed by the controller 1110, or more particularly, by the model manager 416 using any of the techniques described in greater detail above with reference to the model manager 416 (see e.g., FIG. 4).

Process 1800 includes obtaining an occupancy profile for the one or more zones of the building (step 1806), according to some embodiments. In some embodiments, the occupancy profile includes a scheduled occupancy of each zone for the previous time period. In some embodiments, the occupancy profile is timeseries data indicating a number of occupants in each of the zones. In some embodiments, the occupancy profile is obtained from a scheduling service or from occupancy detectors (e.g., detectors at the door that read a number of occupants that enter the building 10 or that enter a specific zone). In some embodiments, step 1806 is performed by the controller 1110 or more specifically by the model manager 416. In some embodiments, the occupancy profile is generated based on zone scheduling and ASHRAE 90.1 standards.

Process 1800 includes performing a simulation of the infection model for the previous time period (step 1808), according to some embodiments. In some embodiments, the simulation is performed using the infection model generated in step 1804. In some embodiments, the simulation is performed for the previous time period using the one or more input parameters as obtained in step 1802. The simulation can be performed to determine infection risks, infection probability, disinfection magnitude, etc., resulting from the operation of the HVAC system over the previous time period, according to some embodiments. In some embodiments, step 1808 is performed by the optimization manager 412 or the dynamic model simulator 1232. In some embodiments, the simulation is performed for a 24 hour period preceding a current time in 15 minute timesteps.

Process 1800 includes determining one or more infection metrics based on outputs of the simulation (step 1810), according to some embodiments. In some embodiments, the one or more infection metrics include infection probability, infection probability reduction, disinfection amount, etc., of the zones of the building that is served by the HVAC system. In some embodiments, the infection metrics include ventilation rate of air for the zones, clean-air delivery rate to the zones, infection risk, and/or clean air score. In some embodiments, step 1810 is performed by the dynamic model simulator 1232, the analysis mode outputs 1234, or the results manager 418.

Process 1800 includes operating a display to provide the infection metrics of the previous time period to a user as analysis data (step 1812), according to some embodiments. In some embodiments, step 1812 is performed using the display device 422. In some embodiments, step 1812 includes operating the display device 422 to provide any of the ventilation rate of air for each of the zones, clean-air delivery rate to each of the zones, infection risk of each of the zones or of the overall building, and/or clean air score for each of the zones. In some embodiments, the infection metrics are for the previous time period.

Advisory Mode Process

Referring particularly to FIG. 19, a process 1900 for determining advisory mode outputs is shown, according to some embodiments. Process 1900 can be performed for a future or subsequent time period of the building 10, according to some embodiments. In some embodiments, process 1900 is performed simultaneously or concurrently with process 1800 so that the future time period is relative to a current time, and the previous or historical time period is also relative to the current time. Process 1900 can include steps 1902-1914 and can be performed by the controller 1110, according to some embodiments.

Process 1900 includes obtaining one or more input parameters of one or more zones of a building served by an HVAC system (step 1902), according to some embodiments. In some embodiments, step 1902 is similar to step 1802 as described in greater detail above with reference to FIG. 18 but is performed for a future time period. In some embodiments, step 1902 includes defining one or more input parameters for use and obtaining BMS data. In some embodiments, step 1902 is performed using the data model 1202 and the modeling data 1218. In some embodiments, step 1902 is performed by the timeseries resampler 1212.

Process 1900 includes performing a regression technique using operational data to determine key model parameters (step 1904), according to some embodiments. In some embodiments, step 1904 includes using artificial intelligence, machine learning, a neural network, etc., to train, adjust, calibrate, etc., different model parameters (e.g., parameters of an infection risk model). In some embodiments, step 1904 is performed using a predefined model or predefined model parameters (e.g., generic parameters) that is/are adjusted based on operational data obtained from the BMS of the HVAC system to improve an accuracy of simulations or predictions using the model.

Process 1900 includes generating an infection model for the one or more zones of the building served by the HVAC system based on the one or more input parameters (step 1906), according to some embodiments. In some embodiments, step 1906 is the same as or similar to step 1804 of process 1800. In some embodiments, step 1906 is performed using the model parameters that are updated, adjusted, calibrated, determined, etc., in step 1904 using the regression technique and operational data (e.g., actual data of the HVAC system obtained from a BMS).

Process 1900 includes obtaining an occupancy profile for the one or more zones of the building (step 1908), according to some embodiments. In some embodiments, step 1908 is the same as or similar to step 1806 of process 1800 but is performed for a future time period. In some embodiments, step 1908 includes generating the occupancy profile for the zones based on ASHRAE standards and zone scheduling.

Process 1900 includes performing a simulation of the infection model for a future time period (step 1910), according to some embodiments. In some embodiments, step 1910 is the same as or similar to step 1808 of process 1800 but performed for the future time period (e.g., a future time horizon). In some embodiments, the simulation performed in step 1910 is performed at a different periodicity (e.g., the duration of the future time period, and the time steps of the simulation performed at step 1910 are different than the duration of the previous time period and the time steps of the simulation performed at step 1808 of process 1800). In some embodiments, the simulation is performed to determine energy consumption or energy cost and corresponding infection risks for different decision variables (e.g., minimum ventilation setpoint, supply temperature setpoint, etc.).

Process 1900 includes determining one or more infection metrics based on outputs of the simulation (step 1912) and performing a Pareto optimization to determine different Pareto optimal operating points (step 1914), according to some embodiments. In some embodiments, step 1912 is the same as or similar to the step 1810 of process 1800. In some embodiments, step 1914 includes performing steps 1706-1710 of process 1700 as described in greater detail above with reference to FIG. 17. For example, the simulation performed in step 1910 can result in different combinations of energy cost or energy consumption and infection risk for different operating parameters (e.g., for different values of decision variables). The Pareto optimization is performed to determine different Pareto optimal points that may be provided in step 1916 as suggested operating points or as advised operating points, according to some embodiments. In some embodiments, step 1914 includes determining which of the Pareto optimal operating points result in lowest energy cost or energy consumption, lowest infection risk (e.g., highest disinfection), and an equal priority between energy cost or energy consumption and infection risk.

Process 1900 includes operating a display to provide the Pareto optimal points (or a subset thereof) to a user as advisory data (step 1916), according to some embodiments. In some embodiments, step 1916 includes providing the Pareto optimal points associated with lowest or minimal energy cost or energy consumption, lowest or minimal infection risk (e.g., maximum disinfection), and an equal priority Pareto optimal point between energy consumption or cost and infection risk. In some embodiments, the Pareto optimal points are provided as advisory or suggested operating conditions for the future time period.

Combined Analysis and Advisory Process

Referring particularly to FIG. 20 a process 2000 for performing both an infection metric analysis for a previous time period and a Pareto optimization for a future time period is shown, according to some embodiments. In some embodiments, process 2000 includes steps 2002-2010 and is performed by the controller 1110. In some embodiments, process 2000 illustrates the simultaneous performance of process 1800 and process 1900.

Process 2000 includes performing an infection risk and energy cost analysis of an HVAC system for a previous time period to determine analysis data (step 2002) and performing an infection risk and energy cost Pareto optimization of the HVAC system for a future time period to determine advisory data (step 2004), according to some embodiments. In some embodiments, performing step 2002 includes performing process 1800. In some embodiments, performing step 2004 includes performing process 1900. In some embodiments, steps 2002 and 2004 are performed at least partially simultaneously with each other.

Process 2000 includes operating a display to provide both the analysis data and the advisory data to a user (step 2006), according to some embodiments. In some embodiments, step 2006 includes performing steps 1812 and 1916 of processes 1800 and 1900, respectively. In some embodiments, step 2006 is performed by the display device 422. Providing both the analysis data and the advisory data can facilitate a temporal bi-directional informing of the user regarding past operation of the HVAC system (e.g., the HVAC system 300) and suggested future suggestions or advisory control decisions to achieve desired energy costs and infection reduction or acceptable infection risk levels.

Process 2000 includes automatically selecting control decisions or receiving a user input of a selected control decision (step 2008) and operating equipment of an HVAC system according to the control decisions (step 2010), according to some embodiments. In some embodiments, steps 2008 and 2010 are the same as or similar to steps 1714 and 1716 of process 1700.

User Interfaces

Figure 21:
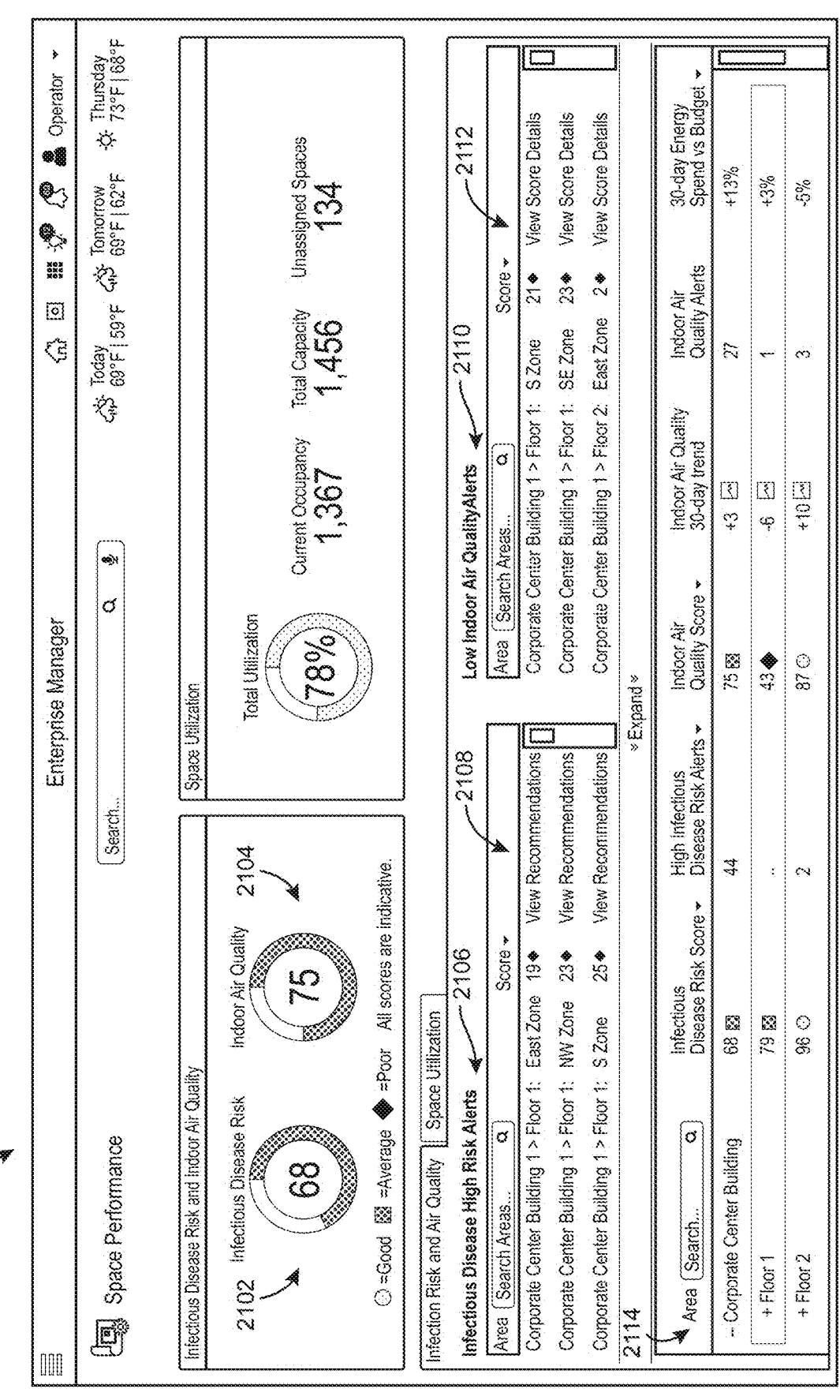
FIG. 21 is a user interface showing results of an infection metric analysis for display on a user device, according to some embodiments.
Figure 22:
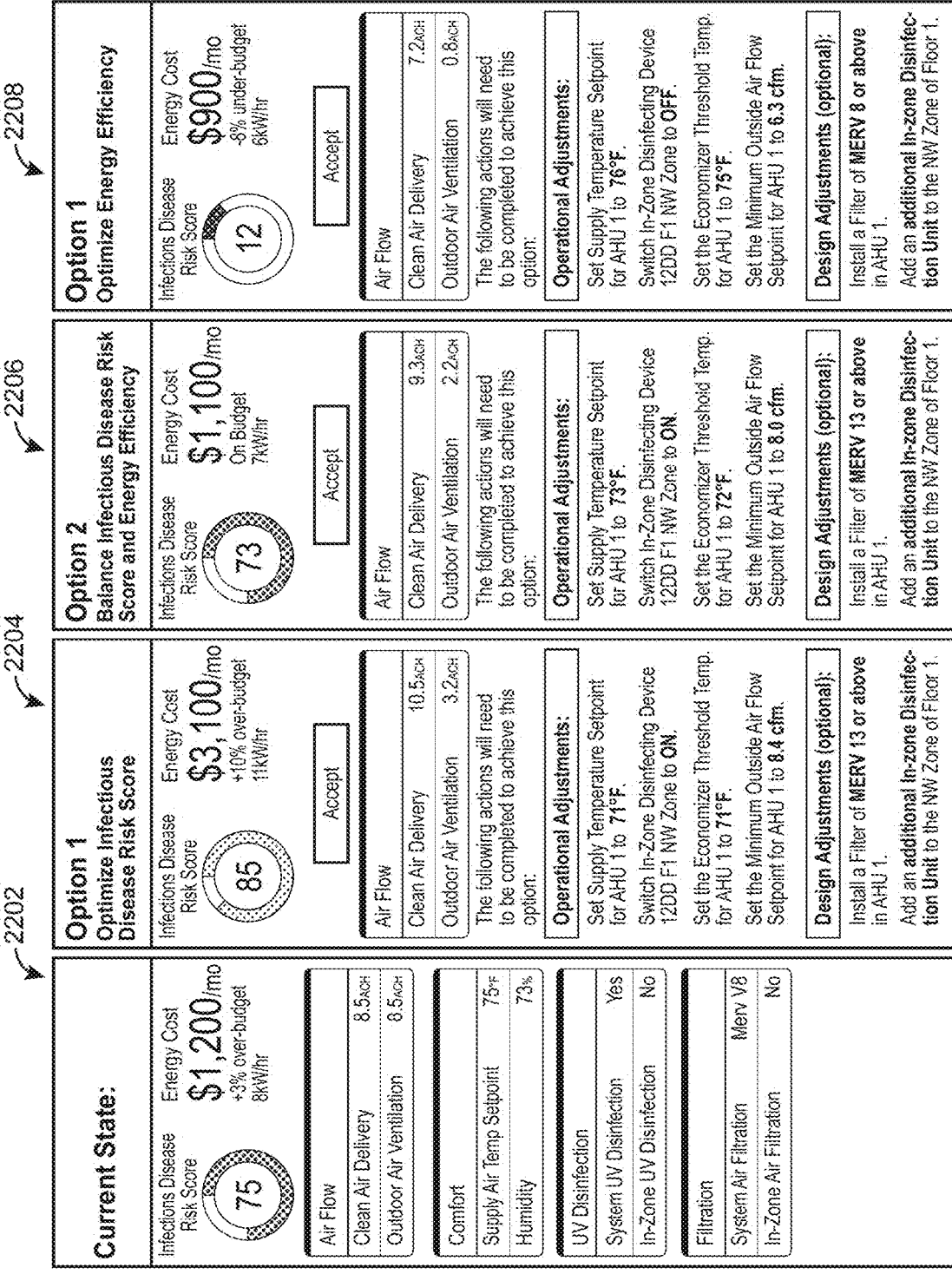
FIG. 22 is a user interface showing results of the Pareto optimization of FIG. 17 or 19, according to some embodiments.
Figure 23:
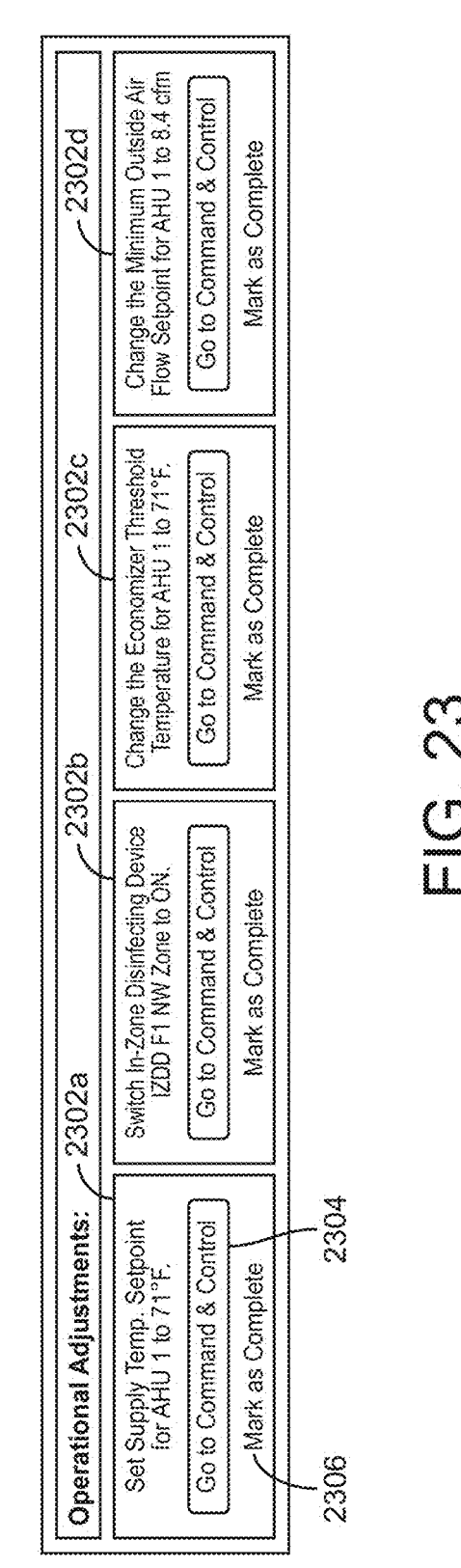
FIG. 23 is a user interface showing operating adjustments for a building administrator to perform as a result of the Pareto optimization of FIG. 17 or 19, according to some embodiments.

Referring particularly to FIGS. 21-23, different user interfaces 2100, 2200, and 2300 display the various outputs of the controller 1110 (e.g., the display data), according to some embodiments. In some embodiments, the user interfaces 2100, 2200, and 2300 are displayed on the display device 422 and presented to a user or a building administrator. The user interface 2100 shows display of the analysis mode outputs 1234, the user interface 2200 shows display of the advisory mode outputs 1240, and the user interface 2300 shows checklists for implementing one of the various options of the advisory mode outputs 1240.

Referring particularly to FIG. 21, the user interface 2100 includes an infectious disease risk score icon 2102, and an indoor air quality score icon 2104. In some embodiments, the infectious disease risk score 2102 is a scaled version of the infection risk for the previous time period. In some embodiments, the infectious disease risk score is a weighted average, a time-series average, etc., of the infection risks of zones of the building 10 over the previous time period. In some embodiments, the indoor air quality score icon 2104 displays a similarly aggregated, average, etc., score of the indoor air quality of the zones of the building 10 over the previous time period. In some embodiments, the values of the infectious disease risk score and the indoor air quality score are normalized values from ranging from 0 or 1 to 100.

In some embodiments, the indoor air quality score icon 1204 and the infectious disease risk score icon 2102 are graphical icons that display a bar or a circle chart and a textual or numeric value of the indoor air quality score and the infectious disease risk score for the zones of the building 10 over the previous time period. In some embodiments, the indoor air quality score icon 1204 and the infectious disease risk score icon 2102 are color-coded based on their values. For example, if the indoor air quality score is between a first or normal range, then the color of the indoor air quality score icon 1204 may be yellow, according to some embodiments. In some embodiments, if the indoor air quality score is between a second range or less than a lower value of the first or normal range, this may indicate that the indoor air quality score is poor and the color of the indoor air quality score icon 2104 may be red. In some embodiments, if the indoor air quality score is between a third range or greater than a higher value of the first or normal range, this may indicate that the indoor air quality score is good and the color of the indoor air quality score 2104 may be green.

Referring still to FIG. 21, the user interface 2100 includes a list 2106 of one or more infectious disease high risk alerts, according to some embodiments. In some embodiments, the list 2106 includes different items 2108, each item corresponding to a different zone of the building 10 and an individual infection risk score associated with the different zones. In some embodiments, the items 2108 of the list 2106 are zone-specific and are determined based on the infectious disease risk score for each of the zones of the building 10. For example, if one of the zones has an associated infectious disease risk score that is below a threshold amount, then that zone may be added with the associated infectious disease risk score to the list 2106 as one of the items 2108.

Referring still to FIG. 21, the user interface 2100 also includes a list 2110 of one or more low indoor air quality alerts, according to some embodiments. In some embodiments, the list 2110 includes different items 2112, each item corresponding to a different zone of the building 10 and an individual indoor air quality associated with the different zones. In some embodiments, the items 2112 of the list 2110 are zone-specific and are determined based on the indoor air quality for each of the zones of the building 10. For example, if one of the zones has an associated indoor air quality that is below a threshold amount, then that zone may be added with the associated indoor air quality to the list 2110 as one of the items 2112.

Referring still to FIG. 21, the user interface 2100 includes a list 2114 of each of the zones of the building 10 (e.g., organized by zone type, floor of the building 10, etc.). Each of the items of the list 2114 includes an indication of the zone or floor, an associated infectious disease risk score for the zone or floor, a number of infectious disease risk alerts for the zone or floor, an indoor air quality score for the zone or floor, an indoor air quality trend (e.g., a 30 day trend), a number of indoor air quality alerts, and/or an energy spend versus budget (e.g., for 30 days).

Referring to FIG. 22, the user interface 2200 includes different widgets 2202-2208 indicating the results of the Pareto optimization (e.g., the advisory mode outputs 1240) as described in greater detail above with reference to FIGS. 11-20. Specifically, the user interface 2200 includes a current operational state widget 2202 illustrating current energy costs and associated infectious disease risk score with additional air flow, comfort, UV disinfection, and filtration specifics, according to some embodiments. The user interface 2200 includes a widget 2204 illustrating a first option, namely, the Pareto optimal result for optimizing the infectious disease risk score (e.g., minimizing infection risk or infection probability such as the maximum disinfection point 1318), a widget 2206 illustrating a second option, namely, the Pareto optimal result for equal priority between disinfection and energy consumption (e.g., the equal priority point 1320), and a widget 2208 illustrating a third option, namely, the Pareto optimal result for operating with minimum energy cost (e.g., the minimum energy consumption point 1322). Each of the widgets 2204-2208 include graphical and/or textual information regarding a corresponding infectious disease risk score, an energy cost per a time period (e.g., a monthly time period), air flow parameters, required operational adjustments, optional design adjustments, etc., for each of the options. In some embodiments, the user or building administrator may select one of the options by selecting one of the widgets 2204-2208.

Referring particularly to FIG. 23, the user interface 2300 illustrates different operational adjustments for the HVAC system 400 that the building administrator should implement in order to configure the HVAC system 400 to perform the selected option, according to some embodiments. The user interface 2300 includes widgets 2302a-2302d, each of which illustrate a next step that should be performed to implement the selected option, according to some embodiments. In some embodiments, each widget 2302 includes a button 2304 which, when selected, navigates the user to a command and control panel where the user or building administrator can perform the specific operational adjustment (e.g., adjusting the supply temperature setpoint). Each widget 2302 also includes a button 2306 which, when selected, marks the task associated with the widget 2302 as completed, according to some embodiments.

Sustainability Metric Techniques

Figure 24:
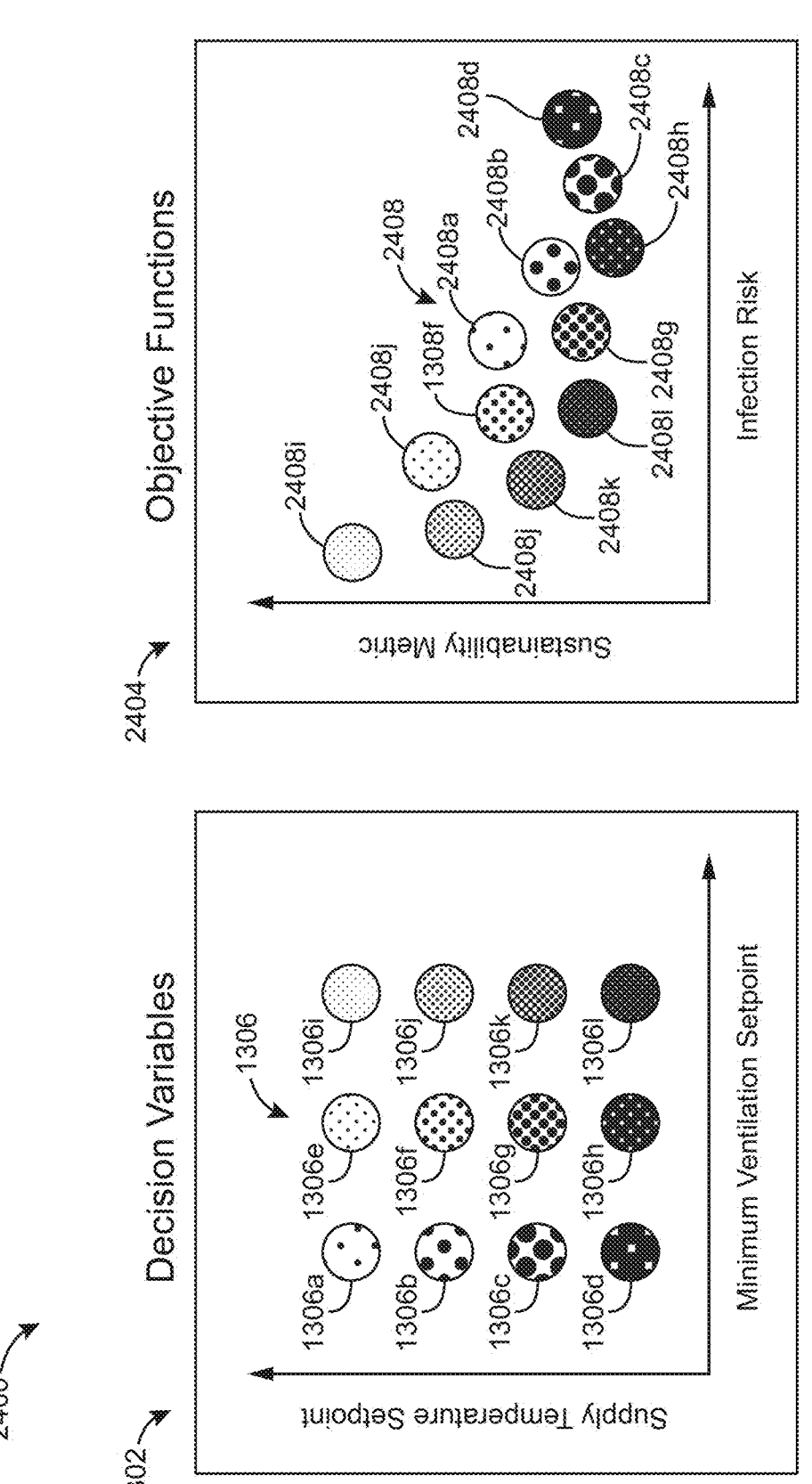
FIG. 24 is a diagram including a first graph that shows different combinations of decision variables, and a second graph that shows simulation results including a sustainability metric and infection risk for each of the different combinations of decision variables, according to some embodiments.
Figure 25:
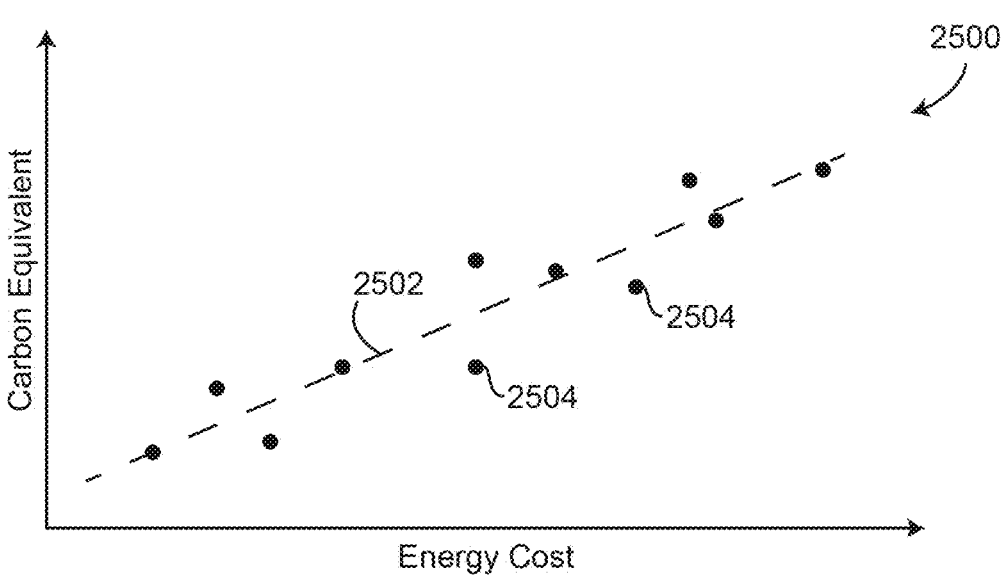
FIG. 25 is a graph showing a relationship between energy cost and a carbon equivalent, according to some embodiments.
Figure 26:
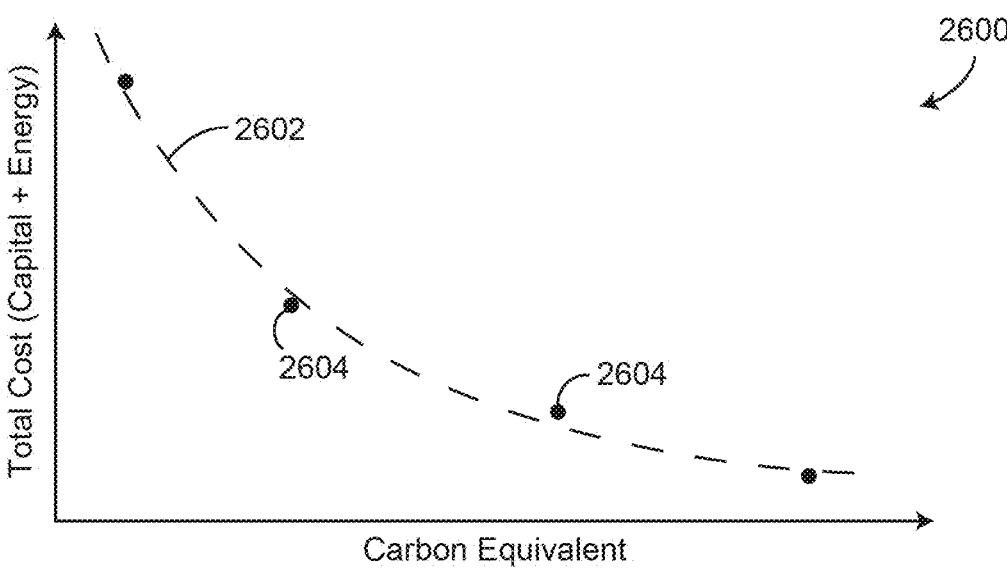
FIG. 26 is another graph showing a relationship between total cost and a carbon equivalent, according to some embodiments.
Figure 30:
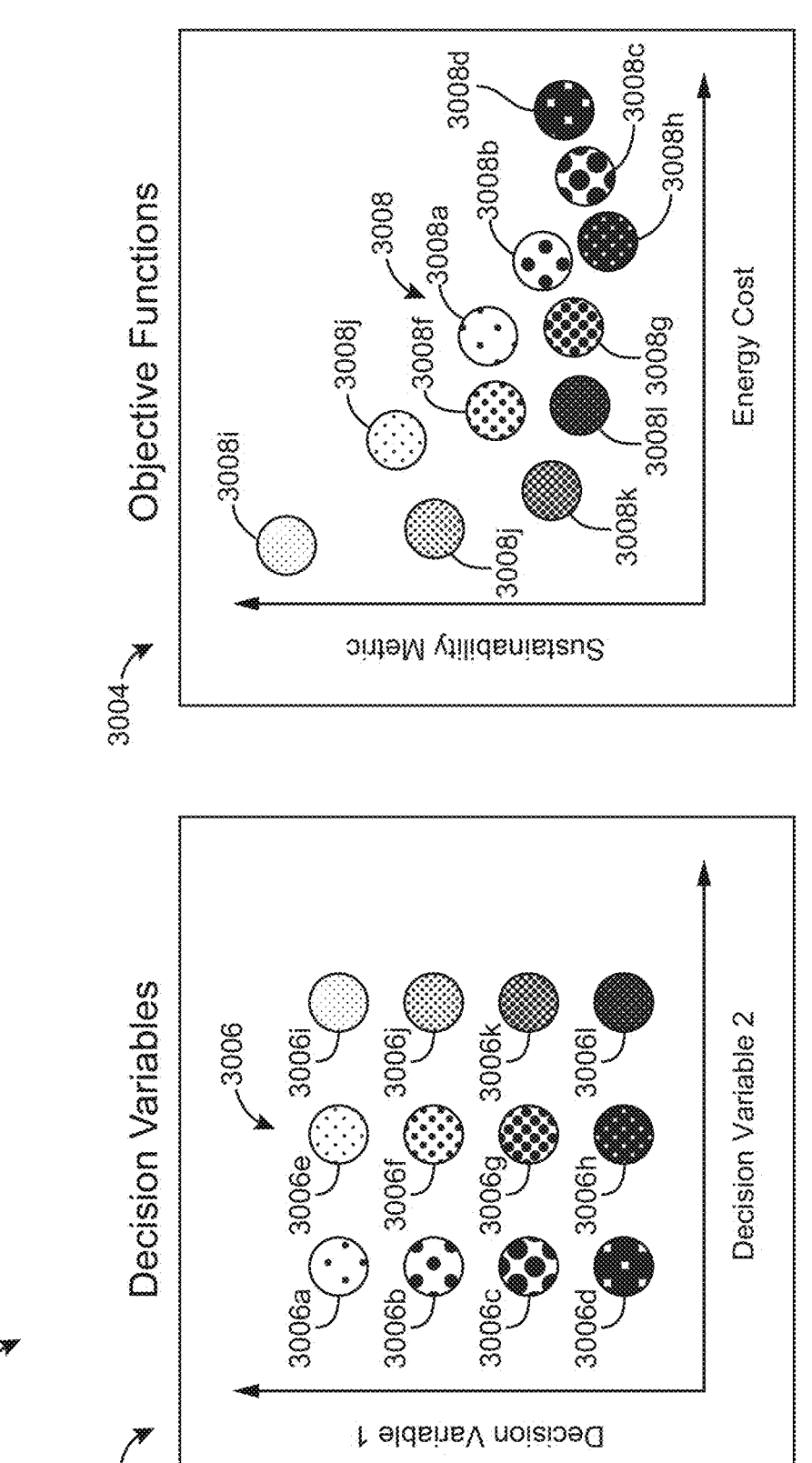
FIG. 30 is a diagram including a first graph that shows different combinations of decision variables, and a second graph that shows simulation results including a sustainability metric and an energy cost for each of the different combinations of decision variables, according to some embodiments.

Referring to FIGS. 24-30, various techniques for performing the Pareto optimization based on a sustainability metric are shown, according to some embodiments. In some embodiments, the sustainability metric can be introduced into the Pareto optimization as a third control objective such that the Pareto optimization considers energy cost, infection risk, and the sustainability metric. In some embodiments, the sustainability metric may replace one of the control objectives discussed above (e.g., replacing energy cost or infection risk) such that the Pareto optimization considers energy cost and the sustainability metric (as shown in FIGS. 26 and 30) or considers infection risk and the sustainability metric (as shown in FIG. 24).

The sustainability metric may include any of a variety of metrics that quantify the performance of a building, campus, or organization with respect to energy sustainability or environmental sustainability. Some examples of sustainability metrics include carbon dioxide ($CO_2$) related metrics (i.e., carbon equivalents) such as carbon emissions, carbon footprint, carbon credits, carbon offsets, and the like. Other examples of sustainability metrics include greenhouse gas emissions (e.g., methane, nitrous oxide, fluorinated gases, etc.), water usage, water pollution, waste generation, ecological footprint, resource consumption, or any other metric that can be used to quantify sustainable building operations. In some embodiments, sustainability metrics can be expressed on a per unit basis such as carbon per number of widgets produced, carbon per volume of product produced, carbon per meals served, carbon per patients treated, carbon per experiments run, carbon per sales revenue, carbon per items shipped, carbon per emails sent, carbon per unit of data processed, carbon per occupant, carbon per occupied room, carbon per normalized utilization value, etc. In some embodiments, sustainability metrics can be generated on an enterprise-wide basis (e.g., one value for the whole enterprise), on a building-by-building basis, on a campus-by-campus basis, by business unit/department, by building system or subsystem (e.g., HVAC, lighting, security, etc.), by control loop (e.g., chiller control loop, AHU control loop, waterside control loop, airside control loop, etc.), by building space (e.g., per room or floor) or by any other division or aggregation. Sustainability metrics can be calculated or generated based on actual or historical building operations or predicted for future building operations using one or more predictive models.

The techniques described herein with reference to FIGS. 24-27 can be performed or implemented by the controller 1110, the functionality of the controller 1110 as shown in the diagram 1200, etc., with the one or more sustainability metrics used in the Pareto optimization as an additional parameter (e.g., an additional degree of freedom for the optimization to thereby result in points that define a Pareto optimal surface), in place of the energy cost or consumption, in place of infection risk, or as a post-processing calculation to determine a sustainability metric or carbon equivalence for the various proposed solutions or operating schedules. Advantageously, the sustainability techniques described herein can be used for at least one of (i) an operational optimization to minimize or to inform a building administrator regarding sustainable building operation, or (ii) a design optimization to determine infrastructure (e.g., building equipment, HVAC equipment, etc.) that results in a cost-effective and sustainable (e.g., reduced carbon emissions) HVAC system infrastructure.

It should be understood that the sustainability metric described herein provides an estimation of how sustainable or environmentally friendly a proposed solution is (e.g., in terms of carbon emissions). Therefore, "high" or "maximum" values of the sustainability metric indicate an increased amount of carbon emissions and decreased or minimal environmental friendliness of the solution, and "low" values of the sustainability metric indicate a decreased amount of carbon emissions and increased or maximal environmental friendliness of the solution. It should further be understood that while FIGS. 24-29 described herein show infection risk being used as one of the optimization objectives (e.g., one of the parameters that is calculated by an objective function), the optimization objectives can also be a combination of the sustainability metric and an energy consumption or energy cost (e.g., as shown in FIG. 30).

Referring particularly to FIG. 24, a diagram 2400 shows the graph 1302 of different decision variables (e.g., supply temperature setpoint and minimum ventilation setpoint), and a graph 2404 that shows corresponding objective function values, shown as points 2408, for each of the different combinations of decision variables. The decision variables 1306 as shown in the graph 1302 of FIG. 24 may be the same as the decision variables 1306 as shown in the graph 1302 of FIG. 13 or any other decision variables that can be adjusted to influence the objective function values. In the embodiment shown in FIG. 24, the objective function values are infection risk and a sustainability metric. In other embodiments, the objective function values may be the sustainability metric and energy cost (described in greater detail with reference to FIG. 30). It is contemplated that any set of objective function values can be used and the teachings of the present disclosure are not limited to the specific examples provided herein. The sustainability metric can be an estimated amount of CO2 emissions that are predicted to occur due to operation according to the minimum ventilation setpoint and supply temperature setpoint, or any other sustainability metric as described in detail above.

The objective function and corresponding predictive models used to define the sustainability metric and the infection risk can be similar to the objective function and predictive models described above with reference to FIGS. 11-20, with the exception that the sustainability metric is calculated/predicted in place of energy cost or consumption (e.g., as shown in the graph 2404). For each combination of the decision variables 1306 (i.e., for each of the points 1306a-1306l), the controller 1110 may perform a simulation to determine corresponding values 2408a-2408l of the control objectives, as described in greater detail above with reference to FIGS. 13-15 and FIGS. 17-20. In this way, the steps of the Pareto optimization as described in greater detail above with reference to FIGS. 13-15 can be performed (e.g., by the controller 1110) using an objective function that predicts a sustainability metric and an infection risk.

In some embodiments, the value of the sustainability metric is calculated or predicted directly using one or more predictive models that define a relationship between the sustainability metric and building control decisions. For example, a predictive model may define the amount of carbon emissions as a function of operating decisions for building equipment (e.g., equipment on/off decisions, operating setpoints, etc.) over the duration of the optimization period. In other embodiments, the value of the sustainability metric can be calculated based on a corresponding amount of energy consumption. In this scenario, the objective function may be the same as the objective function previously described (e.g., an objective function that predicts energy cost or energy consumption as a function of the supply temperature setpoint and the minimum ventilation setpoint), and the resulting value of the objective function (e.g., energy consumption or cost) can be converted to a value of the sustainability metric (e.g., the carbon equivalence) using a conversion relationship. In some embodiments, the conversion relationship is a linear relationship that is used to map energy cost or energy consumption (e.g., for the HVAC system 200) to carbon emissions equivalence or any other sustainability metric.

Referring particularly to FIG. 25, a graph 2500 shows a relationship between energy cost and carbon equivalence for an operational implementation of the Pareto optimization, according to some embodiments. The graph 2500 includes points 2504 and a trendline 2502 that represents the relationship between the energy cost and the carbon equivalent. In some embodiments, the trendline 2502 is a linear relationship (e.g., $y=mx+b$) that can be used to convert between energy cost and carbon equivalent in either direction (e.g., to estimate an energy cost based on carbon emissions, or to estimate carbon emissions of carbon equivalent based on energy cost). In some embodiments, the relationship shown in FIG. 25 is used to convert an output of the objective function from energy consumption to the carbon equivalent prior to performing the Pareto optimization described in greater detail above with reference to FIGS. 13-15, in process 1700, process 1900, etc. In some embodiments, the relationship shown in FIG. 25 is used when the controller 1110 is implemented in an on-line mode for an operational optimization.

Referring particularly to FIG. 26, a graph 2600 shows a relationship between total cost (e.g., a sum of capital expenses for purchase and installation of equipment, and energy cost associated with operating the equipment) and carbon equivalent is shown, according to some embodiments. In some embodiments, the relationship shown in FIG. 26 is used for an off-line implementation of the controller 1110 (e.g., when the functionality of the controller is implemented as a design tool or used to determine what equipment should be purchased). The graph 2600 includes points 2604 and a curve fit 2602 that illustrates the relationship between the total cost and the carbon equivalent (e.g., a curve fit approximation of the points 2604). In some embodiments, the relationship between total cost and the carbon equivalent is used by the controller 1110 when the capital cost is affected by a decision variable or depends on a decision variable (e.g., when the controller 1110 is used to determine what equipment should be purchased or used, or to provide a recommendation to a building administrator regarding what equipment should be purchased). In some embodiments, the relationship as shown in FIG. 26 illustrates that as the carbon equivalent increases, a significant tradeoff between carbon emissions and total cost may occur (e.g., the total cost may be significantly reduced but cause increasingly higher carbon equivalents).

Figure 27:
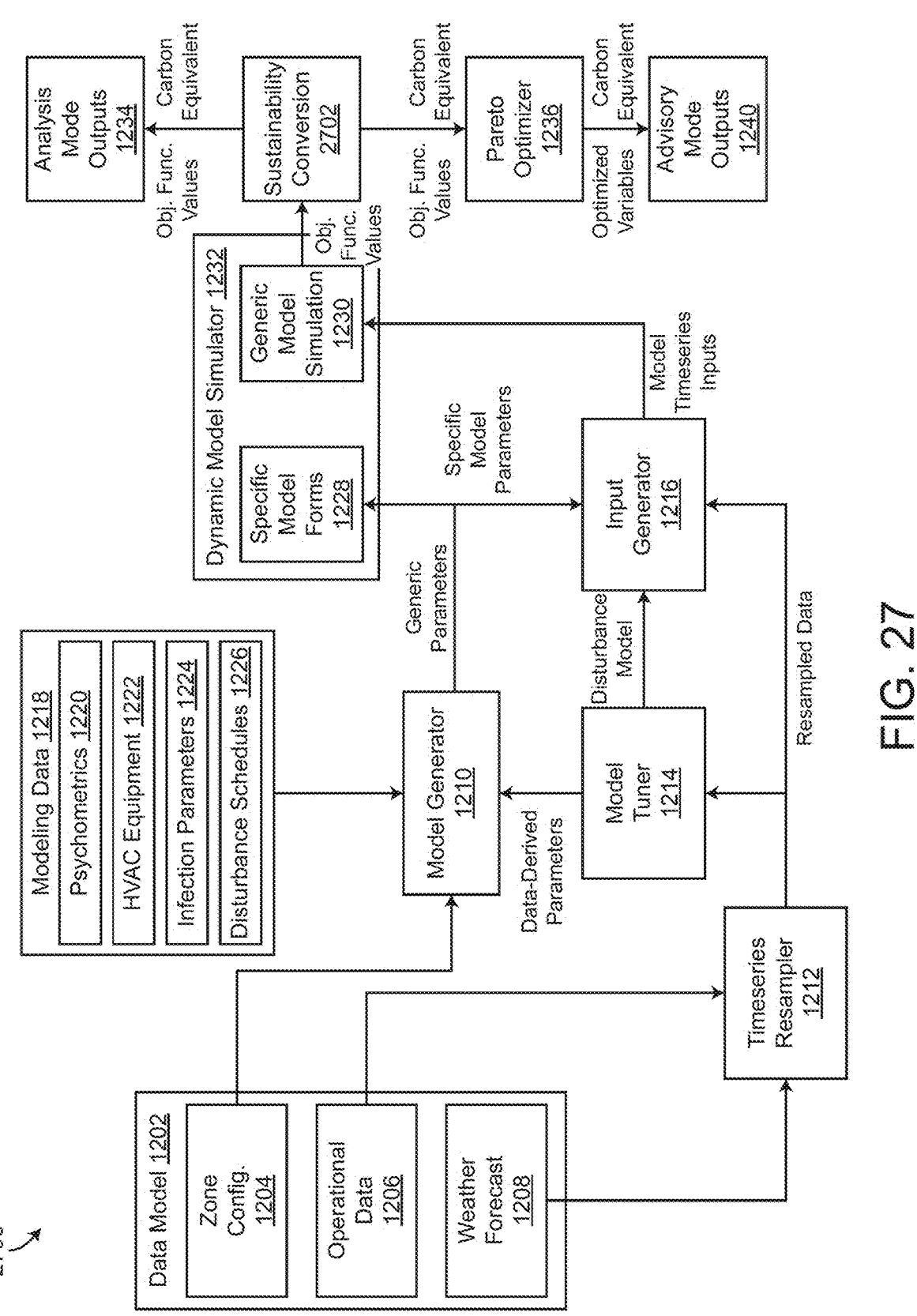
FIG. 27 is a block diagram illustrating the functionality of the controller of FIG. 11 including functionality for converting between energy cost and a sustainability metric, according to some embodiments.

Referring to FIG. 27, the diagram 1200 that illustrates the functionality of the controller 1110 (see e.g., FIG. 12, above) is shown as diagram 2700, modified to account for sustainability instead of energy cost or energy consumption, according to some embodiments. In some embodiments, the components of the diagram 2700 are the same as the components of the diagram 1200 but with an additional sustainability conversion 2702 that is performed either (i) using an output of the dynamic model simulator 1232 to convert the resulting objective function values into a sustainability metric (e.g., CO2 emission or carbon equivalent), (ii) using an output of the Pareto optimizer 1236 to convert the optimized values to a sustainability metric (e.g., CO2 emission or carbon equivalent) so that at least one of the optimized values in terms of energy cost or energy consumption or the carbon equivalent is provided to the user as the advisory mode outputs 1240 or the analysis mode outputs 1234, or (iii) using a different generic model simulation 1230 that predicts the sustainability metric as a function of one or more decision variables, or incorporates a conversion between energy consumption or cost and the sustainability metric.

As shown in FIG. 27, the sustainability conversion 2702 can be implemented using an output of the dynamic model simulator 1232 to convert the objective function values from being in terms of energy cost or energy consumption to being in terms of the sustainability metric. In some embodiments, the sustainability conversion 2702 is configured to receive values of the objective function from the dynamic model simulator 1232 (e.g., values of energy cost or energy consumption) and determine a corresponding or equivalent value of a sustainability metric such as carbon or CO2 emissions. In some embodiments, the sustainability conversion 2702 or any of the other sustainability conversions described herein is/are implemented using the linear relationship shown in FIG. 25 or using the curve-fit relationship as shown in FIG. 26. In some embodiments, the linear relationship shown in FIG. 25 is implemented when the controller 1110 operates to perform operational optimizations, and the curve-fit relationship as shown in FIG. 26 is implemented when the controller 1110 operates to perform building design and operational optimization. In some embodiments, the sustainability conversion 2702 is implemented using outputs of the Pareto optimizer 1236, or as part of a post-process when providing the analysis mode outputs 1234 or the advisory mode outputs 1240 to the user.

Referring still FIGS. 27, 4-5, and 11, the functionality of the sustainability conversion 2702 can be performed in an on-demand manner in response to a user input, according to some embodiments. In some embodiments, the user can provide an input to the controller 1110 to transition use of the sustainability conversion 2702 or to toggle the controller 1110 from operating using an objective function that predicts energy consumption or energy cost, and an objective function that predicts the sustainability metric. In this way, the dynamic model simulator 1232 can be transitioned between performing a simulation for energy consumption or energy cost (e.g., the objective function values) and performing a simulation for a sustainability metric. In some embodiments, the functionality of the sustainability conversion 2702 is performed as a display feature. For example, the Pareto optimal values may be provided to the user (e.g., via the display device 422, a user interface, a display screen, etc.) in terms of energy consumption or energy cost, and can be toggled (e.g., in response to a user input) to the sustainability metric (e.g., using the linear relationship shown in FIG. 25) in response to a user input. In this way, the user can use either energy consumption, energy cost, or the sustainability metric to determine which control decisions to select. In some embodiments, the controller 1110 operates to provide both the sustainability metric and the energy cost or consumption to the user (e.g., via the display device 422) without requiring a user input.

Referring to FIGS. 13 and 24, all of the infection risk, the energy cost or consumption, and the sustainability metric can be used to determine objective function values based on one or more decision variables, according to some embodiments. Specifically, while FIGS. 13 and 24 show only two objective function values (e.g., predicted energy cost/consumption and predicted infection risk in FIG. 13, and predicted sustainability metric and predicted infection risk in FIG. 24), the objective function values may be combined so that more than two objective function values are used to assess Pareto optimality of the different combinations of decision variables. In some embodiments, the sustainability metric, the energy cost or consumption, and the infection risk are calculated using several different objective functions to determine a surface of points (e.g., each point having a value of the sustainability metric, the infection risk, and the energy cost or consumption). The subsequent steps of determining feasible points, and the various Pareto optimal points can be performed by the controller 1110 similarly as described above but using the surface graph. In some embodiments, the equal priority point is an equal priority between the sustainability metric, the infection risk, and the energy cost or consumption, and may be an inflection point of the surface of feasible points that is identified by the controller 1110.

Referring particularly to FIG. 28, a process 2800 shows the process 1700 modified to use the sustainability metric in place of the energy cost or energy consumption, according to some embodiments. In some embodiments, the process 2800 is the same as the process 1700 but includes an additional step 2802 performed using the outputs of the simulation performed in step 1704. Process 2800 includes converting values of the energy cost and infection risk to values of a sustainability metric and infection risk (step 2802), according to some embodiments. In some embodiments, step 2802 includes using either of the relationships shown in FIGS. 25 and 26 to convert the energy cost or energy consumption resulting from the simulations into a corresponding value of carbon emissions (e.g., the sustainability metric).

Process 2800 also includes modified steps 2804, 2806, and 2808, and steps 1712-1716 of process 1700, according to some embodiments. In some embodiments, the modified step 2804 is the same as the step 1706 but is performed based on the sustainability metric instead of the energy cost. Similarly, step 2806 can be the same as or similar to the step 1708 but performed to determine Pareto optimal solutions based on the sustainability metric. Finally, step 2808 can be the same as the step 1710 of the process 1700 but performed to determined various of the Pareto optimal points (e.g., a minimum sustainability metric solution, a maximum disinfection solution, and an equal priority sustainability/disinfection solution), according to some embodiments. In some embodiments, the step 2802 is incorporated in the step 1704, or the simulation is performed to determine sets of values of the sustainability metric and the infection risk directly. In such an implementation, step 2802 can be performed to determine energy cost or energy consumption based on the determined values of the sustainability metric.

Referring particularly to FIG. 29, a process 2900 for performing a Pareto optimization while accounting for the sustainability metric of an HVAC system, the energy cost, and an infection risk is shown, according to some embodiments. Process 2900 includes steps 2902-2916 and can be the same as or similar to the steps 1702-1716 of process 1700. Process 2900 differs from the process 1700 in that the process 2900 is performed for three objective function values (the energy cost, the sustainability metric, and the infection risk) instead of only two objective function values (the energy cost and the infection risk).

Particularly, process 2900 includes performing a simulation for each set of the values of the control decision variables to determine sets of values of energy cost, a sustainability metric, and infection risk (step 2904), according to some embodiments. In some embodiments, step 2904 is performed by the controller 1110 similarly to step 1704 but for several objective function values (e.g., optimization objectives). In some embodiments, step 2904 is performed using multiple objective functions, namely, an objective function that estimates energy cost based on the control decision variables, an objective function that estimates a sustainability metric based on the control decision variables, and an objective function that estimates or predicts infection risk based on the control decision variables. In some embodiments, the objective function used to predict the sustainability metric is the same as the objective function used to predict the energy cost but with an additional conversion factor or function to convert the energy cost to the sustainability metric.

Process 2900 includes determining which of the sets of values of energy cost, the sustainability metric, and the infection risk are infeasible and which are feasible (step 2906), according to some embodiments. In some embodiments, the sets of values of energy cost, sustainability metric, and the infection risk are used to construct a surface or 3-d plot. In some embodiments, the step 2906 includes comparing various values of the control decision variables, or values of any of the energy cost, the sustainability metric, or the infection risk to constraints (e.g., user-specified constraints, system operating constraints, etc.) to determine which of the sets of values of the energy cost, the sustainability metric, or the infection risk are feasible or infeasible.

Process 2900 includes determining which of the feasible sets of values of energy cost, the sustainability metric, and the infection risk are Pareto optimal solutions (step 2908), according to some embodiments. In some embodiments, step 2908 is performed similarly to step 1708 of process 1700 but also accounting for the sustainability metric. In some embodiments, the Pareto optimal solutions are curves that define multiple Pareto optimal solutions. Process 2900 includes determining, based on the Pareto optimal solutions, a minimum energy cost solution, a maximum disinfection solution, a minimum sustainability metric solution, and an equal priority solution (step 2910), according to some embodiments. In some embodiments, step 2910 is similar to step 1710 but also accounts for the sustainability metric. In some embodiments, the Pareto optimal solutions are curves that define multiple Pareto optimal solutions along the surface graph in terms of the minimum energy cost solution, the maximum disinfection solution, the minimum sustainability metric solution, and the equal priority solution. In some embodiments, the equal priority solution is an equal priority between the energy cost, the infection risk, and the sustainability metric.

Process 2900 includes steps 2912-2916 that are the same as or similar to steps 1712-1716 but also including display and accordingly user selection of options that take into account the sustainability metric. In some embodiments, only one of the sustainability metric or the energy cost is displayed to the user via the display screen, and the user may toggle between the sustainability metric and the energy cost for the different proposed solutions to facilitate proper selection.

Referring to FIG. 30, another diagram 3000 shows a graph 3002 of different decision variables, and a graph 3004 of corresponding objective function values for each of the different decision variables. The graph 3002 can be the same as or similar to the graph 1302 as described in greater detail above with reference to FIG. 13. As shown in FIG. 30, the graph 3002 shows different combinations for a first decision variable (the Y-axis) and a second decision variable (the X-axis) for the HVAC system 300, illustrated as points 3006, according to some embodiments. In some embodiments, the first decision variable and the second decision variable are minimum temperature setpoint and minimum ventilation setpoint for the HVAC system 300. It should be understood that the decision variables 3006 are not limited to the minimum temperature setpoint and the minimum ventilation setpoint and may be any other setpoints, operating parameters, etc., such as temperature setpoints, humidity setpoints, comfort parameters, HVAC operating parameters, etc. The points 3006 are shown to include points 3006a-30061, each point corresponding to a different pair of objective function values.

In some embodiments, a simulation is performed using one or more dynamic models to determine one or more corresponding values of Pareto optimization objectives (e.g., values of the sustainability metric and the energy cost) for each of the decision variables, represented by the points 3006. In some embodiments, the corresponding values of the Pareto optimization objectives are shown as points 3008, including points 3008a-30081. Each of the points 3008a-3081 correspond to one of the points 3006a-3061. In some embodiments, the one or more dynamic models include models that predict energy cost and/or the sustainability metric as a function of both the first decision variable and the second decision variable. In some embodiments, the points 3008 are determined by the dynamic model simulator 1232 based on the different values of the first decision variable and the second decision variable using one or more dynamic models.

The points 3008 can be used by the Pareto optimizer 1236 or the Pareto optimizer 1112 to determine which of the points 3008 are feasible and in-feasible, and to further determine which of the feasible points 3008 are Pareto optimal points in terms of sustainability (e.g., a Pareto optimal point having a lowest value of the sustainability metric), energy cost (e.g., a Pareto optimal point having a lowest value of energy cost), or an equal priority Pareto point that optimizes both the sustainability metric and the energy cost equally, according to some embodiments. In some embodiments, the sustainability metric accounts for operational carbon emissions (e.g., if the Pareto optimization is performed in the context of an operational tool) or accounts for carbon emissions resulting from both operation of the HVAC system 300 and/or installing equipment in the HVAC system 300 (e.g., if the Pareto optimization is performed in the context of a design tool). In some embodiments, the points 3008 are used for selection or determination of the various Pareto optimal points. These Pareto optimal points may be automatically selected for use by the HVAC system 300 or may be presented to a building administrator for selection thereof. Each of the Pareto optimal points corresponds to different values of the decision variables or schedules of decision variables over a time period (e.g., setpoints over a future time period) and selection of one of the Pareto optimal points of the points 3008 results in the selection of the corresponding decision variables or schedules of the decision variables.

Once a particular Pareto optimal point of the Pareto optimal points 3008 are selected, the controller 1110 or the controller 310 generates control signals for the HVAC system 300 to operate the HVAC system 300 according to the selected Pareto optimal point (e.g., according to the corresponding combination of decision variables or the corresponding schedule of the decision variables over a time horizon such as a future time horizon).

Indoor Air Quality (IAQ) Analysis System

Figure 31:
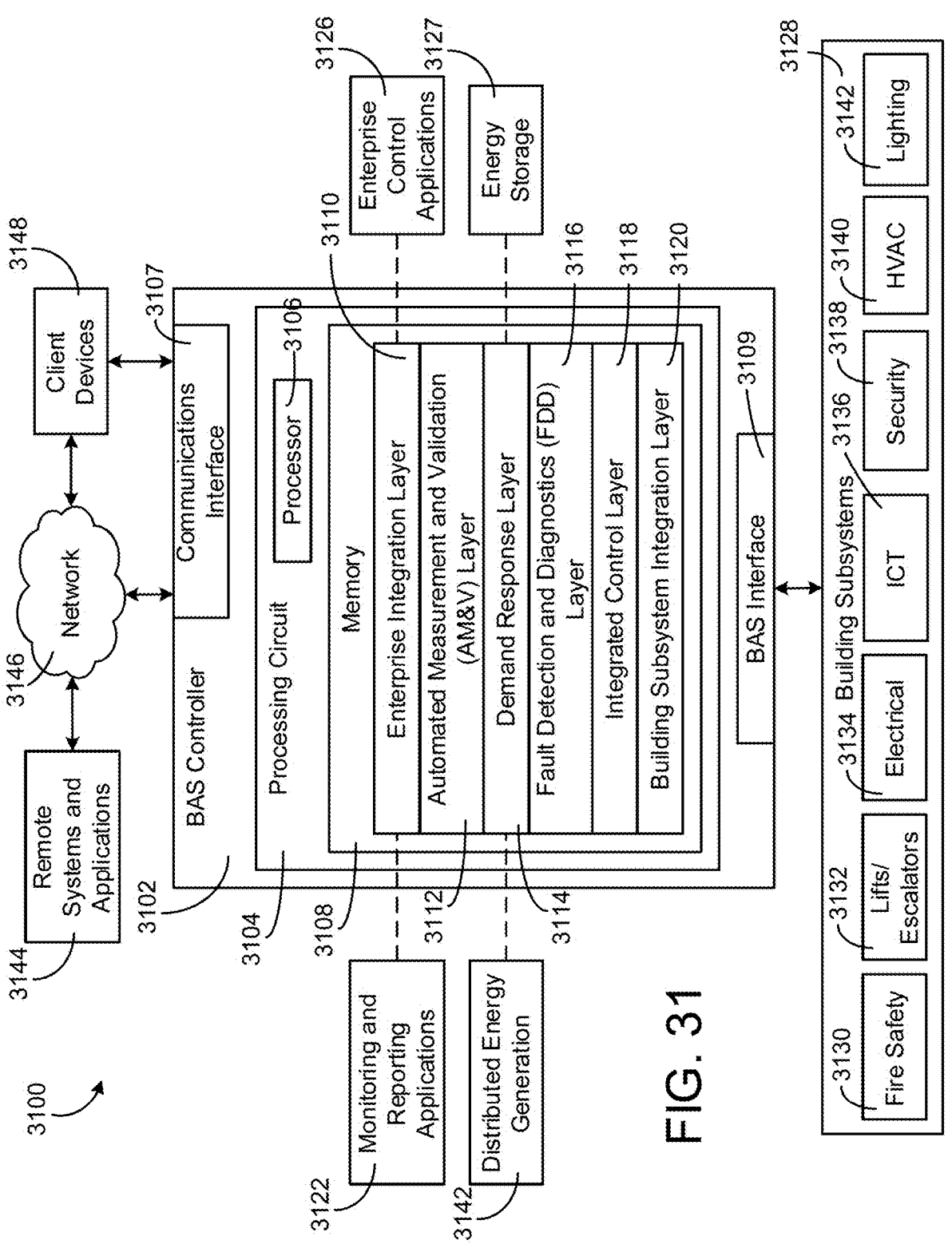
FIG. 31 is a block diagram of a building automation system (BAS) that may be used to monitor and/or control the building of FIG. 1, according to an exemplary embodiment.

Referring now to FIG. 31, a block diagram of a building automation system (BAS) 3100 is shown, according to an exemplary embodiment. BAS 3100 can be implemented in building 10 to automatically monitor and control various building functions. BAS 3100 (including similar features and functionality of controller 310 and BMS controller 266 as described herein) is shown to include BAS controller 3102 and building subsystems 3128. Building subsystems 3128 are shown to include a building electrical subsystem 3134, an information communication technology (ICT) subsystem 3136, a security subsystem 3138, a HVAC subsystem 3140, a lighting subsystem 3142, a lift/escalators subsystem 3132, and a fire safety subsystem 3130. In various embodiments, building subsystems 3128 can include fewer, additional, or alternative subsystems. For example, building subsystems 3128 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 3128 include a waterside system and/or an airside system. A waterside system and an airside system are described with further reference to U.S. patent application Ser. No. 15/631,830 filed Jun. 23, 2017, the entirety of which is incorporated by reference herein.

Each of building subsystems 3128 can include any number of devices, controllers, and connections for completing its individual functions and control activities. HVAC subsystem 3140 can include many of the same components as HVAC system 100, as described with reference to FIG. 1. For example, HVAC subsystem 3140 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 3142 can include any number of light fixtures, ballasts, lighting sensors, dimmers, or other devices configured to controllably adjust the amount of light provided to a building space. Security subsystem 3138 can include occupancy sensors, video surveillance cameras, digital video recorders, video processing servers, intrusion detection devices, access control devices and servers, or other security-related devices.

Still referring to FIG. 31, BAS controller 3102 is shown to include a communications interface 3107 and a BAS interface 3109 (both interface including similar features and functionality of interface 2100, 2200, and 2300 as described above). Interface 3107 can facilitate communications between BAS controller 3102 and external applications (e.g., monitoring and reporting applications 3122, enterprise control applications 3126, remote systems and applications 3144, applications residing on client devices 3148, etc.) for allowing user control, monitoring, and adjustment to BAS controller 3102 and/or subsystems 3128. Interface 3107 can also facilitate communications between BAS controller 3102 and client devices 3148. BAS interface 3109 can facilitate communications between BAS controller 3102 and building subsystems 3128 (e.g., HVAC, lighting security, lifts, power distribution, business, etc.).

Interfaces 3107, 3109 can be or include wired or wireless communications interfaces (e.g., jacks, antennas, transmitters, receivers, transceivers, wire terminals, etc.) for conducting data communications with building subsystems 3128 or other external systems or devices. In various embodiments, communications via interfaces 3107, 3109 can be direct (e.g., local wired or wireless communications) or via a communications network 3146 (e.g., a WAN, the Internet, a cellular network, etc.). For example, interfaces 3107, 3109 can include an Ethernet card and port for sending and receiving data via an Ethernet-based communications link or network. In another example, interfaces 3107, 3109 can include a Wi-Fi transceiver for communicating via a wireless communications network. In another example, one or both of interfaces 3107, 3109 can include cellular or mobile phone communications transceivers. In one embodiment, communications interface 3107 is a power line communications interface and BAS interface 3109 is an Ethernet interface. In other embodiments, both communications interface 3107 and BAS interface 3109 are Ethernet interfaces or are the same Ethernet interface.

Still referring to FIG. 31, BAS controller 3102 is shown to include a processing circuit 3104 including a processor 3106 and memory 3108. Processing circuit 3104 can be communicably connected to BAS interface 3109 and/or communications interface 3107 such that processing circuit 3104 and the various components thereof can send and receive data via interfaces 3107, 3109. Processor 3106 can be implemented as a general purpose processor, an application specific integrated circuit (ASIC), one or more field programmable gate arrays (FPGAs), a group of processing components, or other suitable electronic processing components.

Memory 3108 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 3108 can be or include volatile memory or non-volatile memory. Memory 3108 can include database components, object code components, script components, or any other type of information structure for supporting the various activities and information structures described in the present application. According to an exemplary embodiment, memory 3108 is communicably connected to processor 3106 via processing circuit 3104 and includes computer code for executing (e.g., by processing circuit 3104 and/or processor 3106) one or more processes described herein.

In some embodiments, BAS controller 3102 is implemented within a single computer (e.g., one server, one housing, etc.). In various other embodiments BAS controller 3102 can be distributed across multiple servers or computers (e.g., that can exist in distributed locations). Further, while FIG. 31 shows applications 3122 and 3126 as existing outside of BAS controller 3102, in some embodiments, applications 3122 and 3126 can be hosted within BAS controller 3102 (e.g., within memory 3108).

Still referring to FIG. 31, memory 3108 is shown to include an enterprise integration layer 3110, an automated measurement and validation (AM&V) layer 3112, a demand response (DR) layer 3114, a fault detection and diagnostics (FDD) layer 3116, an integrated control layer 3118, and a building subsystem integration later 3120. Layers 3110-3120 is configured to receive inputs from building subsystems 3128 and other data sources, determine optimal control actions for building subsystems 3128 based on the inputs, generate control signals based on the optimal control actions, and provide the generated control signals to building subsystems 3128 in some embodiments. The following paragraphs describe some of the general functions performed by each of layers 3110-3120 in BAS 3100.

Enterprise integration layer 3110 can be configured to serve clients or local applications with information and services to support a variety of enterprise-level applications. For example, enterprise control applications 3126 can be configured to provide subsystem-spanning control to a graphical user interface (GUI) or to any number of enterprise-level business applications (e.g., accounting systems, user identification systems, etc.). Enterprise control applications 3126 can also or alternatively be configured to provide configuration GUIs for configuring BAS controller 3102. In yet other embodiments, enterprise control applications 3126 can work with layers 3110-3120 to optimize building performance (e.g., efficiency, energy use, comfort, or safety) based on inputs received at interface 3107 and/or BAS interface 3109 (e.g., such as HVAC equipment data 1222, infection parameters 1324, and disturbance schedules 1226).

Building subsystem integration layer 3120 can be configured to manage communications between BAS controller 3102 and building subsystems 3128. For example, building subsystem integration layer 3120 can receive sensor data and input signals from building subsystems 3128 and provide output data and control signals to building subsystems 3128. Building subsystem integration layer 3120 can also be configured to manage communications between building subsystems 3128. Building subsystem integration layer 3120 translate communications (e.g., sensor data, input signals, output signals, etc.) across multi-vendor/multi-protocol systems.

Demand response layer 3114 can be configured to optimize resource usage (e.g., electricity use, natural gas use, water use, etc.) and/or the monetary cost of such resource usage in response to satisfy the demand of building 10. The demand response layer 3114 can include similar features and functionality as data model 1202, Pareto optimizer 1236, and/or optimization manager 412). The optimization can be based on time-of-use prices, curtailment signals, energy availability, or other data received from utility providers, distributed energy generation systems 3124, from energy storage 3127, or from other sources. Demand response layer 3114 can receive inputs from other layers of BAS controller 3102 (e.g., building subsystem integration layer 3120, integrated control layer 3118, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 3114 includes control logic for responding to the data and signals it receives. These responses can include communicating with the control algorithms in integrated control layer 3118, changing control strategies, changing setpoints, or activating/deactivating building equipment or subsystems in a controlled manner. Demand response layer 3114 can also include control logic configured to determine when to utilize stored energy. For example, demand response layer 3114 can determine to begin using energy from energy storage 3127 just prior to the beginning of a peak use hour.

In some embodiments, demand response layer 3114 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 3114 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 3114 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable setpoint adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 3118 can be configured to use the data input or output of building subsystem integration layer 3120 and/or demand response later 3114 to make control decisions. Due to the subsystem integration provided by building subsystem integration layer 3120, integrated control layer 3118 can integrate control activities of the subsystems 3128 such that the subsystems 3128 behave as a single integrated supersystem. In an exemplary embodiment, integrated control layer 3118 includes control logic that uses inputs and outputs from building subsystems to provide greater comfort and energy savings relative to the comfort and energy savings that separate subsystems could provide alone. For example, integrated control layer 3118 can be configured to use an input from a first subsystem to make an energy-saving control decision for a second subsystem. Results of these decisions can be communicated back to building subsystem integration layer 3120.

Integrated control layer 3118 is shown to be logically below demand response layer 3114. Integrated control layer 3118 can be configured to enhance the effectiveness of demand response layer 3114 by enabling building subsystems 3128 and their respective control loops to be controlled in coordination with demand response layer 3114. This configuration can reduce disruptive demand response behavior relative to conventional systems. For example, integrated control layer 3118 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 3118 can be configured to provide feedback to demand response layer 3114 so that demand response layer 3114 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 3118 is also logically below fault detection and diagnostics layer 3116 and automated measurement and validation layer 3112. Integrated control layer 3118 can be configured to provide calculated inputs (e.g., aggregations) to these higher levels based on outputs from more than one building subsystem.

Automated measurement and validation (AM&V) layer 3112 can be configured to verify that control strategies commanded by integrated control layer 3118 or demand response layer 3114 are working properly (e.g., using data aggregated by AM&V layer 3112, integrated control layer 3118, building subsystem integration layer 3120, FDD layer 3116, or otherwise). The calculations made by AM&V layer 3112 can be based on building system energy models and/or equipment models for individual BAS devices or subsystems. For example, AM&V layer 3112 can compare a model-predicted output with an actual output from building subsystems 3128 to determine an accuracy of the model.

Fault detection and diagnostics (FDD) layer 3116 can be configured to provide on-going fault detection for building subsystems 3128, building subsystem devices (i.e., building equipment), and control algorithms used by demand response layer 3114 and integrated control layer 3118. FDD layer 3116 can receive data inputs from integrated control layer 3118, directly from one or more building subsystems or devices, or from another data source. FDD layer 3116 can automatically diagnose and respond to detected faults. The responses to detected or diagnosed faults can include providing an alarm message to a user, a maintenance scheduling system, or a control algorithm configured to attempt to repair the fault or to work-around the fault.

FDD layer 3116 can be configured to output a specific identification of the faulty component or cause of the fault (e.g., loose damper linkage) using detailed subsystem inputs available at building subsystem integration layer 3120. In other exemplary embodiments, FDD layer 3116 is configured to provide "fault" events to integrated control layer 3118 which executes control strategies and policies in response to the received fault events. According to an exemplary embodiment, FDD layer 3116 (or a policy executed by an integrated control engine or business rules engine) can shut-down systems or direct control activities around faulty devices or systems to reduce energy waste, extend equipment life, or assure proper control response.

FDD layer 3116 can be configured to store or access a variety of different system data stores (or data points for live data). FDD layer 3116 can use some content of the data stores to identify faults at the equipment level (e.g., specific chiller, specific AHU, specific terminal unit, etc.) and other content to identify faults at component or subsystem levels. For example, building subsystems 3128 can generate temporal (i.e., time-series) data indicating the performance of BAS 3100 and the various components thereof. The data generated by building subsystems 3128 can include measured or calculated values that exhibit statistical characteristics and provide information about how the corresponding system or process (e.g., a temperature control process, a flow control process, etc.) is performing in terms of error from its setpoint. These processes can be examined by FDD layer 3116 to expose when the system begins to degrade in performance and alarm a user to repair the fault before it becomes more severe.

Figure 32:
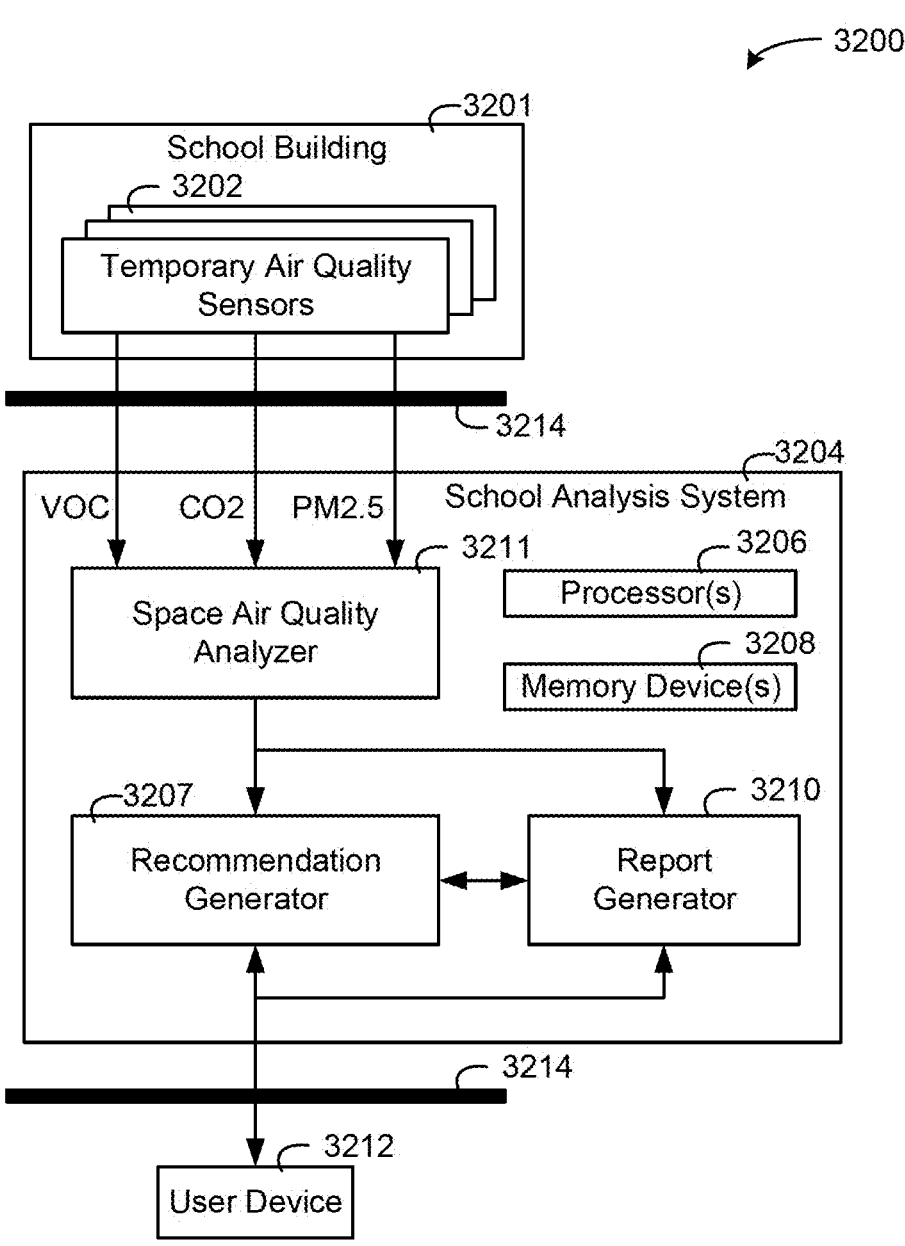
FIG. 32 is a block diagram of a school analysis system that generates recommendations and reports of spaces of a school building based on air quality measurements of sensors, according to an exemplary embodiment.

Referring now to FIG. 32, a system 3200 including a school analysis system 3204 that generates recommendations and reports for spaces of a school building 3201 based on air quality measurements of sensors 3202 is shown, according to an exemplary embodiment. It should be understood the school building 3201 could be different building such a hospital building, stadium, office building, etc. A technician can install the sensors 3202 in the school building 3201 on a temporary basis, e.g., for one week, two weeks, a month, etc. The sensors 3202 can be spread out through various spaces of the school building 3201 in order to record air quality measurements of each space of the school building 3201. In some embodiments, the school building 3201 can be an office building, a commercial building, an apartment building, a hospital, etc. The systems and methods discussed herein can be applied to various types of and are not limited to school buildings.

Each sensor of the temporary air quality sensors 3202 (including similar features and functionality of zone sensors 312 and ambient sensors 314) can measure one or multiple air quality metrics, e.g., can include one sensors or a set of sensors. For example, the sensors 3202 can measure ventilation for a space, occupancy for a space, $CO_2$ for a space, particulate matter PM10 for a space, particulate matter PM2.5 for a space, volatile organic compounds (VOC) for the space, total volatile organic compound (TVOC) for the space, thermal measurements for the space, temperature for the space, relative humidity for the space, dew point for the space, ozone for the space, carbon monoxide (CO) for the space, formaldehyde for the space, etc. In some embodiments, the sensors 3202 are permanent sensors that are installed in a permanent manner. In this regard, if the sensors 3202 are permanent, the reports and/or recommendations can be generated over a requested period of time, e.g., a particular day, week, year, etc.

The measurements of the sensors 3202 can be communicated to a cloud platform that can perform an analysis on the air quality measurements of the various spaces of the school building 3201. For example, the sensors 3202 can be wireless sensors (or wired sensors) that communicate across a network 3214 which may include local networks within the school building 3201 and/or external networks. For example, various routers, switches, servers, cellular towers, LAN networks, WAN, networks, Wi-Fi networks, etc. can be included within the network 3214 and can communicate the measurements of the sensors 3202 to the school analysis system 3204.

Furthermore, information describing physical character-istics of the school building 3201 and various spaces of the school building 3201 can be provided to the school analysis system 3204 via a mobile application of a user device 3212, a web browser of the user device 3212, and/or any another application of the user device 3212 (including similar fea-tures and features described above with reference to FIG. 21). The information can be manually collected site data, photos of the school building 3201, equipment information of the school building 3201, schematic diagrams of the school building 3201, user information, desired metrics, desired school performance, floor plans of the spaces assessed via the sensors 3202, AHU zone maps indicating each AHU and the spaces the AHUs serve, an AHU list/schedule indicating lists of AHUs with sizes and service information, etc. The user device 3212 can be a smartphone, a tablet, a laptop computer, a desktop computer, etc. The user device 3212 can communicate with the school analysis system 3204 via the network 3214.

The school analysis system 3204 can be a cloud based system, a remote system, a local on-premises system with the school building 3201, etc. The school analysis system 3204 can include processors 3206 and/or memory devices 3208. Processors 3206 can be implemented as a general purpose processor, an application specific integrated circuit (ASIC), one or more field programmable gate arrays (FP-GAs), a group of processing components, or other suitable electronic processing components.

Memory devices 3208 (e.g., memory, memory unit, stor-age device, etc.) can include one or more devices (e.g., RAM, ROM, Flash memory, hard disk storage, etc.) for storing data and/or computer code for completing or facili-tating the various processes, layers and modules described in the present application. Memory devices 3208 can be or include volatile memory or non-volatile memory. Memory devices 3208 can include database components, object code components, script components, or any other type of infor-mation structure for supporting the various activities and information structures described in the present application. According to an exemplary embodiment, memory devices 3208 is communicably connected to processors 3206 via the processors 3206 and includes computer code for executing (e.g., by the processors 3206) one or more processes described herein.

The school analysis system 3204 includes a space air quality analyzer 3211, a recommendation generator 3207, and a report generator 3210. The space air quality analyzer 3211 can record measurements of the various sensors 3202 and create air quality profiles of the various spaces of the school building 3201. For example, the analyzer 3211 can record air quality for the spaces and generate a trend over time (e.g., timeseries data or other time correlated data) in which the temporary sensors 3202 are installed, e.g., over the two weeks that the sensors 3202 are installed. The trends created by the analyzer 3211 can be provided to the recom-mendation generator 3207 and the report generator 3210.

In some embodiments, the analyzer 3211 can generate space hierarchy air quality information. For example, rooms, hallways, and closets may be basic units of space in the school building 3201. However, a hierarchy of spaces can be built from the basic space unit. For example, a group of rooms could form a zone of a floor. A group of zones could form a floor of a building. A group of floors could form a building of a campus. The analyzer 3211 can generate higher level space air quality metrics for a particular space based on the basic space units that make up the particular space. For example, a $CO2$ metric for a floor could be generated by averaging the $CO2$ metrics for all rooms that make up the floor. Similarly, the $CO2$ metrics for a building could be made based on averaging $CO2$ metrics for all the floors of the building. In some embodiments, the metrics may be used to generate space health scores for the spaces (e.g., the rooms themselves, floors/buildings/campuses that include the rooms, etc.). In some embodiments, the space health scores may be specific to air quality. In some embodiments, the metrics may be used in combination with other metrics to generate an overall space health score. In some embodi-ments, the air quality metrics may be used in combination to generate a combined air quality health score, and that score may in turn be used as a component score to generate an overall space/building health score that includes air quality as a component. Example of such features that can be used in conjunction with the features of the present disclosure can be found in U.S. patent application Ser. No. 17/354,583, filed Jun. 22, 2021, and Ser. No. 17/354,565, filed Jun. 22, 2021, both of which are incorporated herein by reference in their entireties.

The report generator 3210 can generate reports that sum-marize the air quality trends of the spaces of the building and/or include recommendations. For example, the charts and tables of shown herein can be generated by the report generator 3210 and included within a report generated by the report generator 3210. The report generated by the report generator can provide the report to the user device 3212 for review by a user. The report can further indicate areas of the school building 3201, recommendations for improving indoor air quality (IAQ), recommendations for saving energy in the school building 3201, etc. In some embodi-ments, the report is a user interface including various charts, graphs, trends, recommendations, or other information. The interface can be displayed on a display device of the user device 3212.

The report generator 3210 can generate a report including recommendations generated by the recommendation genera-tor 3207 indicating actionable data that can be implemented by the system 3204 and/or a BMS system of the school building (e.g., the BMS system described in FIGS. 1-2, 31). The recommendations can indicate a recommendation to improve ventilation in a room of the school building 3201 that requires additional ventilation (e.g., operate ventilation equipment to increase a ventilation rate), can recommend opportunities for energy savings where adjusting ventilation when a space is unoccupied would save energy (e.g., operate ventilation equipment to decrease a ventilation rate), rec-ommendations which identify equipment which could pro-vide better ventilation and/or filtering for spaces (e.g., install VAVs or unit ventilators (UVs) based on which type of equipment is performing better), assessments of adequacy of outdoor air filtration, recommendation to filter mixed air, etc. The recommendation can be presented via a user inter-face described herein (e.g., 900, 2100, 2200, 2300, 3107, and/or 3109). The report generator 3210 can include a summary indicating key findings, testing details, testing results, photographs, conclusions, recommendations, etc.

The report generated by the report generator 3210 can include a detailed building data summary report that indicates building size and use, recent renovation, special use areas, number of AHU's, filtration type and schedule, air supply system type, and specific areas of concern. The report can indicate a technicians visual inspection of representative AHU's, fan coil units, induction units, filter type/installation/condition, air supply diffusers, exhaust systems, and/or return air grilles. The report can indicate whether air systems of the school building 3201 are under proper control, sequence of operations is being followed, and all controls are operating per the desired setpoint and schedule.

The report can include air quality tests of the sensors 3202, e.g., CO2, CO, PM2.5, temperature, relative humidity, NO2, SO2, O3, VOC's, airflow vectors, air pressure differentials, etc. The report can indicate a ventilation assessment indicating the results of testing that ensures outside air intake, supply air fan, and/or ventilation system is supplying minimum outdoor air ventilation rate detailed by ASHRAE 62.1-2016. Ventilation needs based on space type, square footage, and occupancy. The report can indicate an infection risk assessment indicating DNA-tagged bioaerosolstracers safely simulate respiratory emissions to identify potential infection hotspots, verify ventilation and filtration system performance for mitigating airborne exposures, and optimize enhancements.

The recommendations generated by the recommendation generator 3207 and included within the report generated by the report generator 3210 can further include recommendations to investigate ventilation rates of rooms of the school building 3201 with CO2 levels above a particular level (e.g., 1100 ppm). The recommendations can indicate a current ventilation rate of a space along with comparisons to other ventilation rates of other spaces, inconsistencies can indicate that a user should consider adjusting the ventilation rates of the spaces. If all of the ventilation rates are similar, the recommendation can recommend changing a ventilation policy for the entire school building 3201. The recommendations could further be to analyze a source of TVOC for a space where TVOC is above a particular amount, investigate a source of VOCs in a space with TVOCs above a particular amount, etc.

The recommendations in some embodiments, can include recommendations to improve ventilation, e.g., diluting dirty air with clean air as available from outside the school building 3201. This recommendation can ensure the delivery of ASHRAE required ventilation rates. The recommendations can be recommendations to improve filtration for spaces. Filtration may mechanically remove particles from the air of the space. The recommendation can be a recommendation to increase particle collection with options with filters such as Koch filters, MAC-10 fan filter units, enviro portable HEPA filtration units, etc.

The recommendations can include recommendations for improving disinfection for a space, e.g., deactivating bacteria and/or viruses in the space. The recommendations can be recommendations to install and/or operate disinfectant systems such as disinfectant light systems (e.g., ultraviolet (UV), ultraviolet-C (UVC), etc.). The recommendations can be recommendations to implement isolation of certain spaces of the school building 3201. For example, cause one space to be an isolated space that contains particles and prevents the particles going elsewhere in the school building 3201. This can be implemented through creating a negative-pressure isolation environments. The recommendations can be recommendations for performing monitoring and maintenance of equipment, e.g., to inspect equipment at a particular frequently and/or track results for maintenance and monitoring to maintain clean air.

In some embodiments, the CO2 measurements of the sensors 3202 can be used by the recommendation generator 3207 to determine how well a space is being ventilated. If the CO2 levels are higher than particular amounts, a recommendation to increase ventilation can be generated and/or implemented. The TVOC measurements can indicate how safe a space is for human beings and/or animals. If TVOC is above a particular level, an alert can be generated to evacuate the space and/or address the high TVOC level. The PM2.5 levels can indicate how well filtering equipment is operating. If PM2.5 is greater than a particular amount, this may indicate that the space is not being properly filtered and that a filter of equipment serving the space needs to be replaced and/or changed to a higher quality filter.

In some embodiments, the recommendation generator 3207 can perform an analysis on equipment type for the spaces. For example, the generator 3207 could analyze that spaces with low PM2.5 use unit ventilators while spaces with high PM2.5 use VAVs. This improvement in performance of the unit ventilators vs. the VAVs can be used in a recommendation for the recommendation generator 3207 to recommend that unit ventilators replace the VAVS in the school building 3201.

In some embodiments, the recommendation generator 3207 could recommend that persons with allergies be assigned to areas of a building with low VOC, TVOC, PM2.5, and/or PM10 levels. This may allow the allergenic persons to avoid having an asthma attack or other breathing problems. In some embodiments, class scheduling can be set up and/or recommended by the school analysis system 3204 such that students or teachers are not assigned spaces with high VOC, TVOC, PM2.5 levels for a long duration.

Referring now to FIG. 33, a process 3300 where temporary air quality sensors are installed in spaces of a school building to collect air quality measurements of the spaces and generate one or more reports and/or recommendations is shown, according to an exemplary embodiment. The process 3300 can be performed by the school analysis system 3204. Furthermore, the process 3300 can be performed by any computing device described herein.

In step 3302, the school analysis system 3204 can connect to the temporary air quality sensors 3202 via the network 3214, the temporary air quality sensors 3202 being installed by a technician in the school building 3201 on a temporary basis (e.g., for two weeks, three weeks, etc.). Connecting to the sensors 3202 can include sending a message to the sensors 3202 requesting a response, receiving an indication from the sensors 3202 indicating that the sensors 3202 are online, receiving measurements from the sensors 3202 for a first time, creating a data point to store measurements of the sensor in, etc. In step 3304, the air quality measurements can be received by the school analysis system 3204 from the In step 3306, the school analysis system 3204 can generate one or more reports and/or recommendations for improving performance of operation of the school building 3201. The reports can summarize air quality for various spaces of the school building 3201, e.g., the charts and graphs shown herein. The recommendations can be included within the reports and can indicate control operations for implementation for various spaces (e.g., new ventilation rates, air flow rates, air change rates, etc.). The recommendations can recommend investigation into various sources of TVOCs, VOCs, etc. in various spaces of the school building

3201, etc. The one or more reports and/or recommendations can be provided to a user for review via the user device 3212 in step 3308.

In some embodiments, the report can include infection risk for the school building 3201, spaces of the school building 3201, students of the school building 3201, and/or staff of the school building 3201. The infection risk can be a risk level of contracting an infectious disease present in a population (e.g., COVID19, influenza, the bird influenza, etc.). The infection risk can be based on current ventilation rates, filter performance, etc. which can be derived from the air quality measurements of the sensors 3202. The report can indicate a control profile, e.g., guidelines for implementing physical control of AHUs, VAVs, unit ventilators, temporary space filters, etc. The guidelines may be ranges for operating settings, recommended operating settings, specific control algorithms to be used, etc. This control profile can operate equipment to reduce the infection risk. In some embodiments, the control profile can operate to provide energy savings. The control profile can be used to determine operating settings that are implemented at a time after the sensors 3202 are disconnected from and/or uninstalled. In some embodiments, features described in U.S. patents application Ser. Nos. 16/927,759 and 16,927,318, both filed Jul. 13, 2020, and both incorporated by reference herein in their entireties, can be utilized in conjunction with the features of the present disclosure. For example, in some embodiments, the infection risk can be estimated using the readings collected by the sensors and processed using the Wells-Reilly equation as described in detail in the aforementioned applications.

In step 3310, the school analysis system 3204 can disconnect from the sensors 3202 as the sensors 3202 are to be removed and uninstalled by a technician. Disconnecting from the sensors 3202 can include sending a shutdown message to the sensor 3202, sending a disconnect message from the sensors 3202, not receiving new data from the sensors 3202, etc. The sensors 3202 can be uninstalled by the technician and disconnected from at the end of the temporary installation period. After the sensors are disconnected from, a BMS system can begin operating with operating settings and/or control algorithms based on the control profile generated by the school analysis system 3204. The IAQ analysis system is described with further reference to U.S. Provisional Application No. 63/230,608, filed Aug. 6, 2021, the entire disclosure of which is incorporated by reference herein.

Clear Air Optimization

Referring to FIGS. 34-42 generally, knowing time-varying occupancy, ventilation, and recirculation within a room is important for several analyses. For example, this information can be used to estimate the risk of airborne pathogen transmission by using a physics-based model (described above with reference to the Pareto Optimization (FIGS. 13-16) and metric analyses (FIGS. 24-30) above). Additionally, this information can also be used to estimate energy savings from installing demand-controlled ventilation. However, these values can be difficult to measure in most buildings. Occupancy sensing often includes significant infrastructure and flow sensors required to measure ventilation and recirculation can be expensive and challenging to calibrate. This makes direct measurement of these quantities challenging in many buildings. As an alternative to direct measurement, it is possible to estimate these values using measurements from Indoor Air Quality (IAQ) sensors. The unknown values of occupancy, ventilation, and recirculation can be estimated using parameter-estimation algorithms, as they are influenced by occupancy and airflow. When either occupancy or airflow is constant, both values can be reliably estimated. However, if both values are varying, it becomes difficult to determine from a single IAQ measurement whether the changes are due to occupancy or airflow. To address these challenges, the systems and methods of FIGS. 34-42 disclose using multiple IAQ measurements simultaneously (e.g., computing in parallel or sequentially) to improve the robustness of the inferred values. In some embodiments, this can be completed using a single-species (e.g., CO2, VOCs, PM, etc.) model that applies to each value measured by the IAQ sensors. That is, by using multiple IAQ measurements, the systems and method provide a more robust estimation of occupancy, ventilation, and recirculation values.

Additionally, the use of IAQ sensors to estimate the values of occupancy, ventilation, and recirculation is a cost-effective and practical solution, as it can eliminate or reduce the need for expensive infrastructure and flow sensors. The proposed systems and methods of using multiple IAQ measurements and BAS system information to estimate the desired unknown parameters is based on the concept of parameter modeling. In some embodiments, parameter modeling includes using a model, such as a single-species model, to describe the relationship between the IAQ measurements, BAS information, and the unknown values of occupancy, ventilation, and recirculation. In particular, the single-species model can be a set of ordinary differential equations (ODEs) that describe the time-varying behavior of a single species (e.g., CO2, VOCs, PM) within a room. In some embodiments, the model can take into account the influence of occupancy and airflow on the behavior of the species. By using multiple IAQ measurements simultaneously, the systems and methods improve the robustness of the inferred values by considering the behavior of multiple species at the same time.

In some embodiments, the single-species model can be implemented to solve the parameter-estimation optimization problem, which includes determining values of the unknown parameters that most closely match the measured data. The optimization problem can be solved by finding the values of the unknown parameters that minimize the difference between the measured data and the predictions of the model. In various embodiments, the unknown variables and parameters can be expressed as a linear combination of basis functions and estimating the coefficients of these basis functions. The estimated values of occupancy, ventilation, and recirculation can then be used as inputs to various analyses, such as estimating the risk of airborne pathogen transmission or energy savings from demand-controlled ventilation (DCV) (described in greater detail above). In some embodiments, estimated values of occupancy, ventilation, and recirculation can be used to update or modify a control strategy of an HVAC system. That is, by using IAQ measurements and BAS information to estimate these values, building owners and managers can gain valuable insights into the indoor environment without the need for expensive infrastructure and flow sensors.

In some embodiments, for a given species, airborne concentration evolves according to the following single-species model (Equation 1):

$$V_{zone} \frac{dc_{zone}}{dt} =$$

85

-continued $$g_{occ}N_{occ} + g_{bkgd} + f_{out}(c_{out} - c_{zone}) + f_{recirc}(c_{recirc} - c_{zone}) - k_{decay}c_{zone}$$

where $V_{zone}$ is the volume of air within in the zone (units of volume), $c_{zone}$ is the airborne concentration of the species within the zone (units of amount/volume), $g_{occ}$ is the per-occupant generation rate of the species (units of amount/time), $g_{bkgd}$ is the background generation rate of the species (units of amount/time), $f_{out}$ is the volumetric flow of outdoor air provided to the zone (units of volume/time), $c_{out}$ is the concentration of the species in the outdoor air, $f_{recirc}$ is the volumetric flow of recirculated building air to the zone (units of volume/time), $c_{recirc}$ is the concentration of the species in the recirculated building air (units of volume/time), and $k_{decay}$ is the natural first-order decay rate of the substance (units of 1/time). As referred to herein, a "species" can be a compound, substance, and/or contaminant that can be measured by sensors (e.g., IAQ sensors).

In some embodiments, the BAS data (or information) can provide the outdoor and recirculating flows $f_{out}$ and $f_{recirc}$, while the IAQ measurements can provide the c, measurements (concentration values for the measured characteristic, such as particular concentration, for outside air, zone air, recirculated air, etc.). The per-occupant and background generation germs $g_{occ}$ and $g_{bkgd}$, and natural decay rate $k_{decay}$, could all be estimated from the data. Controller 310 (or 1110) could have up to four (or more or less) different copies of this equation for the IAQ species (one each for humidity, CO2, PM, and VOCs) from which you can simultaneously estimate time-varying $N_{occ}$ and possibly also constant values of $g_{occ}$, $g_{bkgd}$, and $k_{decay}$, in some embodiments.

Figure 34:
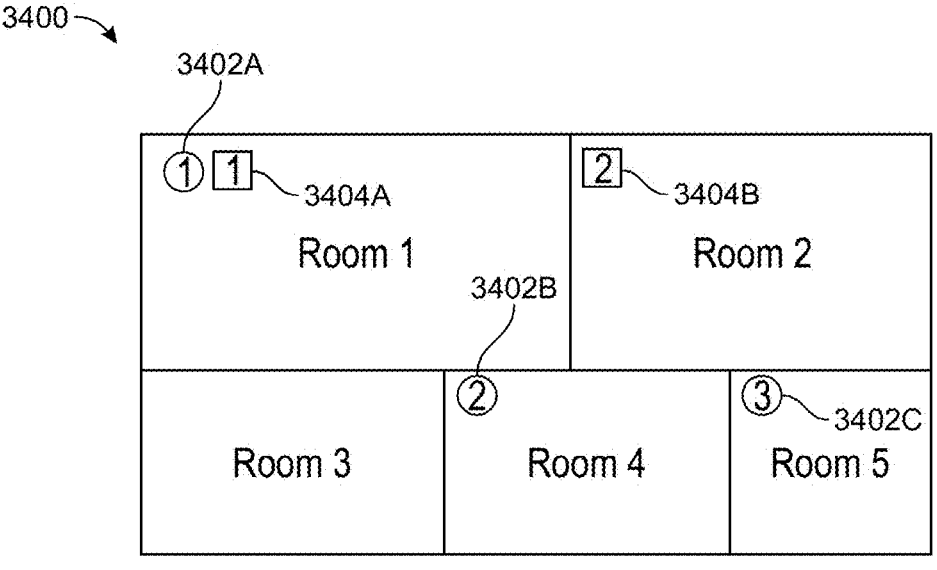
FIG. 34 is a schematic diagram of spaces of a building, according to an exemplary embodiment.

In some embodiments, the single-species model for estimating the parameters of a building's indoor air quality (IAQ) involves the use of time-series data from IAQ sensors. These sensors measure various environmental factors such as the concentration of pollutants (CO2, volatile organic compounds (VOCs), particulate matter (PM), and water) in the air, and the temperature and humidity levels. In particular, the measurements can be used to estimate the values of the model parameters such as occupancy, ventilation, and recirculation. For example, an example sensor placement 3400 throughout a building is shown in FIG. 34. Sensors 3402 (e.g., A-C) can be a first type of sensor, e.g., configured to collected measurements of humidity, volatile organic compounds (VOCs), polymerase chain reactions (PCRs), carbon dioxide, etc. Sensors 3404 (e.g., A-B) can be a second type of sensor, e.g., configured to collected measurements of particulate matter (PM), temperature, high resolution size-resolved particles, etc.

In some embodiments, each sensor can communicate (e.g., via a wired or wireless connection) the collected measurements a controller (e.g., 310, 1110). In various embodiments, multiple sensors may be installed in each space, or sensors installed in the spaces may include multiple different sensing capabilities (e.g., may be configured to sense multiple characteristics of the space such as humidity, carbon dioxide, temperature, etc.). In some implementations, the sensors may additionally or alternatively be installed in places other than in the space itself, such as in a VAV unit serving the space, an AHU serving the space, ductwork proximate to the space, etc. Accordingly, IAQ sensors provide data streams that can be used to determine the values of the unknown parameters. This involves applying parameter-estimation algorithms to the data streams to find the values of the parameters that best match the measured data. In cases where occupancy or airflow is constant, these values can be reliably estimated. However, if both quantities are varying, it can be difficult to determine the source of changes in the measured data. To improve robustness, the use of multiple IAQ sensors is proposed, as it can help to distinguish between changes due to occupancy and changes due to airflow.

In this model, the timeseries values for $c_*$ are measured via IAQ sensors (or calculated via other means), while the remaining parameters are estimated using those data streams (e.g., according to table 3500 of FIG. 35). This general model can be applied to each species measured with the IAQ sensor, such as CO2, VOCs, PM, and humidity. The units of measure and sources of each model parameter and data stream are listed in table 3500 of FIG. 35. By using this model, it is possible to estimate the values of the unknown parameters that describe the building's IAQ, even if direct measurement is not possible or cost-prohibitive. This information can then be used for various purposes, such as evaluating the transmission risk of airborne pathogens, estimating the energy savings that could be achieved by installing demand-controlled ventilation, modifying control strategies of building equipment, etc.

In some embodiments, the values of $c_{recirc}$ and $c_{out}$ that are obtained from the IAQ sensors may not accurately reflect the actual air quality in the building if the HVAC system is affecting the measurements. For instance, if the outdoor and recirculated air streams pass over a cooling coil, the humidity levels in these streams may decrease, which would impact the accuracy of the $c_{recirc}$ and $c_{out}$ values obtained from the sensors. To account for these potential effects, it may be advantageous to make slight modifications to the $c_{recirc}$ and $c_{out}$ values obtained from the sensors, so that they accurately reflect the air quality in the building. In some embodiments, this step is important in ensuring that the estimated values of the parameters are accurate, which would improve the overall accuracy of the analysis. Thus, both $c_{recirc}$ and $c_{out}$ could be substituted with (Equation 2):

$$\omega_{supply} := \min\left( \frac{f_{recirc}\omega_{recirc} + f_{out}\omega_{out}}{f_{recirc} + f_{out}}, \omega_{sat}(T_{supply}) \right)$$

where $\omega_{sat}(T)$ is the saturation humidity at temperature T, and $T_{supply}$ is the supply temperature (usually measured by the BMS). Similarly, if the air streams pass through a filter, then the PM concentrations should be attenuated by the filtration efficiency $\Delta$ (i.e., using $\lambda c_{out}$ and $\lambda c_{recirc}$) in place of the unscaled values. Additional details regarding the multivariable estimation (e.g., occupancy, ventilation, and recirculation values) is described in greater detail with reference to FIGS. 41-42.

Referring now to FIGS. 36-40, implementing a data-driven control of airborne disease transmission and energy use in buildings, according to some embodiments. In general, FIGS. 36-40 relate to implementing the single-species concentration model. In particular, while FIGS. 36-40 discuss using CO2, it should be understood other species with additional IAQ data can be used in combination to calculate unknown parameters and estimate of occupancy, ventilation, and recirculation values. Additional details regarding using multiple species is described in detail with reference to FIGS. 41-42.

Referring now to FIGS. 36-40 generally, the implemented procedure (sometime referred to herein as an "infection-risk monitoring procedure" or "infection-risk monitoring model") combines physical models of aerosol dynamics and disease transmission with building sensor data to monitor the risk of airborne disease transmission in indoor spaces. The single-species concentration model can use measured CO2 levels to determine the occupancy of rooms, which can be a variable in determining transmission rate. The infection-risk monitoring procedure can also incorporate the droplet size-dependent properties of masks, filters, and viral infectivity. This approach provides the basis for reducing airborne disease transmission in current and future indoor environments. Furthermore, mass-balance models that have been used in the past to study airborne transmission of diseases via aerosols were used to explain the transmission of COVID-19. However, these models required an accurate estimate of the number of infectious and susceptible individuals in a given space, which is often not readily available in most buildings.

The infection-risk monitoring procedure combines CO2 data (and other IAQ data) with quantitative models for airborne transmission and integrates with existing air control systems. In particular, the infection-risk monitoring procedure leverages available building data and physics-based models to focus on improved indoor air quality (IAQ) and reduce the risk of airborne transmission. The approach utilizes data from building management systems (BMS), CO2 concentration, other IAQ data, and portable sensors to simulate real-time transmission risk for a given space. The infection-risk monitoring procedure allows for hypothetical simulations to be run, comparing alternative strategies and customizing mitigation strategies for unique features of individual buildings. Additionally, the infection-risk monitoring procedure enables building controllers to make informed decisions about modifying control strategies of the building.

With reference to FIGS. 36-40, the data collected (e.g., IAQ, space characteristics, and BAS data) was from multiple buildings in a common location (e.g., college, business, stadium, military base). The buildings were equipped with heating, ventilation, and air-conditioning (HVAC) systems, which were configured to collect and provide various data streams throughout a monitoring period.

Figure 36:
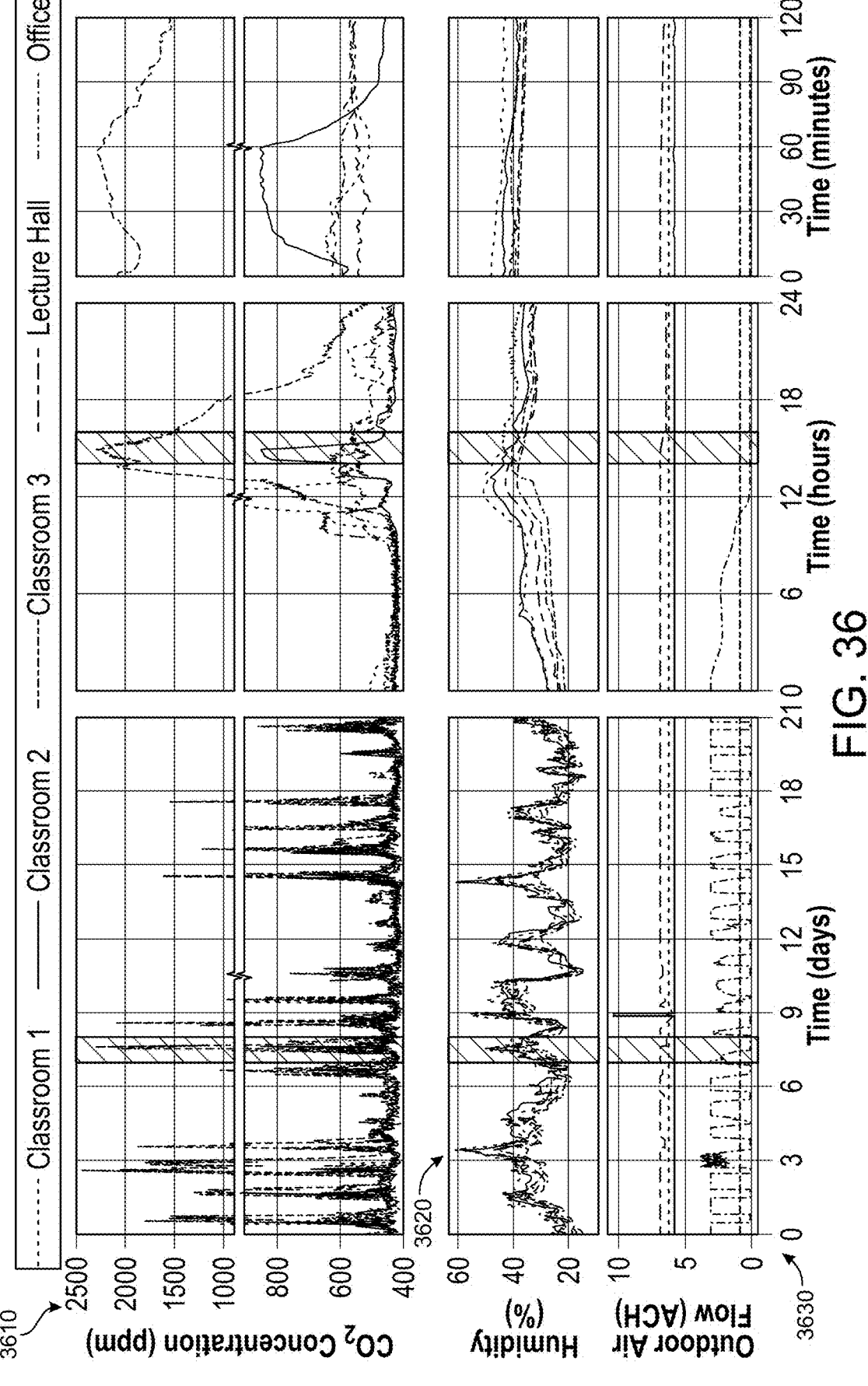
FIG. 36 are graphs of collected data from a plurality of building, according to some embodiments.

Referring now to FIG. 36, graphs (e.g., 3610, 3620, and 3630) of collected data from a plurality of building, according to some embodiments. In some embodiments, the data collected can include, but is not limited to, total supply air flow, outdoor air flow, supply air temperature, flow measurements, additional IAQ data (e.g., temperature, relative humidity, CO2 concentration, total volatile organic compounds (TVOC), PM10, and PM2.5). FIG. 36 provides a visual representation of sample data collected from four monitored rooms. This data provides insight into the key Indoor Air Quality (IAQ) parameters, namely the CO2 concentration and relative humidity levels, within these rooms. The CO2 concentration data was collected by the in-room IAQ sensors, while the humidity measurements can also be recorded by the in-room sensors. In addition, the outdoor air flow measurements can be obtained from the Building Management System (BMS), or through an estimate of natural ventilation (e.g., in the case of Classroom 3).

In some embodiments, outdoor temperature and humidity can also be measured using a sensor placed on the roof of one of the monitored buildings. In particular, the sensor can provide size-resolved particulate concentrations. In some embodiments, the sensors can transmit data directly to the cloud using cellular modems or to controller 310, making installation simple and requiring only an AC power source or battery pack.

In some embodiments, the space characteristics of the rooms and/or building in which the sensors are installed, such as floor area, ceiling height, intended usage, estimated occupancy based on the number of desks in the room, and the specific HVAC configuration. In some embodiments, flow measurements can be recorded in cubic feet per minute (CFM) units, which can be converted to air changes per hour (ACH) by dividing by the room volume and adjusting time units. Among the IAQ parameters, the CO2 concentration levels may be primarily influenced by the room occupancy. On the other hand, the outdoor air flow measurements for most rooms may remain relatively constant. Typically, these values can vary based on the occupancy schedule of the building, with lesser ventilation during unoccupied times, and also with the outdoor temperature. However, during the monitoring period (as shown in graphs 3610, 3620, and 3630), the HVAC systems were programmed to provide constant 24/7 ventilation. In some embodiments, the monitored spaces can include a variety of room types, such as typical classrooms, large lecture halls, conference rooms, and offices (both individual and shared). In some embodiments, room temperature can be maintained by in-room fan-coil units (FCUs) that use a fan to circulate room air across heating or cooling coils.

Additionally, FIG. 36 depicts a visual representation of the period data at multiple time scales (e.g., days, hours, minutes) and highlighting some IAQ parameters (e.g., CO2 concentration (ppm), humidity, outdoor air flow). The shaded regions in the figure indicate the time range covered in the subsequent column, with missing data points filled in via interpolation. As described in greater detail above, inputs into the transmission rate models can include the room volume, number of occupants, ventilation rates, and intensity of any other disinfection sources. The models are based on the assumption that each room is well-mixed, which allows for the particle concentration to be treated as uniform throughout the room. The time-evolution of the radius-resolved concentration of the infectious pathogen, C(r, t), in a room with volume V can be modeled (Equation 3):

$$V\frac{\partial C(r,t)}{\partial t} = N_i(t)P(r) - (Q_a + p_f Q_r + v_s A + \lambda_v V)C(r,t)$$

where $N_i$ is the number of infectors present in the room exhaling infectious droplets with rate P. Infectious droplets are removed through various removal mechanisms, such as ventilation $Q_a$, filtration in the recirculated airflow $p_f Q_r$, sedimentation USA, and deactivation $\lambda_v V$. In addition to deactivation, ventilation, filtration, and sedimentation can also be expressed as rates: $\lambda_a = Q_a/V$, $\lambda_f(r) = p_f(r)Q_r/V$, and $\lambda_s(r) = v_s(r)Q_s/H$, respectively. The removal mechanisms can be combined into a single parameter, the equivalent outdoor air delivered to the space (EOA): $\lambda_{EOA}(r) = \times_a + \lambda_f + \lambda_s + \lambda_v$. The single parameters represents the volumetric flow of outdoor-air ventilation that would lead to an equivalent removal rate of infectious particles In some embodiments, the airborne transmission rate, Ba (t), is defined as the mean number of transmissions per time per infectious individual per susceptible individual. This can be estimated through a linear approximation of an exponential dose-response model (Equation 4):

$$\beta_a(t) = Q_b \int_0^\infty C(r,t)p_m(r)c_i(r)dr$$

where $Q_b$ is the occupants' breathing rate, $p_m(r)$ is a size-dependent mask penetration factor, and $c_i(r)$ is a size-dependent infectivity.

The expected transmission per infector hour (the expected number of transmissions from one infector in a room for one hour) can be calculated by (Equation 5):

$$\dot{R} = \frac{\int_0^T \beta_a(t) N_s(t) dt}{\int_0^T N_i(t) dt}$$

To perform Equations 4 and 5, some simplifying assumptions can be made. First, it can be assumed that all occupants have a fixed breathing rate of $f_b=0.6$ m$^3$/hr for each occupant. Secondly, it can be assumed that the infectious quanta concentration ($c_i$) in the exhaled breath of infected individuals is equal to 25 quanta/m$^3$. It is important to note that the assumptions do not account for the effects of immunity or mask-wearing. Thus, the estimated transmission rates can be used for relative comparisons across different spaces.

Figure 37:
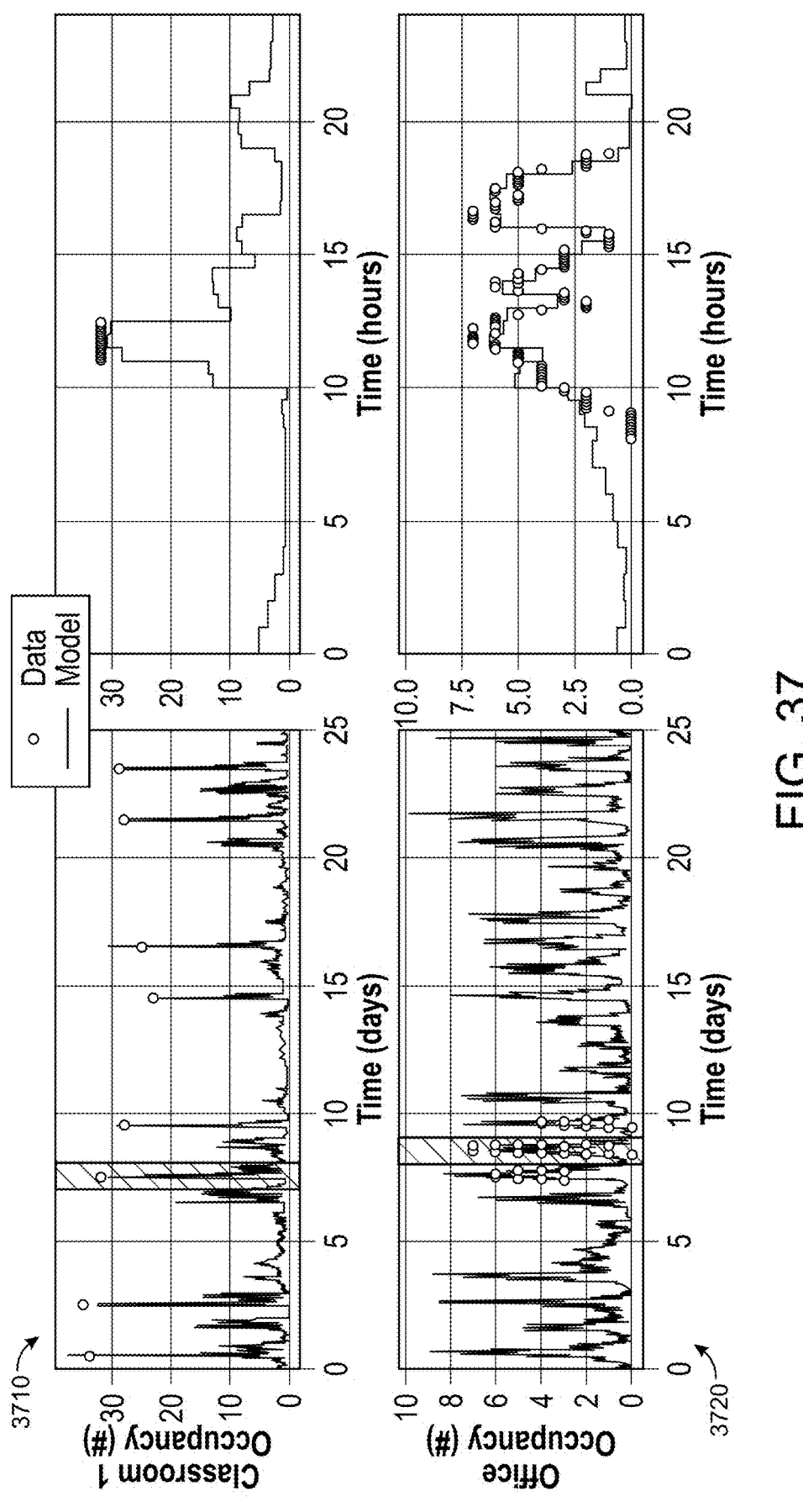
FIG. 37 are graphs of estimated occupancy, according to some embodiments.

Referring now to FIG. 37, graphs (e.g., 3710 and 3720) of estimated occupancy, according to some embodiments. In some embodiments, estimated occupancy can be used to estimate the number of susceptible $N_s$ and infectious $N_i$ occupants. CO2 concentration can be modeled according to (Equation 6):

$$V \frac{dC_{CO2}}{dt} = Q_b C_{CO2,b} N_t(t) - Q_a(C_{CO2} - C_{CO2,OA})$$

where V is the space volume, $Q_b$ is the occupant breathing rate, $Q_a$ is the ventilation flow rate, $N_t$ is the total number of occupants, $C_{CO2,b}$ is the building exhaled-breath excess CO2 concentration (e.g., about 38,000 ppm) and $C_{CO2,OA}$ is the outdoor CO2 concentration (e.g., about 400 ppm).

Using the above model, $N_t$ can be calculated by selecting a set of basis functions and finding the linear combination that matches the actual measured CO2 concentrations as closely as possible. To do this, a nonlinear technique is used to solve for the basis function coefficients. The basis functions chosen can be piecewise-constant functions, with different time blocks depending on whether the room is occupied or unoccupied. These time blocks can be set to 30-minute or 60-minute intervals, starting at the top of the hour or half of the hour, respectively. To ensure that the resulting occupancy estimate, $N_t$ are within a reasonable range, bounds can be added so that the estimate is always between zero and 1.5 (or 2 times, or 3 times) times the room's design occupancy. In some embodiments, the underlying data is sampled every minute, so there are 30 to 60 samples of data for each unknown scalar parameter. The model for occupancy estimation can be validated using limited manual data collection in one or more rooms (shown in graphs 3710 and 3720). For example, Classroom 1 and the Office room can manually record attendance over the time period. The results of the proposed model can be compared to the manual data collection and what can be found is that the model is in good agreement with the measured occupancy during nominal occupied hours.

Figure 38:
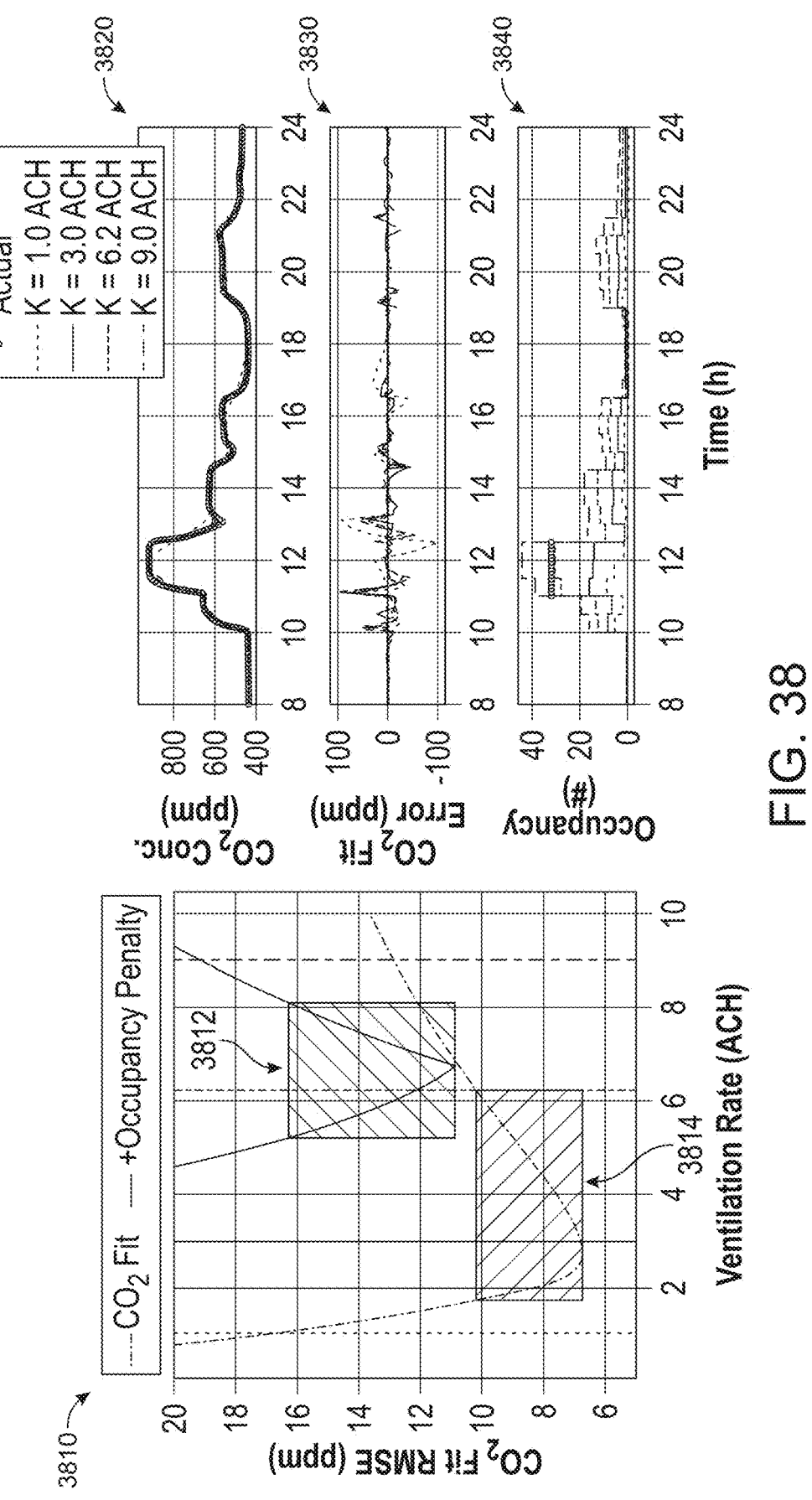
FIG. 38 are graphs of estimations using peak occupancy, according to some embodiments.

Referring now to FIG. 38, graphs (e.g., 3810, 3820, 3830, and 3840) of estimations using peak occupancy, according to some embodiments. In general, spaces where there are few changes in occupancy throughout the day, a chosen objective function may lead to high uncertainty in the estimates as it is dominated by pseudo-steady periods with $dC_{CO2}/dt\approx0$. This relationship implies that an estimate of 1 air change per hour (ACH) ventilation and 10 occupants would fit the data almost exactly as well as an estimate of 10 ACH ventilation and 100 occupants. To overcome this uncertainty, a second term to the objective function that penalizes deviation of peak occupancy from a provided target value can be introduced. This is because, while the full time-varying occupancy is unknown, the peak occupancy can be reasonably estimated as a fixed multiple of the space's design occupancy. Additional details regarding peak occupancy and relevant equations are described below with reference to Equations 16 and 17. With this modification, the ventilation rate is chosen to minimize the sum of the CO2 prediction errors and the deviation of an occupancy parameter (e.g., the peak of the inferred occupancy profile, or a threshold amount associated with the inferred occupancy profile) from the provided value, removing the degeneracy of the pseudo-steady model. The weight of the two terms can be chosen based on the level of confidence in the chosen peak-occupancy target. The systems and methods for estimating ventilation rate and occupancy are demonstrated in FIG. 38. FIG. 38 depicts the objective functions (with peak-occupancy penalty 3812 and without peak-occupancy penalty 3814), simulated CO2 concentrations (3820), fit error (3830), and estimated occupancy for selected ventilation rates (3840).

FIG. 38 depicts the objective functions, model fits, and estimated occupancy profiles for a 1-day period in Classroom 1. Uncertainty regions are calculated as +/−50% of the optimal objective value. Including only the penalty on CO2 concentration fit, it is shown that the estimated ventilation rate is low, with a large relative uncertainty. Although the $CO_2$ error rules out the extremely low and high ventilation rates, it may not adequately distinguish between the intermediate values. However, after adding the additional term for deviation from the occupancy target (e.g., peak occupancy, set to 65% of the room's design occupancy), the estimated value is now much closer to the actual measured value, with lower relative uncertainty. This is shown with respect to the box with the peak-occupancy 3812 and without peak-occupancy 3814.

Referring now to safety guidelines generally, to derive a safety guideline, an event reproductive number (R) can be calculated, which represents the expected number of transmissions per infected individual at an event (e.g., a specific room and time period). This value can be obtained through an analytical expression derived from the pseudo-steady transmission model by assuming that all time-dependent variables are constant during a given event. This assumption transforms the ordinary differential equation model into a simple algebraic relationship. Under this assumption, along with size-average parameters, the functional form of R is (Equation 7):

$$R \propto \frac{N_s \tau}{(\lambda_a + \lambda_f(\bar{r}) + \lambda_v(\bar{r}) + \lambda_s(\bar{r}))V}$$

where R is the event reproductive number, t is the total duration of the event, the $\lambda$, are the particle removal rates (as defined below Equation 3) evaluated at a representative particle size $\bar{r}$, and V is the room volume.

In some embodiments, the event reproductive number, R, provides an estimation of the expected number of transmissions per infector during a given room and time period. That is, the calculation of R is based on the simplified pseudo-steady approximation of the dynamic transmission model, which results in an algebraic relationship. In some embodiments, the calculation of R is proportional to the product of the susceptible occupants and the time they spend in a room, divided by the equivalent outdoor air provided to the room. The proportionality constant of this model depends on various factors such as breathing rate, activity level, immunity, mask usage, and viral infectivity. These factors can vary significantly from room to room, but may not be necessary to assess relative risk across spaces. However, they can be used to determine absolute risk.

Figure 39:
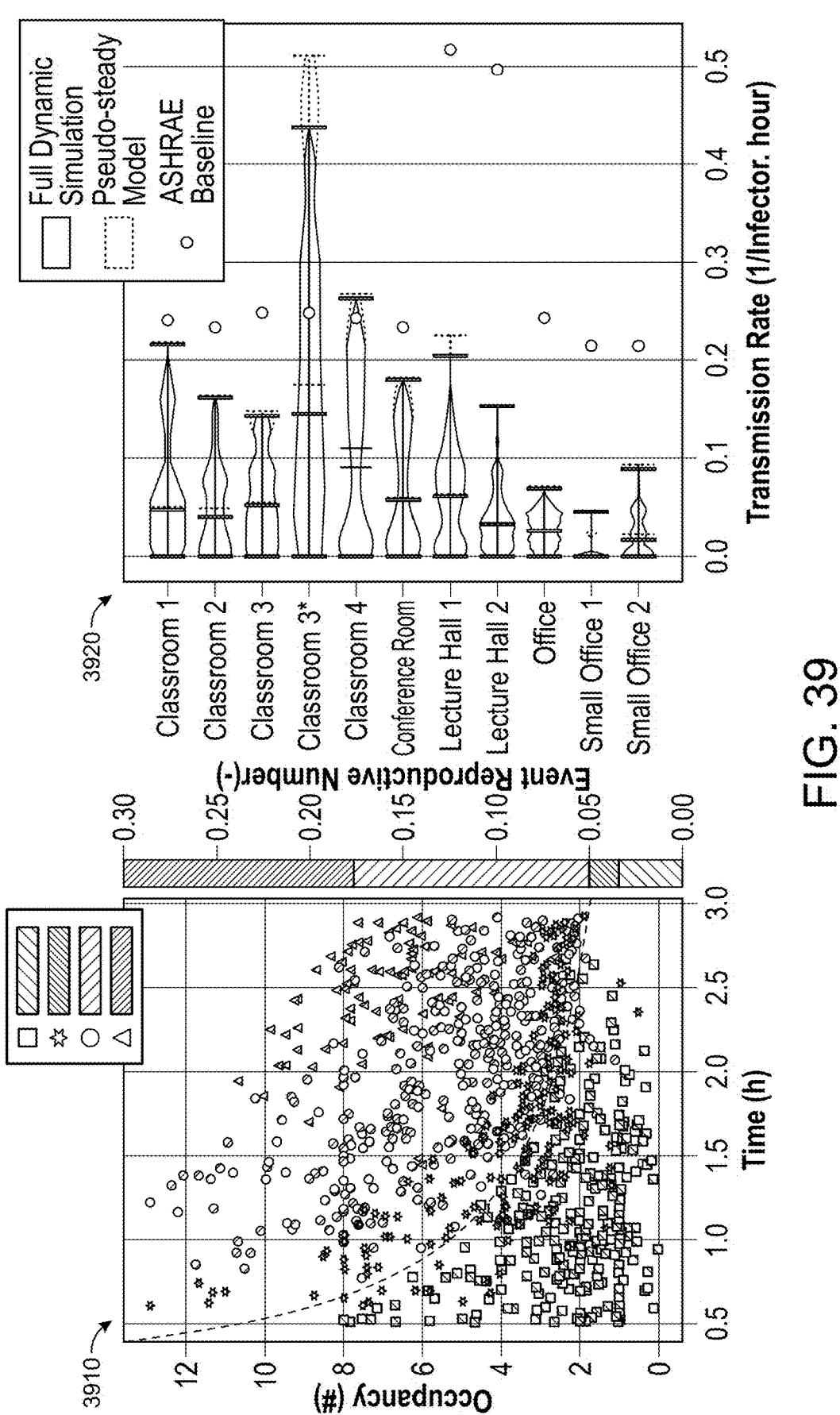
FIG. 39 are graphs of the transmission data for monitored spaces, according to some embodiments.

Referring now to FIG. 39, graphs 3910 and 3920 depict the transmission data for monitored spaces, according to some embodiments. Graph 3910 depicts a scatter plot of reproductive numbers, calculated from the dynamic simulation. The pseudo-steady model, which closely matches the full dynamic simulation, is represented by the dashed contour. Graph 3920 depicts a distribution of transmission rates throughout a period of time, with the distributions being weighted by occupancy to show the expected number of transmissions if an infectious occupant were to remain in the space for one hour. The solid curves represent the full dynamic model, with solid lines showing the minimum, median, and maximum values (e.g., from left to right). The dotted curves represent the simplified pseudo-steady model, with dotted lines showing the same three stats for that data. Finally, the dots indicate the expected values based on minimum ventilation rates and occupant density per ASHRAE standard 62.1. Accordingly, the results shown in FIG. 39 provide a picture of the transmission risk in different spaces and highlight a desire for a balanced approach to energy consumption and control in commercial buildings.

That is, energy efficiency can be an important consideration in reducing the environmental impact of buildings, especially given that commercial buildings account for a significant portion of total energy consumption in the United States. However, reducing energy consumption in buildings can sometimes conflict with the goal of reducing airborne transmission risk, especially in the context of the COVID-19 pandemic. In light of this, it is important to find a balance between reducing energy consumption and reducing transmission risk, taking into account all available mechanisms for mitigating the spread of infectious particles.

In some embodiments, approaches to reducing energy consumption can include using infectious particle mitigation, such as filtration, UV light, and ventilation. Filtration can provide a high level of EOA (Equivalent Outdoor Air) and is often more energy-efficient than ventilation, especially if high-efficiency filters are used. On the other hand, UV light can also provide effective disinfection, but it requires proper installation and shielding, as UV light is harmful to people. By integrating these sources of EOA with demand-controlled ventilation, energy consumption can be optimized while still maintaining required indoor air quality.

Figure 40:
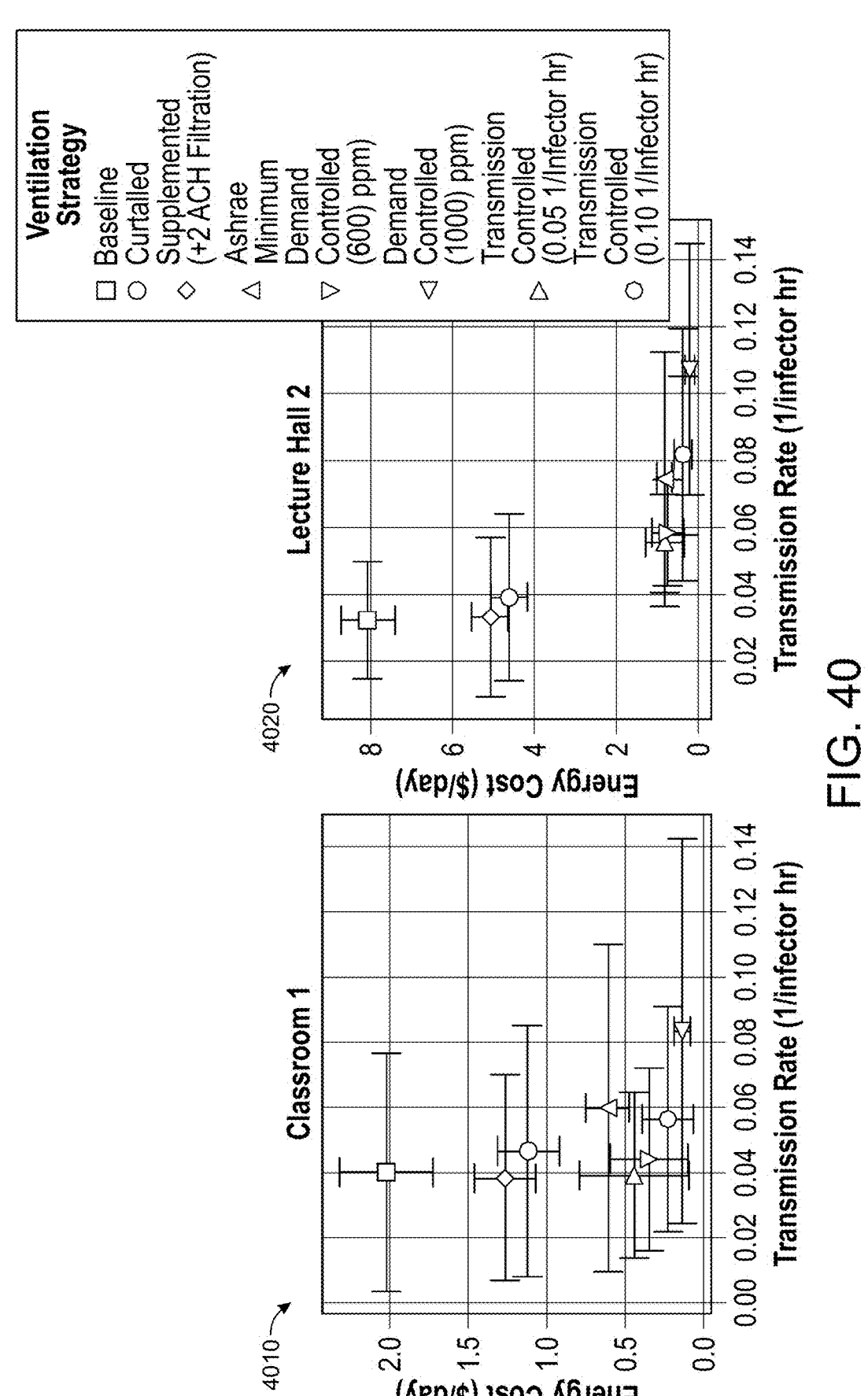
FIG. 40 are graphs of ventilation strategies, according to some embodiments.

Referring now to FIG. 40, graphs 4010 and 4020 depict ventilation strategies, according to some embodiments. In particular, different strategies can be implemented to compare energy costs and transmission risk levels, taking into account the specific needs of each room and the overall goals of the building management. In graphs 4010 and 4020, the tradeoff between energy consumption and transmission risk are analyzed. The daily energy cost of each room can be estimated based on standard thermodynamic and equipment modeling procedures. In some embodiments, the primary cost component of the monitored rooms can be energy required to heat the outdoor air to its supply temperature. The actual operation during the monitoring periods can be referred to as the baseline scenario, and the following hypothetical scenarios were considered for each room. In one embodiment, curtailed ventilation can be implemented where ventilation is supplied during nominal occupied hours, from 8 am to 10 $\mu$m. In another embodiment, supplemented ventilation can be implemented where, in addition to the schedule change in the curtailed scenario, an additional 2 ACH of in-room filtration can be provided via standalone air cleaners during occupied hours. In another embodiment, ASHRAE minimum ventilation can be implemented where ventilation follows the curtailed schedule and can be further adjusted to provide the minimum amount of ventilation required in each space per ASHRAE standard 62.1. In another embodiment, demand control ventilation (DCV) can be implemented where ventilation can be provided by a standard demand control algorithm for a given $CO2$ concentration setpoint. In another embodiment, transmission controller ventilation can be implemented where ventilation can be provided by a modified algorithm that provides enough ventilation to operate below a given transmission risk as calculated by a pseudo-steady model.

The first four scenarios can be implemented in most Building Management Systems (BMS), while the final scenario may require modification to the underlying control logic. The time-varying ventilation for each hypothetical strategy can be estimated, and the transmission risk and energy cost can be calculated using the previously discussed modeling approach. The results of this analysis for two representative spaces are shown in FIG. 40. For example, for Classroom 1, it can be shown that significant energy savings could be achieved without significantly increasing the expected transmission rate. Thus, curtailing ventilation during unoccupied hours reduced energy consumption by roughly half, with only a slight increase in transmission rate due to after-hours gatherings in that room. Supplementing with in-room filtration further reduced expected transmission rate below the baseline scenario, while still providing significant energy savings. Reducing ventilation to the ASHRAE-specified minimum is shown to reduce energy consumption. The results in graphs 4010 and 4020 illustrate the potential for reducing energy consumption and expected transmission rate by employing advanced control strategies and alternative sources of EOA in building management systems (BMS).

Figure 41:
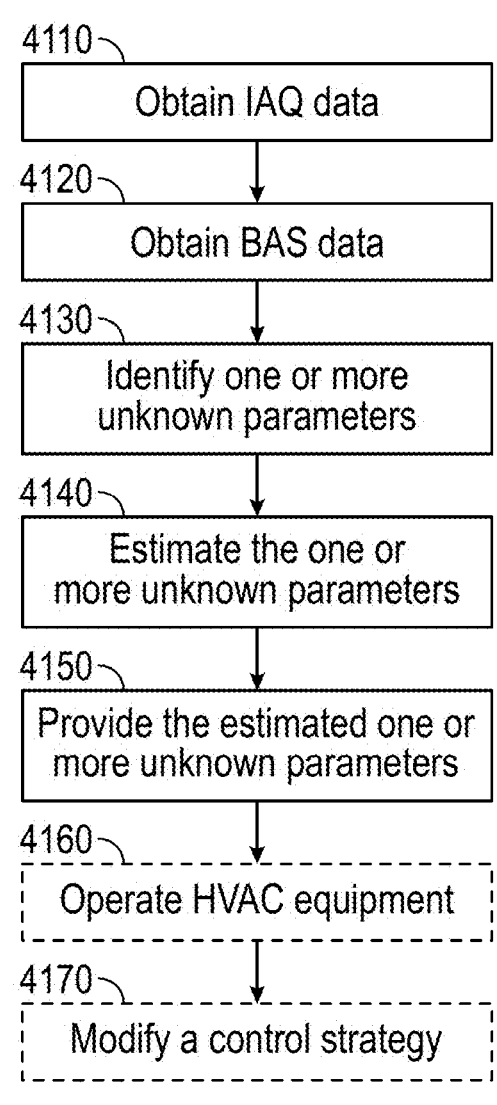
FIG. 41 is a flowchart for a method for executing an indoor air quality (IAQ) analysis of a building is shown, according to some embodiments.
Figure 42:
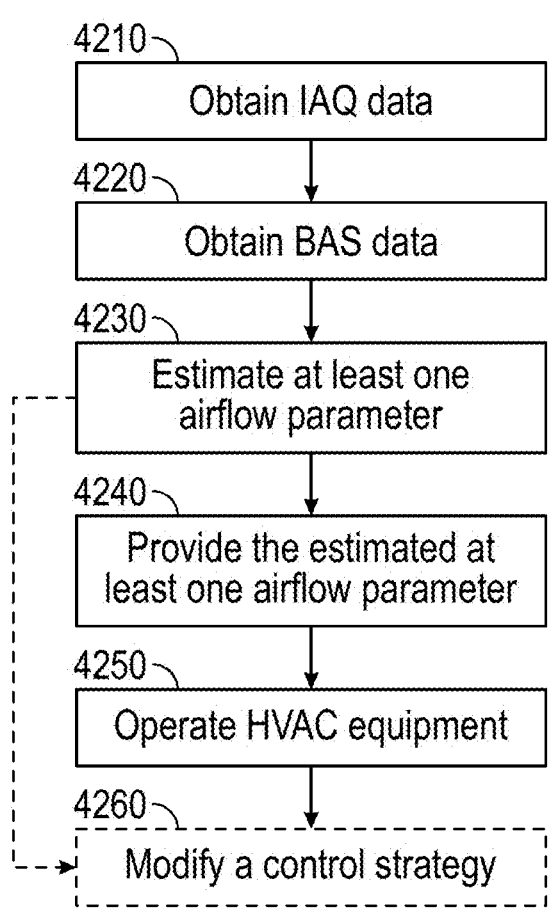
FIG. 42 is a flowchart for a method for executing an indoor air quality (IAQ) analysis of a building is shown, according to some embodiments.

In general FIGS. 41-42, include methods for data enrichment utilizing multiple data streams, according to some embodiments. The blocks and instructions described can be performed by HVAC system 300, in particular controller 310. Alternatively, or in combination, controller 1110, and/or BAS controller 3102 can perform the blocks and instructions. Furthermore, the methods 4100 and 4200 can be performed by any computing device described herein. It should be understood that methods 4100 and 4200 are shown to be performed by controller 310 for ease of explanation, and that any number of computing devices described herein may be used. In some embodiments, methods 4100 and 4200 are performed in real time for HVAC system 200 to balance energy cost and/or optimize building HVAC controls to mitigate risk of hospitalization (e.g., serious illness) from infectious disease (e.g., a subset of infection risk). In some implementations, methods 4100 and 4200 are not performed in real time (e.g., performed offline to modify building device parameters, such as periodically).

Methods 4100 and 4200 generally, a composite dataset can be generated or assembled based on, for example, building automation system (BAS) data, indoor air quality (IAQ) measurements, and/or space characteristics. In some embodiments, the composite dataset can be a collection of data collected over a 2-4 week timespan. Alternatively, the composite dataset can be a collection of data collected over any historical period of time (e.g., 1 hour, 2 days, 1 week, 3 months, etc.). In some embodiments, the BAS and IAQ data may be enriched using one another or using other data available to the building management system. In some embodiments, the BAS and/or IAQ data and/or other data about the building may be stored within one or more digital twins of the building and/or may be enriched using data stored in the digital twins. Some illustrative implementations of such digital twin-related features and infrastructure are described in U.S. patent application Ser. No. 17/504,121, which is incorporated herein by reference in its entirety.

Referring now to FIG. 41, a flowchart for a method 4100 for executing an indoor air quality (IAQ) analysis of a building is shown, according to some embodiments. Controller 310 or controller 1110 can be configured to perform method 4100. Further, any computing device described herein can be configured to perform method 4100.

In broad overview of method 4100, at block 4110, the one or more processing circuits (e.g., controller 310 or 1110) can obtain IAQ data. At block 4120, the one or more processing circuits can obtain BAS data. At block 4130, the one or more processing circuits can identify one or more unknown parameters. At block 4140, the one or more processing circuits can estimate the one or more unknown parameters. At block 4150, the one or more processing circuits can provide the estimated one or more unknown parameters. At block 4160, the one or more processing circuits can operate HVAC equipment. At block 4170, the one or more processing circuits can modify a control strategy. Additional, fewer, or different operations may be performed depending on the particular arrangement. In some embodiments, some, or all operations of method 4100 may be performed by one or more processors executing on one or more computing devices, systems, or servers. In various embodiments, each operation may be re-ordered, added, removed, or repeated. In some arrangements blocks can be optionally executed (e.g., blocks depicted as dotted lines) by the one or more processing circuits.

At block 4110, controller 310 can obtain IAQ data from one or more sensors within the building, wherein the IAQ data is associated with at least one of a plurality of environment species. For example, the IAQ data can be IAQ measurements from IAQ sensors (e.g., 3202). For example, the IAQ measurements can be collected by sensors 3202 and obtained (or collected) by controller 310. In particular, controller 310 can obtain IAQ measurements similar to how controller 310 obtains zone-by-zone temperature measurements from zone sensors 312 (as described in detail above with reference to FIG. 3). For example, an example sensor placement 3400 throughout a building is shown in FIG. 34. Sensors 3402 and 3404 shown can include similar features and functionality as sensors 3202 described in detail with reference to FIG. 32. Sensors 3402 (e.g., A-C) can be a first type of sensor, e.g., configured to collected measurements of humidity, volatile organic compounds (VOCs), polymerase chain reactions (PCRs), carbon dioxide, etc. Sensors 3404 (e.g., A-B) can be a second type of sensor, e.g., configured to collected measurements of particulate matter (PM), temperature, high resolution size-resolved particles, etc. In some embodiments, each sensor can communicate (e.g., via a wired or wireless connection) the collected measurements to an analysis system (e.g., 3204) or controller (e.g., 310, 1110,

3102). In various embodiments, multiple sensors may be installed in each space, or sensors installed in the spaces may include multiple different sensing capabilities (e.g., may be configured to sense multiple characteristics of the space such as humidity, carbon dioxide, temperature, etc.). In some implementations, the sensors may additionally or alternatively be installed in places other than in the space itself, such as in a VAV unit serving the space, an AHU serving the space, ductwork proximate to the space, etc.

At block 4120, controller 310 can obtain building automation system (BAS) data. The BAS data can be obtained from an HVAC system (e.g., 200, 300, 3100). For example, the BAS data can include, but are not limited to, fan power, air handling unit (AHU) coil load, reheat loads, supply temperature, outdoor air temperature, outdoor air humidity, supply flow, outdoor air flow, supply/return/mixed air temperature, and/or HVAC activation state (yes/no). In various embodiments, the controller 310 may weight the BAS data (e.g., prioritize) such that some of the data may be discarded, unused, or used in part, if prioritized data is available (e.g., fan power, AHU coil load and reheat loads may be prioritized over supply temperature, outdoor air temperature, and outdoor air humidity, which may be prioritized over supply floor, outdoor air flow, and HVAC active, in some implementations). The BAS data can be associated with a time stamp or time period over a period of time such that a timeseries can be used as input into timeseries resample 1212. In various embodiments, the BAS data can be room, space, or zone specific.

Additionally, at block 4120, controller 310 can obtain space characteristics of particular rooms, spaces, or zones from an HVAC system (e.g., 200, 300, 3100) or as user input via a user interface (e.g., 2100, 2200, 2300, 3107, 3109). For example, the space characteristics can include, but are not limited to, space dimensions, typical space use, max occupancy estimate, HVAC equipment type/identifier, room use schedule, deployed sensors identifiers (e.g., sensors 3402 and 3404). In some embodiments, the space characteristics may be stored and accessed locally (e.g., on school analysis system 3204) such that data may not be communicated to a cloud platform, keeping the IAQ measurements and BAS data anonymous. In some implementations, controller 310 may determine characteristics of the rooms from a building information model (BIM) file or other digital representation of characteristics of the spaces in the building. In some embodiments, controller 310 can determine what air cleaners or disinfection devices (if any) are installed in the room or zone. For example, if controller 310 determines a disinfection device is present in the room or zone, the controller 310 can operate (e.g., over a communication network) the disinfection device in response to determining a particular occupancy, ventilation rate, or a response from a predictive model (e.g., indicating a predicted value of a control objective). In the above example, if an occupancy is determined to be above a threshold (e.g., room capacity is 50 and the occupancy is above an occupancy threshold of 30), the controller 310 can activate or operate a disinfection device (e.g., UV light, disinfectant spray o In step 4130, controller 310 can identify one or more unknown parameters from the IAQ data and BAS data of two or more of the plurality of environment species. In some embodiments, the single-species model (Equation 1) can include a plurality parameters and some may be unknown based on the collected IAQ data and BAS data. Additionally, in some embodiments, some parameters for some single-species models may be unknown but the same parameters may be known for a different single-species model. Accordingly, the one or more unknown parameters can be identified and solved for in block 4140. For example, one unknown parameter may be occupancy. In another example, one unknown parameter may be outdoor flow rate. In yet another example, one unknown parameter may be recirculation flow rates.

At block 4140, controller 310 can estimate the one or more unknown parameters based on inputting the IAQ data and the BAS data into an optimization model, and wherein the optimization model analyzes predicted concentrations of the plurality of environment species subject to two or more of the plurality of environment species evolving according to a single-species concentration model. In general, estimating can be done simultaneously and can include generating a composite dataset of the determined unknown parameters by performing data enrichment. In particular, controller 310 can assemble and analyze the obtained data from the various data streams (e.g., IAQ measurements, BAS data, space characteristics). In some embodiments, the controller 310 can resample the obtained data based on obtaining additional data or information from the various data streams (e.g., 200, 300, 3100, 3202, etc.). The controller 310 can enrich the obtained data to simultaneously estimate the unknown parameters based on matching or corresponding the IAQ measurements with BAS data utilizing the space characteristics. In various embodiments, the composite dataset can be anonymized and/or cleaned based on various user preferences.

Referring to estimating in more detail, for a given species, airborne concentration evolves according to the following single-species concentration model (Equation 1, reproduced below):

$$V_{zone}\frac{dc_{zone}}{dt} =$$

$$g_{occ}N_{occ} + g_{bkgd} + f_{out}(c_{out} - c_{zone}) + f_{recirc}(c_{recirc} - c_{zone}) - k_{decay}c_{zone}$$

where $V_{zone}$ is the volume of air within in the zone (units of volume), $c_{zone}$ is the airborne concentration of the species within the zone (units of amount/volume), $g_{occ}$ is the per-occupant generation rate of the species (units of amount/time), $g_{bkgd}$ is the background generation rate of the species (units of amount/time), $f_{out}$ is the volumetric flow of outdoor air provided to the zone (units of volume/time), $c_{out}$ is the concentration of the species in the outdoor air, $f_{recirc}$ is the volumetric flow of recirculated building air to the zone (units of volume/time), $c_{recirc}$ is the concentration of the species in the recirculated building air (units of volume/time), and $k_{decay}$ is the natural first-order decay rate of the substance (units of 1/time).

In some embodiments, the single-species concentration model is an ordinary differential equation (ODE) model, and the plurality of environment species are subject to two or more of the plurality of environment species evolving according to the single-species concentration model using one or more basis function expansions (described below) of the one or more unknown parameters. The estimation of unknown values in a set of known measurements and parameters for each species is important for accurate predictions. To achieve this, controller 310 can perform an optimization where we define c[t] as the measured concentrations of each species, x[t] as the unknown quantities that need to be estimated, p[t] as the known parameters in the model, and y[t] as the predicted concentrations from the model. The optimization problem aims to find the values of x[t] that minimize the difference between y[t] and c[t]. In particular, the optimization model includes an objective function, and wherein the objective function is minimized by adjusting the one or more unknown parameters according to the predicted concentrations approximately matching one or more measured time series concentrations.

In some embodiments, each unknown quantity $x_i[t]$ can be represented as a linear combination of time-varying basis functions (Equation 8):

$$x_i[t] = \sum_{j=1}^{J_i} \alpha_{ij}\phi_{ij}[t]$$

where coefficients $\alpha_{ij}$ in this representation are unknown and need to be optimized in order to fit the model to the measured data, the basis functions $\phi_{ij}[t]$ are functions that are evaluated at discrete time points t, and the exact choice of basis functions is dependent on the specific quantity being modeled.

Thus, Equation 8 can reduce the problem to finding the optimal coefficients of the basis functions, which can be solved using optimization techniques. By using this approach, controller 310 can accurately estimate the unknown quantities and improve the prediction accuracy of the model. For instance, if a quantity remains constant over time, a single trivial basis function of $\phi_{i1}[t]=1$ can be used. On the other hand, for occupancy in certain indoor spaces like classrooms, meeting rooms, or event stadiums, piece-wise-constant basis functions can be used to reflect abrupt changes in occupancy at period changes. In other indoor spaces with a more continuous flow of people coming and going (e.g., gym, airport), spline functions may be a better choice to reflect the smooth changes in occupancy.

For airflows, controller 310 can distinguish between times when the HVAC system is active and inactive. During inactive hours, airflows can be small and constant, so a single constant basis function could be used. However, when the HVAC system is active, airflows can be much larger and may require different basis functions depending on the operation of the HVAC system. For fixed-volume systems, a single constant basis function may suffice, while for variable-volume systems, spline functions may be more appropriate. Thus, the choice of basis functions can ultimately depend on the specific characteristics of the HVAC system being modeled. For airflows, controller 310 can distinguish between times when the HVAC system is active and inactive. Thus, the optimization problem aims to find the optimal values of x[t], y[t], and $\alpha_{ij}$ that minimize the sum of the squared differences between the predicted concentrations (y[t]) and the measured concentrations (c[t]). Once appropriate basis functions are determined by controller 310 the optimization problem can be as follows (Equations 9):

$$\min_{x[t],y[t],\alpha_{ij}} \sum_t \|y[t] - c[t]\|^2$$

$$\text{such that (s.t.)} \quad y[t+1] = f(x[t], y[t[, p[t])$$

$$x_i[t] = \sum_{j=1}^{J_i} \alpha_{ij}\phi_{ij}[t]$$

$$x_{min} \leq x[t] \leq x_{max}$$

where the function f($\bullet$, $\bullet$, $\bullet$) represents the one-step simulation of the single-species concentration model given in the previous section, applied to each measured species. In particular, the function $f(\supseteq, \bullet, \bullet)$ represents the mathematical representation of the one-step simulation of the single-species concentration model (e.g., Ordinary Differential Equation (ODE)) that is described above, and it is applied to each of the measured species. This enables the controller 310 to estimate the values of the unknown quantities, x[t], it attempts to determine by fitting them to the measured concentrations, c[t].

It should be understood that the occupancy and airflow variables $N_{occ}$, $f_{out}$, and $f_{recirc}$ should be constant across all the measured species. Thus, the optimizer must find profiles that simultaneously fit all data streams. In particular, by implementing the optimization problem and single-species concentration models described herein, controller 310 can determine the optimal solution that fits all the data streams as closely as possible. For example, a time series occupancy trajectory and a ventilation trajectory will be constant for each of a plurality of single-species concentration models, but the predicted concentrations can be different for each of the plurality of single-species concentration models. Therefore, the end arc trajectory, $f_{out}$ and $N_{occ}$ (both time series) are the same for both the $CO_2$ and PM models. The concentration measurements, on the other hand, may have different generation and decay terms, but they are all influenced by the same inputs, such as the number of occupants in the room and the outdoor air flow rate. By keeping these inputs constant across all species, controller 310 ensures that the model accurately describes multiple data streams simultaneously, rather than just one individual data stream at a time. In some embodiments, controller 310 can include simple box constraints on the unknown quantities to ensure that they remain within a physically reasonable range. The optimization can be solved via nonlinear programming techniques, such as, but not limited to, gradient descent, sequential quadratic programming, and interior point methods. As shown, the optimizer reduces (or minimizes) the sum of the squared differences (see Equations 9) between the predicted and measured concentrations, with respect to the unknown quantities x[t], y[t], and $\alpha_{ij}$.

Subject to the constraints the relationship between x[t] and y[t], is described by the function f(x[t], y[t], p[t]), where p[t] are the known parameters in the model. The unknown quantity $x_i[t]$ can represented as a sum of time-varying basis functions, where $\alpha_{ij}$ are the unknown coefficients and $\varphi_{ij}$ are the basis functions evaluated at time t. In some embodiments, the values of x[t] must be within a defined range, with lower and upper bounds of $x_{min}$ and $x_{max}$, respectively. Accordingly, the optimization problem can be solved using nonlinear programming techniques, which involves finding the minimum value of the objective function (see Equation 9), subject to the constraints that $$y[t+1] = f(x[t], y[t], p[t]), \; x_i[t] = \sum_{j=1}^{J_i} \alpha_{ij}\phi_{ij}[t], \text{ and } x_{min} \le x[t] \le x_{max}.$$

In one example, suppose controller 310 is to estimate the occupancy and outdoor-air ventilation in a classroom space with variable ventilation and no recirculation based on measurements of CO2 and PM concentrations. To achieve this goal, controller 310 determines the unknown quantities x, which in this case are $$x := \left( N_{occ}, f_{out}, g_{occ}^{PM} \right),$$

while the measured species are $$c = y := \left( c_{zone}^{CO2}, c_{zone}^{PM} \right),$$

and the known quantities are $$p := \left( c_{out}^{CO2}, g_{occ}^{CO2}, c_{out}^{PM}, k_{decay}^{PM} \right),$$

with remaining values all set equal to zero. It can be assumed that each unknown quantity can be represented as a sum of time-varying basis functions, where the $\alpha_{ij}$ are unknown coefficients to be determined through optimization and the $\varphi_{ij}$ are the ith basis function evaluated at discrete time t. For this particular example, controller 310 could use piecewise-constant basis functions for $N_{occ}$, splines for $f_{out}$, and a constant basis for $$g_{occ}^{PM}.$$

The optimization problem is formulated by minimizing (or reducing) the sum of the squared difference between the predicted and measured concentrations, subject to the one-step simulation of the species-specific concentration model, applied to each measured species, and box constraints on the unknown quantities to ensure they remain within a physically reasonable range. After solving the optimization problem, controller 310 will have estimated time-series values for occupancy and ventilation, along with a constant estimate for the per-occupant generation rate of PM, which was not known a-priori.

The optimization problem controller 310 seeks to solve in this scenario is to estimate the unknown quantities of occupancy ($N_{occ}$), outdoor-air ventilation ($f_{out}$), and the per-occupant generation rate of $$PM\left( g_{occ}^{PM} \right)$$

based on the measured CO2 and PM concentrations $$\left( c_{zone}^{CO2}, c_{zone}^{PM} \right)$$

in a classroom space with variable ventilation and no recirculation. The other known quantities are the outdoor CO2 concentration $$\left( c_{out}^{CO2} \right),$$

the per-occupant generation rate of CO2

$$\left( g_{occ}^{CO2} \right),$$

the outdoor PM concentration $$\left(c_{out}^{PM}\right),$$

and the PM decay rate $$\left(k_{decay}^{PM}\right),$$

all of which are set to zero. The objective of the optimization is to minimize the prediction error between the measured and predicted concentrations of CO2 and PM. With these assumption, the optimization problem can be as follows (Equation 10):

$$\min_{\substack{c_{zone}^{*}[t],N_{occ}[t] \\ f_{out}[t],g_{occ}^{PM}[t],\alpha_{ij}}} \sum_{t}\lambda_{CO2}\left|c_{zone}^{CO2}[t]-c_{meas}^{CO2}[t]\right|^{2}+\lambda_{PM}\left|c_{zone}^{PM2}[t]-c_{meas}^{PM}[t]\right|^{2}$$

$$\text{s.t. } c_{zone}^{CO2}[t+1]=c_{zone}^{CO2}[t]+\frac{\Delta}{V}\left(g_{occ}^{CO2}N_{occ}[t]+f_{out}[t]\left(c_{out}^{CO2}[t]-c_{zone}^{CO2}[t]\right)\right)$$

$$c_{zone}^{PM}[t+1]=$$

$$c_{zone}^{PM}[t]+\frac{\Delta}{V}\left(g_{occ}^{PM}[t]N_{occ}[t]+f_{out}[t]\left(c_{out}^{PM}[t]-c_{zone}^{PM}[t]\right)-k_{decay}^{PM}c_{zone}^{PM}[t]\right)$$

$$N_{occ}[t]=\sum_{j=1}^{J_{1}}\alpha_{1j}\phi_{1j}[t]$$

(Piecewise-constant basis functions)

$$f_{out}[t]=\sum_{j=1}^{J_{2}}\alpha_{2j}\phi_{2j}[t]$$

(Spline basis functions)

$$g_{occ}^{PM}[t]=\alpha_{31}$$

(Constant basis function)

As shown, the optimization problem can be subject to $$c_{zone}^{CO2}[t+1]$$

and $$c_{zone}^{PM}[t+1]$$

equality constraints that represent the one-step simulation of the ODE model. Additionally, the following constraints that determine the occupancy and ventilation variables based on the basis functions include: $N_{occ}[t]$, $f_{out}[t]$, and $$g_{occ}^{PM}[t].$$

Furthermore, the independent variables in the above example of the optimization problem are the coefficients of the basis functions ($\alpha_{1j}$ and $\alpha_{2j}$), while the other variables are determined by the equality constraints. In some embodiments, the optimization problem can be solved using non-linear programming techniques. It should be understood that while an explicit Euler method was used, a more robust numerical integration scheme (e.g., such as Runge-Kutta 4) could be used instead.

Accordingly, the optimization problem example defined above involves minimizing (or reducing) the sum of the prediction errors of the CO2 and PM concentrations $$\left(c_{zone}^{CO2}[t],\right.$$

and $$\left.c_{zone}^{PM}[t]\right)$$

in the classroom space. The prediction errors are calculated as the difference between the measured concentrations $$\left(c_{meas}^{CO2}[t]\text{ and }c_{meas}^{PM}[t]\right)$$

and the simulated concentrations of the species, which are dependent on the unknown variables ($N_{occ}[t]$, $f_{out}[t]$, and $$g_{occ}^{PM}[t]).$$

The optimization problem is subject to the constraints imposed by the one-step simulation of the single-species concentration model, which governs the dynamics of the species' concentrations. In some embodiments, the objective function can be weighted by $\lambda_{CO2}$ and $\lambda_{PM}$ coefficients and can represent the balance between the prediction errors for CO2 and PM according to the weights. That is, each environment species of the plurality of environment species can be scaled according to one or more scaling coefficients of the optimization model. In some embodiments, the one or more scaling coefficients can be determined based comparing a first accuracy of a first sensor configured to collect the IAQ data for a first environment species (e.g., CO2) with a second accuracy of a second sensor configured to collect the IAQ data for a second environment species (e.g., PM) and in response to comparing the first accuracy and the second accuracy, biasing, using the coefficients, either the first environment species or the second environment species in the optimization model. That is, each sensor may have a designated accuracy (e.g., accuracy (at standard pressure, 1 atm): low range: 0 to 1,000 ppm: +/−100 ppm; 1,000 to 10,000 ppm: +/−10% of reading), calculated uncertainty of measurements, gross error, random error, systematic error, etc.), and the sensors with the greater accuracy or lower error may be biased (e.g., favored) over less accurate or higher error sensors within a building.

In some embodiments, $\|y[t]-c[t]\|^2$ of Equations 9 and $\|c_{zone}*[t]-c_{meas}*[t]\|^2$ of Equations 10 are the predicted errors of the optimization model of the two or more environment species of the plurality of environment species. In particular, the predicted errors can be scaled according to one or more scaling coefficients (i.e., $\lambda_*$, sometimes referred to as "scaling factors") of the optimization model, wherein the two or more of the plurality of environment species can be collected from a sensor of the one or more sensors.

In some embodiments, the time series data used in the optimization problem can cover an entire data collection period, which can vary in length depending on the sample rate (e.g., every minute, every 5 minutes, for a day, a week, etc.). The optimizer can be implemented by controller 310 to find a piecewise constant trajectory for each of the variables (occupancy, outdoor flow rate, and PM generation rate) over the entire data period. That is, the optimization problem being solved minimizes the discrepancy between the predicted CO2 and PM concentrations and the measured time series data. To achieve this goal, the controller 310 executing the optimization will adjust the coefficients (alpha variables) of the basis functions in the model, which ultimately determines the time series variables that are used to calculate the objective function. The controller 310 will iteratively adjust these alpha values until the objective function is minimized, meaning the predicted and measured data match as closely as possible. In particular, the optimizer works by expanding the basis functions and solving the optimization problem to find the trajectory that minimizes the objective function. This is achieved by considering all variables (occupancy, outdoor flow rate, and PM generation rate) and ensuring that the inputs that influence the concentration levels are constant across all models, as they describe the same room, occupants, and airflow. Accordingly, by implementing the optimized ventilation trajectory, recirculation rate, and occupancy, the optimizer can determine an optimal way to control the air quality in the room. The time series data used in the optimization problem can cover the entire data collection period, regardless of the sample rate, so that the optimization process is as accurate as possible.

Expanding on the advantages of using multiple species models instead of just one species model to estimate occupancy and ventilation, this approach leads to greater robustness in the face of measurement or model errors. The one species model may assume that the space is well-mixed, which may not always be the case. For example, there may be dead spaces in the zone, fluctuations in background rate, and other complicating factors that can make it difficult to get an accurate estimate of occupancy and ventilation. This is especially true if the infection-risk monitoring procedure is only considering one species, as it can be challenging to differentiate between an increase in occupancy and a decrease in ventilation rate. For example, if CO2 levels increase, it can be hard to determine whether this is due to more people in the space or a decrease in the ventilation rate. However, by using multiple species simultaneously, HVAC systems, controllers, and building operators gain a greater chance to differentiate between these effects. For example, the difference in PM levels between indoors and outdoors will have a different profile compared to CO2. This allows controller 310 to deconvolve the two time series and be more confident in attributing changes to specific causes, such as increased ventilation or decreased occupancy. Thus, using multiple species simultaneously provides a clearer picture of the changes taking place in a space, leading to more accurate estimates of occupancy and ventilation.

By using multiple species models, the possibility of measurement or model errors is reduced. For example, if only CO2 is used to estimate occupancy and ventilation, it can be difficult to determine the specific reason for an increase in CO2 concentration. It could be due to an increase in the number of people in the space or a decrease in the ventilation rate. However, by using both CO2 and PM models, it is easier to deconvolve the time series and determine the specific cause of changes in concentration levels. The different profiles of CO2 and PM between indoors and outdoors also play an important role in improving the accuracy of the estimates. For example, if the difference in CO2 concentration between indoor and outdoor is high, it could be due to a change in ventilation rate, but it could also be due to a change in occupancy. However, if PM concentration is also used, the difference in PM concentration between indoor and outdoor will provide additional information that can help to determine the specific cause of changes in CO2 concentration. Therefore, by using multiple species models, it is possible to improve the accuracy and robustness of occupancy and ventilation estimates. This is because multiple streams of data are being described simultaneously, providing multiple chances to distinguish between different factors that may influence concentration levels.

In some embodiments, it may be advantageous to use a single species model to determine occupancy and ventilation. In one example, other data streams may not be informative for a specific space, e.g., rooms where the PM measurements are almost all zero (because the actual value is below the detection threshold of the sensor). In another example, fitting to the particular data might erroneously imply that there is zero occupancy or outdoor-air flow. In yet another example, when computational cost and processing load is desired to be low, a single species model may be used. In some embodiments, the one or more processing circuits can (1) obtain IAQ data associated with an environment species, (2) obtain building automation system (BAS) data, (3) identify occupancy and ventilation rate as a plurality of unknown parameters from the IAQ data and BAS data the environment species, and (4) simultaneously estimate the occupancy and the ventilation rate based on inputting the IAQ data and the BAS data into an optimization model, and wherein the optimization model minimizes predicted concentrations of the environment species subject to the environment species evolving according to a single-species concentration model.

In some embodiments, time-varying ventilation rate may be known. In the following scenario, the process of estimating occupancy and ventilation rates involves using a mathematical model to make predictions about the concentration of CO2 in a given space (Equation 11):

$$\frac{dC_{CO_2}}{dt} = \frac{Q_b}{V}C_{CO_2,b}N_t(t) - k_a(t)\big(C_{CO_2} - C_{CO_2,OA}\big)$$

The model is based on an ordinary differential equation (ODE) that considers the CO2 concentration as the state variable. In this model, the CO2 concentration ($C_{CO_2}$) changes over time based on the breath rate of the occupants ($Q_b$), the volume of the space (V), the concentration of CO2 in exhaled breath ($C_{CO_2,b}$), and the outdoor air CO2 concentration ($C_{CO_2,OA}$). The model takes into account the fact that the CO2 concentration will increase as more people enter the space, due to the increased rate of breathing. The rate of ventilation ($k_a(t)$) is also considered, as it helps to regulate the CO2 concentration in the space by exchanging indoor air with outdoor air. The goal of the model is to infer the number of people present in the space ($N_t(t)$) at any given time. In some embodiments, the value of $k_a(t)$ can be assumed to be measured in the model, but it can also be estimated directly by observing changes in the CO2 concentration and considering other factors such as the volume of the space and the rate of air exchange. This information can be used to make predictions about the occupancy rate in the space over time, and to make decisions about how to optimize the ventilation system to improve indoor air quality.

In some embodiments, the parameter-estimation problem includes the refinement of two key aspects, which are discretization in time and the selection of basis functions for the unknown parameters. To achieve the discretization, a fixed sample rate of 1 minute ($\Delta=1$ min) is selected, and a new function, $f(C_{CO2}, N_t, k_a)$, is defined to implement the explicit Runge-Kutta 4 discretization of the ODE model. Additionally, the appropriate basis functions $\phi_i[t]$ can be selected for $N_t$ for the parameter-estimation process. The resulting optimization problem is thus (Equations 12):

$$\min_{\alpha_1,\ldots,\alpha_1} E := \sum_t |C_{CO2}^m[t] - C_{CO2}[t]|^2$$

$$\text{s.t. } C_{CO2}[t+1] = f(C_{CO2}[t], N_t[t], K_a[t])$$

$$N_t[t] = \sum_{i=1}^{I} \alpha_i \phi_i[t]$$

$$N_t^{min} \leq N_t[t] \leq N_t^{max}$$

To obtain estimates of occupancy and ventilation rates, the ODE model can be modified (1) by discretizing it in time and selecting suitable basis functions for the unknown parameters. A fixed sample rate of $\Delta=1$ minute is chosen, and a new function, $(C_{CO2}, N_t, k_a)$, is defined to represent the discretized form of the ODE model. In some embodiments, the function is linear in the first two variables and results in a convex quadratic programming problem that can be solved using optimization methods. Given CO2 concentration measurements, $$C_{CO2}^m,$$

and pre-defined occupancy bounds $$\left(N_t^{min} \text{ and } N_t^{max}\right),$$

controller 310 can determine the occupancy profile over time. The bracket notation [t] indicates that the quantities are defined in discrete time.

For example, as the monitoring of spaces and zones can be a primary objective, it can assume that the occupancy profile is piecewise-constant and changes values abruptly during changes (e.g., when meetings occur, when classes change, during a fitness class timeslot). Based on this assumption, the occupancy is expected to remain constant for 30 minutes during occupied hours (8 am to 10 pm) and for 60 minutes otherwise. The basis functions $\phi_i[t]$ can be chosen based on these expected occupancy profiles, and thus, the values of basis functions are given by (Equation 13):

$$\phi_i[t] := \begin{cases} 1, & \text{if } \tau_i \leq t \leq \tau_{i+1} \\ 0, & \text{else} \end{cases}$$

where $\tau_i$ is the sequence of change times, with separation of 30 or 60 minutes between successive points. As shown, occupancy can be estimated when ventilation rate is known using Equations 11-13.

In some embodiments, when time-varying ventilation rate is not known, the time-varying ventilation rate can be determined using an optimization problem. That is, when airflow parameters (sometimes referred to herein as "ventilation parameters") are unknown an optimization problem can be applied to a given dataset to estimate the time-varying occupancy profile. The objective of the analysis is to estimate the ventilation rate $k_a(t)$ in a room. The approach is to assume that the ventilation rate is constant, represented by $\bar{k}_a$, over the time horizon. Furthermore, controller 310 can let $E(\bar{k}_a)$ denote the optimal value of the optimization problem assuming $k_a[t]=\bar{k}_a$, and $N_t[t](\bar{k}_a)$ give the corresponding value for the occupancy profile. To estimate $\bar{k}_a$, controller 310 can solve the one-dimensional optimization problem (Equation 14):

$$\min_{\bar{k}_a} E(\bar{k}_a) \text{ s.t. } k_a^{min} \leq \bar{k}_a \leq k_a^{max}$$

The problem of estimating the ventilation rate, $k_a(t)$, can be approached by assuming the rate to be constant, denoted as $\bar{k}_a$, over the given time horizon. This enables controller 310 to calculate the optimal value of the optimization problem, represented by $E(\bar{k}_a)$, and the corresponding occupancy profile, represented by $N_t(t)$. To estimate the constant ventilation rate, controller 310 can solve a one-dimensional optimization problem by using the volume-normalized $k_a$ as the decision variable. The advantage of using this variable is that its value should always lie between 1 and 10 h$^{-1}$, which is independent of any species area or zone. In some embodiments, this problem can be solved using bounded scalar optimization techniques or even via an exhaustive grid search with a chosen granularity. To estimate the uncertainty in the estimate, a level set of the objective function is taken, with the threshold set to 50% higher than the optimal value $E(\bar{k}_a^*)$.

When there are sufficient number of large occupancy changes, the procedure of estimating the ventilation rate can produce a tight range of values by matching the exponential decay predicted by the model during such events to the measured data. However, if the occupancy is relatively constant, the data may be dominated by the pseudo-steady relationship (Equation 15):

$$C_{CO2} - C_{CO2,OA} = \frac{Q_b C_{CO2,b} N_t}{k_a V}$$

When pseudo-steady relationship dominates it makes the resulting uncertainty region extremely large (i.e., linearly degenerate). This is because almost any value of $k_a$ can produce a low value of the objective function by simply re-scaling the corresponding $N_t$. For example, a ventilation estimate of $1$ $h^{-1}$ with an average occupancy of 10 people will give almost the same objective value as a ventilation estimate of $10$ $h^{-1}$ with an average occupancy of 100 people. Thus, some modification is needed.

In order to address the linear degeneracy issue, peak occupancy over a given period of time may be determined. That is, the fact that while the full time-varying occupancy profile may not be known, the peak occupancy $(N_t)$ over a given time period is often well understood or can be determined. To utilize this information, controller 310 can define $N_p(\bar{k}_a)$ as the pth percentile of the occupancy estimates $N_t[t](k_a)$ and thus aim for $N_{95\%}(\bar{k}_a)$ to approximate ($\approx$) $\hat{N}_t$. The choice of the 95th percentile (or 90th or 85th) is made to account for small periods of abnormal data, such as when the HVAC system is temporarily shut down for maintenance. By incorporating this relationship into the cost function, a modified optimization problem can provide a more accurate estimate of ventilation rate (Equation 16):

$$\min_{\bar{k}_a} E(\bar{k}_a) + \mu(\bar{k}_a)\left|N_{95\%}(\bar{k}_a) - \hat{N}_t\right| \text{ s.t. } k_a^{min} \le \bar{k}_a \le k_a^{max}$$

where $\mu(\bullet)$ is a scaling factor to weight the two terms (Equation 17):

$$\mu(\bar{k}_a) := 0.05\frac{Q_b C_{CO2,b}}{k_a V}$$

Thus, to overcome the limitations of the previous approach (Equations 14-15), the new optimization problem (Equations 16-17) includes an additional term that penalizes the difference between the 95th percentile of the occupancy estimates and the estimated peak occupancy. This helps to account for the error that could result from differences in occupancy, as the pseudo-steady model is based on a constant occupancy assumption. The scale factor of the penalty term can be adjusted based on the confidence in the estimated peak occupancy. In some embodiments, this scale factor can be increased or decreased depending on the level of confidence in the assumed peak occupancy estimate $\hat{N}_t$. This allows for greater flexibility and accuracy in the final estimated ventilation rate.

At block 4150, controller 310 can provide the estimated one or more unknown parameters to one or more predictive models configured to predict values of a control objective for one or more building zones as a function of control decision variables for HVAC equipment. That is, the composite dataset (e.g., estimated unknown parameters) can be provided to various systems and models described herein. In general, the composite dataset can be used in performing infection metric analysis, Pareto optimization, sustainability metric analysis, energy cost analysis, infection modeling (e.g., Wells-Riley based model) etc. Accordingly, using the composite dataset can improve accuracy of simulations or predictions of models and analyses. For example, the composite dataset can be used when performing step 1704 or validating the selected Pareto optimal solution in step 1716 of process 1700. In yet another example, controller 1110 can use the composite dataset when performing any of the Pareto optimization techniques described herein. In yet another example, the composite dataset can be supplemented (i.e., user as additional data with additional data points) as input parameters in step 1802 or used in validating the simulation in step 1808 of process 1800. In yet another example, the composite dataset can be supplemented as operational data in step 1904 or used in obtaining an occupancy profile in step 1908 of process 1900.

Referring again to FIGS. 11-19, the controller 1110 (or 310) can be configured to perform any of the Pareto optimization techniques described herein to perform a historical analysis for the building 10 that the HVAC system 300 serves. For example, the controller 1110 can use the composite dataset including IAQ measurements, BAS data, and space characteristics to supplement or substitute the modeling data 1218 and/or a data model 1202 that is based on historical data of the building 10, weather conditions, occupancy data, etc. In some embodiments, the controller 1110 is configured to perform the simulation and Pareto optimization techniques to determine different sets of values for hospitalization risk (e.g., subset of infection risk), the energy cost (described above), and infection risk (described above), carbon reduction, etc., and determine which of these sets are feasible, infeasible, Pareto optimal, etc., and compare the different Pareto optimal solutions to estimated actual energy consumption (e.g., as read on a meter or other energy consumption sensor), and estimated hospitalization risks that are determined based on the composite dataset, and/or historical data of the building 10 or the HVAC system 300.

In some embodiments, the analysis mode outputs 1234 (e.g., analysis results over a previous or historical time period) and the advisory mode outputs 1240 (e.g., suggested operating points for the HVAC system 300 such as different Pareto optimal points) can be used, according to different Pareto optimal solutions as described in greater detail above with reference to FIGS. 13-16. In some embodiments, the controller 1110 is configured to use energy cost or energy consumption data, and associated infection risk data (e.g., values of the objective functions and the newly obtained composite dataset) and compare them to energy cost or energy consumption data, and associated infection risk data (including the composite datasets) of a previous time period (e.g., a same month from a year ago) to provide the user with information regarding improved efficiency of the HVAC system 300 resulting from operating the HVAC system 300 according to a Pareto optimal solution.

At block 4160, controller 310 can operate HVAC equipment to affect an environmental condition (e.g., disinfection, recirculation, ventilation, warm or cool, humidity, etc.) of the building in accordance with a selected set of the optimization results from the one or more predictive models. For example, exhaust air damper 216, mixing damper 218, or outside air damper 220 may be operated. In another example, controller 310 operate the HVAC system 200 to maintain an actual probability of infection P below (or drive the actual probability of infection below) a constraint or maximum allowable value. In yet another example, controller 310 operates one or more filters 308 and UV lights 306 to provide disinfection for building zones 206. In yet another example, controller 310 operates to draw outdoor air and/or recirculated air (e.g., from zones 206) to output conditioned (e.g., cooled) air.

At block 4170, controller 310 can modify a control strategy for the one or more building zones based on satisfying a ratio between the estimated occupancy and the estimated ventilation rate (e.g., improving a value of the predicted values). For example, after determining an occupancy time series and a ventilation time series the controller 310 may determine a ratio of occupants to ventilation/airflow rate is incorrect. For example, the higher the number of occupants the greater than airflow rate, but if controller determines the estimated occupancy is high (e.g., close to a building or room capacity) but the ventilation rate is low (e.g., off or on standby with minimal air circulation) the ratio may be considered incorrect and a control strategy for the building may be modified. In some embodiments, one or more instructions generated by the processing circuits are used to implement a control strategy that adjusts at least one control of the HVAC equipment. The control strategy is based on the time series outdoor airflow rate, which can be maintained during the ventilation schedule. The BMS uses the time series outdoor airflow rate to adjust the HVAC equipment, for example, by adjusting the airflow rate, temperature, and humidity, to ensure that the building's IAQ meets the desired standards. This includes maintaining the desired outdoor airflow rate, which is calculated using the IAQ data and occupancy estimates. The BMS continuously monitors the IAQ data, and adjusts the HVAC equipment in real-time to ensure that the ventilation schedule is followed, and the building's IAQ is maintained.

In some embodiments, the one or more processors further configured to execute the one or more predictive models to (1) scale at least one of the first control objective or the second control objective based on the estimated one or more unknown parameters and at least one hospitalization metric, (2) execute an optimization process using the one or more predictive models to produce multiple sets of optimization results of the control decision variables and corresponding sets of optimal values of the first control objective and the second control objective for a time period, (3) select one or more of the sets of optimization results, and (4) operate the HVAC equipment to affect an environmental condition of the building in accordance with the values of the control decision variables corresponding to a selected set of the optimization results. Additionally details regarding scaling, executing an optimization process, selecting optimization results are described in detail below with reference to the priority based wells-riley equation incorporating hospitalization risk and the hospitalization metric techniques.

Referring now to FIG. 42, a flowchart for a method 4200 for executing an indoor air quality (IAQ) analysis of a building is shown, according to some embodiments. Controller 310 or controller 1110 can be configured to perform method 4200. Further, any computing device described herein can be configured to perform method 4200.

In broad overview of method 4200, at block 4210, the one or more processing circuits (e.g., controller 310 or 1110) can obtain IAQ data. At block 4220, the one or more processing circuits can obtain BAS data. At block 4230, the one or more processing circuits can estimate at least one airflow parameter. At block 4240, the one or more processing circuits provide the estimated at least one airflow parameter. At block 4250, the one or more processing circuits can provide the operate HVAC equipment. At block 4260, the one or more processing circuits can modify a control strategy. Additional, fewer, or different operations may be performed depending on the particular arrangement. In some embodiments, some, or all operations of method 4200 may be performed by one or more processors executing on one or more computing devices, systems, or servers. In various embodiments, each operation may be re-ordered, added, removed, or repeated. In some arrangements blocks can be optionally executed (e.g., blocks depicted as dotted lines) by the one or more processing circuits.

At blocks 4210 and 4220, controller 310 can obtain IAQ data from one or more sensors within the building, wherein the IAQ data is associated with at least one of a plurality of environment species, and obtain building automation system (BAS) data. Blocks 4210 and 4220 include similar features and functionality as described in detail with reference to blocks 4110 and 4120 of FIG. 41.

At block 4230, controller 310 can estimate at least one airflow parameter for a plurality of single-species concentration models based on enriching two or more of the plurality of environment species, wherein enriching includes estimating the least one airflow parameter based on inputting the IAQ data and the BAS data into an optimization model and scaling the optimization model according to an occupancy parameter (e.g., peak occupancy) over a given time period. In some embodiments, the airflow parameters (with reference to Equation 1 and Equations 8-10) are $f_{out}$ and $f_{recirc}$. Additional details regarding peak occupancy (i.e., an occupancy parameter) and relevant equations are described below with reference to Equations 16 and 17. In various embodiments, airflow parameters can be estimated when occupancy is already known (e.g., measured or estimated another way). For example, when occupancy is already known, the controller 310 can validate an appropriate amount of ventilation is being provided based on the occupancy.

In some embodiments, the estimated at least one airflow parameter is an estimated ventilation rate. In particular, controller 310 can compare an expected ventilation rate of the HVAC system with the estimated ventilation rate and in response to the expected ventilation rate and the estimated ventilation rate diverging from each other, modify a control strategy for the one or more building zones based on the estimated ventilation rate and a ventilation schedule for the one or more building zones. For example, the controller 310 can then use an ASHRAE outdoor airflow rate and/or estimated outdoor airflow rate (or ventilation rate) and compare it to the actual outdoor airflow rate, as well as take into account any uncertainty in the outdoor airflow rate. This information can then use as input into a ventilation cost model, which can calculate the potential savings from implementing DCV by comparing the energy consumption under the current outdoor airflow rate to the energy consumption under the ASHRAE recommended rate. In some embodiments, a time series of the outdoor airflow rates can then be compared with a ventilation schedule that was input by the user or determined by the system. This comparison allows controller 310 to identify any deviations or discrepancies between the actual outdoor airflow rates and the desired ventilation schedule. The time series outdoor airflow rate can be used to identify patterns and trends in the outdoor airflow rates over time, which can be used to make adjustments to the ventilation schedule to improve energy efficiency or IAQ. Additionally, the estimated time series outdoor airflow rate can be used to detect any unexpected changes or anomalies in the outdoor airflow rates, which can be used to trigger alarms or notifications to alert the building's occupants or maintenance personnel.

At block 4240, controller 310 can provide the estimated at least one airflow parameter to one or more predictive models configured to predict values of a control objective for one or more building zones as a function of control decision variables for HVAC equipment. Block 4240 includes similar features and functionality as described in detail with reference to block 4150 of FIG. 41.

At blocks 4250 and 4260, controller 310 can operate the HVAC equipment to affect an environmental condition of the building in accordance with a selected set of the optimization results from the one or more predictive models, and in response to estimating the at least one airflow parameter, modify a control strategy or ventilation schedule for the one or more building zones based on the estimated at least one airflow parameter. Blocks 4250 and 4260 include similar features and functionality as described in detail with reference to blocks 4160 and 4170 of FIG. 41.

In some embodiments, an occupancy estimate and a particle generation rate are back calculated based on (i) calculating a time series particle disturbance based on the estimated ventilation rate and the IAQ data, wherein an increase in a portion of the time series particle disturbance indicates an increase in occupancy of the one or more building zones of the building, and (ii) calculating a particle generation rate based on an occupancy dataset comprising occupant ages and occupant metabolic rates. That is, the back calculation process takes into account the occupancy and metabolic rate of occupants, which affect the particle generation rate in the building. This information can be used to understand how the outdoor airflow rate affects the particle concentration and how it can be optimized to improve IAQ.

Priority Based Wells-Riley Equation Incorporating Hospitalization Risk

Referring again to FIGS. 3-4, a priority based modification of the Wells-Riley equation can be implemented by controller 310 as described herein, controller 310 may use the priority based Wells-Riley equation (or a dynamic version of the Wells-Riley equation) to determine an actual or current probability of infection and enable a user to specify the infection risk metric to use and then specify one or more priorities (e.g., hospitalization risks), either by selecting from a set of pre-defined profiles (e.g., "minimum-energy", "maximum-disinfection", or "balanced") or by defining a desired custom profile (e.g., using some of the filtering options discussed herein).

The controller 310 could automatically run the Pareto optimization each day, choose the best solution given the user's chosen profile, and then automatically dispatch setpoints to the BMS with no manual intervention required, in some embodiments. The controller 310 could also evaluate the design decisions on a slower frequency (e.g., weekly, monthly) and then make specific recommendations for design decisions (e.g., "add a 1000 CFM air-cleaner to Zone 2") that could be accompanied by estimates of infection risk (e.g., incorporating hospitalization risk) and energy cost benefits should a recommendation be implemented. Furthermore, if the user's specified infection-risk goals consistently cannot be met, the application could generate an alarm that infection risk is too high and that occupancy reductions should be considered.

In some implementations, a priority based version of the Wells-Riley equation can be expressed as:

$$\text{Metric}=R \times \sigma_{Immunity} \times \sigma_{Infector} \times \sigma_{Outcome} \times \sigma_{Community}$$

where R is in-building per-infector daily transmission rate or reproductive number (calculated from a clean-air optimization model including Equation 7, assuming one infectious occupant with all other occupants susceptible, with reference to FIGS. 3-4), $\sigma_{Immunity}$ is the adjustment to number of susceptible due to immunity, $\sigma_{Infector}$ is the adjustment to number of infectors in the building, $\sigma_{Outcome}$ is the scale for infection-related outcome being considered, and $\sigma_{Community}$ is the scale to consider secondary spread in the community. Accordingly, each σ can be a different priority of the user or building manager and can be customized based on preferences, environment, and localized infection/hospitalization risk. That is, each σ can be scaled based on a user preference or automatically by controller 310.

In some embodiments, a control could modify a control strategy for the one or more building zones based on improving a value of the predicted value. For example, a predicted value could be the reproductive number (e.g., which should be maintained below 1). In another example, a predicted value could be any of the modified reproductive-number metrics described herein. In yet another example, the controller could control a specific equivalent outdoor-air delivery rate ($\times_{EOA}$) or EOA per person ($\lambda_{EOA}$/person). In some embodiments, additional priorities can be incorporated into the priority based Wells-Riley equation. In various embodiments, some priorities may be removed from the priority based Wells-Riley equation. The Wells-Riley equation and implementations are described with further reference to U.S. patent application Ser. No. 16/927,759, filed Jul. 13, 2020, and U.S. patent application Ser. No. 16/927, 766, filed Jul. 13, 2020, both of which are incorporated by reference herein in their entirety.

As shown below, the following parameters can be used in scaling the various priorities: A model output variable includes:

R: daily building transmission rate [#transmissions per infector per day]

Building parameter variables include:

$N_O$: total number of occupants in the building [#]

$N_V$: total number of vaccinated (or otherwise immune) occupants [#]

Location-dependent external parameter variables include:

$p_i$: fraction of occupants that are infectious (equal to community infection rate) [0-1]

$R_c$: community reproductive number [#new infections per infector]

Location-independent external parameter variables include:

$p_h$: probability that an infection leads to hospitalization (or other severe outcome) [0-1]

$p_a$: probability that an infection leads to an absence [0-1]

$t_l$: latent period for infection spread [days]

Cim: immunity effectiveness against re-infection [0-1]

In some embodiments, the immunity scale option (Immunity) can be prioritized based on:

| Name | $\sigma_{Immunity}$ | Description |
|---|---|---|
| None | 1 | Assumes no resistance from immunity ($e_{im}$ = 0). |
| Partial | $1 - e_{im} N_v/N_o$ | Assumes partial resistance provided by immunity ($0 < e_{im} < 1$) |
| Absolute | $1 - N_v/N_o$ | Assumes complete resistance from immunity ($e_{im}$ = 1) | where accounting for partial or complete immunity essentially reduces the number of susceptible occupants in accordance with the immunity effectiveness (e.g., simple linear scaling can provide correct mean value). In some embodiments, there can be interplay between the immunity scale and the outcome scale. Furthermore, the probability of serious illness or hospitalization can depend on whether individuals are vaccinated/immune. In some embodiments, the $p_h$ parameter can implicitly depend on the immunity rate and in such circumstances, the user may desire to set $\sigma_{Immunity}$=1 and account for effects via $\sigma_{Outcome}$.

In some embodiments, the immunity scale option ($\sigma_{Infector}$) can be prioritized based on:

| Name | $\sigma_{Immunity}$ | Description |
|---|---|---|
| Reproductive | 1 | Assumes 1 infector has made it into the building. |
| Prevalence | $p_I N_o$ | Estimates number of infectors in the building based on community infection probability. |
| Hybrid | $\min(p_I N_o, 1)$ | Shifts from Prevalence to Reproductive once community infection probability gets too high. | where reproductive does not require any external data, but prevalence can be a more realistic picture of infection risk, but it is subject to much more uncertainty (e.g., require community infection rate $p_I$, and does not consider the effects of temperature checks or other screening activities). Hybrid can automatically adjust based on community prevalence but may be more challenging to set scoring thresholds and may give an overly optimistic picture during severe outbreaks.

In some embodiments, the outcome scale option ($\sigma_{Outcome}$) can be prioritized based on:

| Name | $\sigma_{Immunity}$ | Description |
|---|---|---|
| Transmissions | 1 | Counts number of disease transmissions regardless of outcomes. |
| Hospitalizations | $p_h$ | Counts only the disease transmissions that lead to hospitalization (or other severe outcome). |
| First-Order Absences | $p_a$ | Counts number of absences resulting from first-order transmissions. |
| Second-Order Absences | $p_a(1 + (1 - p_a)t_I R)$ | Counts number of absences resulting from first-order transmissions and second-order transmissions (when the first-order transmission does not lead to an absence). | where hospitalizations can be appropriate when severe cases result in much greater cost than do mild cases, but it could potentially make optimization moot in low-probability $p_h$ limit. Absences can be most appropriate for schools and offices where the same occupants are present day after day. First-order may be the simplest scale to determine but may underestimate risk, whereas second-order may be more realistic by considering additional spread for occupants that become infected but are not absent. However, absence probability $p_a$ is probably more a function of testing than disease severity, which can add uncertainty.

In some embodiments, the community scale option ($\sigma_{Community}$) can be prioritized based on:

| Name | $\sigma_{Immunity}$ | Description |
|---|---|---|
| Building | 1 | Consider only the events that happen in the building and not any resulting effects on the local community. |
| First-Order Community | $1 + R_C$ | Consider the events in the building and the events that will result from first-order transmissions into the local community. |
| Nth-Order Community | $\sum_{n=0}^{N} (R_c)^n$ | Consider the events in the building and resulting transmissions into the community up to and |

-continued

| Name | $\sigma_{Immunity}$ | Description |
|---|---|---|
| | | including order N transmissions. | where building focuses just on the space of interest, while neglecting any downstream negative outcomes. The Nth-order community can provide a more holistic picture of transmission consequences, but can require location-dependent transmission rate $R_C$, and if $R_C > 1$, then the scale grows very quickly for increasing N. First-order community can provide a balanced approach by adjusting up and down with community infection rate, but with less severe scaling than Nth-order.

As described with reference to FIG. 21, a disease risk score can be calculated and shown on user interface 2100. Furthermore, based on the priority based Wells-Riley equation, the disease risk score can be converted to a given metric, and four interpolation points (or more or less) can be used in assessing the overall risk. The scoring can include, in some example implementations: (1) Excellent: receive score of 100 at this level or anything better, (2) Good: receive a score of 85 at this level, (3) Okay: receive a score of 50 at this level, and (4) Poor: receive a score of 0 at this level or anything worse. In some embodiments, scores can be interpolated linearly within each of the three regions, and can be clipped between 0 and 100. In various embodiments, the thresholds could be configurable on a per-AHU basis.

Referring to automatically dispatching setpoints to the BMS with no manual intervention in more detail, in some embodiments, controller 1110 can perform various action (e.g., notice user or building manager) and adjust setpoints including, but not limited to, installation of different in-duct filter type (e.g., MERV8 versus MERV13), installation of additional in-zone air cleaners and/or activation/deactivation of such cleaners, setting of a minimum outdoor-air ventilation setpoint, economizer suitability temperature setpoint, and/or AHU supply temperature setpoint, activation of in-zone air cleaners (if installed), activation of in-duct air cleaners (if installed), setting of demand-controlled ventilation $CO_2$ setpoint, zone temperature setpoint, and/or zone humidity setpoint, etc. As such, controller 1110 can update or adjust operational decisions that daily (or more or less often) via the BMS.

Hospitalization Metric Techniques

Referring again to FIGS. 41 and 42, various techniques for performing the Pareto optimization based on a hospitalization metric are described herein. In some embodiments, the hospitalization metric can be introduced into the Pareto optimization as a part of the infection risk objective (described above) such that the Pareto optimization considers energy cost, infection risk (including the hospitalization metric). In alternative embodiments, the hospitalization metric can be introduced into the Pareto optimization as a third control objective (i.e., objective function) such that the Pareto optimization considers energy cost, infection risk, and the hospitalization metric. It should be understood that the hospitalization metric described herein can provide an estimation of expected transmissions, expected case of serious illness, expected hospitalizations, and/or expected number of absences from work/school. For example, a user may select the desired objective function (e.g., expected transmissions, expected case of serious illness, expected hospitalizations, and/or expected number of absences from work/ school) associated with infection risk, such that the Pareto optimization considers energy cost and the infection risk (including the hospitalization metric).

In some embodiments, serious illness can be defined as a case worse than a cold (e.g., fever over 100 degrees Fahrenheit, received a prescription drug, and/or symptoms lasted more than 5 days). In various embodiments, hospitalizations can be defined as a case that is expected to be hospitalization. In some embodiments, expected number of absences from work can be based on two data points: (1) the probability $p_a$ that a transmission leads to an absence (e.g., due to symptoms or a positive test) and (2) the average number of days $n_a$ that the person remains absent for. In turn, from the existing in-building daily reproductive number R, the expected number of absences $N_a$ caused by each infector is given as:

$$N_a=Rp_an_a$$

For cases where $p_a\ll1$ (e.g., that that infected individuals may not be absent due to asymptomatic cases), the calculation can also consider the additional second-order absences caused by those infectious individuals not being absent. Using the period $t_i$ over which those individuals are infectious, the total number of absences (first-order and second-order) can be as follows:

$$N_a=Rn_a(p_a+(1-p_a)t_iR)$$

In general, $n_a$ can be the number of required quarantine days, and $p_a$ can be the probability that the infection is symptomatic and would be caught by screening. $t_i$ would vary by disease but should generally be available from the CDC. Additional objective functions can be used that could depend on information tracked by a health organization (e.g., hospital, CDC).

The hospitalization metric may include the composite dataset (e.g., one or more estimated unknown parameters) based on enriched data from various data streams and local infection data (e.g., from CDC). In particular, the hospitalization metric includes BAS related metrics, IAQ metrics, and space characteristic metrics. In some embodiments, hospitalization metrics can be generated on an enterprise-wide basis (e.g., one value for the whole enterprise), on a building-by-building basis, on a campus-by-campus basis, by business unit/department, by building system or subsystem (e.g., HVAC, lighting, security, etc.), by control loop (e.g., chiller control loop, AHU control loop, waterside control loop, airside control loop, etc.), by building space (e.g., per room or floor) or by any other division or aggregation. Hospitalization metrics can be calculated or generated based on actual or historical building operations or predicted for future building operations using one or more predictive models (calculating hospitalization metrics can include similar techniques described herein with reference to calculating infection risk using the techniques herein).

The techniques described herein with reference to FIGS. 41 and 42 can be performed or implemented by the controller 1110, the functionality of the controller 1110 as shown in the diagram 1200, etc., with the one or more hospitalization metrics used in the Pareto optimization as an additional parameter (e.g., an additional degree of freedom for the optimization to thereby result in points that define a Pareto optimal surface) in the infection risk control objective, as data-drive estimates of existing parameters and/or inputs, or as a post-processing calculation to determine a hospitalization metric for the various proposed solutions or operating schedules. Advantageously, the hospitalization metric techniques described herein can be used for at least one of (i) an operational optimization to minimize or to inform a building administrator regarding potential hospitalization risks among employee, or (ii) a design optimization to determine infrastructure (e.g., building equipment, HVAC equipment, etc.) that results in reduced transmission of a particular disease, reduced case of serious illness (e.g., defined by the CDC), reduced hospitalization, reduced number of absences, etc.

It should be understood that the additional data (from the composite dataset) could be used to produce data-driven estimates of the parameters and inputs used in our existing models. Some relevant, but not limited to, additional data can include: (1) occupancy and breathing rate: estimate from IAQ measurements (per Item 5) if available (otherwise, fall back to default schedule), (2) filtration efficiency: estimate from PM measurements if available (otherwise, fall back to the default efficiency for the filter's MERV rating), (3) viral decay and respiratory aerosol deposition rates: apply models with zone-level temperature and humidity measurements if available (otherwise, apply with BMS measurements from the return air), (4) respiratory aerosol generation rates: estimate from size-dependent PM measurements if available (otherwise, fall back to default values), (5) model granularity: apply room-by-room model is required room-level data is available (otherwise, apply aggregate model for the whole space served by the AHU). Accordingly, by having appropriate fallbacks for most parameters (while not required), the overall approach described herein can remain plug-and-play.

As shown, the composite dataset (e.g., all estimated unknown parameters of FIGS. 41 and 42) can provide additional advantages such as improving monitoring capabilities (e.g., room-level analysis, where room-level BAS data and room-level IAQ measurements are available). For example, the improved monitoring capabilities can include estimating occupancy in each room (e.g., accounting for recirculation across different rooms), applying existing infection-risk models but to specific rooms instead of larger spaces, IAQ summary indices can be calculated using multiple data streams, and identifying specific rooms with high infection risk or poor IAQ. Optimizing building HVAC controls for disease reduction and infection-risk monitoring are described with further reference to U.S. patent application Ser. No. 17/459,963, filed Aug. 27, 2021, U.S. patent application Ser. No. 17/476,351, filed Sep. 15, 2021, U.S. patent application Ser. No. 17/013,273, filed Sep. 4, 2020, and U.S. patent application Ser. No. 17/541,119, filed Dec. 2, 2021, all of which are incorporated by reference herein in their entirety.

Furthermore, the infection-risk monitoring described herein can be extended to apply at the AHU level. Additionally, metrics could be presented on a real-time dashboard (e.g., via the cloud) on a user interface (e.g., 2100, 2200, etc.), a report could be generated to cover a specific assessment period (e.g., 1-2 weeks), and/or a static recommendation may be presented or provided to a user (e.g., "Reduce temperature setpoint to save energy," "Increase minimum ventilation rate to improve IAQ," "Install an in-zone air cleaner to reduce infection risk," etc.). As shown, the metrics can be presented or provided to users to provide additional specificity by including estimates of energy, infection risk, and/or other relevant metrics with each recommendation. The recommendations could also be based on the specific opportunities for improvement for each space. For example, the recommendation could indicate: "Room 12 has elevated infection risk of 2.5, which is above the average of 1.5 for the building. Installing a 1000 CFM air cleaner would reduce infection risk to 1.25 at a cost of $50/month." In another example, the recommendation could indicate: "Room 20 has a low infection risk of 0.5, which is below the average of 1.5. Installing demand-controlled ventilation would save $65/month energy cost while increasing infection risk to 1.0." Accordingly, the composite dataset can provide improvement allowing room-level recommendation and additional specificity to quantitative estimates.

In some embodiments, the functionality of the hospitalization metric can be performed in an on-demand manner in response to a user input, according to some embodiments. In should be understood such functionality can be implemented client-side (e.g., user device), server-side, or both. For example, the dynamic model simulator 1232 can be transitioned between performing a simulation for energy consumption, energy cost (e.g., the objective function values), or infection risk generally, or more specifically, for a hospitalization metric. In some embodiments, the functionality of the hospitalization metric can be provided as a display feature. For example, the Pareto optimal values may be provided to the user (e.g., via the display device 422, a user interface, a display screen, etc.) in terms of energy consumption or energy cost, and can be toggled (e.g., in response to a user input) to the infection risk including the hospitalization metric in response to a user input. In this way, the user can use either energy consumption, energy cost, infection risk, or infection risk with the hospitalization metrics to determine which control decisions to select. In some embodiments, the controller 1110 operates to provide infection risk with hospitalization metrics, and the energy cost or consumption to the user (e.g., via the display device 422) without requiring a user input.

In some embodiments, the additional parameters of the one or more hospitalization metrics used in the Pareto optimization can be predefined, predetermined, or stored values, may be determined (e.g., using a function, an equation, a table, a look-up table, a graph, a chart, etc.) based on IAQ measurements, BAS data, or space characteristics, or may be based on a user preference. In particular, the additional parameters can be adjusted by user input. For example, a user may desire to adjust a disease-specific parameter to select a specific disease of interest (e.g., COVID, influenza, measles, tuberculosis, etc.). In some embodiments, the adjustment of the disease-specific parameter can adjust the disease quanta generation rate q (described above), as well as include additional new parameters such as, but not limited to, expected transmissions, expected case of serious illness, expected hospitalizations, and/or expected number of absences from work/school.

It should be understood, the user can customize various parameters (e.g., threshold, weights) of the additional parameters to get new Pareto optimization results. As additional parameters are obtained and the desired objective function is selected (e.g., expected transmissions, expected case of serious illness, expected hospitalizations, and/or expected number of absences from work/school), recommendation can be updated regarding operating possibilities such as a minimum expected hospitalization, minimum disease specific spread, minimum infection risk and expected transmission, etc.

Referring again to FIG. 21-22, the Pareto optimal values may be provided to the user (e.g., via the display device 422, a user interface, a display screen, etc.) in terms of hospitalization risk (e.g., a subset of infection risk). In this way, the user can be provided metric selection, disease selection, risk-tolerance selection, recommendation filtering, and visualization of alternatives. For example, the user can select one or more recommendation filters to designate relative weights for two or more objective functions, add hard constraints on one or more metrics, and/or add further restrictions on the HVAC variables. In some embodiments, a default profile may have a default values of weights for both objective functions, but the filters could allow the user to create a custom profile, e.g., 45% energy cost and 55% hospitalization risk. In various embodiments, metric constraints could be added to further restrict the set of possible options (e.g., "keep infection risk below 1.5 per infector per day"), and an informative message could be displayed (e.g., via a display device) if one or more of these constraints are too tight. Furthermore, adding such filters on the user interface (e.g., 2100, 2200) as postprocessing could allow values to be refined without having to redo the optimization (e.g., if the user knows an in-zone filtration unit is broken, they could remove all solutions that use that unit). In some embodiments, the user may select the various objective functions (e.g., two, three, or four) to examine tradeoffs from the results of the Pareto optimization. In various embodiments, the user may be provided a default recommendation (e.g., highlighted on the display device) based on the selected Pareto optimization objective functions.

Referring again to FIGS. 11-19, the controller 1110 (or 310) can be configured to optimize building HVAC control based on the composite dataset assembled and analyzed at blocks 4110 to 4140 of FIG. 41. For example, the composite dataset can include carbon dioxide concentrations that can be used by controller 1110 to estimate true occupancy. In another example, the composite dataset can include particulate matter (PM) measurements that can be used by controller 1110 to estimate filtration efficiency and natural particle deposition rates. In some embodiments, the filtration efficiency can be estimated using one measurement just before the filter and one measurement just after. Alternatively, based on HVAC setups, this could be expanded to three: one in the supply duct (after the filter), one in the return duct (which gives essentially an average of zone concentrations), and one outside (so you know what's coming in). As such, if there are periods of low occupancy, controller 1110 can also make a reasonable estimate without the supply measurement. In any case, controller 1110 could calculate an equivalent MERV rating for the filter as operating and compare that with what the filter's MERV rating is supposed to be. If there is a big mismatch, the filter may be installed incorrectly or generally be defective, and an alarm could be generated by controller 1110. In various embodiments, filter lifespan may not be as relevant for infection risk (e.g., filter efficiency generally improves as the filter is used, which is good for reducing infection risk), but if pressure-drop measurements are available, energy analysis by controller 1110 could be considered as well to recommend specifically when to replace a given filter.

In yet another example, the composite dataset can include localized temperature and humidity data allowing for more accurate estimation of decay rates and size distributions for respiratory aerosols. As such, controller 1110 could apply models of viral decay and particle deposition with more confidence using space-by-space measurements. For example, for viral decay, viral activity can reduce over time as a function of temperature and humidity. In another example for particle deposition, rates can be primarily size-dependent, but because the size distribution of respiratory aerosols produced by humans depends on humidity, the effective deposition rate for infectious aerosols can be dependent on humidity. As such, since temperature and humidity vary from space to space, and so by using localized measurements (rather than averages at the AHU return), controller 1110 get a sharper estimate of infection risk. In various embodiments, controller 1110 can also analyze size-resolved PM concentration measurements, which can be used to directly infer particle generation rates from the data. For example, a standard mass balance:

$$V\frac{dc_r}{dt} = g_r + f_s(c_r^s - c_r)$$

where $c_r$ is the concentration of size-r particles in the air, V is the space volume, $g_r$ is the generation rate, $f_s$ is the supply flow rate, and $c_r^s$ is the concentration of size-r particles in the supply. Since controller 1110 can measure all of these variables except for $g_r$, controller 1110 can thus estimate $g_r$ using this relationship. This value can then be correlated against occupancy and space humidity to determine the actual level of respiratory activity in the space, rather than having to rely on default values.

In some embodiments, additional data streams can be added and incorporated into the composite dataset, and the controller 1110 executing the Pareto optimization model may automatically incorporate the additional data streams (e.g., presence of sensors can be checked via a digital twin, and data could be fetched accordingly). In some embodiments, the digital twin could tell the controller 1110 whether particular sensors are available and provide available data. The controller 1110 could then use data directly where available and otherwise revert to fallback strategies (e.g., assuming default values or applying simpler models). Accordingly, the user wouldn't have to manage the point mapping, and if a new sensor is installed, the data automatically flows to the algorithms (e.g., Wells-Riley, Pareto Optimization, etc.) executed by controller 1110. Alternatively, when data streams become unavailable (e.g., offline, error) controller 1110 executing the Pareto optimization model may automatically revert back to previous approaches using other data streams.

In some embodiments, the composite dataset can provide additional advantages such as improving occupancy estimation capabilities. For example, multiple data streams can be used simultaneously to enrich estimates, as occupants are a source of $CO_2$, humidity, and particulates. The BAS/HVAC operational data can provide information about, for example, airflow rates (outdoor airflow rate, recirculation rate and average return data), etc. Thus, the composite dataset can remove the need to make assumptions about ventilation. Furthermore, the controller 1110 (or 310) could use the composite dataset to determine typical activity level by room, typical breathing rates in office spaces, and higher breathing rates in gyms. Accordingly, occupancy estimates would enrich infection-risk calculations (e.g., Wells-Riley, Pareto Optimization) but could also be passed to other analytics/optimization solutions that require occupancy information (e.g., prediction of energy/water consumption). In some implementations, data can be applied on a room level by making use of relationships between rooms, such as by leveraging relationship information between spaces/rooms stored within a digital twin.

Furthermore, with higher-accuracy occupancy estimates, control strategies can be fine-tuned to further reduce infection risk and occupancy estimates could be used by controller 1110 to build occupancy forecasting models, which in turn could be used for predictive optimization (e.g., pre-ventilate space prior to occupancy to ensure fresh starting air, post-ventilate spaces to flush any potential pathogens).

For example, spaces with high occupant density could be targeted by controller 1110 for installation of in-zone air cleaners (e.g., notify the user), which could reduce costs (e.g., rather than trying to increase clean air via the BMS). The controller 1110 could also help mitigate short-range transmission better than via BMS.

In some embodiments, using $CO_2$ concentrations, humidity, and PM measurements stored in the composite dataset can enable controller 1110 (or 310) to correlate PM measurements with occupancy to directly estimate the concentration of respiratory aerosols in the air (e.g., accuracy can be better with size-resolved PM measurements, as human-source aerosols can be better distinguished from dust and other ambient particles). For example, relative indoor versus outdoor PM measurements can be used to estimate filtration efficiency of AHU, which could help controller 1110 identify poorly-installed filters that are not providing their rated filtration efficiency.

In various embodiments, controller 1110 can calculate an estimation of time-varying ventilation and recirculation rate using IAQ measurements. For example, multiple IAQ data streams can be used simultaneously to estimate HVAC ventilation and recirculation rates, since IAQ quantities can be affected by ventilation, decaying at a given rate. In this example, where there is recirculation among zones, concentration differences can be relevant. In this example, using all variables simultaneously can significantly improve accuracy of estimated airflows. Furthermore, in many situations, relevant BMS timeseries data may not be available (e.g., when installing portable IAQ sensors, points not mapped or not trended, flow sensors not installed due to cost).

In some embodiments, the composite dataset may also include wastewater data (e.g., gathered from sensors connected to pipes within and/or outside the building.) Controller 1110 can perform wastewater monitoring to estimate prevalence of infectious diseases in building occupants. The measurements could be used to adjust risk tolerance in tradeoff between energy use and infection risk. For example, when prevalence is low, prioritize energy reduction, when prevalence is high, prioritize disinfection even if energy cost is high, and if prevalence gets very high, could decide to shut down building completely. Furthermore, with wastewater monitoring (or testing), models of airborne infection risk can be validated. For example, controller 1110 could assess correlation between predicted high airborne infection risk and actual incidence). Additionally, performance of building relative to community at large could be assessed. For example, controller 1110 could compare disease incidence rate in building to community numbers from CDC. In another example, the user could provide an indication they desire the building to have 50% lower infection rate than average. While wastewater data may be one source of information, it should be understood that the composite dataset may additionally or alternatively include data from any number of other sensors, such as sensors configured to sense the presence of substances in the air, on surfaces, etc. (e.g., a DNA/RNA detection device that detects presence of an infectious disease in the air).

In various embodiments, controller 1110 can use the composite dataset to perform multi-objective optimization of HVAC setpoints to manage energy use, infection risk, IAQ, carbon production/reduction, occupant comfort, and/or any number of other factors. In some embodiments, dynamic models for IAQ species (sometimes referred to herein as "environment species") could be added to the existing models where the model forms can be the same mass balances as for infectious aerosols, but the rates of generation, removal, and outdoor concentration may be different. Furthermore, removal rates can be known, outdoor concentrations could be measured, and generation rates could be inferred from data. In some embodiments, each IAQ species (described above) can become an independent objective function, along with an overall index that aggregates all species (similar to air quality index for outside air quality). For example, while infection risk is still available as an objective, controller 1110 could de-prioritize the objective when underlying community infection risk is low. In various embodiments, the user could choose what specific objectives to prioritize, and the algorithm would return corresponding recommendations. Multi-objective optimizations are described with further reference to PCT Application No. PCT/US2021/061788, filed Dec. 3, 2021, the entire disclosure of which is incorporated by reference herein.

Configuration of Exemplary Embodiments

Although the figures show a specific order of method steps, the order of the steps may differ from what is depicted. Also, two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, calculation steps, processing steps, comparison steps, and decision steps.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may include or otherwise share the same processor which, in some example embodiments, may execute instructions stored, or otherwise accessed, via different areas of memory). Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A building management system (BMS) for executing an indoor air quality (IAQ) analysis of a building, the BMS comprising:

a controller comprising memory and one or more processors configured to:

obtain IAQ data from one or more sensors within the building, wherein the IAQ data is associated with at least one of a plurality of environment species;

obtain building automation system (BAS) data;

estimate at least one unmeasured time-series airflow parameter for a plurality of single-species concentration models based on enriching two or more of the plurality of environment species according to an occupancy parameter over a time-series based on inputting the IAQ data and the BAS data into an optimization model;

provide the estimated at least one unmeasured time-series airflow parameter to one or more predictive models configured to predict values of a control objective for one or more building zones as a function of control decision variables for HVAC equipment; and operate the HVAC equipment to affect an environmental condition of the building in accordance with a selected set of optimization results from the one or more predictive models.

2. The BMS of claim 1, the one or more processors further configured to:

in response to estimating the at least one unmeasured time-series airflow parameter, modify a control strategy or ventilation schedule for the one or more building zones based on the estimated at least one unmeasured time-series airflow parameter.

3. The BMS of claim 1, wherein the estimated at least one an unmeasured time-series airflow parameter is an estimated ventilation rate, and wherein the one or more processors are further configured to:

compare an expected ventilation rate of HVAC system with the estimated ventilation rate; and in response to the expected ventilation rate and the estimated ventilation rate diverging from each other, modify a control strategy for the one or more building zones based on the estimated ventilation rate and a ventilation schedule for the one or more building zones.

4. The BMS of claim 3, wherein an occupancy estimate and a particle generation rate are back calculated based on:

calculating a time series particle disturbance based on the estimated ventilation rate and the IAQ data, wherein an increase in a portion of the time series particle disturbance indicates an increase in occupancy of the one or more building zones of the building; and calculating the particle generation rate based on an occupancy dataset comprising occupant ages and occupant metabolic rates.

5. The BMS of claim 1, wherein the occupancy parameter is a peak occupancy over a given time period, and wherein the occupancy parameter is scaled according to a scaling factor.

6. The BMS of claim 1, wherein the two or more of the plurality of single-species concentration models are an ordinary differential equation model, and wherein at least one value of at least one environment species of the plurality of environment species is updated according to a single-species concentration model using one or more basis function expansions of the at least one unmeasured time-series airflow parameter.

7. The BMS of claim 6, wherein a predicted error of the optimization model of the two or more of the plurality of environment species of the plurality of environment species is scaled according to one or more scaling coefficients of the optimization model, wherein the two or more of the plurality of environment species is collected from a sensor of the one or more sensors.

8. The BMS of claim 1, wherein the plurality of environment species comprises at least two of a carbon dioxide species, a particulate matter species, a volatile organic compounds species, and a humidity species.

9. The BMS of claim 1, wherein the optimization model comprises an objective function, and wherein the objective function is minimized by adjusting the at least one unmeasured time-series airflow parameter according to predicted concentrations matching one or more measured time series concentrations.

10. The BMS of claim 9, wherein the at least one unmeasured time-series airflow parameter comprises at least one of a time series ventilation rate, or a time series recirculation rate, and wherein the two or more of the plurality of environment species are associated with one or more of the predicted concentrations.

11. The BMS of claim 10, wherein the predicted concentrations are different for each of the plurality of single-species concentration models.

12. The BMS of claim 1, the one or more processors further configured to execute the one or more predictive models to:

scale at least one of a first control objective or a second control objective based on the estimated at least one unmeasured time-series airflow parameter and at least one hospitalization metric;

execute an optimization process using the one or more predictive models to produce multiple sets of optimization results of the control decision variables and corresponding sets of optimal values of the first control objective and the second control objective for a time period;

select one or more of the sets of optimization results; and operate the HVAC equipment to affect the environmental condition of the building in accordance with the values of the control decision variables corresponding to a selected set of the optimization results.

13. A building management system (BMS) for executing an indoor air quality (IAQ) analysis of a building, the BMS comprising:

a controller comprising memory and one or more processors configured to:

obtain IAQ data from one or more sensors within the building, wherein the IAQ data is associated with an environment species;

obtain building automation system (BAS) data;

identify a ventilation rate and a recirculate rate as a plurality of unknown parameters from the IAQ data and the BAS data the environment species;

estimate the ventilation rate and the recirculate rate based on inputting the IAQ data and the BAS data into an optimization model, and wherein the optimization model analyzes predicted concentrations of the environment species subject to the environment species evolving according to a single-species concentration model;

provide the estimated ventilation rate and the estimated recirculate rate to one or more predictive models configured to predict values of a control objective for one or more building zones as a function of control decision variables for HVAC equipment; and operate the HVAC equipment to affect an environmental condition of the building in accordance with a selected set of optimization results from the one or more predictive models.

14. The BMS of claim 13, wherein the single-species concentration model is an ordinary differential equation model, and wherein the environment species is subject to the environment species evolving according to the single-species concentration model using one or more basis function expansions of the plurality of unknown parameters.

15. The BMS of claim 13, wherein the optimization model comprises an objective function, and wherein the objective function is minimized by adjusting the plurality of unknown parameters according to the predicted concentrations matching one or more measured time series concentrations.

16. The BMS of claim 13, the one or more processors further configured to:

in response to estimating the ventilation rate and the recirculate rate, modify a control strategy for the one or more building zones based on improving a value of the predicted values.

17. A computer-implemented method for executing an indoor air quality (IAQ) analysis of a building, the computer-implemented method comprising:

obtaining, by a processing circuit, IAQ data from one or more sensors within the building, wherein the IAQ data is associated with at least one of a plurality of environment species;

obtaining, by the processing circuit, building automation system (BAS) data;

estimating, by the processing circuit, at least one unmeasured time-series airflow parameter for a plurality of single-species concentration models based on enriching the two or more of the plurality of environment species according to an occupancy parameter over a time-series based on inputting the IAQ data and the BAS data into an optimization model and scaling the optimization model according to an occupancy parameter over a given time period;

providing, by the processing circuit, the estimated at least one unmeasured time-series airflow parameter to one or more predictive models configured to predict values of a control objective for one or more building zones as a function of control decision variables for HVAC equipment; and causing, by the processing circuit, an operation of the HVAC equipment to affect an environmental condition of the building in accordance with an output from the one or more predictive models.

18. The computer-implemented method of claim 17, wherein the estimated at least one unmeasured time-series airflow parameter is an estimated ventilation rate, and wherein the computer-implemented method further comprises:

comparing, by the processing circuit, an expected ventilation rate of HVAC system with the estimated ventilation rate; and in response to the expected ventilation rate and the estimated ventilation rate diverging from each other, modifying, by the processing circuit, a control strategy for the one or more building zones based on the estimated ventilation rate and a ventilation schedule for the one or more building zones.

19. The computer-implemented method of claim 18, wherein an occupancy estimate and particle generation rate are back calculated based on:

calculating, by the processing circuit, a time series particle disturbance based on the estimated ventilation rate and the IAQ data, wherein an increase in a portion of the time series particle disturbance indicates an increase in occupancy of the one or more building zones; and calculating, by the processing circuit, the particle generation rate based on an occupancy dataset comprising occupant ages and occupant metabolic rates.

20. The computer-implemented method of claim 17, wherein two or more of the plurality of single-species concentration models are an ordinary differential equation model, and wherein at least one value of at least one environment species of the plurality of environment species is updated according to a single-species concentration model using one or more basis function expansions of the at least one unmeasured time-series airflow parameter.

\* \* \* \* \*